US012277842B2

(12) United States Patent
Saitoh et al.

(10) Patent No.: US 12,277,842 B2
(45) Date of Patent: Apr. 15, 2025

(54) SELF-CHECKOUT SYSTEM AND METHOD FOR DETECTING A REGISTRATION FAILURE FOR A PRODUCT

(71) Applicant: Teraoka Seiko Co., Ltd., Tokyo (JP)

(72) Inventors: Fumikatu Saitoh, Tokyo (JP); Mitsutoshi Yoshida, Tokyo (JP); Tomoki Kaneko, Tokyo (JP); Kazuki Watanabe, Tokyo (JP); Naoto Kurosaki, Tokyo (JP); Ekaterina Mamontova, Tokyo (JP)

(73) Assignee: Teraoka Seiko Co., Ltd., Tokyo (JP)

( * ) Notice: Subject to any disclaimer, the term of this patent is extended or adjusted under 35 U.S.C. 154(b) by 0 days.

(21) Appl. No.: 17/883,945

(22) Filed: Aug. 9, 2022

(65) Prior Publication Data

US 2023/0043615 A1    Feb. 9, 2023

Related U.S. Application Data

(63) Continuation of application No. PCT/IB2021/051039, filed on Feb. 9, 2021.

(30) Foreign Application Priority Data

Feb. 10, 2020 (JP) .................................. 2020-020717
Aug. 4, 2020 (JP) .................................. 2020-132372
(Continued)

(51) Int. Cl.
 *G07G 1/00* (2006.01)
 *G07G 1/01* (2006.01)

(52) U.S. Cl.
 CPC ........... *G07G 1/0081* (2013.01); *G07G 1/009* (2013.01); *G07G 1/01* (2013.01)

(58) Field of Classification Search
 None
 See application file for complete search history.

(56) References Cited

U.S. PATENT DOCUMENTS 9,892,438 B1    2/2018   Kundu et al.
2012/0284132 A1   11/2012   Kim et al.
(Continued)

FOREIGN PATENT DOCUMENTS

JP    2018-147252 A    9/2018
JP    2020-67947 A    4/2020

OTHER PUBLICATIONS

International Search Report issued in corresponding International Application No. PCT/IB2021/051039 mailed Apr. 27, 2021 (5 pages).

(Continued)

*Primary Examiner* — Suezu Ellis
(74) *Attorney, Agent, or Firm* — Osha Bergman Watanabe & Burton LLP

(57) ABSTRACT

A self-checkout system includes a checkout device that checks out a product registered by a portable terminal, a camera that captures an image of a scene where a customer attempts to register the product, a detector that detects a registration failure state where registration of the product is determined to have failed during a period in which the registration of the product according to a single transaction is attempted, and a display that displays, during a period in which the checkout device is checking out the product registered according to the single transaction, the detected registration failure state.

6 Claims, 55 Drawing Sheets

(30) Foreign Application Priority Data

Sep. 10, 2020 (JP) ................................. 2020-151786
Sep. 10, 2020 (JP) ................................. 2020-152041

(56) References Cited

U.S. PATENT DOCUMENTS

2018/0114322 A1* 4/2018 Sawada ................ G07G 1/0036
2018/0253604 A1* 9/2018 Hiramatsu ............. G06V 20/52
2021/0192902 A1* 6/2021 Sasaki .................. G06Q 20/322
2021/0295299 A1* 9/2021 Suzuki .................. G06Q 20/20

OTHER PUBLICATIONS

Written Opinion issued in corresponding International Application No. PCT/IB2021/051039 mailed Apr. 27, 2021 (3 pages).
Extended European Seach Report issued in corresponding European Application No. 21754070.7, mailed Feb. 1, 2024 (8 pages).

* cited by examiner

| Patron ID | Patron Name | Patron Registration Date | Cancellation Information (Past Totals) | Patron Rank | No. of Points | ... |
|---|---|---|---|---|---|---|
| C000001 | Taro Teraoka | YYYYMMDD | Previous visit to store: 2 times<br>Time before previous visit to store: 1 time<br>Three visits ago to store: 5 times | A | 305 | ... |
| C000002 | Hanako Teraoka | YYYYMMDD | ... | ... | ... | ... |
| ... | ... | ... | ... | ... | ... | ... |

FIG. 7A

| Store ID ("Shop, Corporate Code" + "Branch Code") | Store Name | Store-Specifying Info. 1 (2D Code Info.) | Store-Specifying Info. 2 (Position Info. (GPS Info.)) | ... |
|---|---|---|---|---|
| 0001-00001 | ○○ shop of AAA corporation | AAAXXXBBBCCC | Latitude: 35.XXXXXX<br>Longitude: 139.XXXXXX | ... |
| 0002-00001 | ○○ shop of BBB store | ... | ... | ... |
| ... | ... | ... | ... | ... |

FIG. 7B

| ("Store-Identifying Information" + "Date" + "Serial Number") | Transaction Start Date (Creation Date and Time)<br>Transaction End Date (Checkout Date and Time) | Patron ID |
|---|---|---|
| 0001-00001-YYYYMMDD-00175 | Transaction start date and time:<br>YYYYMMDD-HHMMSS<br>Transaction end date and time: - | C000001 |
| ... | ... | ... |

| Registered Product Information (Total) | Registered Product Information (Registered Product 1) | Registered Product Information (Registered Product 2) | ... |
|---|---|---|---|
| Number of items: 5<br>Approximate subtotal amount: 1280<br>Subtotal amount (calculated subtotal amount): - | Product code, item name, price,... | Product code, item name, price,... | ... |
| ... | ... | ... | ... |

| Held Product Information (Total) | Held Product Information (Held Product 1) | Held Product Information (Held Product 2) | Held Product Information (Held Product 3) |
|---|---|---|---|
| Number of items: 3<br>NO-FILE: 2<br>Reading failure (unauthorized operation confirmation required): 1 | Held product type: 1 (NO-FILE), product code | Held product type: 1 (NO-FILE), product code | Held product type: 2 (reading failure), image data |
| ... | ... | ... | ... |

| Cancellation Information (Current Total) | Cancellation Information (Cancellation 1) | Cancellation Information (Cancellation 2) | Payment State Info. |
|---|---|---|---|
| Number of cancellations: 2 | Product code, quantity | Product code, quantity | 20 |
| ... | ... | ... | 20 |

FIG. 7C

| Classification Number | Held Product Classification |
|---|---|
| 1 | NO-FILE |
| 2 | Reading failure |
| 3 | Pseudo-scan input |
| 4 | Non-scan input |
| 5 | Age confirmation product |
| 6 | Pharmaceutical product |
| 7 | Security tag product |
| 8 | Canceled product |

Rows 2–4: Registration failure

FIG. 8

When there is no held product

When there is no held product

When there is no held product

When there is no held product

| Managed products | > Please register the held products. | | |
|---|---|---|---|
| Age confirmation | Canned beer (350 mL) | ×1 | ¥116 |
| Security tag | Ceramic heater | ×1 | ¥2,350 |
| Pharmaceutical product | ○○ pharmaceutical Allergy medication | ×1 | ¥2,036 |
| Unscanned | — — — — — — | | |
| NO-FILE | — — — — — — | | |
| Canceled product | ~~Yakisoba~~ | | ~~¥122~~ |

| | | |
|---|---|---|
| ○○ canned beer (350 mL × 24 cans) | ×1 | ¥4,280 |
| Nigiri sushi ○(2 portions, 24 pieces) | | ¥1,680 |
| Natural shrimp pack from ○○ (2 packs) | | ¥1,000 |
| Soy sauce marinated salmon roe | | ¥980 |
| Beef brisket for sukiyaki from ○○ | | ¥690 |
| New Pione from ○○ | | ¥1,300 |
| ○○ original smoke | ×1 | ¥540 |
| Kawachi mandarins from ○○ | ×2 | ¥960 |
| ○○ wine (750 mL) | ×1 | ¥470 |
| Sushi set | ×1 | ¥470 |
| Rainbow trout from ○○ | ×1 | ¥450 |
| House strawberries from ○○ | ×1 | ¥450 |
| Sirloin pork cutlet meat from ○○ | ×1 | ¥450 |
| ○○ sukiyaki dipping sauce | ×1 | ¥370 |
| ○○ instant coffee | ×1 | ¥390 |
| ○○ mirin (1,000 mL) | ×1 | ¥350 |
| Pacific saury from ○○ (one piece) | ×1 | ¥300 |
| Naruto kintoki sweet potato from ○○ | ×1 | ¥280 |

¥1,000~ | ¥500~ | ~¥499 | ¥300~¥499 | ¥300~¥499

< 1/2 >

☐ Membership card reading complete

Approximate total    36 items    ¥ 28,682

Payment

FIG. 13

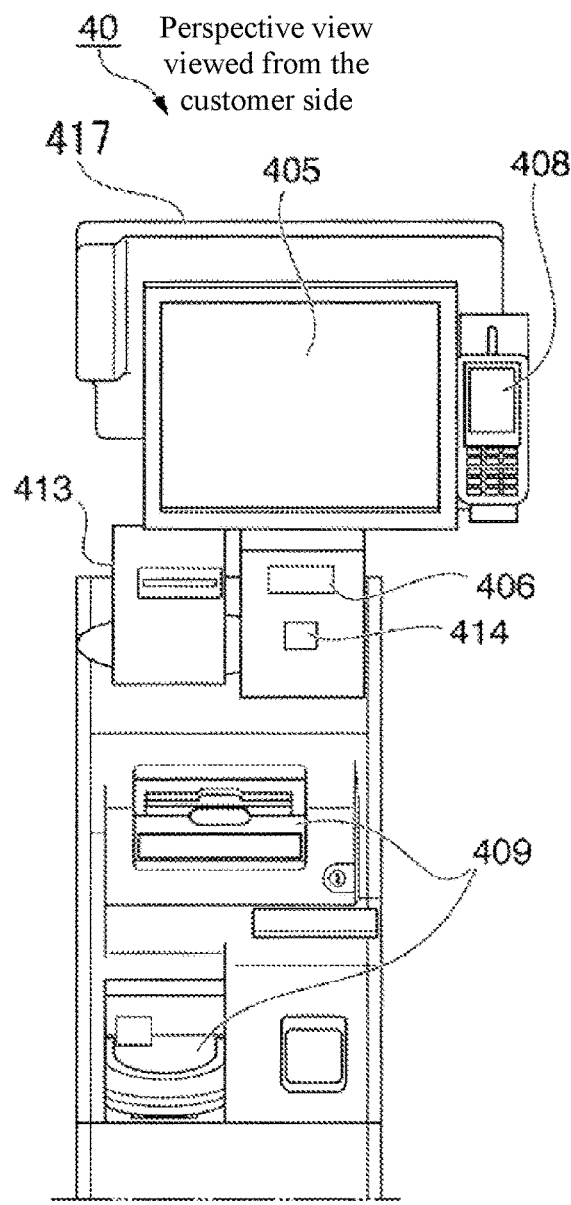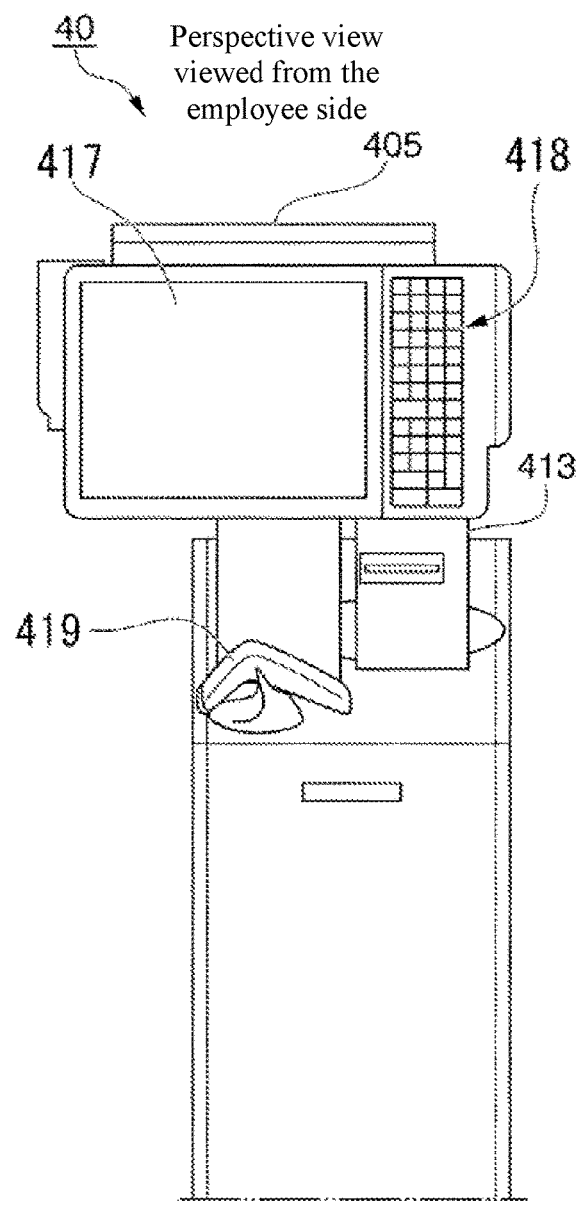
FIG. 24A
FIG. 24B

> An employee will be with you soon. Please wait.

BT31:
- [Illegible] Canned beer (350 mL) ×1 ¥116
- [Illegible] Ceramic heater ×1 ¥2,350
- [Illegible] ○○ pharmaceutical Allergy medication ×1 ¥2,036 TN
- [Illegible] Product could not be scanned. TN
- [Illegible] NON File 123456789123

AR31:
- Steak (three pieces) from USA ×1 ¥2,700
- Steak (two pieces) from USA ×1 ¥1,800
- Nigiri sushi ○(2 portions, 24 pieces) ×1 ¥1,680
- Natural shrimp pack from ○○ (2 packs) ×1 ¥1,000
- Soy sauce marinated salmon roe ×1 ¥1,300
- Beef brisket for sukiyaki from ○○ ×1 ¥690
- New Pione from ○○ ×1 ¥980

- ○○ original smoke ×1 ¥540
- Kawachi mandarins from ○○ ×2 ¥960
- ○○ wine (750 mL) ×1 ¥470
- Sushi set ×1 ¥470
- Rainbow trout from ○○ ×1 ¥450
- House strawberries from ○○ ×1 ¥450
- Sirloin pork cutlet meat from ○○ ×1 ¥450
- ○○ sukiyaki dipping sauce ×1 ¥390
- ○○ instant coffee ×1 ¥370
- ○○ mirin (1,000 mL) ×1 ¥350
- Pacific saury from ○○ ×1 ¥300
- Naruto kintoki sweet potato from ○○ ×1 ¥280

AR3

| ¥1,000~ | ¥500~ | ¥300~¥499 | ¥300~¥499 | ¥300~¥499 | Held product |
|---|---|---|---|---|---|
| 13 | 4 | 10 | 14 | | 5 |
| < | 1/2 | > | | | |

☐ Membership card reading complete

Approximate total  36 items  ¥28,682

| Classification No. (Held Product Classification) | Holding Sub-Classification Number (Holding Sub-Classification Name) | Reading Performance | Reading Outcome | Notes |
|---|---|---|---|---|
| 1 (NO-FILE) | 11 (NO-FILE) | Yes | Success | Not registered etc. in product file |
| 2 (Reading failure) | 21 (Pseudo scan (covered or the like)) | Yes | Failure | Covered, incorrect angle, etc. |
| | 22 (Pseudo scan (short time)) | Yes | Failure | Quick movement, etc. |
| | 23 (Barcode defect) | Yes | Failure | Wrinkling, stains, etc. |
| | 24 (Non-scan input) | No | --- | No scan operation |
| 3 (Specified product) | 31 (Age confirmation product) | Yes | Success | Alcohol, tobacco, etc. |
| | 32 (Pharmaceutical product) | Yes | Success | Confirmation by pharmacist, etc. |
| | 33 (Security tag product) | Yes | Success | Removal of security tag |
| 4 (Canceled product) | 41 (Canceled product) | Yes | Success | Cancellation after registration |

FIG. 35

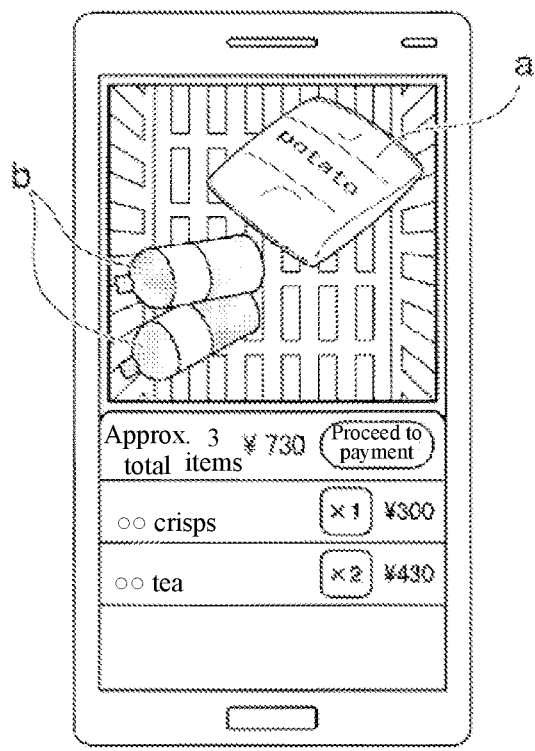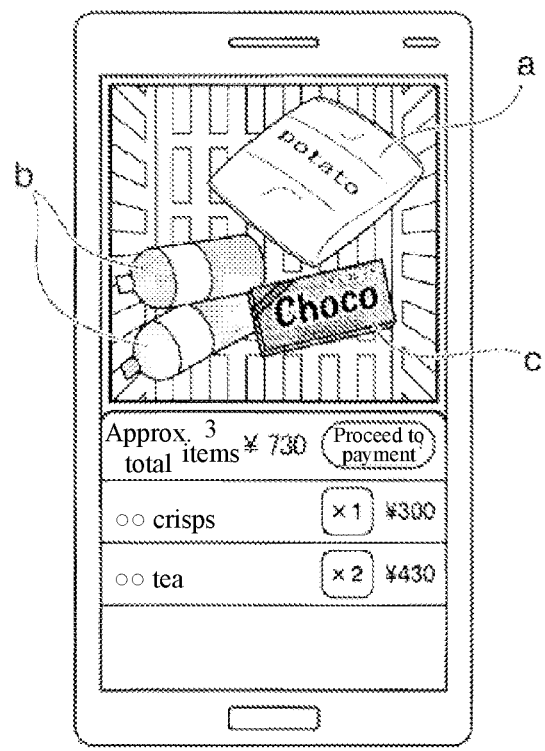
FIG. 40A  FIG. 40B
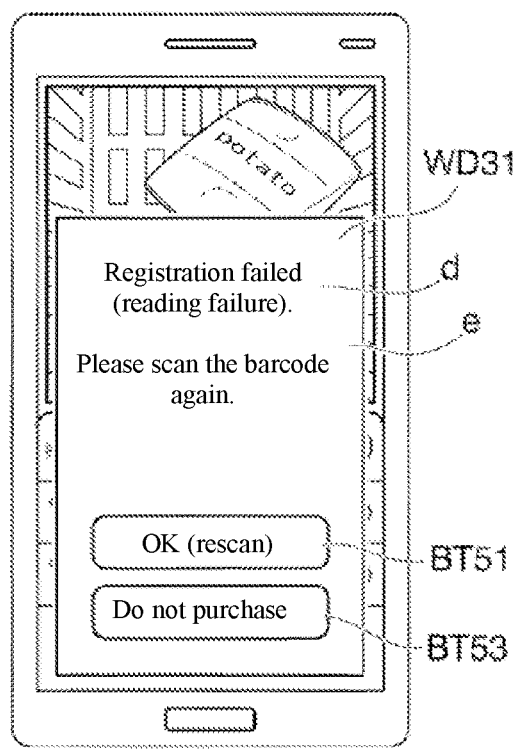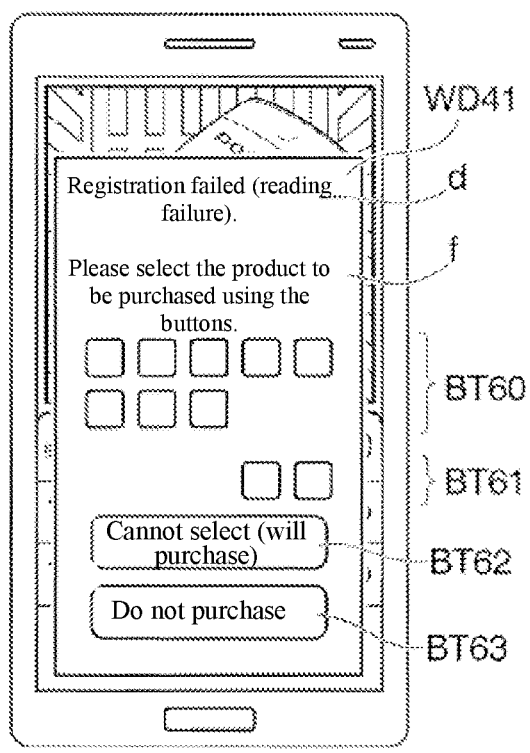
FIG. 40C  FIG. 40D

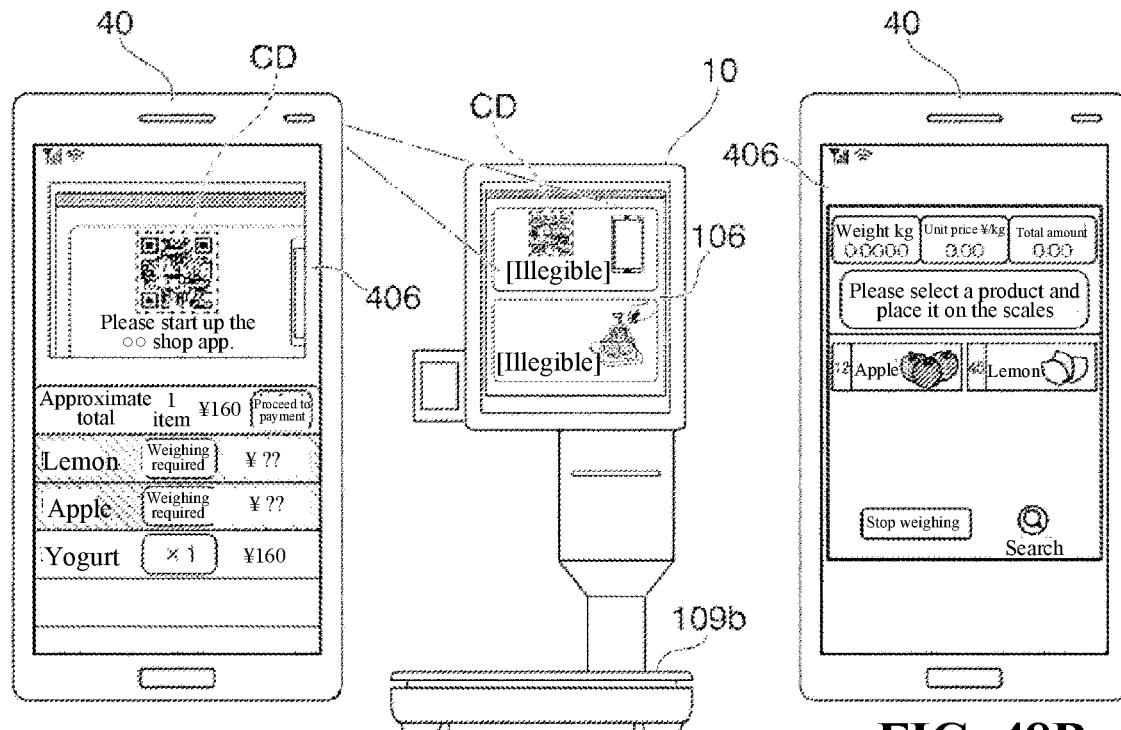
FIG. 48A
FIG. 48B
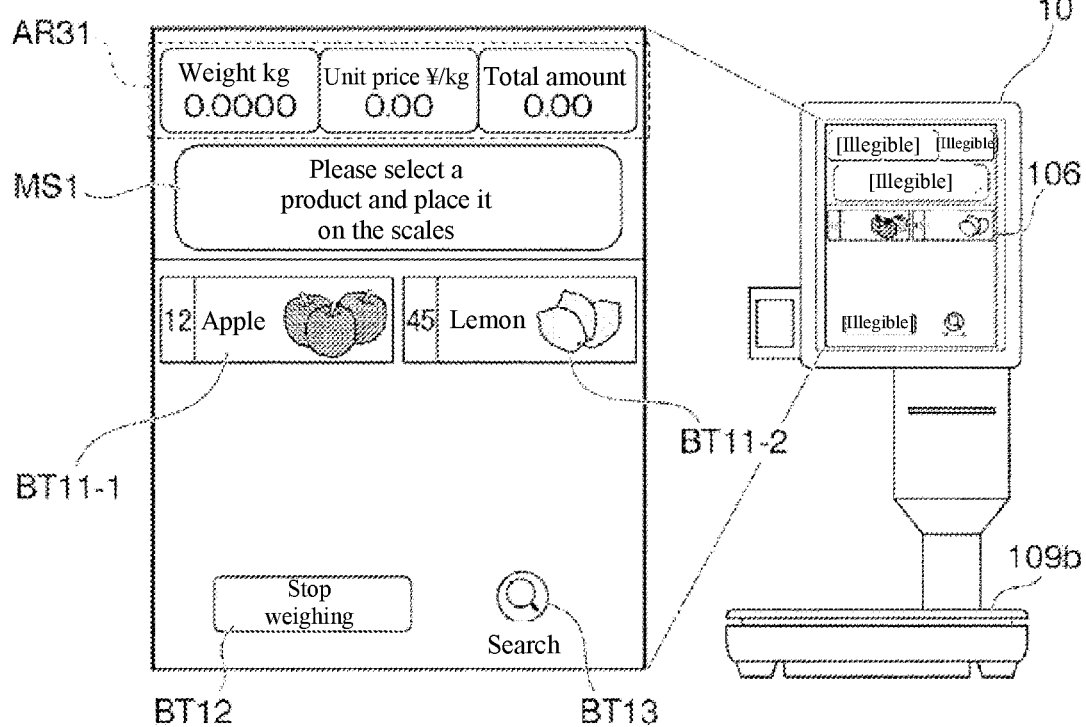
FIG. 48C

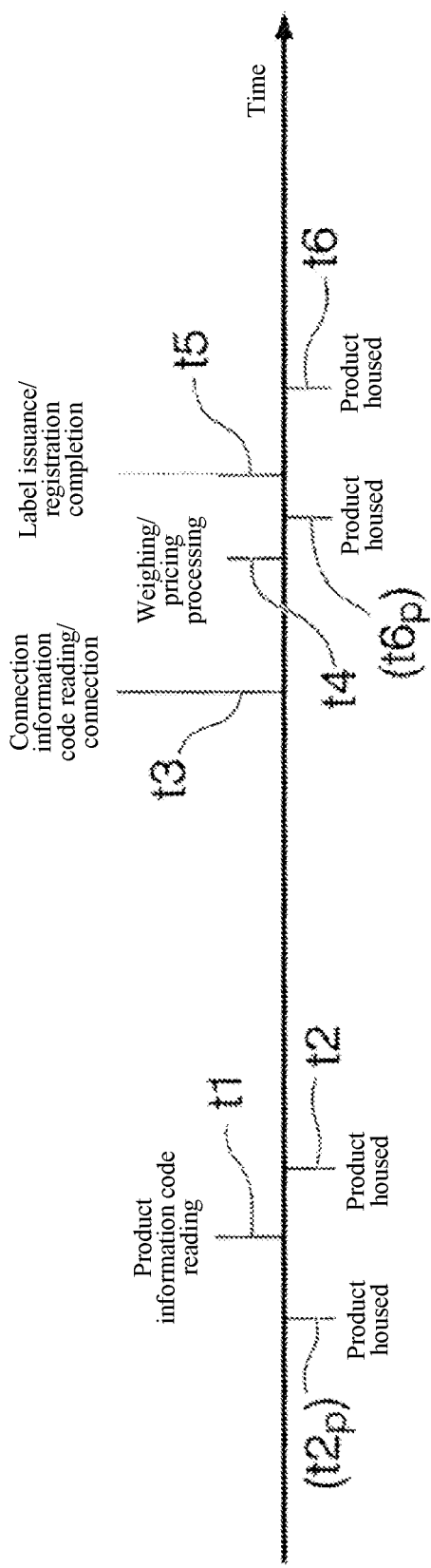
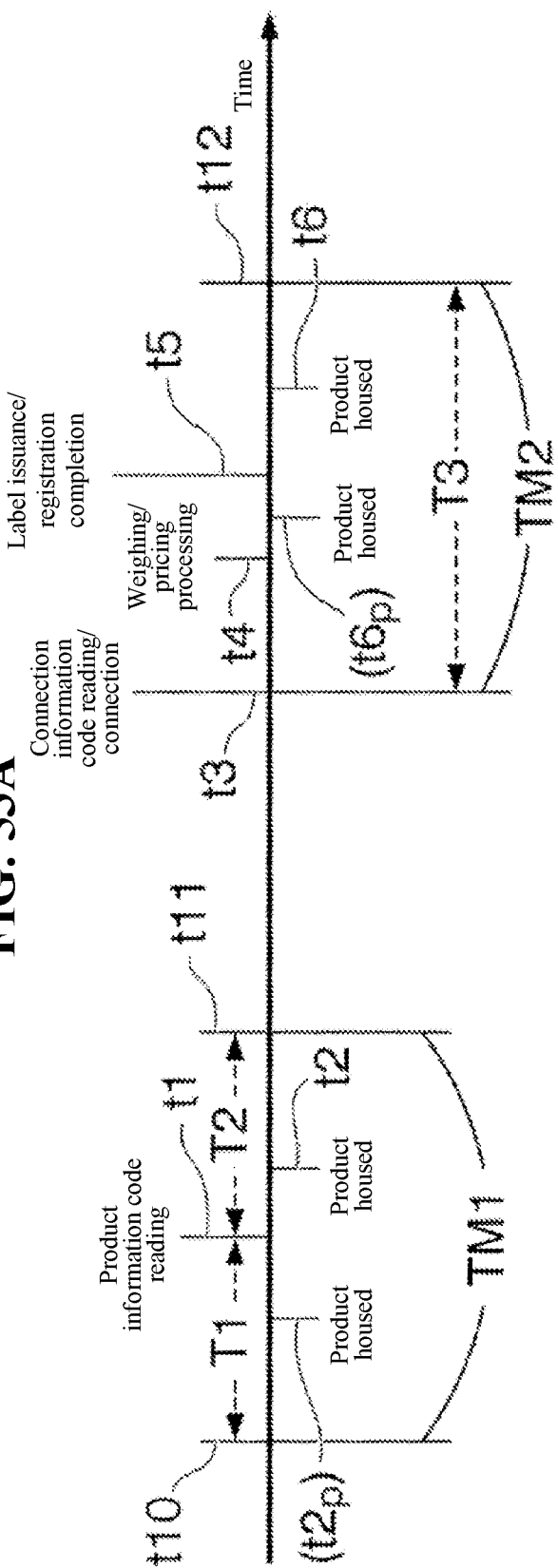
FIG. 53A
FIG. 53B

SELF-CHECKOUT SYSTEM AND METHOD FOR DETECTING A REGISTRATION FAILURE FOR A PRODUCT

BACKGROUND

Technical Field

The present invention relates to a self-checkout system and a self-checkout method.

Description of the Related Art

A system is known wherein a customer registers a product themselves using a portable terminal equipped with a camera (for example, see Patent Literature 1).

PATENT LITERATURES

Patent Literature 1: JP 2018-147252 A
Patent Literature 2: JP 2020-067947 A

However, because the customer registers the product themselves using the portable terminal, there is a possibility that the barcode of the product is not able to actually be read even if intending to do so, or that the product is intentionally input into a shopping basket without causing the barcode to be read due to malicious intent.

SUMMARY

According to one or more embodiments, self-checkout, wherein a customer registers a product themselves, can be smoothly operated.

In a self-checkout system (SCS) according to one or more embodiments, a portable terminal registers a product, and a checkout device performs checkout processing corresponding to the product registered by the portable terminal. The SCS is provided with image capture means (a camera) provided to enable image capture of a state relating to registration of the product by the customer (the camera that captures a scene where a customer attempts to register the product), detection means (a detector) for detecting a predetermined registration failure state where registration of the product is considered to have failed during a period in which registration of the product in response to a single transaction is performed, and display control means (a display) for displaying a captured image corresponding to the registration failure state detected by the detection means on the basis of a captured image obtained by the image capture means when the checkout device performs checkout of the product registered in response to the single transaction.

BRIEF DESCRIPTION OF THE DRAWINGS

FIGS. 7A to 7C are diagrams illustrating one example of customer information, store information, and cart information according to one or more embodiments.

FIG. 8 is a diagram illustrating a definition example of a held product according to one or more embodiments.

FIG. 13 is a diagram illustrating one example of a checkout screen according to one or more embodiments.

FIG. 24A and FIG. 24B are diagrams illustrating an external appearance example of the self-checkout machine according to one or more embodiments.

FIG. 27 is a diagram illustrating one example of a checkout screen according to one or more embodiments.

FIG. 28 is a diagram illustrating one example of a held product processing screen according to one or more embodiments.

FIG. 34 is a diagram illustrating one example of the checkout screen according to one or more embodiments.

FIG. 35 is a descriptive diagram describing classifications of held products according to one or more embodiments.

FIGS. 40A to 40D are diagrams illustrating one example of a rereading instruction screen and a preset key screen according to one or more embodiments.

FIGS. 48A to 48C are diagrams illustrating one example of a reading procedure of a connection information code and a pricing operation screen according to one or more embodiments.

FIGS. 53A and 53B are diagrams illustrating a setting example of an invalidation period according to one or more embodiments.

DETAILED DESCRIPTION

Embodiments of the present invention will be described hereinafter with reference to drawings.

A self-checkout system (Self-Checkout System (SCS)) according to one or more embodiments is installed in a store. The store is, for example, a supermarket, a convenience store, a drug store, a hardware store, or an electric appliance retail store.

First Example

Figure 1:
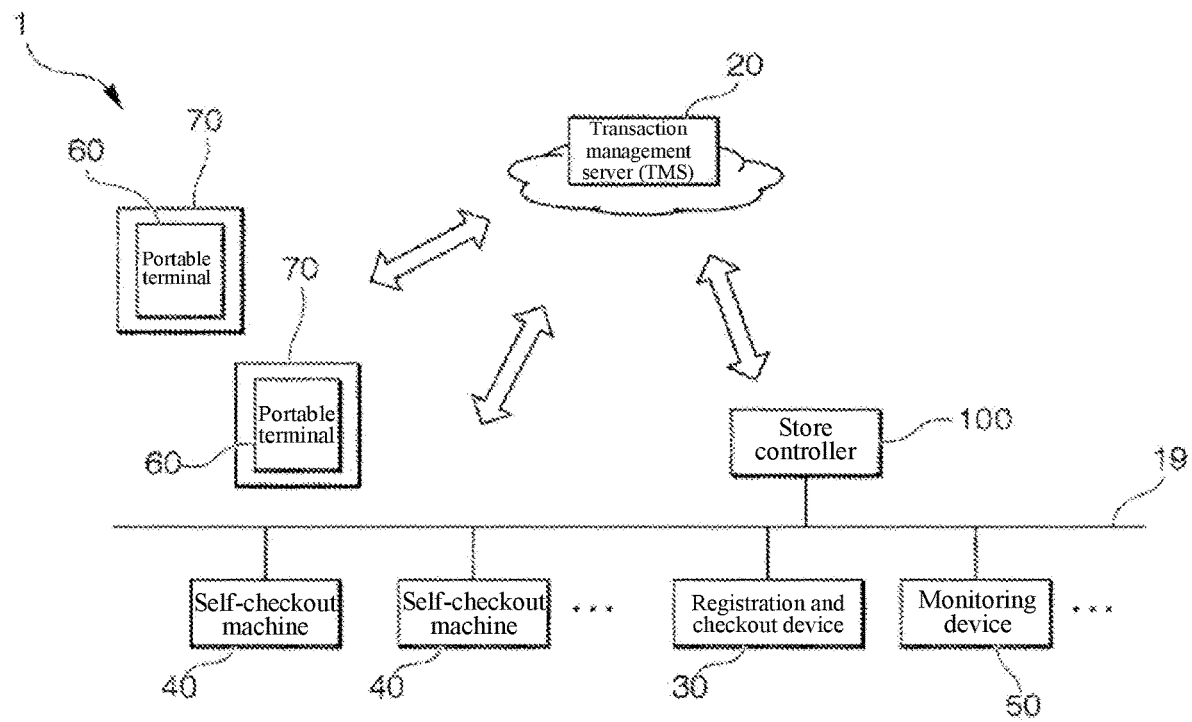
FIG. 1 is a diagram illustrating a configuration example of an SCS according to one or more embodiments.

FIG. 1 illustrates a configuration example of an SCS 1 of one or more embodiments.

The SCS 1 includes a store controller 100, a transaction management server (Transaction Management Server (TMS)) 20, a registration and checkout device 30, a self-checkout machine 40, a monitoring device 50, and a portable terminal 60.

The SCS 1 may be provided with one or a plurality of the store controller 100, the registration and checkout device 30, the self-checkout machine 40, and the monitoring device 50.

In the SCS 1, a product is registered on the basis of an employee operating the registration and checkout device 30. The registered product may be checked out on the basis of the employee operating the registration and checkout device 30, or the registered product may be checked out on the basis of a customer operating the self-checkout machine 40.

The SCS 1 may be applied to a self-checkout system. In the self-checkout system, the product is registered on the basis of the customer operating the portable terminal 60, and the registered product is checked out on the basis of the customer operating the self-checkout machine 40. An example where the SCS 1 is used as the self-checkout system will be described below.

The store controller 100, the registration and checkout device 30, the self-checkout machine 40, and the monitoring device 50 are installed in the store. Furthermore, the store controller 100, the registration and checkout device 30, the self-checkout machine 40, and the monitoring device 50 communicate mutually via a local area network (LAN) 19. The LAN 19 may be a wired LAN or a wireless LAN. The store controller 100 communicates with the TMS 20.

The store controller 100 manages a device installed in the store. The store controller 100 is also referred to as a management device or a store computer. The store controller 100 may communicate with an external device. For example, the store controller 100 stores a product master. The product master includes, for example, a product code and a product name and price of a product sold in a store. The store controller 100 transmits the product master to the TMS 20 and transmits transaction information received from the self-checkout machine 40 to the TMS 20.

The TMS 20 provides various services. The TMS 20 may be a cloud server or a local server connected to the LAN 19. For example, the TMS 20 manages transaction information (for example, cart information, which will be described later) used in the self-checkout system.

The registration and checkout device 30 is operated by an employee and executes registration processing and checkout processing.

The self-checkout machine 40 is operated by a customer and executes checkout processing. In the event that checkout processing is executed, when the registered product includes a product that requires an employee's attention (hereinafter referred to as a "held product"), the self-checkout machine 40 may execute a cancellation or registration processing of the held product on the basis of an operation of the employee. The self-checkout machine 40 is also referred to as a checkout device.

The monitoring device 50 monitors devices in the LAN 19. The monitoring device 50 may be a personal computer. The monitoring device 50 monitors the operating states of other devices (for example, the registration and checkout device 30 and the self-checkout machine 40), displays information related to the other devices, and outputs instructions to the other devices. The monitoring device 50 is also referred to as a transaction state management device.

The portable terminal 60 is a terminal used by a customer in the self-checkout system. The portable terminal 60 is mounted to a shopping cart 70.

The portable terminal 60 is provided with a communication function, a function for capturing an image using a camera, and a barcode scanner for scanning various codes (for example, a barcode or a two-dimensional code). A barcode or a two-dimensional code is printed on the product or the packaging of the product and is associated with the product code for identifying the product. The portable terminal 60 scans the barcode and reads the product code associated with the scanned barcode. The portable terminal 60 may recognize the barcode (marker 73, which will be described later) wherein predetermined information is encoded. The portable terminal 60 may extract a characteristic point in a captured image (image acquired as a through-the-lens image) captured by an image capture function and recognize an object (various codes).

The portable terminal 60 is a smartphone owned by a customer, and performs product registration according to an operation of the customer. The portable terminal 60 may be a tablet. The portable terminal 60 may be owned by the store and loaned to the customer. The number of portable terminals 60 included in the SCS 1 depends on the number of customers.

A shopping application having a function of performing product registration in the self-checkout system is installed on the portable terminal 60.

Figure 2:
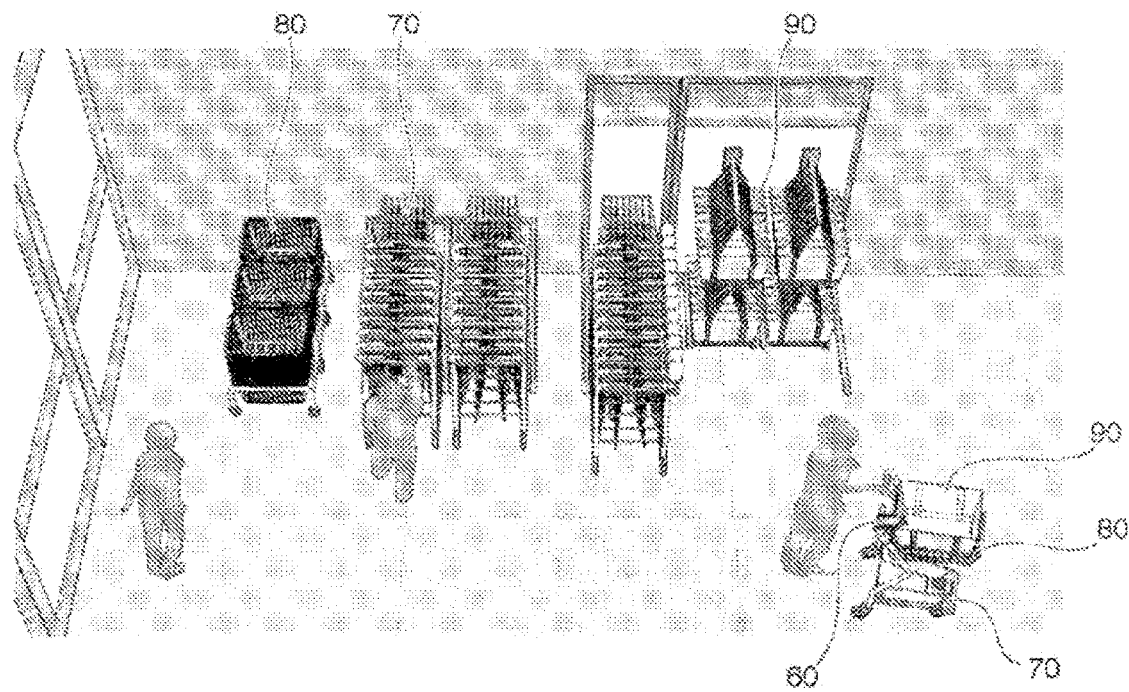
FIG. 2 is a diagram illustrating one example of a store wherein the SCS is installed according to one or more embodiments.

FIG. 2 illustrates one example of a store wherein the SCS 1 is installed. As illustrated in FIG. 2, the shopping cart 70 for loan, a shopping basket 80 for loan, and a shopping bag 90 for sale are disposed near an entrance and exit (entrance when the entrance and exit are different) of the store. When arriving at the store, the customer places the shopping basket 80 in the shopping cart 70, places the shopping bag 90 in the shopping basket 80, and proceeds into the store. The customer mounts the portable terminal 60 to the shopping cart 70 when utilizing the self-checkout system.

A bag for a held product wherein the held product, which will be described later, is placed may be mounted to the shopping cart 70 separately from the shopping basket 80.

Figure 3A:
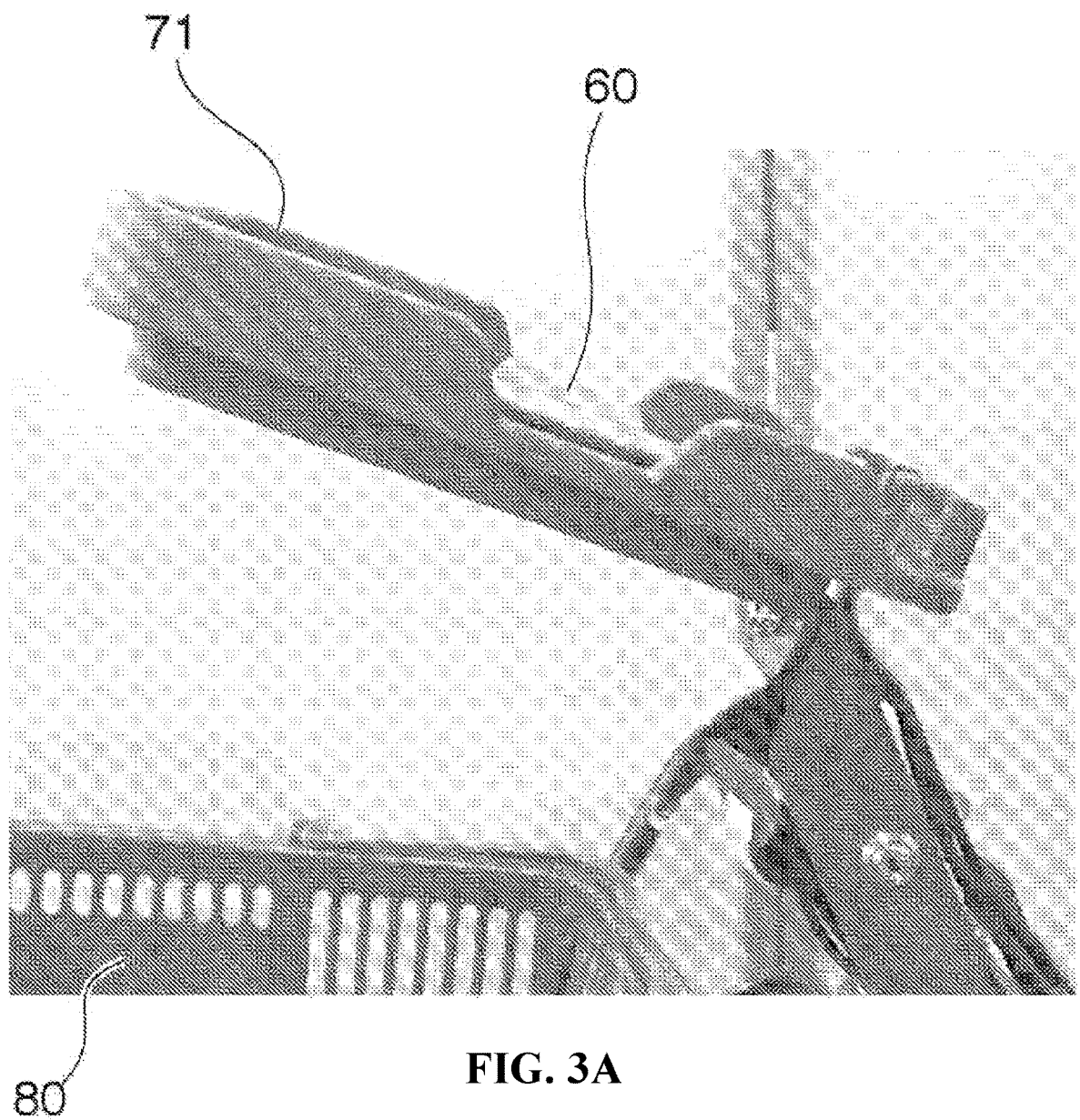
FIG. 3A is a diagram illustrating one example of how a portable terminal is mounted to a shopping cart according to one or more embodiments.
Figure 3B:
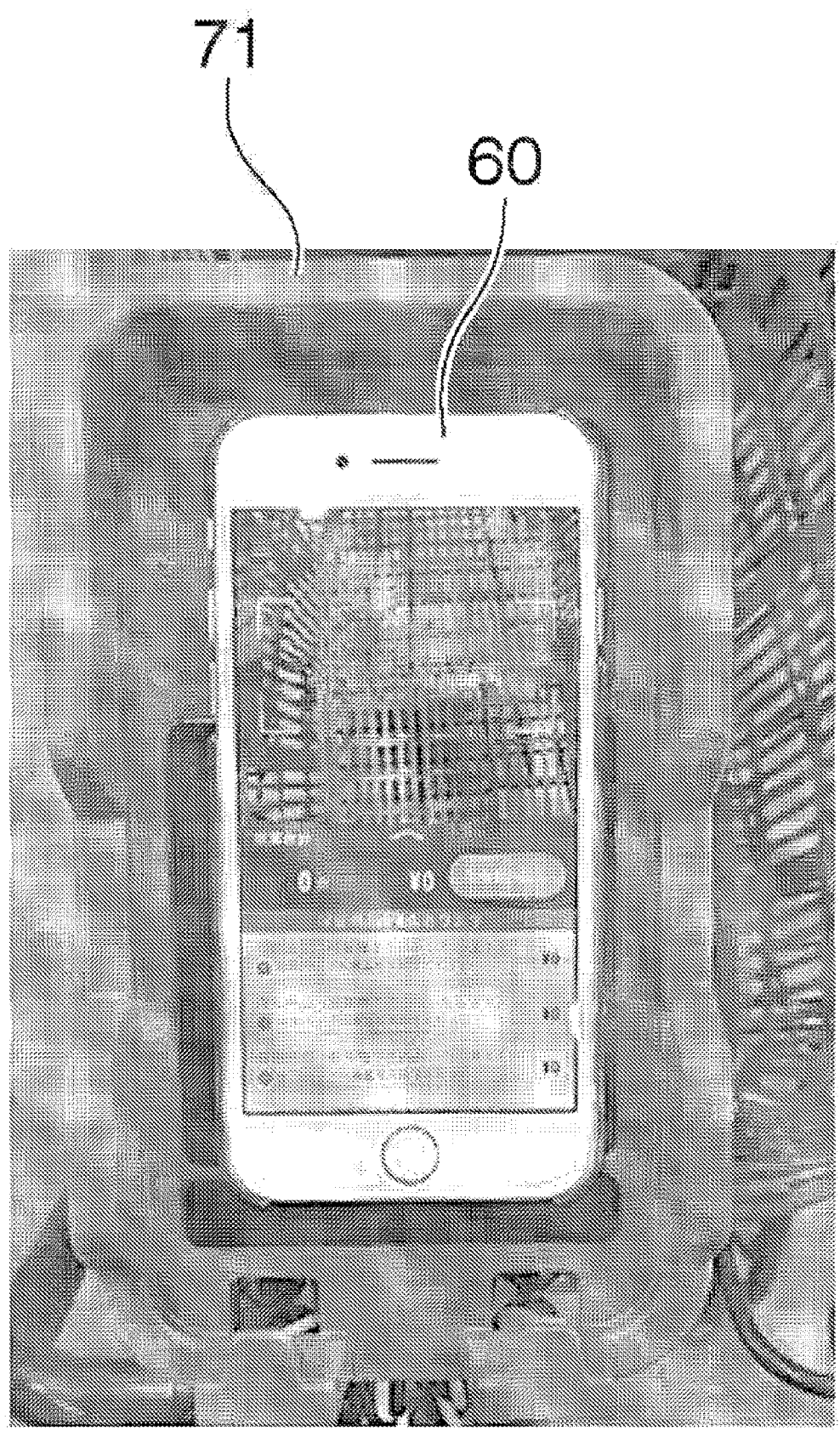
FIG. 3B is a diagram illustrating one example of how the portable terminal is mounted to the shopping cart according to one or more embodiments.

One example of how to mount the portable terminal 60 to the shopping cart 70 will be described with reference to FIG. 3A and FIG. 3B. FIG. 3A is a diagram where a place on the shopping cart 70 to which the portable terminal 60 is mounted is viewed from a side direction. FIG. 3B is a diagram where the shopping cart 70 to which the portable terminal 60 is mounted is viewed from above.

As illustrated in FIG. 3A, the shopping cart 70 is provided with a holder 71. The portable terminal 60 is mounted to the holder 71. When the portable terminal 60 is mounted to the holder 71, the camera of the portable terminal 60 is capable of capturing an image of the shopping bag 90 as illustrated in FIG. 3B.

[Configuration Example of Self-Checkout Machine]

Figure 4A:
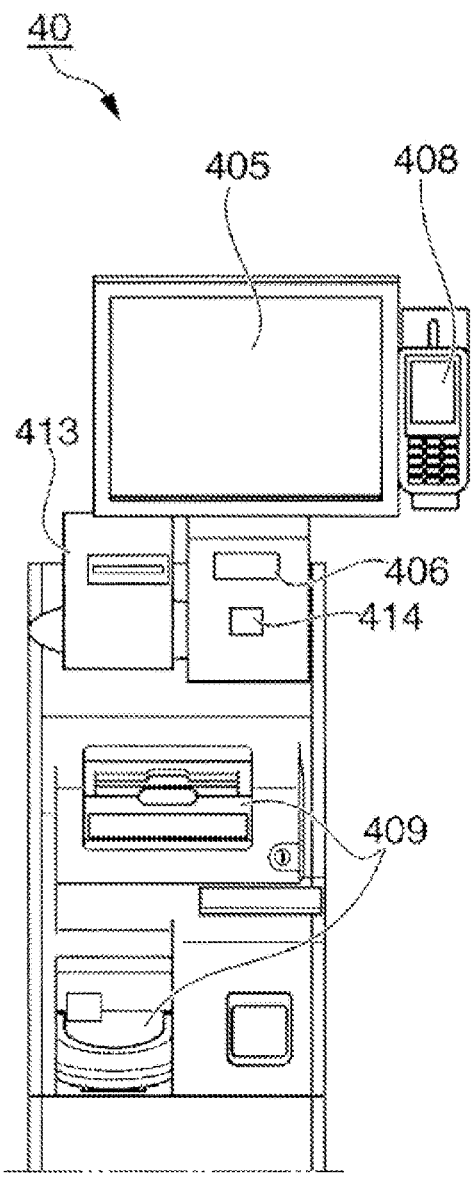
FIG. 4A is a diagram illustrating one example of an external appearance of a self-checkout machine according to one or more embodiments.
Figure 4B:
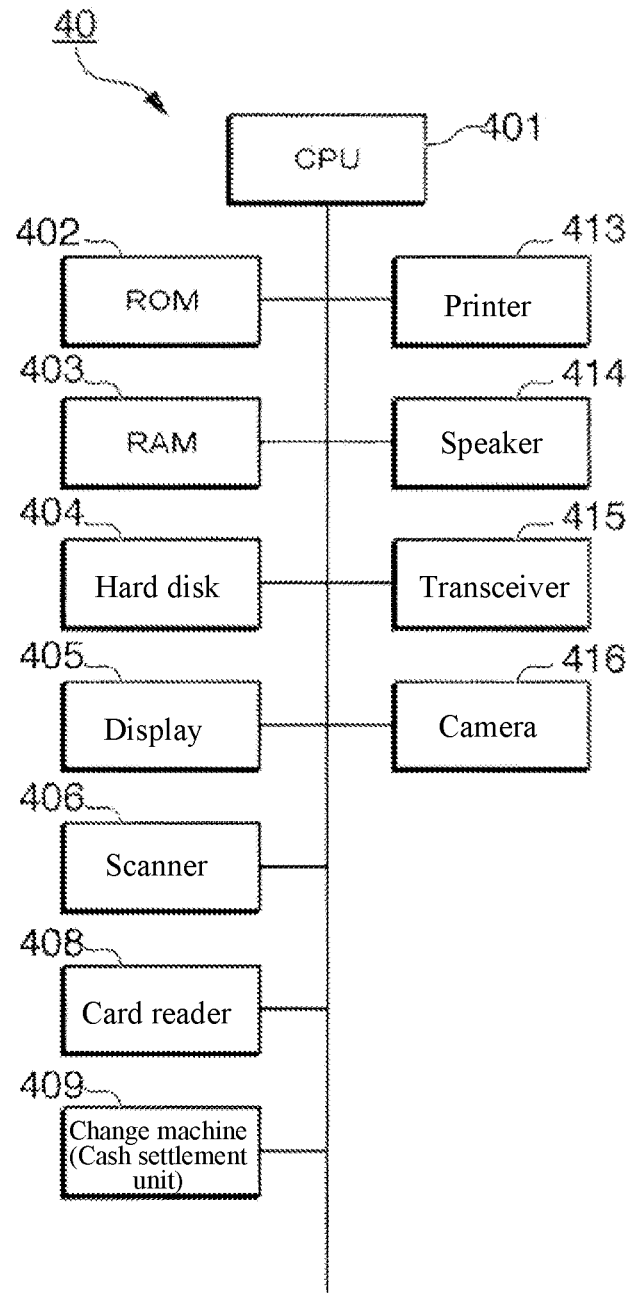
FIG. 4B is a diagram illustrating a configuration example of the self-checkout machine according to one or more embodiments.

FIG. 4A is a diagram illustrating one example of an external appearance of the self-checkout machine 40 (front view when viewed from the customer side). FIG. 4B is a diagram illustrating a configuration example of the self-checkout machine 40. In FIG. 4A and FIG. 4B, the same reference numerals are given to the same parts.

The self-checkout machine 40 is provided with a CPU 401, a ROM 402, a RAM 403, a hard disk 404, a display 405, a scanner 406, a card reader 408, a change machine 409, a printer 413, a speaker 414, a communication unit 415, and a camera 416. Each of these components mutually transmits and receives signals via a bus. The self-checkout machine 40 may be further provided with a keyboard or a lamp, such as a sign pole.

The CPU 401 is a central processing unit and reads and executes a program stored in the ROM 402 to control the operation of the self-checkout machine 40.

The ROM 402 is read-only memory and stores data, including a program, to be executed by the CPU 401.

The RAM 403 is read-write memory and stores various data as a main storage device. For example, the RAM 403 stores data read from the ROM 402 and the hard disk 404, data acquired externally, and data generated in processing.

The hard disk 404 stores various data as an auxiliary storage device. The hard disk 404 may, for example, store a program or the like executed by the CPU 401 instead of the ROM 402. Furthermore, it may store data read from the ROM 402, data acquired externally, and data generated in processing instead of the RAM 403. The self-checkout machine 40 may be provided with a Solid State Drive (SSD).

The display 405 is a touch display (also referred to as a touch panel or a touch screen) and displays various information and accepts various inputs.

The scanner 406 optically reads various information. For example, the scanner 406 scans a code (for example, a barcode or a two-dimensional code) displayed on the display of the portable terminal 60 and reads the information required for checkout processing. The scanner 406 may scan a code printed on another device (for example, a payment ticket (registered trademark) emitted by the registration and checkout device 30) and read the information required for checkout processing. The scanner 406 may scan a code attached to the product and read the product code. The scanner 406 may scan a code attached to a name tag of an employee and read an employee code identifying the employee.

The card reader 408 reads various cards (for example, a credit card, a debit card, a prepaid card, a cash card, and a point card at the time of point payment) and executes settlement processing. The card reader 408 decodes information stored in a magnetic stripe or a microchip of the card and reads the information of the card. The card reader 408 may be further provided with a display and operation keys.

The change machine 409 performs settlement processing using cash and is provided with an insertion slot and an ejection slot for bills and coins. The change machine 409 calculates the amount of money input in the insertion slot, calculates the amount of change, which is the difference between the amount of money input and the purchase amount, and ejects change from the ejection slot. When bills or coins are inserted into the insertion slot, a sensor of the change machine 409 detects that the bills or coins have been inserted and detects the number of each by type.

The printer 413 prints and issues various media (for example, a receipt).

The speaker 414 outputs sound. For example, the speaker 414 outputs voice guidance.

The communication unit 415 communicates with other devices (for example, the store controller 100, the registration and checkout device 30, another self-checkout machine 40, and the monitoring device 50).

The camera 416 is disposed so as to capture an image of the vicinity of the customer operating, for example, the change machine.

The registration and checkout device 30 may be configured so as to be provided with a display unit and a scanner on both sides (employee side, customer side), respectively, and to also be provided with a settlement unit (card reader, cash settlement unit) on one side (customer side).

The registration and checkout device 30 of this configuration may be a device capable of switching to any performance mode from among a plurality of operating modes (a mode where registration processing is executed by an operation of the employee and checkout processing is executed by an operation of the customer; a mode where registration processing and checkout processing are executed by an operation of the customer; a mode where registration processing is executed by an operation of the employee and the customer and checkout processing is executed by an operation of the customer; and the like) according to, for example, an operating state or the like. Furthermore, the registration and checkout device 30 may be utilized for self-operation provided that the device is in a mode where checkout processing is executed by an operation of the customer. Namely, the customer is able to perform payment by causing the portable terminal 60 to execute registration processing and causing the registration and checkout device 30 to execute checkout processing.

However, an example of when the self-checkout machine 40 is used for self-operation is given in the description below.

Figure 5:
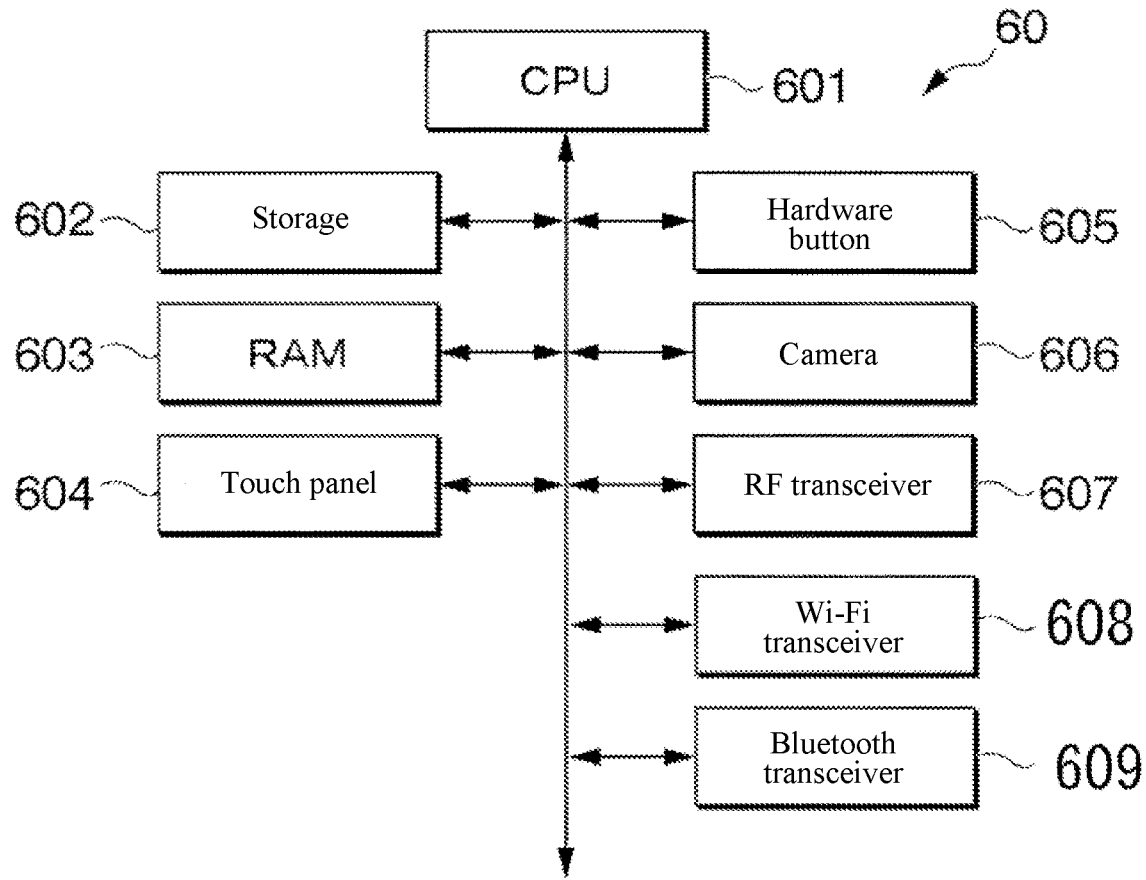
FIG. 5 is a diagram illustrating a configuration example of the portable terminal according to one or more embodiments.

As illustrated in FIG. 5, the portable terminal 60 is provided with a CPU 601, a storage unit 602, a RAM 603, a touch panel 604, a hardware button 605, a camera 606, a Radio Frequency (RF) transceiver 607, a Wi-Fi transceiver 608, and a Bluetooth transceiver 609.

The CPU 601 is a central processing unit, and reads and executes a program stored in the storage unit 602 to control the operation of the portable terminal 60.

The storage unit 602 is an auxiliary storage device for the CPU 601, and stores various information, including a program, utilized by the CPU 601.

The RAM 603 is the main storage device of the CPU 601.

The touch panel 604 displays an image in response to display control of the CPU 601 and accepts an input operation on the screen by a user. The touch panel 604 is one example of a display.

The hardware button 605 is a hardware button for accepting an input operation from the user.

The camera 606 performs image capture in response to control of the CPU 401. The portable terminal 60 may scan a two-dimensional code (for example, a QR code) via the camera 606.

The RF transceiver 607 is provided with an RF antenna and performs wireless communication using a mobile communication network conforming to the Long Term Evolution (LTE) and New Radio (NR) (5G) standards. The portable terminal 60 communicates with the TMS 20 via the RF transceiver 607.

The Wi-Fi transceiver 608 is provided with a Wi-Fi antenna and performs wireless LAN communication conforming to the Wi-Fi standard.

The Bluetooth transceiver 609 performs short-range wireless communication in accordance with the Bluetooth standard.

The portable terminal 60 is further provided with a GPS receiver and may receive a GPS signal indicating position information of the portable terminal 60.

Figure 6:
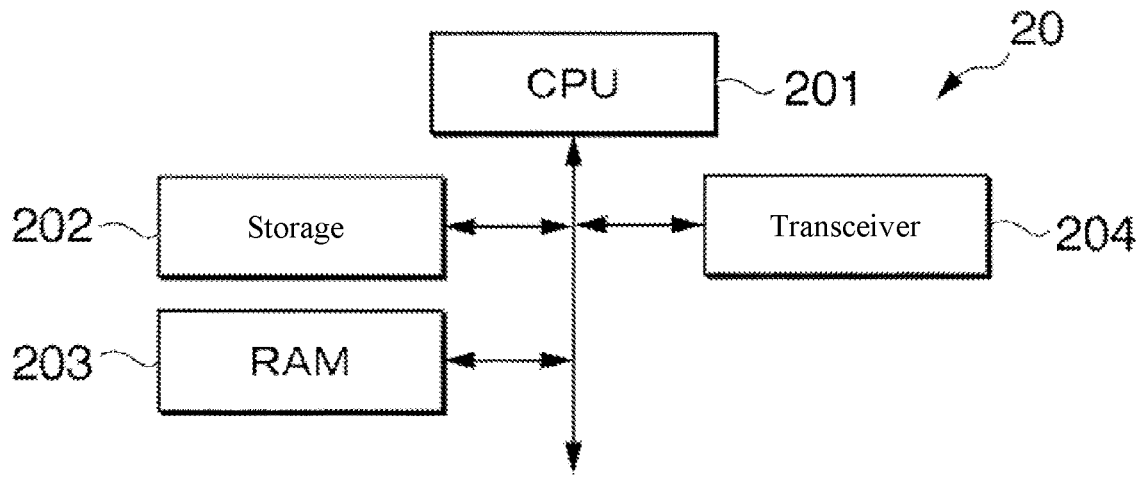
FIG. 6 is a diagram illustrating a configuration example of a transaction management server (TMS) according to one or more embodiments.

As illustrated in FIG. 6, the TMS 20 is provided with a CPU 201, a storage 202, a RAM 203, and a transceiver 204.

The CPU 201 is a central processing unit, and reads and executes a program stored in the storage 202 to control the operation of the TMS 20.

The storage 202 is an auxiliary storage device for the CPU 201, and stores data executed by the CPU 201 and a program.

The RAM 203 is the main storage device of the CPU 201.

The transceiver 204 communicates with other devices via a network.

The TMS 20 is provided with a display and an input interface, and an administrator may operate the TMS 20.

The storage 202 of the TMS 20 stores customer information, store information, product information, and cart information. The TMS 20 stores product information on the basis of the product master received from the store controller 100. The product information includes, for example, an information element of the product master stored by the store controller 100.

The TMS 20 generates customer information when customer information is registered and stores the generated customer information. The TMS 20 updates the customer information on the basis of the cart information. The TMS 20 may, for example, reference the cart information at a predetermined time and update the customer information.

FIG. 7A illustrates one example of customer information stored by the storage 202 of the TMS 20. The customer information includes a customer ID, a customer name, a customer registration date, cancellation information, a customer rank, and a number of points.

The customer ID is identification information for uniquely identifying a customer.

Note that the customer ID may be application identification information that is uniquely assigned to each installed shopping application when, for example, the shopping application is installed on the portable terminal 60. The application identification information may be, for example, a number uniquely given to each installed shopping application. The application identification information may be terminal identification information unique to the portable terminal 60 on which the shopping application is installed. The terminal identification information may be, for example, hardware identification information given so as to be unique to the hardware of the portable terminal 60, such as a telephone number assigned to a customer who is the user of the portable terminal 60, a MAC (Media Access Control) address, or the like.

The customer name is a name, nickname, or the like of the customer. The customer registration date is the date and time the customer was registered. The cancellation information is information relating to the cancellation of a registered product after registration. The customer rank is a rank based on past purchases made by the customer. When customer information of a new customer is generated, the customer ID, the customer name, and the customer registration date are generated, but other information (namely, cancellation information) is not generated because an actual transaction has yet to be started (that is, product registration).

The TMS 20 generates and stores the customer ID when, for example, the portable terminal 60 downloads or installs the shopping application from the TMS 20 or a predetermined external server. When registering a customer, for example, the TMS 20 uses the portable terminal 60 to acquire information input into a name column in a registration form and stores this information as the customer name. The TMS 20, for example, acquires the current date and time when registering the customer and stores this information as the customer registration date.

The TMS 20 may store a portion or all of the customer information in another device (for example, an external file server) instead of or in addition to storing the customer information in the storage 202.

FIG. 7B illustrates one example of store information stored by the storage unit 602 of the TMS 20. The store information includes a store ID, a store name (branch name), store-specifying information 1, and store-specifying information 2.

The store ID is identification information for uniquely identifying a store. The store ID illustrated in FIG. 7B is configured from a shop (name of store) or company code, and a branch code.

The store name is the name of the store. The store name illustrated in FIG. 7B is configured from a shop (name of store) or company, and a branch name.

The store-specifying information 1 is information of a two-dimensional code (QR code (registered trademark) or the like) for specifying a store that carries out transactions (store where the sale of products is performed).

The store-specifying information 2 is position information (GPS information) of a store for specifying a store that carries out transactions.

In the example illustrated in FIG. 7B, the store ID and the store-specifying information 1 are different, but the store ID and the store-specifying information 1 may be the same.

The TMS 20 may acquire store information or the like from an external source (a server (not illustrated) of a headquarters that supervises each store, or the like) and store the same. The TMS 20 may store a portion or all of the store information in another device (a file server or the like that the TMS 20 is capable of accessing) instead of or in addition to storing the store information in the storage 202.

The product information is, for example, information acquired from the store controller 100 of the store, and is information regarding a product to be sold at the store. The product information of one product includes information such as the product code (product identifier), product name, price, and the like.

The cart information is information for managing individual transactions. The TMS 20 generates cart information at the start of a transaction. Furthermore, the TMS 20 updates the cart information (each time a product is registered) to match the progress of the transaction (it may be understood that registration of the product is carried out by means of storing the product in the cart information).

FIG. 7C illustrates one example of the cart information stored by the storage unit 602 of the TMS 20. The cart information includes a cart ID, a transaction start date and time, a transaction end date and time, the customer ID, registered product information, held product information, cancellation information, and the like.

The cart ID is identification information for uniquely identifying cart information. For example, the cart ID includes the store ID, a date, and a serial number (for example, a serial number by date and by store).

The transaction start date and time is the start date and time of a transaction. The transaction start date and time may be, for example, a generated date and time of the cart information. Note that the transaction start date and time may be a registration date and time of a first product (the date and time when the registered product information (registered product 1) was stored in FIG. 7C). The generated date and time of the cart information and the registration date and time of the first product may each be stored.

The transaction end date and time is the end date and time of a transaction. For example, the transaction end date and time is the checkout date and time. The customer ID is a customer ID for identifying the customer of the transaction. Note that when cart information is generated, the cart ID, the transaction start date and time, and the customer ID are generated, but other information (such as the transaction end date and time) is not generated because an actual transaction (product registration) has yet to be started. The checkout date and time may be the checkout start date and time, or may be the checkout end date and time. The checkout start date and time and the checkout end date and time may each be stored as the transaction end date and time.

The registered product information (total) is information that is updated each time a product is registered. The registered product information (total) includes a number of items (number of products), an approximate subtotal amount (for example, a subtotal amount before a discount or the like is reflected), a subtotal amount, or the like. The registered product information (registered product 1) is the registration information of the first product. The registered product information (registered product 2) is the registration information of a second product. Note that in the example illustrated in FIG. 7C, a drawing of registered product information (registered product 3) to registered product information (registered product 5) is omitted. The registered product information (N; N is an integer) includes the product code, item name (product name), price, and the like.

The registered product information (N) may include the registration date and time of the Nth product. That is, the TMS 20 may store the registration date and time of the registered product as the registered product information. The TMS 20 may determine whether to apply a discount service applied according to the date and time on the basis of the registration date and time of each product.

The held product information (total) is information that is updated each time a held product (described later) is registered. The held product information (total) includes the number of items (number of products) of the held product, the number of NO-FILE items among the held products, the number of items having a reading failure (unauthorized operation confirmation required) among the held products, and the like.

NO-FILE indicates a product where scanning of the barcode or product code was successful at the store (the product code was able to be read) but a product code is not stored in the product information (product for which product information has not been registered).

Reading failure is where scanning of a product code has failed in the store, or a product for which scanning of the product code has failed in the store. That is, reading failure is where, for example, time-out processing is carried out when it is possible to discern when image recognition technology has captured an image of a product for a certain period of time but barcode recognition has not been achieved, or indicates a product that has undergone time-out processing.

For example, a reading failure is judged when it is not possible to correctly acquire (recognize) a barcode despite the customer having performed an operation to cause the barcode to be read due to wrinkling or the like on a package, blurring or staining of the barcode printing, or the barcode being printed on transparent film, or the like.

The held product information (held product 1) is information of a first held product. The held product information (held product 2) is information of a second held product. The held product information (held product 3) is information of a third held product.

Held product information (held product N; N is an integer) includes a held product type (information indicating whether the held product is a NO-FILE or reading failure) and image data (image data captured during reading failure). For example, when the Nth product is a held product due to NO-FILE, the held product information (held product N) includes the held product type "1 (NO-FILE)" and image data. Furthermore, when the Nth product is a held product due to a reading failure, the held product information (held product N) includes the held product type "2 (reading failure)" and image data.

FIG. 8 illustrates a definition example of the held product corresponding to the cart information. As illustrated in FIG. 8, an example is illustrated where held products are classified into eight categories. A classification number "1" to "8" is assigned to each of the eight held product classifications.

The classification of a held product having classification number 1 corresponds to "NO-FILE".

The classification of a held product having classification number 2 is "reading failure", as described in FIGS. 7A-7C.

The classification of a held product having classification number 3 is "pseudo-scan". A held product corresponding to "pseudo-scan" is a product for which the customer performed an act of attempting to cause the portable terminal 60 to read the code of the product but the portable terminal 60 was unable to read the code normally.

For example, "pseudo-scan" includes scanning when a product is placed within an image capture range of the camera 606 but the code of the product is not included within the image capture range of the camera 606.

"Pseudo-scan" includes scanning when a product is placed within the image capture range of the camera 606 but an image of a portion without the code is captured.

"Pseudo-scan" includes scanning when a product is placed within the image capture range of the camera 606 while a portion of the code is hidden by a finger or the like.

"Pseudo-scan" includes scanning when an image of the code of a product is captured by the camera 606 but the product passes through the image capture range of the camera 606 at a speed at which the portable terminal 60 is not able to read the code.

The classification of a held product having classification number 4 is "non-scan input". A "non-scan input" held product is a product for which an operation to position the product within the image capture range of the camera 606 is not performed, and the product is placed in the shopping basket 80. Non-scan input may arise, for example, when the portable terminal 60 is fixedly mounted to the shopping cart so as to enable image capture of the inside of the shopping basket placed in the shopping cart. For example, when the portable terminal 60 judges that a product that has not undergone code scanning is put in the shopping cart, the product is associated with non-scan input.

The classification of a held product having classification number 5 is "age confirmation product". An "age confirmation product" is a product requiring an employee to confirm the age of the customer at the point of sale, such as alcohol, tobacco, and the like.

The classification of a held product having classification number 6 is "pharmaceutical product". A "pharmaceutical product" is a product requiring a qualified pharmacist or the like, for example, to confirm the purchaser.

The classification of a held product having classification number 7 is "security tag product". A "security tag product" is a product requiring an employee to remove a security tag from the product at the time of sale since a security tag is attached.

The classification of a held product having classification number 8 is "canceled product". A "canceled product" is a product that was briefly registered but was canceled by a cancellation operation made by the customer on the portable terminal 60. A "canceled product" is, for example, collected by the employee from the customer during checkout.

A held product applicable to "NO-FILE" of classification number 1 is a product where a product code is acquired by code scanning in response to a product registration operation, but product information associated with the acquired product code is not registered in the product information. In other words, a held product applicable to "NO-FILE" of classification number 1 is a product that is not registered in the product master that the TMS 20 received from the store controller 100. It is not specified which of the products registered in the product information is the held product applicable to "NO-FILE" of classification number 1.

A held product applicable to any of "reading failure", "pseudo-scan", and "non-scan input" of classification numbers 2 to 4 is a product whose product code could not be read when the customer registered the product using the portable terminal 60.

In one or more embodiments, a state where a product is registered as a held product in the cart information without performing reading of the code in registration processing is referred to as a registration failure state. A product applicable to any of the three classifications of "reading failure", "pseudo-scan", and "non-scan input" may be referred to as a registration failure product. Registration failure in one or more embodiments means that registration processing of a product was not completed normally, and is also referred to as registration non-success or a registration error.

A held product applicable to any of "NO-FILE", "reading failure", "pseudo-scan input", and "non-scan input" of classification numbers 1 to 4 is an unspecified product. An unspecified product becomes a product which is not registered, for example, by not specifying which product it is among the products registered in the product master.

An unspecified product may be further divided into a code-acquired product for which a product code has been acquired by a product registration operation, such as "NO-FILE" of classification number 1, and a code-unacquired product for which a product code has not been acquired by the product registration operation, such as "reading failure", "pseudo-scan input", and "non-scan input" of classification numbers 2 to 4.

The TMS 20 may store a portion or all of the cart information in another device (a file server or the like that the TMS 20 is capable of accessing) instead of or in addition to storing the cart information in the storage unit within its own device.

[SCS Operation Procedure Corresponding to Self-Checkout]

Figure 9:
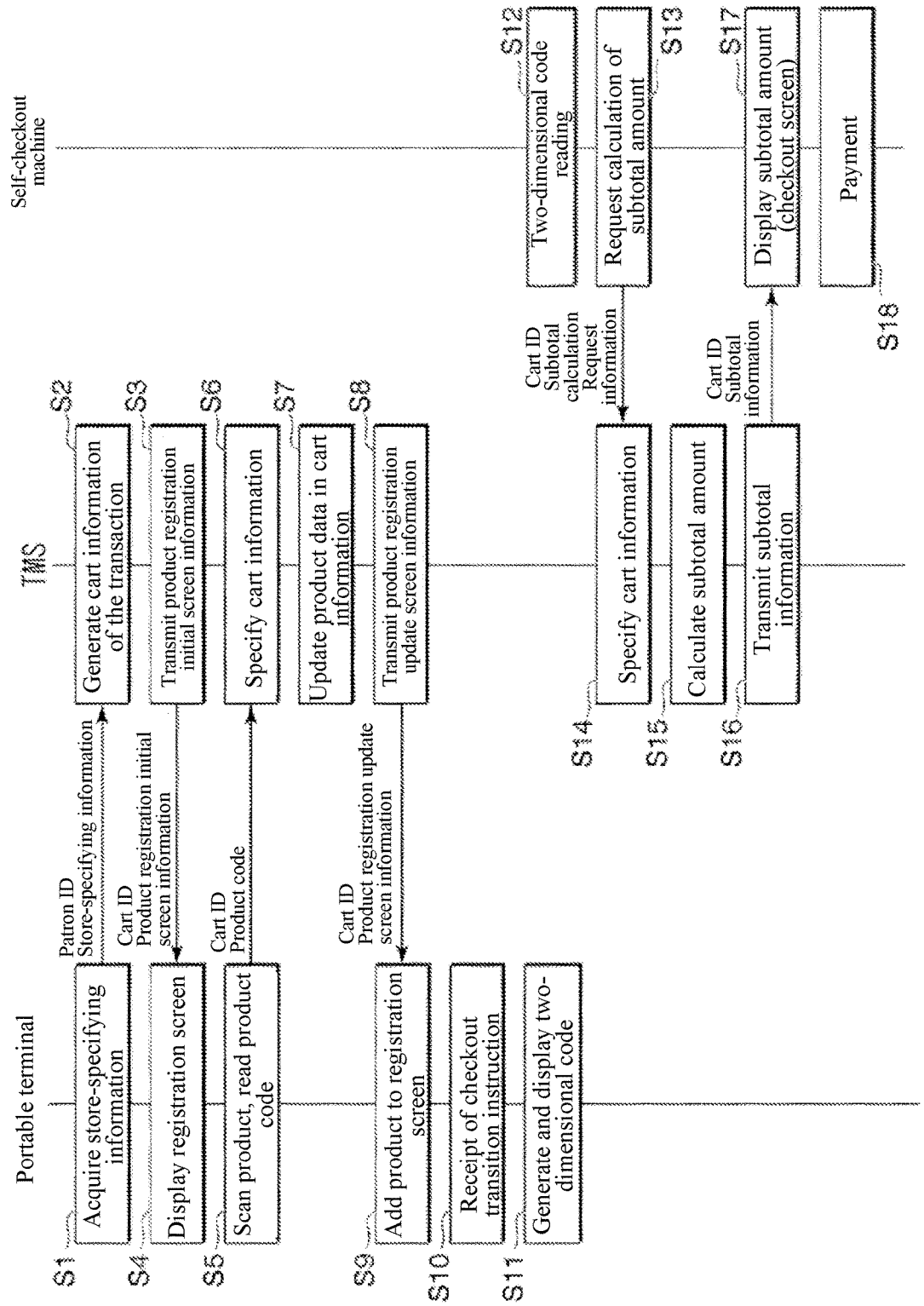
FIG. 9 is a sequence diagram illustrating a processing procedure example executed by the portable terminal, the self-checkout machine, and the TMS in correspondence with payment of a single transaction via self-operation according to one or more embodiments.

FIG. 9 is a sequence diagram illustrating one example of a processing procedure wherein the SCS 1 operates as a self-checkout system. FIG. 9 illustrates one example of processing of the portable terminal 60, the self-checkout machine 40, and the TMS 20 up to when the customer registers a product to be purchased from among products put on display in the store and checkout of the registered products is completed.

Step S1: The portable terminal 60 transmits the customer ID and information specifying the store (store-specifying information) to the TMS 20.

The portable terminal 60 may acquire the store-specifying information during customer registration performed by the customer using the portable terminal 60. For example, a two-dimensional code for specifying the store is displayed near the entrance of the store (the two-dimensional code is output on a display screen; a medium having the two-dimensional code printed thereon is affixed), and the portable terminal 60 may acquire the store-specifying information by a customer visiting the store scanning the two-dimensional code using the portable terminal 60. When the customer visiting the store starts up the shopping application, a screen for instructing the customer to scan the two-dimensional code may be displayed as a startup screen, and when the customer visiting the store scans the two-dimensional code using the portable terminal 60, the shopping application starts up and a screen for notifying the customer that connection to the TMS 20 is in progress may be displayed as the startup screen.

For example, because the store is specified by an address, the customer visiting the store may acquire the position information (GPS information) using the portable terminal 60 at the store. Namely, the position information of the store may be acquired as store-specifying information. Note that when the customer visiting the store starts up the shopping application, the position information is acquired and a screen for notifying the customer that it is connected to the TMS 20 may be displayed as the startup screen. When a plurality of stores is detected from the position information and one is not able to be specified, a selection screen may be displayed to allow the customer to make a selection, or a mode wherein the customer is forced to acquire the two-dimensional code may be switched to.

Figure 10A:
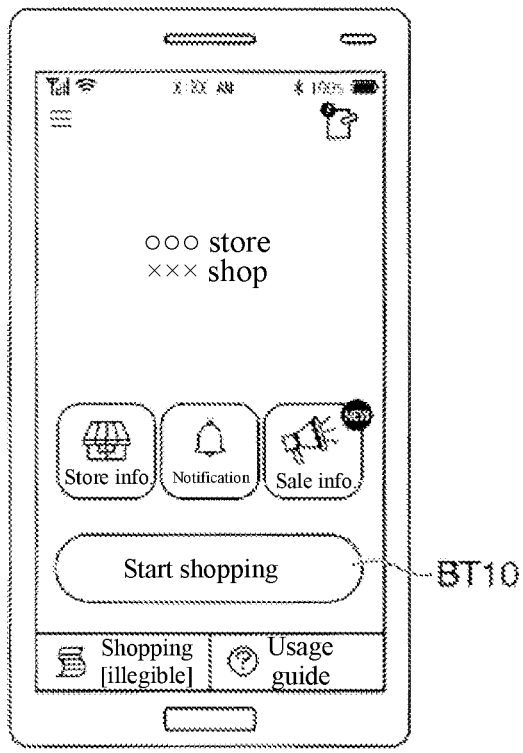
FIGS. 10A to 10D is a diagram illustrating one example of a startup screen, a product registration initial screen, a product registration update screen, and a code display screen according to one or more embodiments.

FIG. 10A illustrates one example of a startup screen of the shopping application displayed on the touch panel 604 of the portable terminal 60. The startup screen displays the store name. The store name is displayed on the basis of the store-specifying information acquired in step S1.

To start product registration for shopping, the customer operates a transaction start instruction button BT 10 displayed on the startup screen.

In response to the operation of the transaction start instruction button BT 10 (for example, tapping on the transaction start instruction button BT 10), the portable terminal 60 transmits a transaction start request including the acquired store-specifying information and the customer ID to the TMS 20. The transaction start request may be transmitted in response to the operation of the customer on the portable terminal 60 or may be transmitted on the basis of the acquisition of the store-specifying information without accepting the operation of the customer on the portable terminal 60.

The TMS 20 may store the customer ID on the basis of information input in the name column of the registration form using the portable terminal 60. The TMS 20 may store the customer ID when the shopping application is downloaded or installed on the portable terminal 60. The customer ID may be stored in the portable terminal 60.

When the store is specified, the store name of the store, a service being implemented (leaflet information distributed on the day thereof), and available coupon information may be displayed on a screen (the product registration initial screen or a screen different from the product registration initial screen). Information on the service or coupon may be acquired from the TMS 20 as screen information, for example.

The portable terminal 60 may acquire and store information of a transmission destination (address of the TMS 20) when the shopping application is downloaded or installed on the portable terminal 60. For example, the portable terminal 60 may scan the two-dimensional code indicating the store-specifying information and the information of the transmission destination, and the portable terminal 60 may acquire the store-specifying information and the information of the transmission destination.

Step S2: The TMS 20 receives the customer ID and store-specifying information as a transaction start request from the portable terminal 60, and generates the cart information of the transaction. For example, the TMS 20 acquires the store ID from the store-specifying information received from the portable terminal 60, further acquires the current date, issues (indexes) the serial number, associates the store ID, the current date, and the serial number, and stores this as the cart ID in the cart information. The TMS 20 stores the current date and time as the transaction start date and time (generated date and time) in the cart information. The TMS 20 stores the customer ID received from the portable terminal 60 as the customer ID in the cart information.

When the received store-specifying information is a two-dimensional code, the TMS 20 acquires the store ID by referencing the store-specifying information 1 of the store information illustrated in FIG. 7B. When the received store-specifying information is position information (GPS information), the TMS 20 acquires the store ID by referencing the store-specifying information 2.

That is, the TMS 20 that received the customer ID and store-specifying information as a transaction start request from the portable terminal 60 acquires the store ID from the store-specifying information received from the portable terminal 60, further acquires the current date, issues (indexes) the serial number, combines the store ID, the current date, and the serial number, and stores this as the cart ID in the cart information. The TMS 20 that received the store-specifying information or the customer ID as a transaction start request from the portable terminal 60 acquires the current date and time and stores it as the transaction start date and time (generated date and time) in the cart information. Furthermore, the TMS 20 that received the store-specifying information or the customer ID as a transaction start request from the portable terminal 60 stores the customer ID received from the portable terminal 60 as the customer ID in the cart information.

Step S3: The TMS 20 that generated the cart information of the transaction generates and transmits product registration initial screen information (screen information of a product registration screen that is an initial screen) to the portable terminal 60. The TMS 20, for example, generates the product registration initial screen information and transmits the generated product registration initial screen information and the cart ID to the potable terminal 60.

Figure 10B:
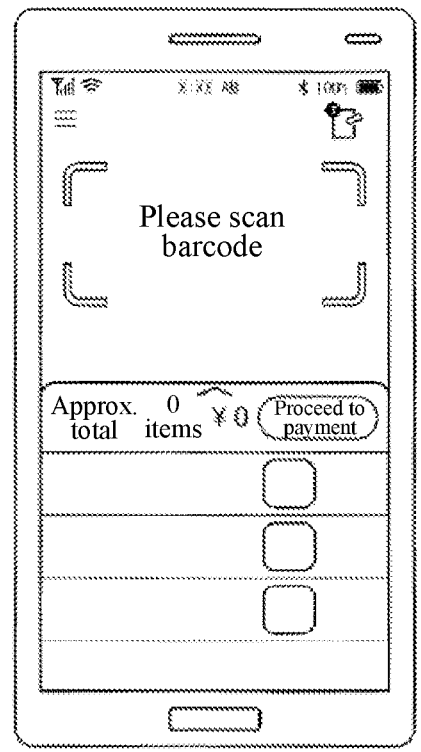

Step S4: The portable terminal 60 that received the cart ID and the product registration initial screen information from the TMS 20 stores the cart ID and displays a registration screen on the display unit. The portable terminal 60 displays, for example, the product registration initial screen as illustrated in FIG. 10B.

Step S5: Due to an operation by the customer, the portable terminal 60 scans the barcode attached to the product and reads the product code. The example in FIGS. 10A-10D illustrate when scanning of the barcode is successful. Step S5 to step S9 are repeatedly executed each time a barcode attached to a product is scanned.

The portable terminal 60 that acquired the barcode transmits product registration information including the cart ID and the product code obtained by scanning to the TMS 20.

Step S6: The TMS 20 that received the product registration information (cart ID and product code) from the portable terminal 60 specifies the cart information of the transaction from the cart ID included in the received product registration information.

Step S7: The TMS 20 updates the product data in the specified cart information. When a product code as the Nth item is included in the received product registration information, the TMS 20 stores the product code as the product code of the registered product information (registered product N) in the specified cart information. The TMS 20 acquires the item name and price corresponding to the product code from the product information and stores them as the product and price of the registered product information (registered product N). The TMS 20 updates the registered product information (total) in the specified cart information.

Step S8: The TMS 20 that updated the product data in the cart information generates and transmits product registration update screen information (screen information of a product registration screen that is an update screen to which the registered product is added) to the portable terminal 60. Specifically, the TMS 20, for example, generates the product registration update screen information such that a product registration update screen to which a list item of the currently registered product is added is displayed in a registered product list, as illustrated in FIG. 10C on the portable terminal 60, and transmits the generated product registration update screen information to the portable terminal 60 together with the cart ID.

Figure 10C:
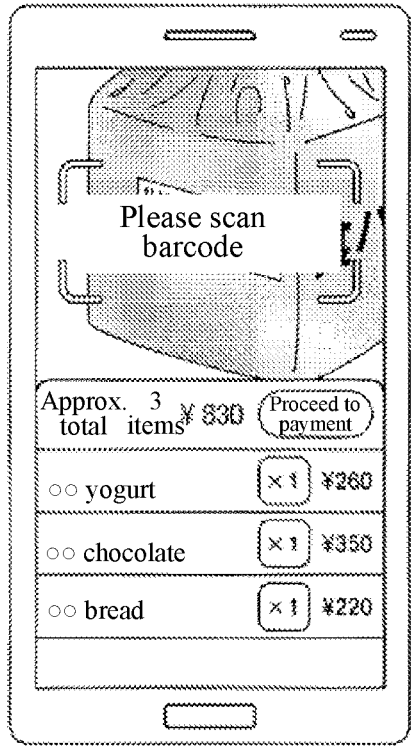
Figure 10D:

The product registration screen (product registration update screen) illustrated in FIG. 10C is a screen displayed on the portable terminal 60 after "○○ bread" is registered as the third product. That is, when "○○ yogurt" is saved as the first item in the cart information, the TMS 20 generates the product registration update screen information such that "○○ yogurt" is displayed on the portable terminal 60, and transmits the generated product registration update screen information to the portable terminal 60 together with the cart ID. When "○○ chocolate" is stored in the cart as the second item, the TMS 20 generates the product registration update screen information such that "○○ yogurt" and "○○ chocolate" are displayed on the portable terminal 60, and transmits the generated product registration update screen information to the portable terminal 60 together with the cart ID. When "○○ bread" is saved as the third item in the cart information, as illustrated in FIG. 10C, the TMS 20 generates the product registration update screen information such that "○○ yogurt" and "○○ chocolate" and "○○ bread" are displayed on the portable terminal 60, and transmits the generated product registration update screen information to the portable terminal 60 together with the cart ID.

Figures 11A, 11B, 11C:
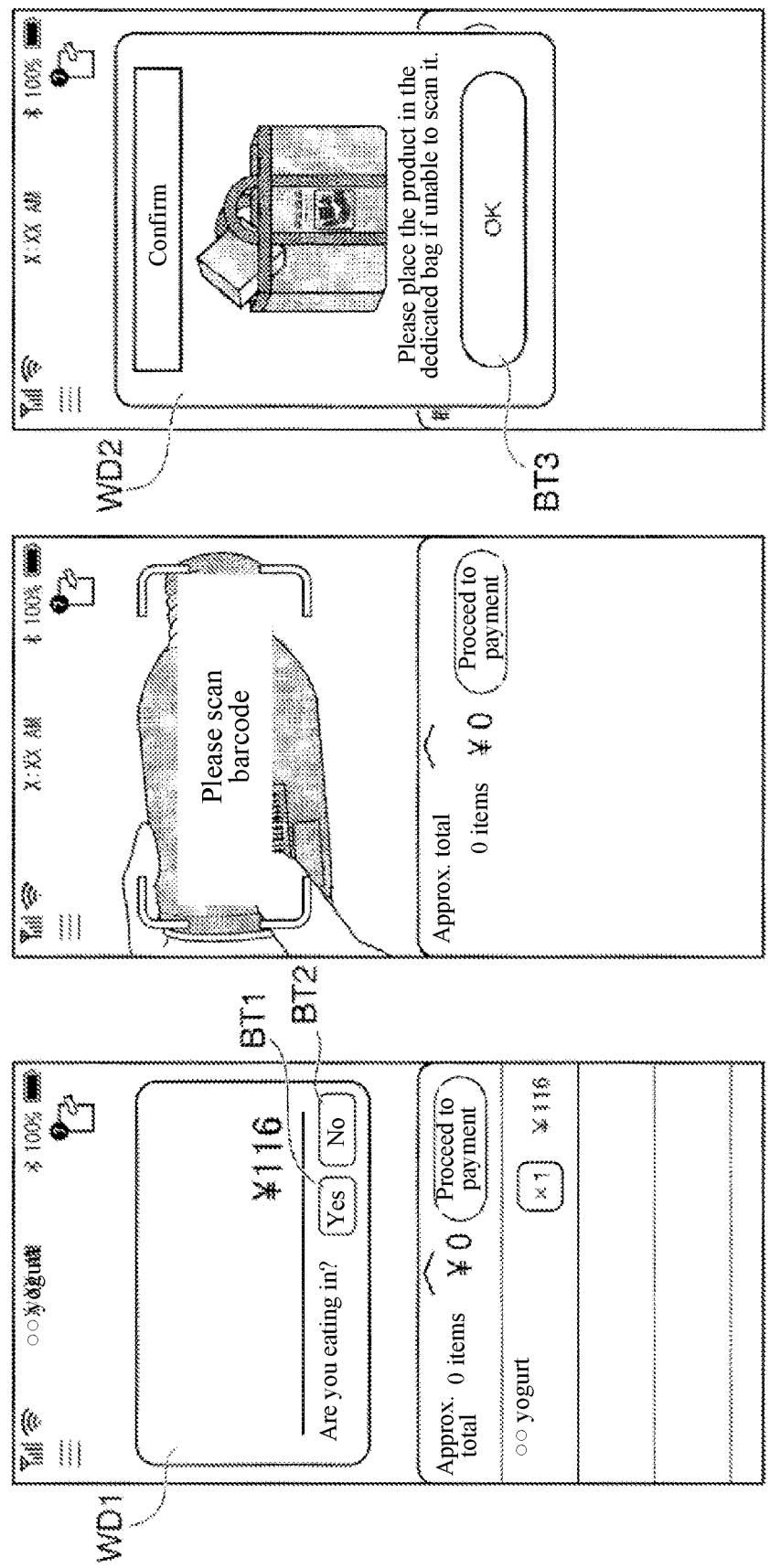
FIGS. 11A to 11C is a diagram illustrating one example of a registered product presentation screen, a product registration screen, and a guidance image according to one or more embodiments.

In response to the first product being registered, for example, as illustrated in FIG. 11A, a registered product presentation screen WD 1 that presents the product registered currently may be displayed. Furthermore, on the registered product presentation screen WD 1 in FIG. 11A, a "Yes" button BT 1 and a "No" button BT 2 to confirm whether the customer will eat in are disposed in response to a target product corresponding to eating in. In this case, the price of the product is calculated so that the consumption tax rate of the target product differs depending on when the "Yes" button BT 1 is operated and when the "No" button BT 2 is operated.

Step S9: The portable terminal 60 that received the cart ID and the product registration update screen information from the TMS 20 adds the product to the registration screen. For example, the portable terminal 60 displays, for example, the product registration update screen as illustrated in FIG. 10C. Note that as described above, the product registration screen (product registration update screen) illustrated in FIG. 10C is displayed on the portable terminal 60 after "○○ bread" is registered as the third product.

Step S10: The portable terminal 60 accepts a checkout transition instruction operation as an operation of the customer. For example, it accepts a touch of a "Proceed to payment" button illustrated in FIG. 10C.

Step S11: The portable terminal 60 that accepted the checkout transition instruction operation generates a two-dimensional code. That is, the portable terminal 60 creates a two-dimensional code of the information necessary to execute checkout processing (for example, cart ID) regarding a purchased product using the portable terminal 60. The portable terminal 60 that generated the two-dimensional code displays the generated two-dimensional code on the display unit. For example, a code display screen having the two-dimensional code such as that illustrated in FIG. 10D disposed thereon is displayed on the touch panel 604.

Step S12: The scanner 406 of the self-checkout machine 40 scans the two-dimensional code displayed on the touch panel 604 of the portable terminal 60.

Step S13: The self-checkout machine 40 that read the two-dimensional code displayed on the touch panel 604 of the portable terminal 60 requests the TMS 20 to calculate the subtotal amount. For example, the self-checkout machine 40 transmits a calculation request for requesting calculation of the subtotal amount (subtotal calculation request information) to the TMS 20 together with the cart ID acquired from the two-dimensional code.

Step S14: The TMS 20 that received the cart ID and the subtotal calculation request information from the portable terminal 60 specifies the cart information of the transaction from the cart ID.

Step S15: The TMS 20 that specified the cart information calculates the subtotal amount by utilizing information, such as a price, in the registered product information included in cart information corresponding to the specified cart information.

Step S16: The TMS 20 that calculated the subtotal amount updates the cart information (stores the subtotal amount (subtotal amount after calculation)), and transmits the subtotal information indicating the calculated subtotal amount to the self-checkout machine 40 together with the cart ID.

Step S17: The self-checkout machine 40 that received the cart ID and the subtotal information from the TMS 20 displays the subtotal amount (checkout screen including the subtotal amount) on the display 405.

Step S18: The self-checkout machine 40 that displayed the subtotal amount on the display 405 executes payment (checkout) processing. For example, the self-checkout machine 40 accepts a selection of a settlement type. When cash is selected as the settlement type, the self-checkout machine 40 accepts an input of a deposit, calculates a change amount, and issues a receipt.

When checkout is completed, the self-checkout machine 40 transmits checkout completion information to the TMS 20 together with the cart information, and the TMS 20 stores the transaction end date and time (checkout date and time) of the cart.

As another operation example, for example, the portable terminal 60 transmits the product code to the TMS 20 after scanning the product (S5), but may not transmit the product code of a product other than a product scanned in the store (for example, a product scanned after moving to another store). For example, the portable terminal 60 acquires and stores position information (GPS information) when visiting a store (or during display of the product registration initial screen). Furthermore, the portable terminal 60 acquires position information when each product is scanned, and compares the position information acquired during scanning of the product to the position information acquired when visiting the store (or during display of the product registration initial screen). Also, the portable terminal 60 may permit transmission of the product code of the product to the TMS 20 when both types of position information match (or substantially match), and may prohibit transmission of the product code of the product to the TMS 20 when both types of position information do not match (or do not substantially match).

It is thereby possible to prevent improper product registration (for example, product registration or the like in a cart generated at another store or the like).

When the self-checkout machine 40 prohibits transmission of the product code as described above, an error message (for example, "Cannot be registered because it is not from ∘∘ store") may be displayed on the customer-side display 405 after the product is scanned. Furthermore, the self-checkout machine 40 may display the foregoing message on the employee-side display 417 instead of or in addition to the customer-side display 405.

The self-checkout machine 40 requests the TMS 20 to calculate the subtotal amount after reading the two-dimensional code displayed on the display unit of the portable terminal 60 (S13), but may not request calculation of the subtotal amount regarding a product other than a product scanned in the store (for example, a product scanned in another store or the like). For example, the self-checkout machine 40 references the store ID of the store (may store and reference the store ID of the store in its own self-checkout machine 40, or may reference the store ID stored in another accessible device), and when reading the two-dimensional code displayed on the display unit of the portable terminal 60, compares the cart ID obtained from the two-dimensional code to the store ID of the store. Also, the self-checkout machine 40 may permit a request for calculation of the subtotal amount when there is a configuration where the store ID included in the cart ID includes the store ID of the store, and may prohibit a request for calculation of the subtotal amount when there is no configuration where the store ID of the store is included.

It is thereby possible to prevent improper checkout (for example, checkout of a product that has undergone product registration at another store or the like).

When the self-checkout machine 40 prohibits a request of the subtotal amount as described above, an error message (for example, "Cannot be checked out because a product from a store other than ∘∘ store is included") may be displayed on the customer-side display 405 after the two-dimensional code is read. Furthermore, the self-checkout machine 40 may display the foregoing message on the employee-side display 417 instead of or in addition to the customer-side display 405.

In the example of the processing procedure in FIG. 9, the TMS 20 calculates the subtotal amount. However, for example, the self-checkout machine 40 may acquire the cart information from the TMS 20 and calculate the subtotal amount on the basis of the acquired cart information. Alternatively, the TMS 20 may transmit cart information to the store controller 100 to request calculation of the subtotal amount, and the store controller 100 may calculate the subtotal amount utilizing the received cart information and transmit the calculated subtotal amount to the self-checkout machine 40 via the TMS 20.

The TMS 20 may confirm the cancellation state regarding products of the customer up to that point on the basis of the customer information or cart information regarding the applicable customer at the time of checkout processing, and determine whether to issue a warning for fraudulence. When it is determined that the warning should be issued, the TMS 20 may, for example, cause the self-checkout machine 40 to execute a notification for the warning.

The TMS 20 may determine whether a held product is included in the product information included in the cart information during checkout processing, and when a held product is included, may request a correction instruction for the held product to the self-checkout machine 40. The self-checkout machine 40 that received the request of the correction instruction of the held product may perform a display notifying to the effect that there is a held product. The employee who confirmed the notification performs an operation, such as the input of a price corresponding to the held product or the cancellation of the held product, as removal (correction) of the held product.

As described above, FIG. 9 illustrates an operation procedure of a case where reading of the product code is successful in step S5. However, in the reading processing of the product code corresponding to step S5, the portable terminal 60 may determine that a state applicable to the registration failure of any of classification numbers 2 to 4 (registration failure state) in FIG. 8 occurred.

For example, FIG. 11B illustrates one example corresponding to a case where the portable terminal 60 determines that a registration failure state as a pseudo-scan of classification number 3 occurred, indicated by the captured image of the product registration screen. The same drawing illustrates a product registration screen displayed by the portable terminal 60. On the product registration screen of the same drawing, a state is illustrated wherein a captured image is displayed of a situation where a customer is attempting to cause the portable terminal 60 to read the barcode of a product while the barcode portion is hidden by a finger.

In such a case, the portable terminal 60 recognizes the existence of the barcode from the captured image, but obtains a processing result that the code is not able to be extracted from the barcode. Since this kind of processing result is included as one type of processing result in a pseudo-scan, the portable terminal 60 detects that a registration failure state occurred as a pseudo-scan. In this case, the portable terminal 60 transmits the product registration information indicating that the product was subjected to the pseudo-scan of classification number 3 to the TMS 20.

Furthermore, when transmitting the product registration information in response to the occurrence of the registration failure state in this manner, the portable terminal 60 transmits the captured image corresponding to the registration failure state that occurred. After a captured image captured by the camera 606 for reading the product code is buffered for a certain period of time, for example, the transmitted captured image may be extracted from the buffered captured image. Furthermore, the transmitted captured image may be, for example, a static image according to a predetermined number, or a moving image of a predetermined period of time corresponding to the occurrence of the registration failure state.

When a registration failure state including a pseudo-scan occurs as described above, the portable terminal 60 treats the product constituting the registration failure (registration failure product) as a held product in correspondence with the registration failure state. The portable terminal 60 in this case, as illustrated in FIG. 11C, may treat the registration failure product as a held product and display a guidance image WD2 prompting to place the held product in the bag for a held product at a timing at which the registration failure state is determined to have occurred. For example, in the guidance image WD2 in the same drawing, a message stating, "Please put the product in the dedicated bag if it cannot be scanned" is displayed. Note that the mode of the guidance image WD2 is not particularly limited. The message displayed on the guidance image WD2 may include content such as, for example, "Scanning failed" or "It has been determined that product registration failed".

There is a mode where the guidance image WD2 is displayed so as to be superimposed on the product registration screen. A confirmation button BT3 is disposed in the guidance image WD2 of the same drawing. In this case, the guidance image WD2 is erased in response to an operation on the confirmation button BT3 being performed. Alternatively, the guidance image WD2 may be erased in response to a fixed time having passed from the start of display. After the guidance image WD2 is erased, the display may return to, for example, the product registration screen of FIG. 10B or FIG. 10C.

The registration failure product is treated as a held product, as described above. On the product registration screen, a registered product list is displayed as illustrated in FIG. 10C, but a list item need not be displayed on the registered product list regarding a product classified as a registration failure product among the held products. A held product not classified as a registration failure product is displayed as a list item in the registered product list. Note that the list item may be displayed in the registered product list so as to indicate that the registration failure product is a registration failure product.

Figure 12:
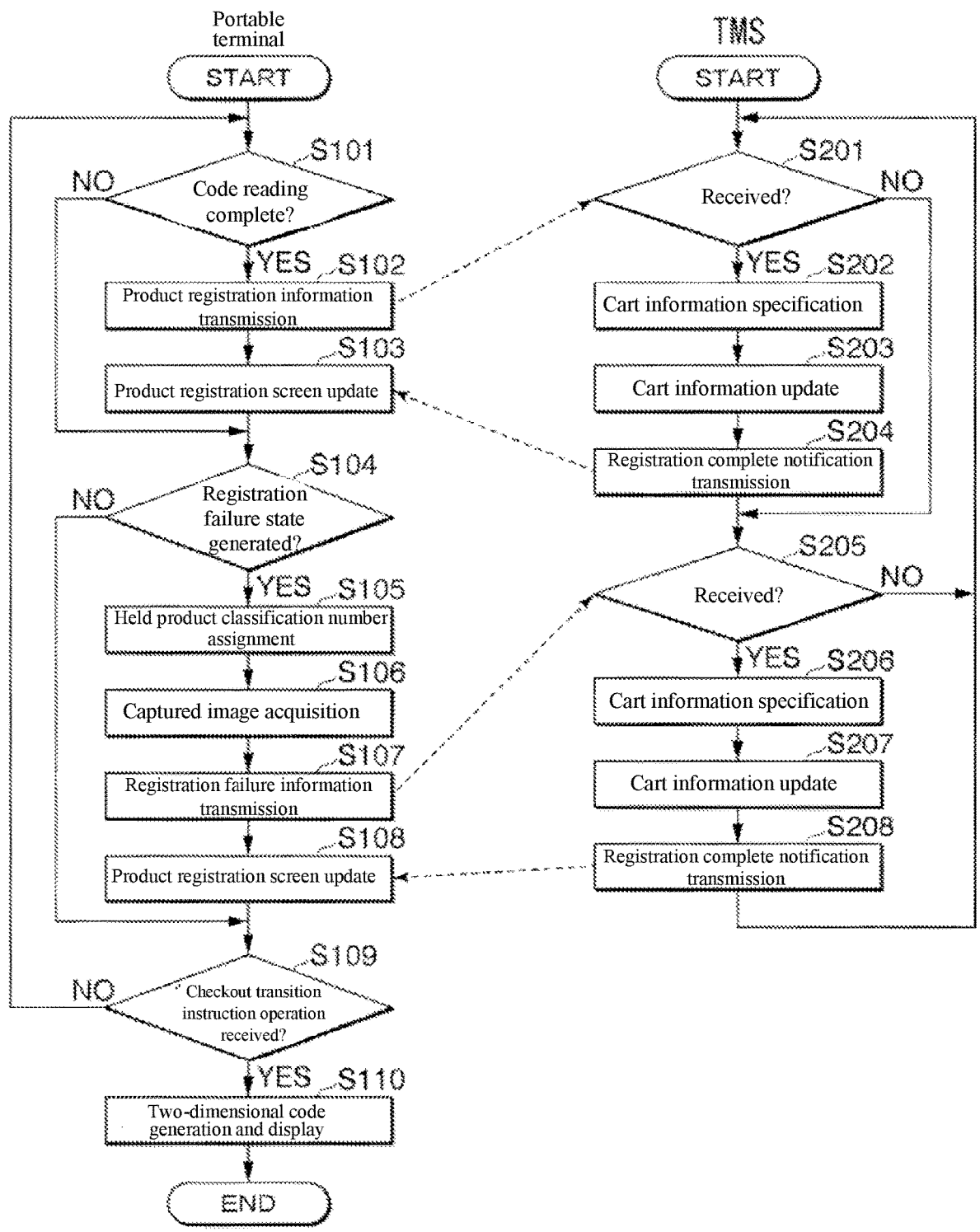
FIG. 12 is a flowchart illustrating a processing procedure example executed by the portable terminal and the TMS in relation to product registration including processing corresponding to a registration failure state according to one or more embodiments.

Referencing the flowchart in FIG. 12, a processing procedure example executed by the portable terminal 60 and the TMS 20 in relation to product registration including processing corresponding to the registration failure state is described. The processing in the same drawing corresponds to FIG. 9, and more specifically illustrates the processing process in steps S5 to S11 as including the processing corresponding to the registration failure state.

First, a processing procedure example executed by the portable terminal 60 will be described.

Step S101: The portable terminal 60 determines whether reading of the product code has completed normally under a state where the product registration screen is displayed.

Step S102: When reading of the product code is completed normally, the portable terminal 60 transmits product registration information including the read product code and the cart ID to the TMS 20.

Step S103: The portable terminal 60 updates the product registration screen, as illustrated in FIG. 10C, for example in response to the reception of a registration complete notification transmitted from the TMS 20 according to the transmission of the product registration information in step S102.

Step S104: The portable terminal 60 may be made to detect the registration failure state on the basis of a captured image obtained by causing the camera 606 to execute image capture for reading of the product code. The portable terminal 60 determines whether a registration failure state has occurred on the basis of the detection result of the registration failure state when it has been determined in step S101 that reading of the product code has not been completed normally, or after the processing in step S103.

The portable terminal 60 may be made to detect a registration failure state as follows.

First, the portable terminal 60 determines that a registration failure state classified as a reading failure has occurred when a certain time has passed without normally completing (successfully) reading a barcode while in a state where it is recognized that the entire barcode of a product has been captured in the captured image.

Furthermore, the portable terminal 60 determines that a registration failure state classified as a pseudo-scan has occurred when a product is recognized in the captured image but reading of a barcode is not completed normally because the barcode is unable to be recognized at all.

Alternatively, as illustrated in FIG. 11B, the portable terminal 60 determines that a registration failure state classified as a pseudo-scan has occurred even when reading of a barcode is not completed normally because only a portion of the barcode of a product is able to be recognized in the captured image.

Alternatively, the portable terminal 60 determines that a registration failure state classified as a pseudo-scan has occurred even when reading of a barcode is not completed normally because a product was moved too quickly, although the barcode of the product is able to be recognized in the captured image.

For this kind of registration failure state classified as a pseudo-scan, there is a possibility that fraudulence has been carried out, such as where the customer merely pretends to perform an operation to cause reading of the barcode of the product and puts the product in the shopping basket 80.

Furthermore, the portable terminal 60 set in the mode illustrated in FIGS. 3A and 3B is capable of capturing an image of the contents of the shopping basket 80 placed in the shopping cart 70. The portable terminal 60 determines that a registration failure state classified as a non-scan input has occurred when a state is detected wherein a new product is additionally input into the shopping basket 80, regardless of whether a situation where an attempt to read the barcode of the product is not recognized in the captured image.

Note that, for example, the customer may move a product already registered within the shopping basket 80 to organize the contents of the shopping basket 80. The portable terminal 60 may be made so as to be capable of respectively identifying the movement of this kind of product and the additional input of a new product corresponding to a registration failure state as a non-scan input on the basis of the captured image.

For the occurrence of this kind of registration failure state classified as a non-scan input, there is a possibility that fraudulence may have been carried out, such as where the customer does not cause the portable terminal 60 to read the barcode of the product and puts the product in the shopping basket 80 as is.

Step S105: When it is determined that the registration failure state has occurred in step S104, the portable terminal 60 grants a classification number corresponding to classification as the registration failure state detected in correspondence with step S104 for a held product to which the current registration failure state occurred. As one example, when it is determined in step S104 that a registration failure state classified as reading failure has occurred, classification number 2 (see FIG. 8) is granted for the corresponding held product.

Step S106: The portable terminal 60 acquires (extracts) a captured image corresponding to the registration failure state currently occurring from among the captured images captured by the camera 606. The captured image acquired by the portable terminal 60 here is for the employee to visually recognize the registration failure state that occurred. Therefore, the format of the captured image (moving image, static image) acquired by the portable terminal 60, the number of captured images, the time, period, and the like of the captured image to be acquired may be made to differ in response to the classification of the detected registration failure state.

After the captured image of the camera 606 is transmitted to the TMS 20, the TMS 20 side may be made to acquire the captured image corresponding to the registration failure state in response to the time when the registration failure state occurred, the classification result, the image analysis result, and the like.

Step S107: The portable terminal 60 transmits registration failure information to the TMS 20. The registration failure information includes the classification number of the held product granted in step S105 and the captured image acquired in step S106.

Step S108: The portable terminal 60 updates the product registration screen in response to the reception of a registration complete notification transmitted from the TMS 20 according to the transmission of the product registration information in step S102. The portable terminal 60 may display the guidance image WD2, as illustrated in FIG. 11C, at a timing according to the update of the product registration screen in step S103, for example.

Step S109: When it is determined that the registration failure state is not occurring in step S104, or after the processing in step S108, the portable terminal 60 determines whether the checkout transition instruction operation is accepted.

If the checkout transition instruction operation is not accepted, processing is returned to step S101.

Step S110: When accepting the checkout transition instruction operation, the portable terminal 60, for example, creates a two-dimensional code of the cart ID and displays the generated two-dimensional code on the touch panel 604 by, for example, the code display screen illustrated in FIG. 10D.

Next, a processing procedure example executed by the TMS 20 will be described.

Step S201: The TMS 20 determines whether the product registration information transmitted from the portable terminal 60 has been received in step S102.

Step S202: When the product registration information is received, the TMS 20 specifies cart information indicated by the cart ID included in the received product registration information.

Step S203: The TMS 20 updates the cart information specified in step S202. That is, the TMS 20 adds registered product information, based on the product code included in the product registration information received in correspondence with step S201, to the specified cart information. Thus, one product is registered in the cart information.

Note that the update of the cart information in step S202 includes the registration of a product that does not correspond to the registration failure state among the held products. That is, the update of the cart information in step S202 includes the registration of a product for which reading of the product code has been completed successfully among the held products. Among the held products, a product for which reading of the product code has been completed normally is a NO-FILE, age confirmation product, pharmaceutical product, or security tag product. Furthermore, a canceled product is not reflected in the processing illustrated in the same drawing, but the TMS 20 updates the registered product information of the applicable product in the cart information so that the applicable product is managed as a canceled product in response to a cancellation operation performed on the portable terminal 60.

Step S204: The TMS 20 transmits a registration complete notification to the portable terminal 60 after the processing in S203.

Step S205: After the processing in S204 or when it is determined that the product registration information is not received in step S201, the TMS 20 determines whether the registration failure information transmitted from the portable terminal 60 has been received in step S107. When the registration failure information is not received, processing is returned to step S201.

Step S206: When the registration failure information is received, the TMS 20 specifies cart information indicated by the cart ID included in the received product registration information.

Step S207: The TMS 20 updates the cart information specified in step S206. In this case, the TMS 20 adds registered product information including the classification number included in the registration failure information received in correspondence with step S205 to the specified cart information. Thus, one held product (registration failure product) corresponding to the occurrence of the registration failure state is registered in the cart information.

Step S208: The TMS 20 transmits a registration complete notification to the portable terminal 60 after the processing in S207.

The customer, when completing registration of all the products to be purchased, performs a checkout transition instruction operation, causing the self-checkout machine 40 to read the two-dimensional code displayed on the portable terminal 60. The self-checkout machine 40 that read the two-dimensional code requests the TMS 20 to calculate the subtotal amount as illustrated in FIG. 9 as step S13. When requesting calculation of the subtotal amount, the self-checkout machine 40 requests checkout information utilized for checkout processing using the checkout screen.

The TMS 20 specifies the applicable cart information in response to the request for the checkout information and generates the checkout information on the basis of the specified cart information. The checkout information includes registered product information in the cart information and information such as a subtotal amount corresponding to the registered product or the like. Furthermore, among the registered product information included in the checkout information, the registered product information corresponding to the registration failure product includes a captured image corresponding to the registration failure state. The TMS 20 transmits the generated checkout information to the self-checkout machine 40.

When the checkout information is received, the self-checkout machine 40 causes the display 405 to display the checkout screen whereon the content of the received checkout information is reflected.

FIG. 13 illustrates one example of the checkout screen displayed on the display 405 of the self-checkout machine 40.

A registered product list area AR3 is disposed on the checkout screen of the same drawing. The registered product list area AR3 is an area for presenting a list of products registered by the portable terminal 60.

When a held product is included among the registered products, a list item of the held product is prioritized, disposed from the upper side of the left column. In the example of the same drawing, in response to the fact that six held products are included among registered products, a held product list area AR31 including list items of six held products is formed from the upper left in the registered product list area AR3. The appearance of the list items in the held product list area AR31, for example, the background color or the like, is made to be different from that of the list items of other products.

The product name of the corresponding product, the registered number, the price corresponding to the registered number, and the like are shown in the list items in the registered product list area AR3. In addition, for example, the classification number, classification name, or the like may be indicated as the held product in a list item to which the held product corresponds.

A call button BT31 is disposed for the list item of each held product in the held product list area AR31. The names of the classifications of the corresponding products as applicable held products are shown respectively on the call buttons BT31.

Furthermore, a customer monitor area AR32 is disposed on the checkout screen. The customer monitor area AR32 is an area for displaying a captured image obtained by image capture using the camera 416 as a monitor image in real time. A situation where the customer is operating the self-checkout machine 40 for checkout is displayed in real time in the customer monitor area AR32. When the self-checkout machine 40 displays this kind of image in the customer monitor area AR32, the customer becomes aware that an image of themselves is being captured, thereby obtaining an effect where fraudulence is suppressed at the time of payment by the customer.

Note that the self-checkout machine 40 may be made to store (keep) images used for display in the customer monitor area AR32.

Here, as in the same drawing, when the held product list area AR31 is formed in the registered product list area AR3 on the checkout screen, it is necessary for an employee to perform an operation for processing a held product. When the checkout screen on which the held product list area AR31 is formed is displayed in this manner, the self-checkout machine 40 executes an employee call to cause an employee to perform the operation of processing the held product. As the employee call, the self-checkout machine 40 may be made so that, for example, the self-checkout machine 40 displays a display device, such as a sign pole or the like, in a predetermined mode, or transmits a notification of the employee call to a terminal device that the employee carries or monitors.

The employee who goes to the self-checkout machine 40 in response to the employee call performs an operation for processing the held product in correspondence with each list item shown in a held product list area AR31 of the displayed checkout screen.

When processing one held product, the employee operates the call button BT31 in the list item of the held product to undergo processing. In this case, the employee performs an operation on the call button BT31 of the list item on the first line corresponding to canned beer in the held product list area AR31. In response to the operation on the call button BT31 being performed, a held product processing screen for processing a held product to which a list item including the operated call button BT31 corresponds is displayed on the checkout screen.

Note that all list items of the held products to undergo processing may be made to be operable by touch.

For example, when the employee performs an operation on the call button BT31 of the list item on the first line corresponding to canned beer, which is an age confirmation product, the held product processing screen for the canned beer is displayed on the checkout screen.

Figure 14:
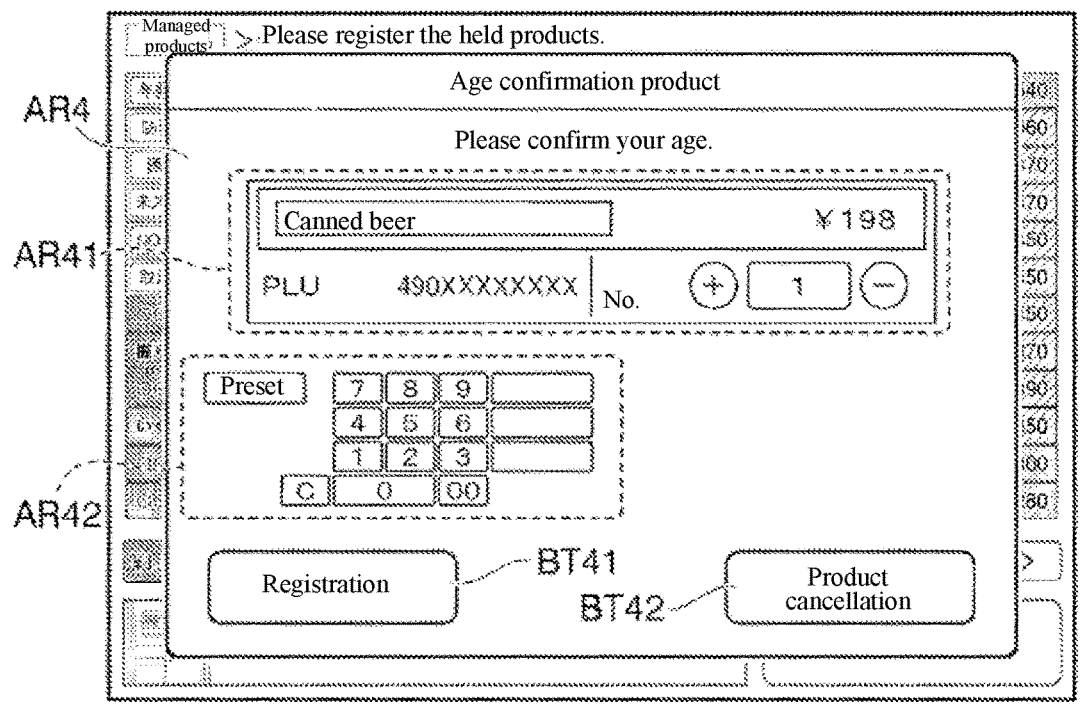
FIG. 14 is a diagram illustrating one example of a held product processing screen according to one or more embodiments.

FIG. 14 is one example of a held product processing screen AR4 for canned beer, which is an age confirmation product.

A product information area AR41, an input operation area AR42, a registration button BT41, and a cancellation button BT42 are disposed in the held product processing screen AR4.

The product information area AR41 is an area showing information on the corresponding held product. The product information area AR41 of the same drawing shows the product name, product code, price, registered number, and the like. In the case of an age confirmation product, the content displayed in the product information area AR41 reflects the content of registered product information of the corresponding product included in the checkout information.

The input operation area AR42 is an area where a software keyboard for inputting information on a product in the product information area AR41 is disposed. The input operation area AR42 is capable of switching between a keyboard having a key layout corresponding to numerical input and a keyboard of a key layout corresponding to character input according to an operation. Furthermore, a preset call key displayed as "Preset", for example, is disposed in the input operation area AR42. Operating the preset call key causes a preset key screen to be displayed, whereon a preset key corresponding to each product is disposed. The employee is able to input the information of a product corresponding to the operated preset key to the product information area AR41 by operating the preset key disposed on the preset key screen.

The registration button BT41 is a button by which an operation is performed to remove the hold on registration of the corresponding product and register it as to be purchased by the customer.

The cancellation button BT42 is a button by which an operation is performed to instruct cancellation of registration for a product whose registration is in a held state.

The employee, after confirming the age of the customer, for example, performs an operation on the registration button BT41 to establish the registration of the canned beer provided that there is no problem. Thus, the self-checkout machine 40 removes the registration held state of the canned beer and processes it so as to be included in the registered products. Alternatively, when it is judged that the canned beer should not be registered, the employee performs an operation on the cancellation button BT42 to cancel the registration of the canned beer and retrieves the canned beer product.

Furthermore, in the case of a registration failure product, the call button BT31 in the list item of the held product list area AR31 displays, for example, "Unscanned". When processing a registration failure product, the employee operates the call button BT31 displayed as "Unscanned" in the list item of the registration failure product.

Note that in the case of a held product classified as "NO-FILE", for example, in an initial display state of the held product processing screen AR4, the product information area AR41 does not show the information of the product. In this case, the employee is able to perform registration of the product after inputting a numeric string as the product code or a letter string as the product name into the product information area AR41 by a numeral input operation or a letter input operation into the input operation area AR42.

The information of the product registered in this manner is transmitted to the TMS 20. The TMS 20 performs synchronization of the cart information regarding the registered product information of the corresponding product in the cart information such that the information input to the product information area AR41 is reflected and is updated from the "NO-FILE" state.

Note that the classification number, classification name, and the like of the corresponding held product may be displayed on the held product processing screen.

Figure 15:
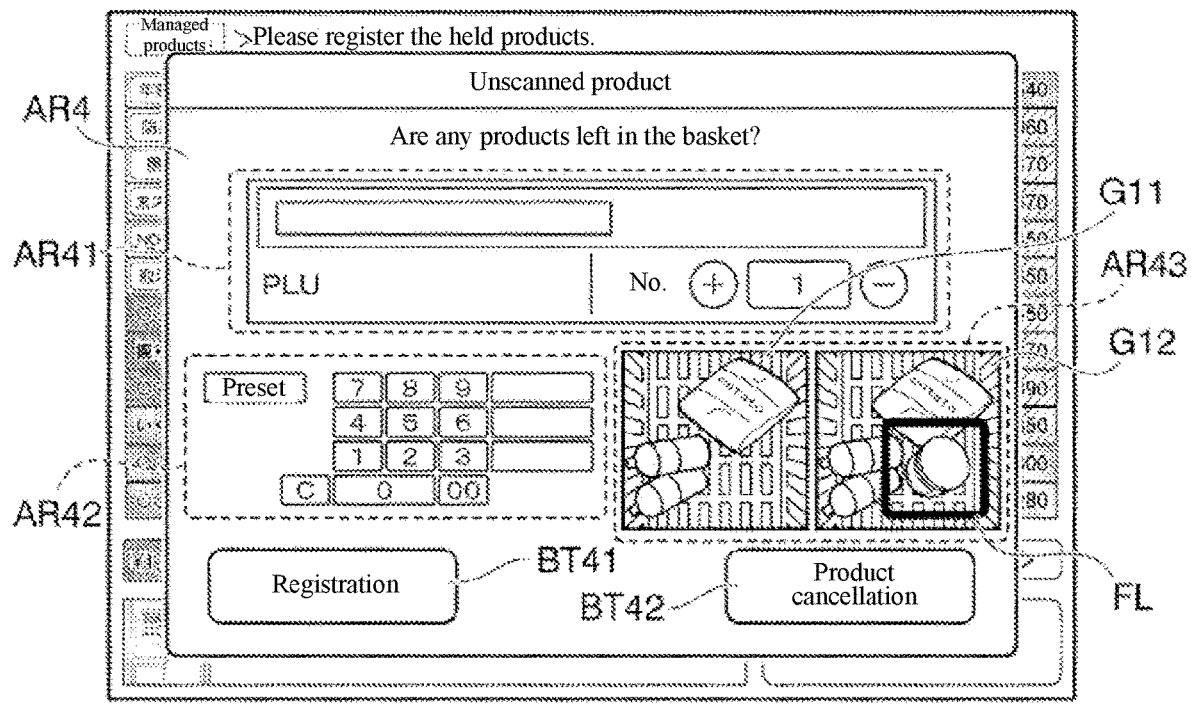
FIG. 15 is a diagram illustrating one example of the held product processing screen according to one or more embodiments.

FIG. 15 is one example of the held product processing screen AR4 that is displayed in response to operating the call button BT31 displayed as "Unscanned" and is for processing the registration failure product.

In the initial display state of the held product processing screen AR4 corresponding to the registration failure product, information relating to the product has yet to be acquired, and therefore, the product information area AR41 does not present information relating to the product as illustrated in the drawing.

Furthermore, in the held product processing screen AR4 corresponding to the registration failure product, a captured image area AR43 is disposed in addition to the product information area AR41, the input operation area AR42, the registration button BT41, and the cancellation button BT42.

A captured image corresponding to the occurrence of a corresponding registration failure state is displayed in the captured image area AR43. This captured image is acquired by the portable terminal 60 in step S106 in FIG. 12.

The captured image of the captured image area AR43 shows a registration failure state classified as non-scan input. Two captured images G1 and G2 are disposed in the captured image area AR43 in the same drawing. The captured image G1 is a captured image showing a state before a product is additionally input into the shopping basket 80. The captured image G2 is an image showing a state following the captured image G1 where a product has been additionally input into the shopping basket 80.

The employee is able to ascertain that the registration failure product to undergo processing has been put in the shopping basket 80 without the barcode being read by looking at the captured image in the captured image area AR43 in the same drawing. Furthermore, in the captured image G2, a frame FL is disposed in a portion of the additionally input product. The employee is thereby able to easily specify what the additionally input product is without being registered.

Specification of the additionally input product and the disposition of the frame FL may be performed by either the portable terminal 60 or the self-checkout machine 40.

Furthermore, when desiring to confirm the captured image in the captured image area AR43 in more detail, the employee is able to perform a captured image magnification operation by, for example, tapping any position in the captured image area AR43.

Figure 16:
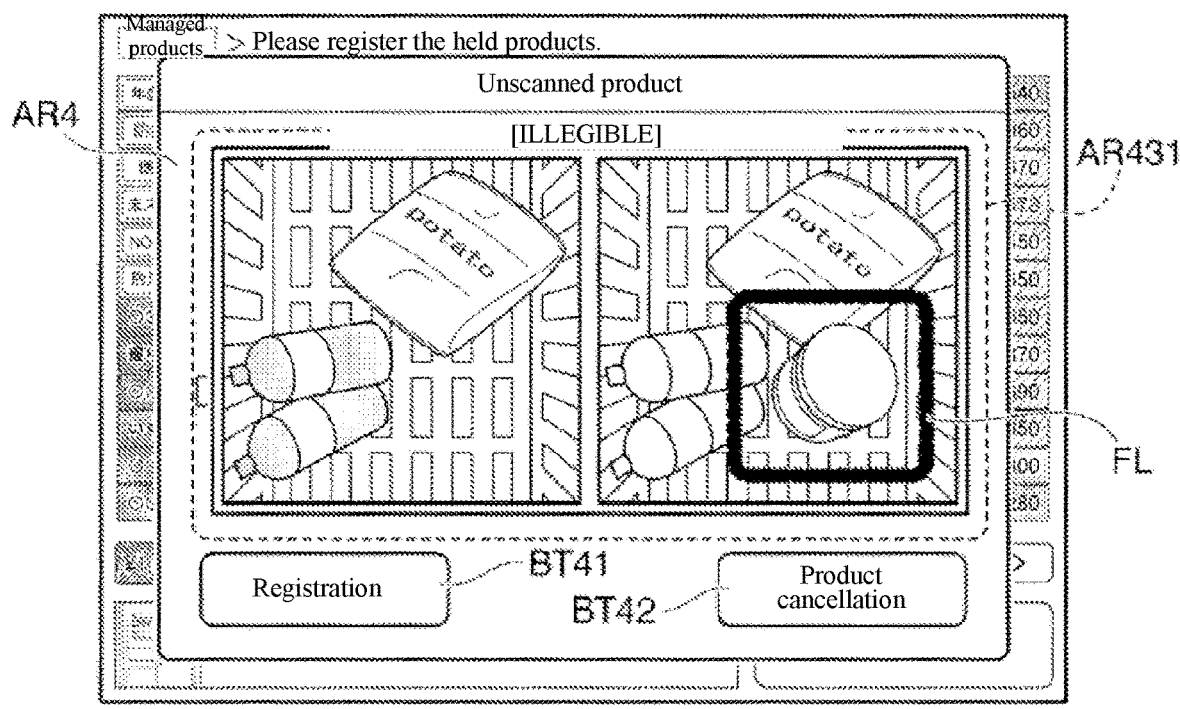
FIG. 16 is a diagram illustrating one aspect example of a magnified captured image area according to one or more embodiments.

In response to the captured image magnification operation having been performed, as illustrated in FIG. 16, the self-checkout machine 40 disposes the magnified captured image area AR431 on the held product processing screen AR4. The magnified captured image area AR431 may be erased (closed) according to a predetermined operation.

The description will now return to FIG. 15. The employee confirms whether the customer intends to purchase the applicable registration failure product. If there is no intention to purchase, the employee operates the cancellation button BT42 and retrieves the applicable registration failure product. If there is an intention to purchase, the employee operates the input operation area AR42 to input the information of the product into the product information area AR41, and then operates the registration button BT41 to perform registration of the product.

Figure 17:
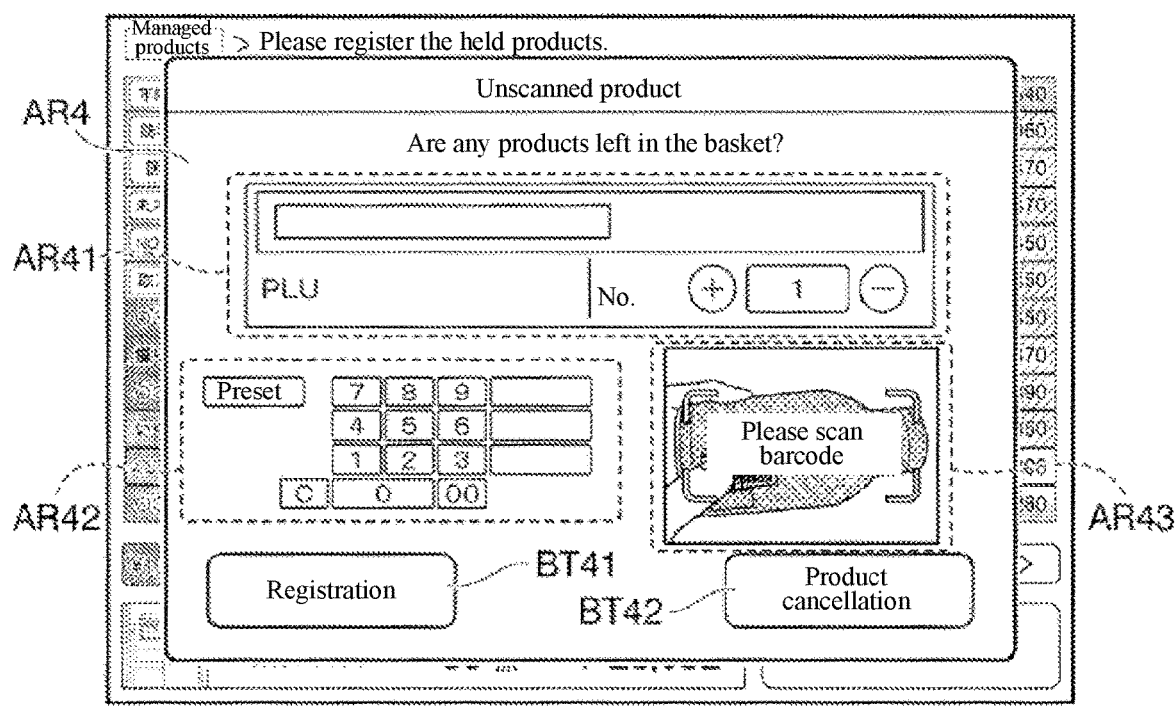
FIG. 17 is a diagram illustrating one example of the held product processing screen according to one or more embodiments.

Furthermore, the held product processing screen AR4 in FIG. 17 illustrates one example of when the registration failure product is classified as a "pseudo-scan".

One captured image is displayed in the captured image area AR43 in the same drawing. According to the captured image of the captured image area AR43 displayed in this manner, it is illustrated that the barcode is captured while a portion of it is hidden by a finger during the occurrence of the registration failure state. By looking at this kind of captured image in the captured image area AR43, the employee is able to ascertain that the registration failure product to undergo processing is classified as a pseudo-scan.

Figure 18:
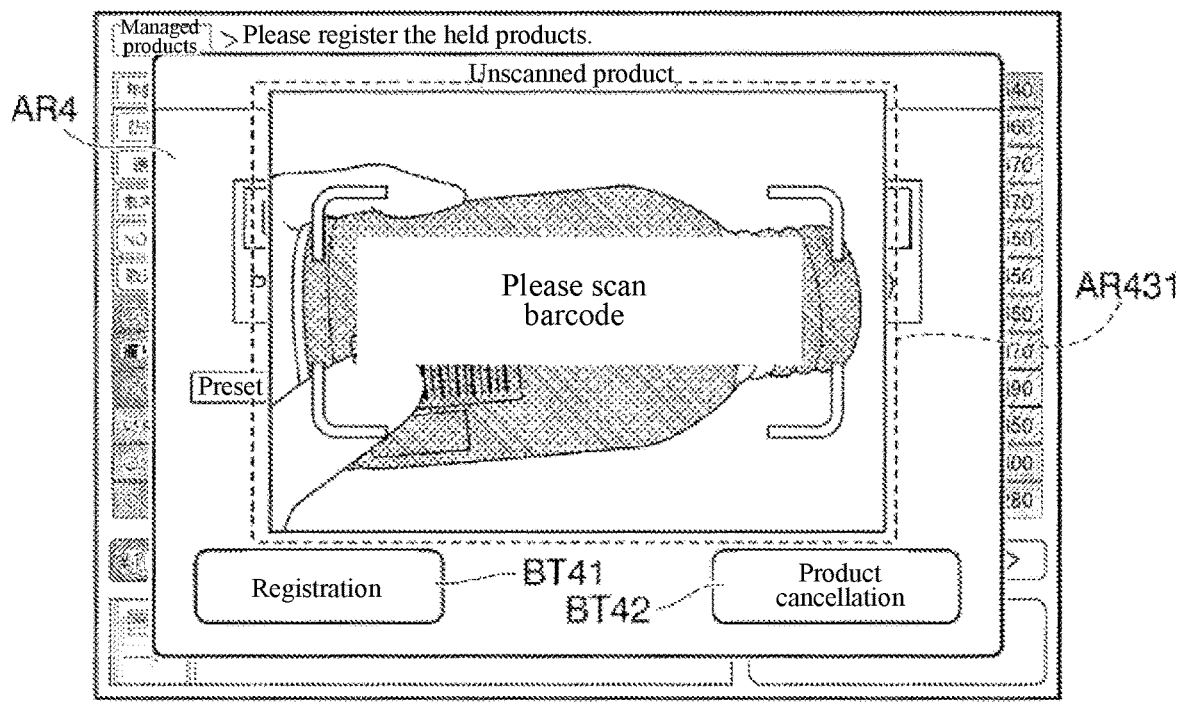
FIG. 18 is a diagram illustrating one aspect example of the magnified captured image area according to one or more embodiments.

Furthermore, in this case as well, performing an operation on the captured image area AR43 as illustrated in FIG. 18 makes it possible to display the magnified captured image area AR431 on the held product processing screen AR4.

In this case as well, the employee confirms whether the customer intends to purchase the applicable registration failure product, and performs an operation for registering or canceling the product according to whether there is an intention to purchase.

Furthermore, the pseudo-scan includes a state where the barcode does not enter the imaging range at all despite the product being held over the image capture range (range within which a barcode can be read) of the camera 606. In this case, a captured image of a state where a portion of the product is in the image capture range but the barcode is not in the image capture range may be displayed in the captured image area AR43.

Furthermore, the pseudo-scan includes a state where the product is passed through the image capture range of the camera 606 at a speed at which the product code is not able to be read. In this case, a captured image taken as a static image captured when the product passes through the image capture range or a captured image taken as a moving image of when the product passes through the image capture range may be displayed in the captured image area AR43.

A processing procedure example executed by the self-checkout machine 40 in relation to the display of the held product processing screen will be described with reference to the flowchart in FIG. 19.

Step S1301: Under a state where the checkout screen is displayed, the self-checkout machine 40 waits for an operation for designating a held product to undergo processing (held product designation operation) to be performed.

Step S1302: When the held product designation operation is performed, the self-checkout machine 40 determines whether the product designated by the held product designation operation is a registration failure product.

For example, a held product having a captured image included in registered product information included in checkout information transmitted from the TMS 20 is limited to a registration failure product. Therefore, as the processing in step S1302, the self-checkout machine 40 may determine whether the captured image is included in the registered product information of the product designated by the held product designation operation.

Step S1303: When it is determined in step S1302 that there is a registration failure product, the self-checkout machine 40 generates the held product processing screen including the captured image area AR43 for the registration failure product designated to undergo processing. The self-checkout machine 40 may acquire the captured image of the captured image area AR43 from registered product information of the applicable product in the checkout information. The self-checkout machine 40 displays the generated held product processing screen.

Step S1304: On the other hand, when it is determined in step S1302 that there is no registration failure product, the self-checkout machine 40 generates the held product processing screen without including the captured image area AR43 for the held product designated to undergo processing. The self-checkout machine 40 displays the generated held product processing screen.

<Variations>

Variations of the first example will be described below.

[First Variation]

In the foregoing embodiments, an example is given wherein one or two captured images (FIG. 15, FIG. 17) are presented in the captured image area AR43 displayed when the held product is a registration failure product. However, the number of captured images presented in the captured image area AR43 may be three or more.

Figure 20:
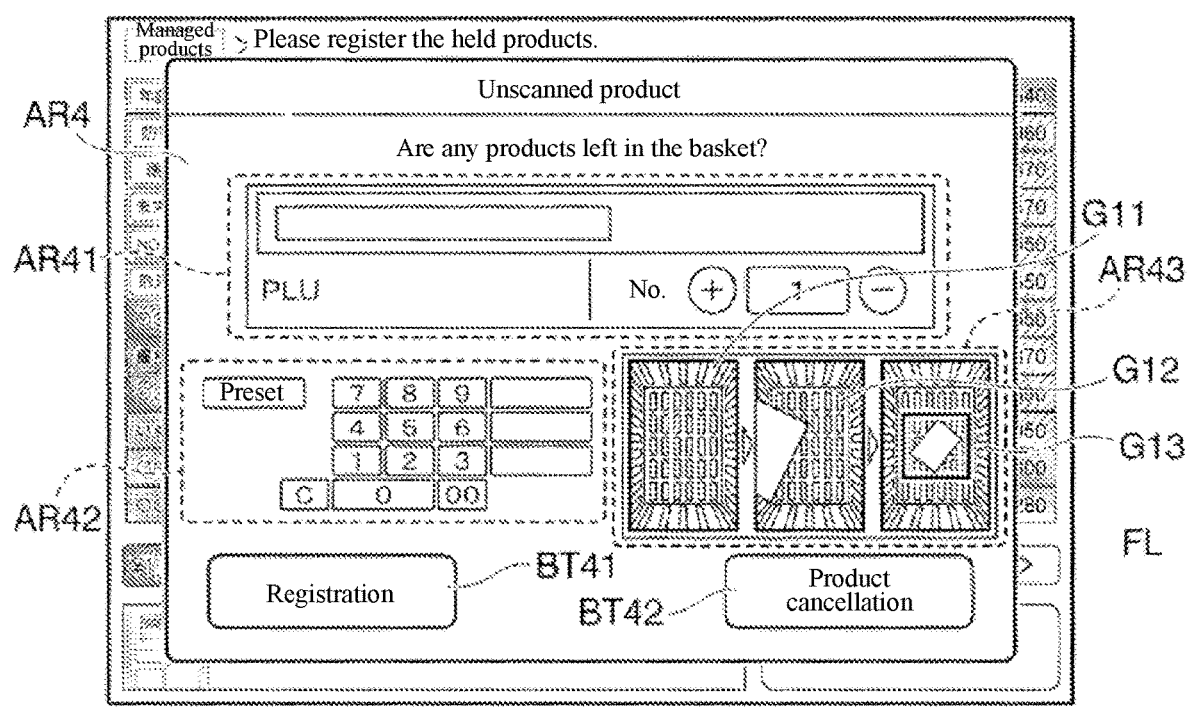
FIG. 20 is a diagram illustrating one example of the captured image area according to one or more embodiments.

FIG. 20 illustrates an example where three captured images G11, G12, and G13 are disposed in the captured image area AR43 of the held product processing screen AR4. An example of the held product processing screen AR4 in the same drawing is given of when the registration failure product to undergo processing is classified as non-scan input.

Captured images G11, G12, and G13 in the same drawing illustrate the following situation. The captured images G11, G12, and G13 are disposed in order from left to right in the captured image area AR43. The disposition order of the captured images G11, G12, and G13 corresponds to the passage of time as the images were captured.

The first captured image G11 is obtained when an image of the inside of the shopping basket 80 is captured before the registration failure product to undergo processing is additionally input. The second captured image G12 is obtained when capturing an image of the process where the captured image G11 changes to the next third captured image G13. The third captured image G13 is obtained when capturing an image of a state where additional input of the registration failure product to undergo processing into the shopping basket 80 is completed.

Note that the second captured image G12 may be extracted from, for example, captured images including the product to be input, or it may be a captured image of a time at a timing determined such as, for example, a precise intermediate time in between the times when the captured images G11 and G13 were captured.

Furthermore, in the captured image G13 also, the frame FL is disposed around a portion of the product additionally input into the shopping basket 80.

[Second Variation]

In the foregoing embodiments, an example is given of when the display surface of the display 405 of the self-checkout machine 40 is laterally long. However, the display surface of the display 405 of the self-checkout machine 40 may be vertically long.

Figures 21A, 21B, 21C:
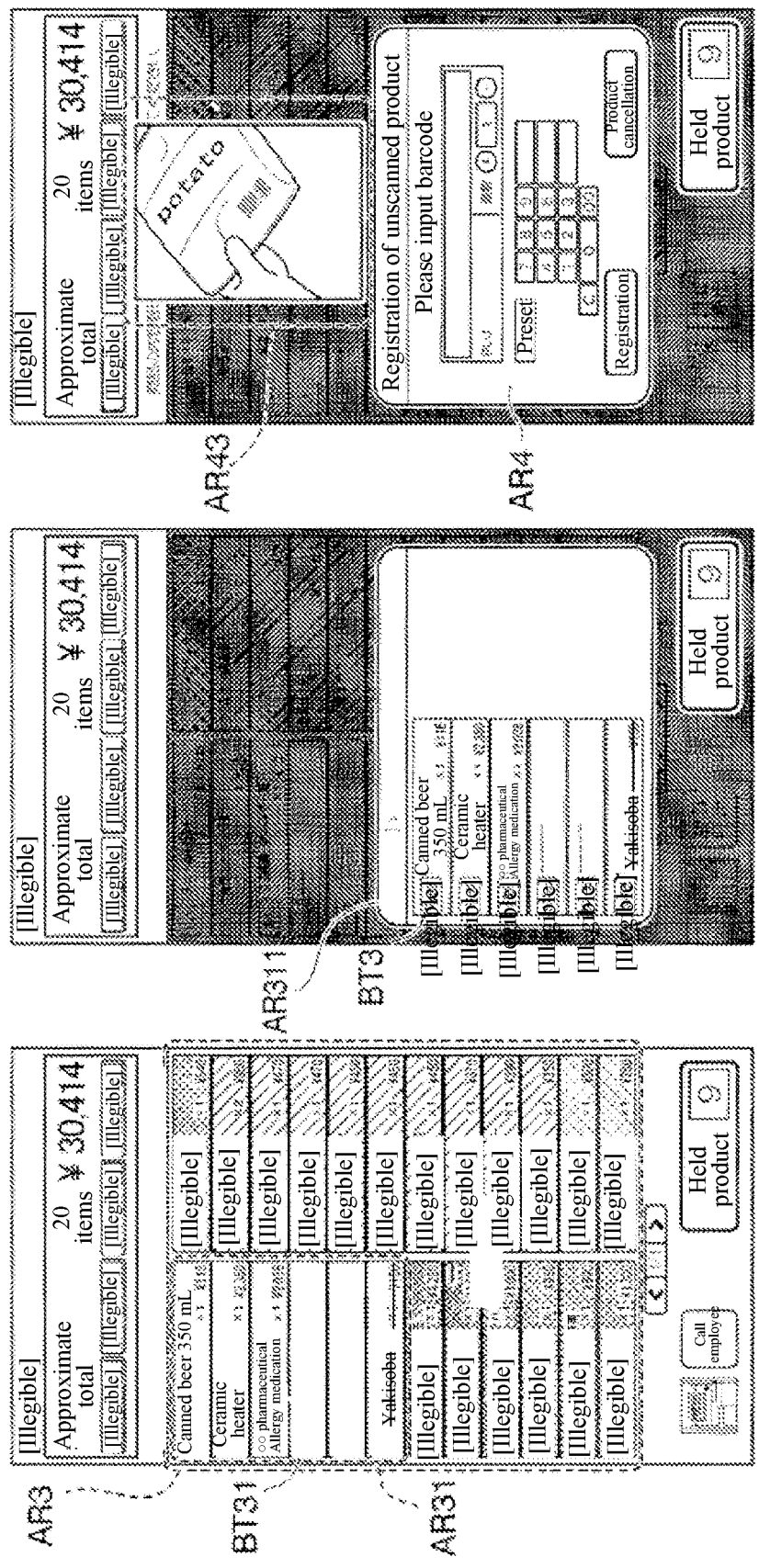
FIGS. 21A to 21C are diagrams illustrating one example of the checkout screen according to one or more embodiments.

FIG. 21A illustrates one example of the checkout screen displayed on the display 405 having a vertically long display surface corresponding to the present variation. In the same drawing, portions that are the same as those in FIG. 13 are given the same reference numeral. As can be seen by comparing the same drawing and FIG. 13, the information presented on the checkout screen is the same, but the layout of the information presented on the checkout screen is made to differ in response to the size of the display surface being made vertically long.

However, even on the checkout screen in FIG. 21A, a held product list area AR31 including list items of held products is formed in the upper left in the registered product list area AR3, and the point where list items for those other than held product and the background color and the like are made to be different is the same as the checkout screen in FIG. 13.

In the case of the present variation, for example, the held product list area AR31 in FIG. 21A may be magnified and displayed as a magnified held product list area AR311 as illustrated in FIG. 21B. The operation for displaying the magnified held product list area AR311 may be an operation wherein any position in the held product list area AR31 is touched. Alternatively, it may be an operation wherein a held product count area AR33 disposed on the checkout screen in FIG. 21A is touched.

By displaying the magnified held product list area AR311 in this manner, the employee is able to easily view the list items of held products and easily ascertain what kind of held products there are.

Furthermore, for example, the position of the display 405 may be higher depending on the disposition location of the display 405 in the self-checkout machine 40, and particularly when the display surface of the display 405 is vertically long, there may be cases where it becomes difficult to operate the upper side of the display surface of the display 405. Therefore, in the example in FIG. 21B, the magnified held product list area AR311 is disposed on the lower side on the display surface. The employee is thereby able to easily perform an operation on the magnified held product list area AR311.

When performing processing corresponding to the held product, the employee operates the call button BT31 disposed on the list item of the held product to undergo processing from among the list items in the magnified held product list area AR311 displayed as in FIG. 21B.

In response to the call button BT31 being operated, the held product processing screen AR4 is displayed instead of the magnified held product list area AR311 as illustrated in FIG. 21C. The held product processing screen AR4 displayed in this manner sets the held product shown by the list item of the call button BT31 that was operated to undergo processing.

Furthermore, when the held product set to undergo processing is a registration failure product, the self-checkout machine 40 displays the captured image area AR43 on the same screen together with the held product processing screen AR4 as illustrated in the same FIG. 21C.

Note that an example is given in the same drawing where one captured image is displayed in the captured image area AR43. However, even in the case of a vertically long screen in this manner, as in FIG. 15 and FIG. 20, a plurality of predetermined captured images may be displayed in the captured image area AR43 in response to the classification of the registration failure product (registration failure state).

For example, in an example such as FIG. 15, the captured image area AR43 is disposed within the held product processing screen AR4. In contrast thereto, in FIG. 21C, the captured image area AR43 is not included in the held product processing screen AR4 according to the display surface of the display 405 being vertically long.

Thus, since the captured image area AR43 may be magnified and disposed in a larger size than when disposing it in the held product processing screen AR4, the captured image is able to be easily viewed. Furthermore, as illustrated in FIG. 21C, on the vertically long display surface, the captured image area AR43 is disposed on an upper side and the held product processing screen AR4 is disposed on a lower side. The employee is thereby able to easily perform an operation on the held product processing screen AR4.

[Third Variation]

In the foregoing embodiments, an example is given wherein the captured image area AR43 is disposed on the held product processing screen for setting a registration failure product to undergo processing from among the held products, and the captured image area AR43 is not disposed on the held product processing screen for held products that are not registration failure products.

However, as the present variation, the captured image area AR43 may be disposed even on the held product processing screen for held products that are not registration failure products. In this case, the portable terminal 60 may transmit product registration information including the captured image even for registered products for which reading of the barcode has been successful.

[Fourth Variation]

The captured image area AR43 may be displayed as an independent screen different from the held product processing screen in response to, for example, an operation or the like made by the employee on the self-checkout machine 40.

[Fifth Variation]

Note that the portable terminal 60 may display a warning screen for notifying the customer in advance that, for example, "An image taken during product registration may be displayed on the checkout device" when, for example, starting product registration by operating the transaction start instruction button BT10 disposed on the startup screen in FIG. 10A. Displaying this kind of warning screen attempts to prevent product registration from being performed fraudulently, for example. Alternatively, the portable terminal may display a consent screen for confirming the customer's consent regarding "An image taken during product registration may be displayed on the checkout device" instead of the warning screen. On the consent screen, a button for accepting an operation to confirm intention is disposed, for example, by means of a "Yes" button and a "No" button. In addition, when the "Yes" button is operated, it is treated as if the customer is not committing a fraudulent act, and for example, the cancellation of a canceled product or the like may be established as is without registering it as a held product.

[Sixth Variation]

In the foregoing embodiments, it can be said that a registration failure state wherein reading of a barcode is not performed is treated as a product registration error. In the present variation, in addition to the registration failure state, a state where, for example, the reading of a barcode was successful but the target product could not be put in the shopping basket 80 may be determined as a single product registration error. Note that, for example, rice of a certain weight or more, canned beverages of six units, and the like are often placed under the cart. Therefore, it may be determined that there is no product registration error even if it is detected that this kind of product is not able to be put into the shopping basket 80.

[Seventh Variation]

For example, when the registration failure information is transmitted in step S107 of FIG. 12, for example, there is a possibility that the captured image is not able be transmitted to the TMS 20 due to a communication error, a communication speed limit set by the portable terminal 60, or the like. In this kind of case, the TMS 20 is capable of receiving registration failure information indicating the classification of the registration failure state despite the captured image not being included, and is therefore capable of registering registered product information indicating the classification of the registration failure state in the cart information.

The self-checkout machine 40 is thereby capable of displaying the held product processing screen regarding a registration failure product such as in FIG. 15 by using the checkout information based on the cart information, although the captured image is not displayed in the captured image area AR43, for example. In this case, a message having content capable of notifying the employee that there is a registration failure product, such as "Are there any products that you have forgotten to scan?", may be displayed in a blank area without displaying the captured image area AR43 on the held product processing screen.

[Eighth Variation]

The occurrence of the registration failure state may be displayed by a terminal (store operating terminal) other than the self-checkout machine 40, such as, for example, the monitoring device 50, that is operating at the store.

For example, the monitoring device 50 that is one of the store operating terminals is able to monitor the state of each transaction in the store by communicating with the TMS 20, for example. Therefore, when registration of a held product occurs, the monitoring device 50 may acquire information specifying the customer to which the target held product corresponds, or, at a timing where registration of the held product occurs, product information of the target product, information on the monetary amount, and the like when registration of the held product occurs, and display the acquired information. In addition, in a case where, for example, the employee who performs a monitoring task using the monitoring device 50 confirms that there is no problem with the displayed product, they may be able to perform an operation such as canceling the registration as a held product and re-registering as a normal product, for example.

[Ninth Variation]

An imaging device used in correspondence with product registration is provided to be able to read a barcode of a product and to capture an image of the contents of the shopping basket 80 or the like, and is not particularly limited provided that there is an imaging device which is able to output a captured image to the portable terminal 60 or the like. This kind of imaging device may be made to be capable of capturing an image of the inside of a reusable shopping bag brought by the customer rather than the shopping basket 80 provided by the store, for example.

[Tenth Variation]

The configuration of embodiments described above may be applied within an applicable range even when the customer performs product registration by hand without the portable terminal 60 being set into the shopping cart 70. In this kind of case, for example, the portable terminal 60 is capable of detecting a reading failure and pseudo-scan as the registration failure state and outputting the captured image corresponding to the detected registration failure state.

[Eleventh Variation]

In the foregoing embodiments, a portion of the processing executed by the portable terminal 60 may be executed by a higher level device, such as the TMS 20, connected via communication to the portable terminal 60. Furthermore, in the foregoing embodiments, a portion of the processing executed by the self-checkout machine 40 may be executed by a higher level device, such as the TMS 20, connected via communication to the self-checkout machine 40.

The SCS (1) in one or more embodiments is provided with a portable terminal (for example, the portable terminal 60) for registering a product, and a checkout device (40) for checkout processing corresponding to the product registered by the portable terminal. The SCS is provided with image capture means (for example, the camera 606) provided to enable image capture of a state relating to registration of the product by the customer, detection means for detecting a predetermined registration failure state where registration of the product is considered to have failed during a period in which registration of the product in response to a single transaction is performed, and display control means for displaying a captured image (for example, the captured image in the captured image area AR43) corresponding to the registration failure state detected by the detection means on the basis of a captured image obtained by the image capture means when the checkout device performs checkout of the product registered in response to the single transaction.

According to the foregoing configuration, when the registration failure state occurs while the customer is registering a product using the portable terminal 60, an image of the registration failure condition may be displayed. This allows, for example, the prevention of the registration failure state (for example, prevention of fraudulent acts in product registration) and accurately deals with products that correspond to the registration failure state, and it is possible to accurately handle problems arising when the customer registers a product themselves.

The display control means that the SCS of one or more embodiments is provided with displays a plurality of captured images corresponding to a predetermined period before and after the product is input into a product input unit (for example, the shopping basket 80) when the product is input into the product input unit without the information of the product being read as classification of the registration failure state.

According to the foregoing configuration, when the classification of the registration failure state is non-scan input, a captured image may be displayed of the contents of the shopping basket 80 during a period from before the target product is input to when it is input. A state transition of the contents of the shopping basket 80 when there is a non-scan input may thereby be accurately ascertained.

In the SCS of one or more embodiments, a display is performed that shows a portion that differs from other captured images in a predetermined captured image from among a plurality of captured images.

According to the foregoing configuration, the frame FL showing a portion of a product additionally input may be disposed in a captured image wherein an image of the additionally input product is captured from among the plurality of captured images displayed when the classification of the registration failure state is non-scan input. The additionally input product may thereby be immediately ascertained.

The display control means that the SCS of one or more embodiments is provided with displays captured images having different imaging targets in response to the classification of the registration failure state detected by the detection means.

According to the foregoing configuration, displaying a captured image wherein an image of the imaging target corresponding to the classification of the registration failure state is captured makes it possible to display an accurate captured image as evidence in response to the registration failure state.

The display control means that the SCS of one or more embodiments is provided with displays a captured image of when an operation for causing reading of the information of a product is performed when in the registration failure state due to a classification that reading of the information of the product was not successful.

According to the foregoing configuration, in the case where, for example, the classification of the registration failure state is a reading failure or a pseudo-scan, when determined as the registration failure state, it is possible to display a captured image obtained by capturing an image of the product falling within the image capture range of the camera 606. In the registration failure state, such as reading failure or pseudo-scan, it is thereby possible to specify a product where reading of the barcode should have been performed.

The display control means that the SCS of one or more embodiments is provided with displays a screen on which the checkout device carries out processing of a held product as a registration failure product (for example, the held product processing screen AR4) together with a captured image captured corresponding to the registration failure product.

According to the foregoing configuration, when the held product is a registration failure product, it is possible to display the captured image area AR43 together with the held product processing screen AR4 that is displayed for an operation where the employee processes the held product. The employee is thereby capable of appropriately processing the held product as a registration failure product.

The portable terminal (60) in one or more embodiments performs registration of products. The portable terminal is provided with image capture means provided to enable image capture of a state relating to registration of a product by the customer, detection means for detecting a predetermined registration failure state where registration of the product is considered to have failed during a period in which registration of the product in response to a single transaction is performed, and display control means for displaying product information of the registered product and a captured image (for example, the product registration screen) obtained by image capture via the image capture means, and performing display relating to the detected registration failure state (for example, the guidance image WD2) in response to the registration failure state having been detected by the detection means.

According to the foregoing configuration, in response to the occurrence of the registration failure state, the portable terminal 60 performs display related to the registration failure state. The customer is thereby able to ascertain that there is a registration failure state. Moreover, a suppressing effect is obtained with respect to customers intending to commit a fraudulent act.

Second Example

There may be cases where a product to be registered is not able to be specified by an SCS whereby a customer performs registration of a product themselves using a portable terminal. In this kind of case, an artificial operation such as an operation by an employee, for example, resolves the unspecified state of the product that was not specified by the SCS (product in an unspecified state), which is not efficient. According to one or more embodiments, the SCS whereby the customer performs registration of a product themselves using the portable terminal may efficiently resolve the unspecified state.

Figure 22:
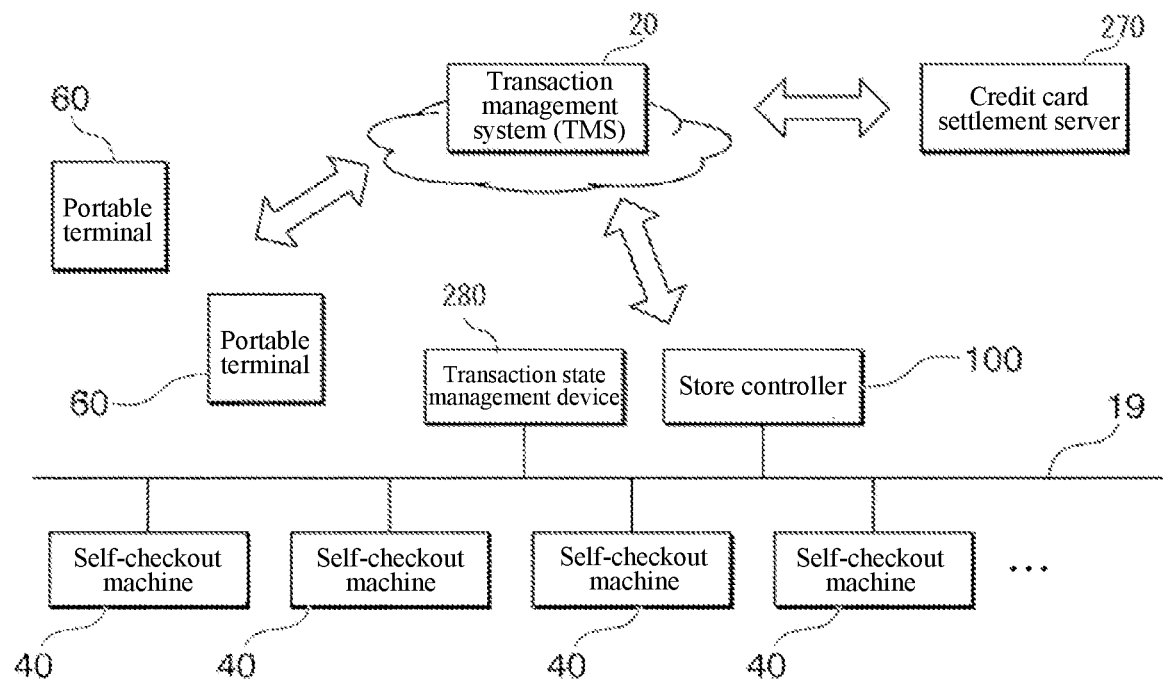
FIG. 22 is a diagram illustrating a configuration example of an SCS according to one or more embodiments.

FIG. 22 illustrates one example of a configuration of the SCS according to one or more embodiments. The SCS of one or more embodiments includes a store controller 100, a TMS 20, a self-checkout machine 40, the portable terminal 60, a transaction state management device 280, and a credit card settlement server 270. The store controller 100, the TMS 20, the self-checkout machine 40, and the portable terminal 60 according to the second example are provided with the same configuration as, for example, the store controller 100, the TMS 20, the self-checkout machine 40, and the portable terminal 60 according to the first example.

The transaction state management device 280 is a terminal for the task of monitoring the state of a transaction performed by the customer utilizing the portable terminal 60 at a store, and is capable of communicating with the TMS 20.

The credit card settlement server 270 executes settlement processing corresponding to a credit card in response to the transmission of a credit card settlement request from the self-checkout machine 40 and the portable terminal 60.

Figure 23A:
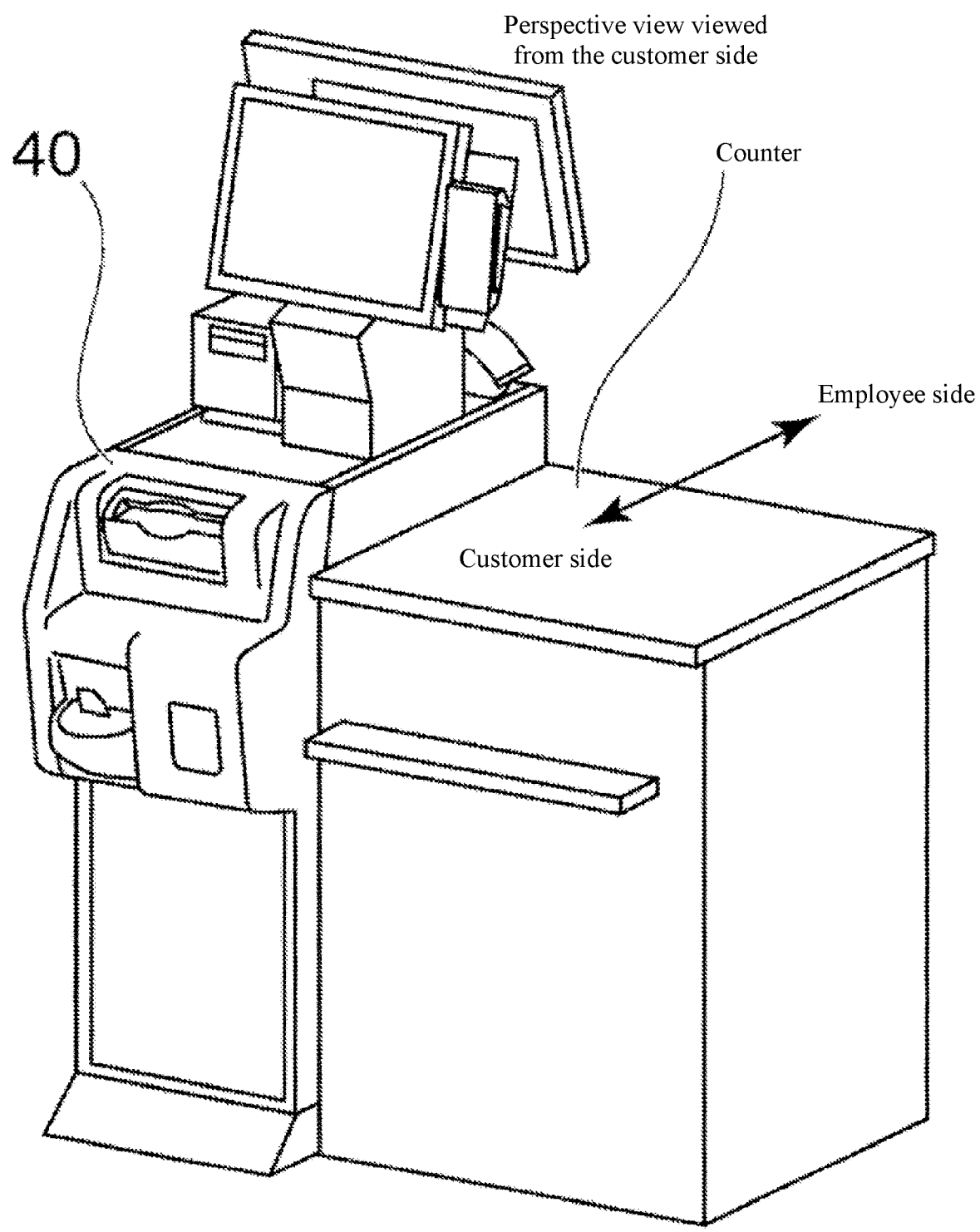
FIG. 23A and FIG. 23B are diagrams illustrating an installation example of a self-checkout machine according to one or more embodiments.
Figure 23B:
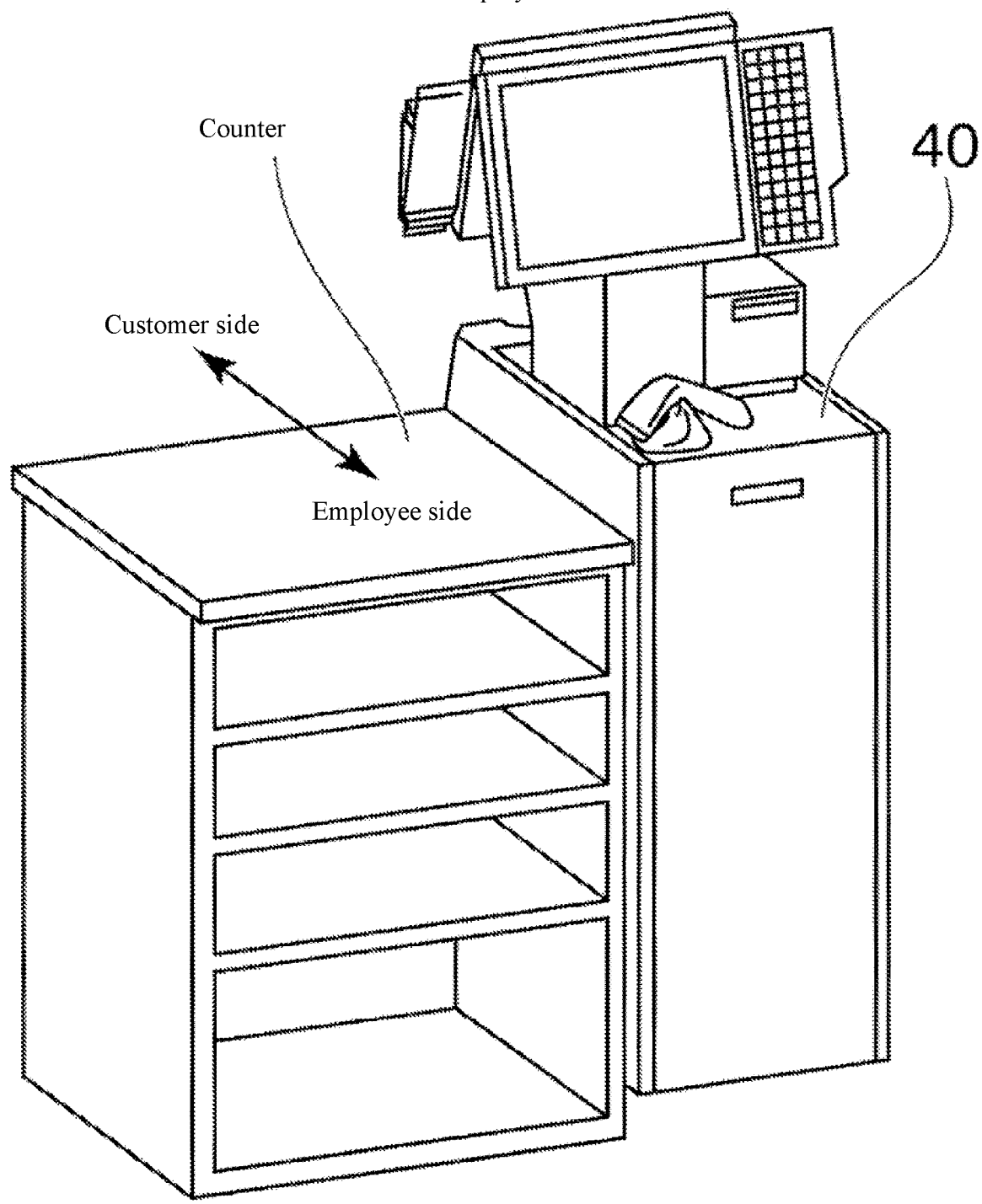

FIG. 23A and FIG. 23B are diagrams illustrating an installation example of the self-checkout machine 40. FIG. 23A is a perspective view of the self-checkout machine 40 viewed from the customer side. FIG. 23B is a perspective view of the self-checkout machine 40 viewed from the employee side. As illustrated in FIG. 23A, a counter is placed on the right side of the self-checkout machine 40 when viewed from the customer side.

FIG. 24A and FIG. 24B are diagrams illustrating an external appearance example of the self-checkout machine 40. FIG. 24A is a perspective view of the self-checkout machine 40 viewed from the customer side. FIG. 24B is a perspective view of the self-checkout machine 40 viewed from the employee side.

Figure 25:
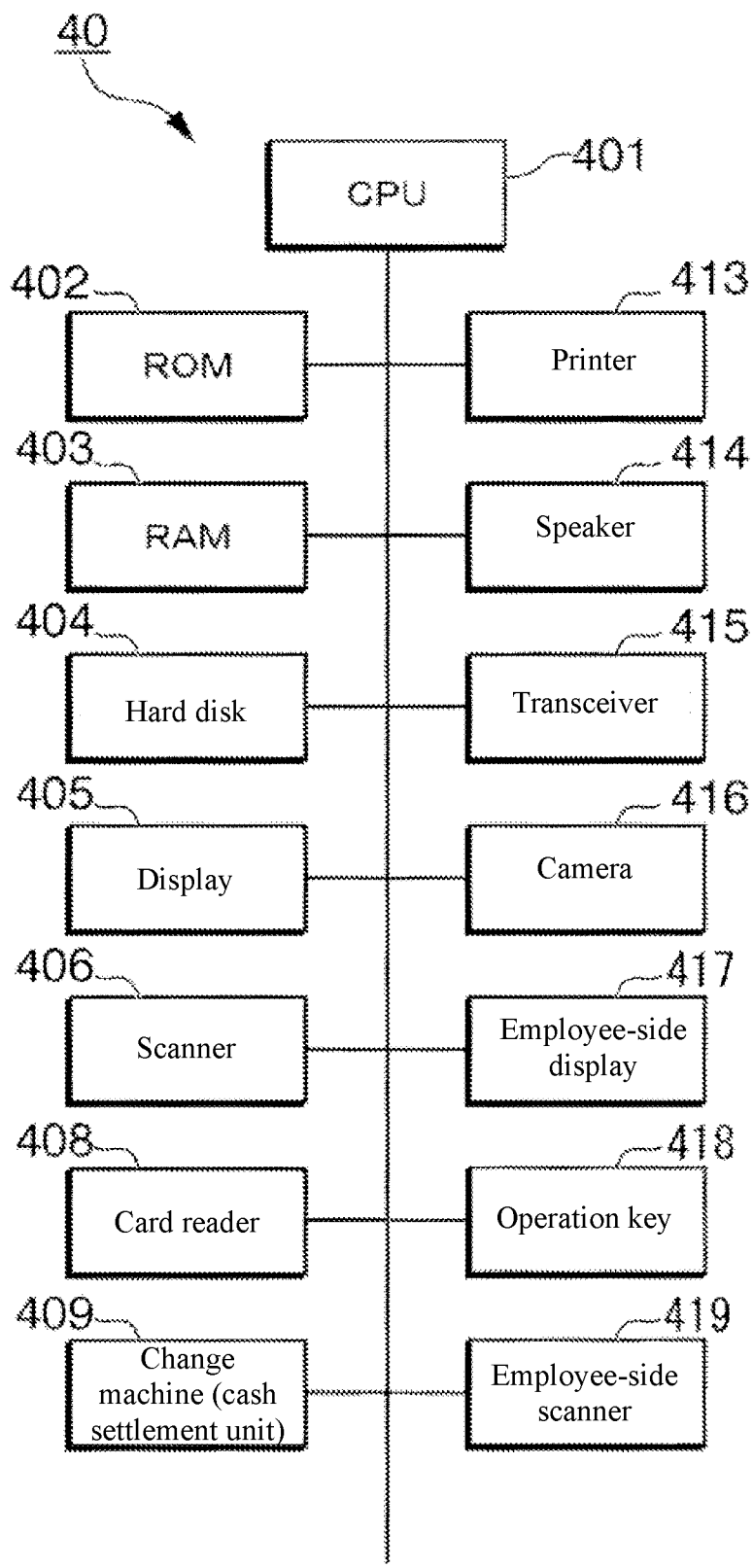
FIG. 25 is a diagram illustrating a configuration example of the self-checkout machine according to one or more embodiments.

The self-checkout machine 40 according to one or more embodiments may be provided with, as illustrated in FIG. 25 for example, an employee-side display 417, operation keys 418, and an employee-side scanner 419, for example, in addition to the configuration illustrated in FIG. 4B. The configuration of the self-checkout machine 40 illustrated in FIG. 25 may be used in embodiments other than the second example.

The employee-side display 417 is a touch display for the employee, which displays various information to the employee and also accepts various inputs from the employee.

The operation keys 418 are constituted of various keys (buttons) and accept various inputs from the employee.

The employee-side scanner 419 is a scanner for the employee, and, for example, scans a barcode attached to a product and reads a product code. The employee-side scanner 419 scans a barcode or the like attached to a name tag of an employee and reads an employee code.

The employee-side scanner 419 is used when the employee registers a product, but the employee may register the product by another method. For example, when a key corresponding to a product (for example, a key corresponding to a sports newspaper or the like) is disposed as the operation key 418, the employee may operate (press) the key to register the product. When a preset key corresponding to a product is displayed on the employee-side display 417, the employee may operate the preset key to register the product.

The self-checkout machine 40 of one or more embodiments is provided with, for example, four running modes. The four running modes are a customer terminal-compatible checkout mode set to perform checkout processing via payment using the portable terminal 60 of the customer, and three payment modes (first to third payment modes) corresponding to three different, respective payment patterns (product registration and checkout). The four running modes are switched by the self-checkout machine 40.

The first payment mode is a running mode wherein the employee performs an operation on the self-checkout machine 40 corresponding to product registration and an operation corresponding to checkout. The second payment mode is a running mode wherein the employee performs an operation on the self-checkout machine 40 corresponding to product registration, and the customer performs an operation on the same self-checkout machine 40 corresponding to checkout. The third payment mode is a running mode wherein the customer performs an operation on the self-checkout machine 40 corresponding to product registration and an operation corresponding to checkout.

Therefore, at the store where the SCS is installed, the customer terminal-compatible checkout mode is set for a portion of the plurality of self-checkout machines 40 so as to be compatible with customer terminal-compatible checkout, and, for example, the first payment mode or the second payment mode is set for the other self-checkout machines 40 so that the employee is able to serve customers and perform payment. The other self-checkout machines 40 may include those having the third payment mode set.

This kind of mode switching may be performed according to, for example, a predetermined time period within business hours of the store.

Note that the self-checkout machine 40 may be configured as a dedicated device specialized for the foregoing customer terminal-compatible checkout mode.

The TMS 20 according to one or more embodiments is provided with the configuration illustrated in FIG. 6.

Figure 26:
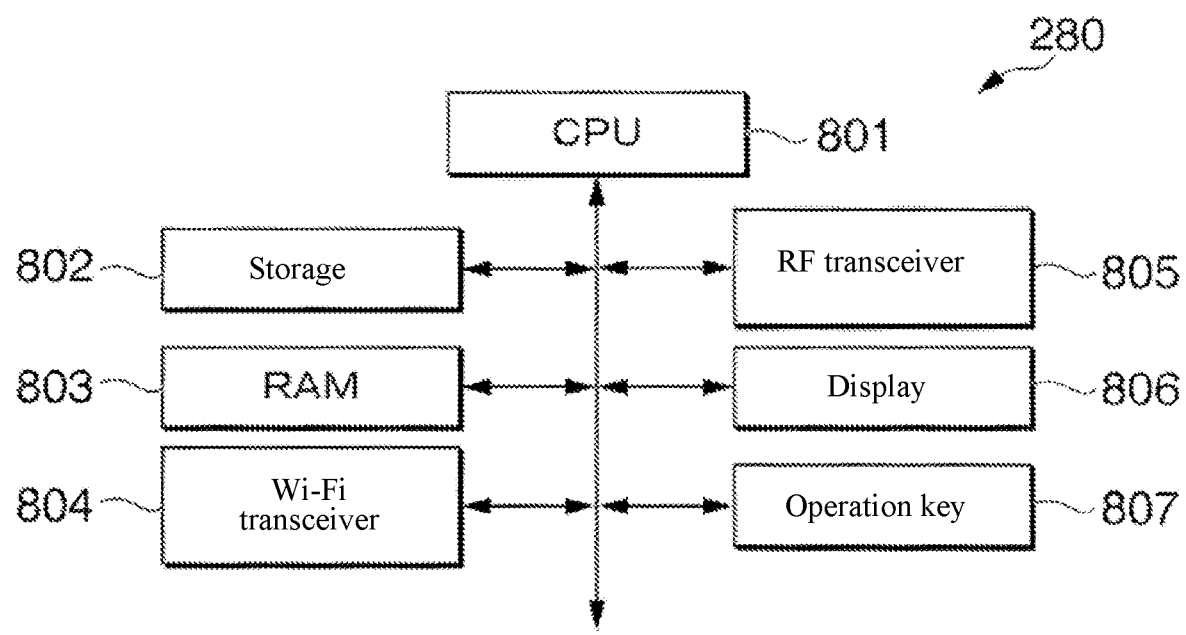
FIG. 26 is a diagram illustrating a configuration example of a transaction state management device according to one or more embodiments.

As illustrated in FIG. 26, the transaction state management device 280 is provided with a CPU 801, a storage 802, a RAM 803, a Wi-Fi transceiver 804, a network-compatible communication unit 805, a display 806, and an operation key 807.

The CPU 801 is a central processing unit, and reads and executes a program stored in the storage 802 to control the operation of the transaction state management device 280.

The storage unit 602 is an auxiliary storage device for the CPU 801, and stores various information, including a program, used by the CPU 801.

The RAM 803 is the main storage device of the CPU 801.

The Wi-Fi transceiver 804 is connected to a Wi-Fi access point in the store and communicates with the self-checkout machine 40 or the store controller 100 in the store via a LAN 19.

The RF transceiver 805 performs communication via a mobile communication network based on LTE and 5G standards.

The transaction state management device 280 uses the Wi-Fi transceiver 804 or the RF transceiver 805 to communicate with the TMS 20 in the cloud.

The display 806 displays an image in response to the control of the CPU 801. The display 806 may be configured as a touch panel.

The operation key 807 is an operator element that the transaction state management device 280 is provided with. The operation key 807 may include an input device connected to the transaction state management device 280.

The customer information, store information, and cart information stored in the TMS 20 according to one or more embodiments includes, for example, the information elements illustrated in FIGS. 7A, 7B, and 7C, respectively.

The held product corresponding to the cart information in one or more embodiments is defined, for example, as in the example illustrated in FIG. 8.

The SCS 1 according to one or more embodiments performs as a system corresponding to self-checkout according to, for example, the procedure illustrated in FIG. 9.

When an unspecified product is registered according to one or more embodiments, a terminal device 60 displays the screen illustrated in FIGS. 11A to 11C described above.

FIG. 27 illustrates one example of the checkout screen displayed on the customer-side display 405 of the self-checkout machine 40. A registered product list area AR3 is disposed on the checkout screen. The registered product list area AR3 is an area for presenting a list of products registered by the portable terminal 60.

In the following description, the product information (registered product information and held product information) corresponding to each list item of products in the registered product list area AR3 may also be referred to as a record.

Furthermore, the registered product information and the held product information corresponding to classification by age confirmation product (classification number 5), pharmaceutical product (classification number 6), and security tag product (classification number 7) are also referred to as product specification records because the product is specified. Among product specification records, registered product information is also referred to as a normal registration record because it corresponds to a product that is registered normally and not as a held product. Among the held product information, those corresponding to unspecified products (classification numbers 1 to 4) are also referred to as unspecified records.

When a held product is included among the registered products, the list item of the held product is prioritized and disposed from the upper side of the left column in the registered product list area AR3. That is, in the registered product list area AR3, the list items of held products are arranged in order from the top.

An example is illustrated wherein in response to there being five held products included among the registered products, a held product list area AR31 including the list items of the five held products is formed from the upper left in the registered product list area AR3. The appearance of the list items in the held product list area AR31, for example, the background color or the like, is made to be different from that of the list items of other products.

In addition, in the held product list area AR31, first, list items corresponding to product specification records wherein products are specified among the held products are disposed in order, and then list items corresponding to unspecified products wherein the products are not specified are disposed in order. That is, in the held product list area AR31, there is an arrangement divided into list items corresponding to product specification records wherein products are specified among the held products and list items corresponding to unspecified products wherein products are not specified.

In the registered product list area AR3, list items corresponding to normal registration records are disposed following the held product list area AR31. In the same drawing, an example is illustrated wherein the list items corresponding to normal registration records are disposed in descending order of the prices of the products in the registered product list area AR3.

Among the list items in the registered product list area AR3, the product name, the registered quantity, the price according to the registered quantity, and the like of the specified product are shown in a list item corresponding to a product specification record.

A holding removal declaration button BT31 is disposed on the list item for each held product in the held product list area AR31. The holding removal declaration button BT31 is a button for performing an operation to declare a removal of holding a corresponding product. However, operation of the holding removal declaration button BT31 is not possible on the checkout screen in the same drawing, but its operation is possible on the held product processing screen that will be described later. On the checkout screen, the holding removal declaration button BT31 has a function as an icon indicating that the corresponding list item corresponds to the held product.

The names of the classifications of the corresponding products as applicable held products are shown respectively on the holding removal declaration buttons BT31.

Specifically, names indicating the corresponding classifications, for example, an age confirmation product (classification number 5), pharmaceutical product (classification number 6), security tag product (classification number 7), and canceled product (classification number 8) are displayed respectively on the holding removal declaration buttons BT31. Furthermore, the name "held product" is displayed collectively for unspecified products (classification numbers 1 to 4).

In the same drawing, an example is illustrated as the display on the holding removal declaration button BT31, wherein the list item of the first line is displayed as "age confirmation" corresponding to there being an age confirmation product (classification number 5), the list item of the second line is displayed as "security tag" corresponding to there being a security tag product (classification number 7), and the list item of the third line is displayed as "pharmaceutical product" corresponding to there being a pharmaceutical product (classification number 6). Furthermore, an example is illustrated wherein the list items of the fourth line and the fifth line are each displayed as "held product".

A thumbnail image TN is disposed in the list items of the fourth line and fifth line. The thumbnail image TN is a captured image obtained by capturing an image using the portable terminal 60 when the product registration operation is being performed for the corresponding unspecified product. The thumbnail image TN may be a static image or a moving image.

For the list items of held products, the employee is able to visually differentiate list items corresponding to unspecified products and list items corresponding to the held products for which products have been specified according to whether the thumbnail image TN is disposed. Furthermore, the employee is able to ascertain what the product registered as the unspecified product actually is according to the content displayed in the thumbnail image TN. The display indicating the corresponding classification on the holding removal declaration button BT31 may be a pattern, such as an icon, indicating the classification.

Among the list items of held products, the product name, registered quantity, price corresponding to the registered quantity, and the like of the specified products are indicated in list items to which the specified products correspond, such as an age confirmation product (classification number 5), pharmaceutical product (classification number 6), security tag product (classification number 7), and the like.

In contrast to this, content according to the classification of the corresponding held product is displayed in the list item corresponding to the unspecified product. Specifically, in the case of an unspecified product as NO-FILE (classification number 1), the content may show NO-FILE as the list item of the fifth line in the same drawing, and also show a read product code. Furthermore, in the case of unspecified product (code-unacquired product) of a reading failure (classification number 2), pseudo-scan input (classification number 3), and non-scan input (classification number 4), a message indicating that the product code could not be read may be displayed as in the list item of the fourth line in the same drawing.

When the held product list area AR31 is formed in the registered product list area AR3 of the checkout screen, it is necessary for the employee to perform an operation for processing the held product. When the checkout screen on which the held product list area AR31 is formed is displayed in this manner, the self-checkout machine 40 executes an employee call for causing the employee to perform the operation for processing the held product. As the employee call, the self-checkout machine 40 may be made so that, for example, the self-checkout machine 40 displays a display device, such as a sign pole or the like, in a predetermined mode, or transmits a notification of the employee call to a terminal device that the employee carries or monitors.

The self-checkout machine 40 does not accept an operation relating to checkout by the customer while the checkout screen on which the held product list area AR31 is formed is displayed because a held product is included in the registration result. For example, in the area above the registered product list area AR3 on the checkout screen, a message is displayed to notify the customer that the employee who was called will come to the self-checkout machine 40.

The employee who went to the self-checkout machine 40 in response to the employee call performs a login operation to log in to the self-checkout machine 40 as an employee. The login operation in this case may be, for example, an operation that causes the scanner (customer-side scanner 406 or employee-side scanner 419) to read the code (two-dimensional code or barcode) printed on an employee card. Alternatively, for example, it may be an operation for inputting an employee number or the like by a numeric operation.

In response to the employee logging in, the display on the customer-side display 405 transitions from the checkout screen to the held product processing screen.

Figure 28:
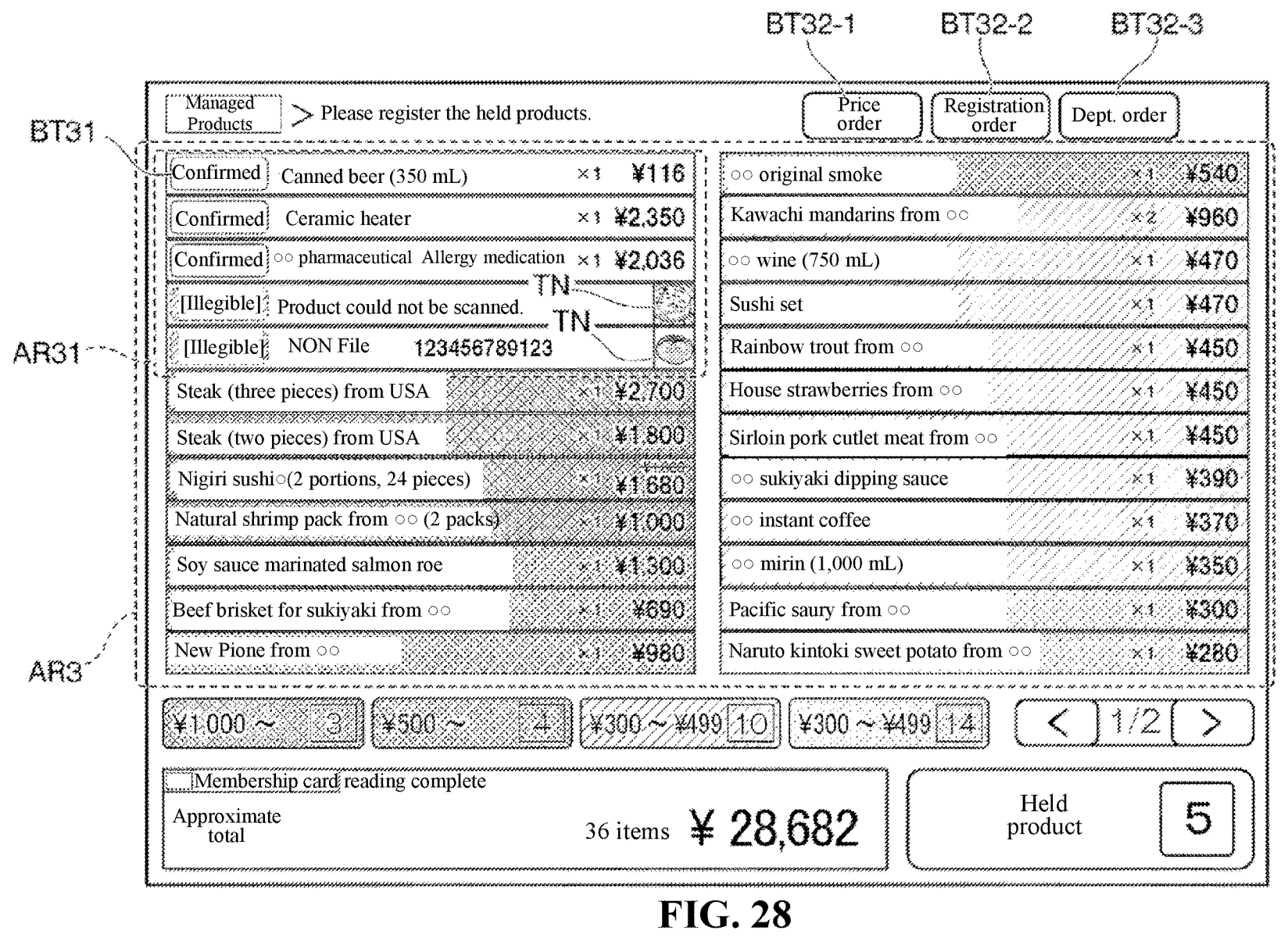

FIG. 28 illustrates one example of the held product processing screen. In the same drawing, portions that are the same as those in FIG. 27 are given the same reference numerals.

On the held product processing screen, the content of the registered product list area AR3 is displayed in a state that is handed over from the checkout screen (FIG. 27). For this reason, on the initial display of the held product processing screen, the list items corresponding to the registered product information in the registered product list area AR3 are disposed in order of price. Furthermore, the content of letters or the like displayed on the holding removal declaration button BT31 disposed in the list item of each held product in the held product list area AR31 is also handed over from the checkout screen (FIG. 13).

On the left side of the area above the registered product list area AR3 on the held product processing screen, it is shown that there is a screen for product management, and a message is displayed instructing the employee to perform a holding removal of the held product.

A sort button BT32 (price order button BT32-1, registration order button BT32-2, department order button BT32-3) is disposed on the right side of the area above the registered product list area AR3.

The sort button BT32 is a button used to perform an operation for sorting the list items corresponding to the registered product information in the registered product list area AR3 according to the respective corresponding sort order. Among the sort buttons BT32, the price order button BT32-1 is a button used to perform an operation for sorting the list items corresponding to the registered product information in order of price. The registration order button BT32-2 is a button used to perform an operation for sorting the list items corresponding to the registered product information in the order registered by the customer using the portable terminal 60. The department order button BT32-3 is a button used to perform an operation to sort the list items corresponding to the registered product information so that products are sorted according to the corresponding department unit.

When performing a holding removal of a held product (age confirmation product (classification number 5), pharmaceutical product (classification number 6), and security tag product (classification number 7) of a classification for which the product could be specified among the held products, the employee performs a predetermined handling task corresponding to each classification and then performs an operation (for example, a tap operation) on the holding removal declaration button BT31 disposed on the corresponding list item in the held product list area AR31. Note that all list items of the held products may be made to be operable by touch.

When the product to undergo holding removal is an age confirmation product, as a handling task, the employee confirms that the customer is an adult and operates the holding removal declaration button BT31 disposed on the corresponding list item.

Furthermore, when the product to undergo holding removal is a pharmaceutical product, as a handling task, the employee either provides an explanation, provided that they are a licensed pharmacist, or has another employee who is a licensed pharmacist provide the explanation, and then operates the holding removal declaration button BT31 disposed on the corresponding list item.

Furthermore, when the product to undergo holding removal is a security tag product, as a handling task, the employee removes the security tag attached to the target product and operates the holding removal declaration button BT31 disposed on the corresponding list item.

When a holding removal is performed for a held product of a classification for which the product could be specified as described above, the display on the operated holding removal declaration button BT31 changes from the state illustrating the applicable classification as illustrated in FIG. 13 to the state illustrating that the holding removal has been carried out, for example, as "Confirmed" (or "holding removal" may also be used) illustrated in FIG. 28.

When performing the holding removal of a held product (NO-FILE (classification number 1), reading failure (classification number 2), pseudo-scan input (classification number 3), and non-scan input (classification number 4)) classified as an unspecified product, the employee first operates the holding removal declaration button BT31 disposed on the list item corresponding to the held product to undergo holding removal in the held product list area AR31.

In response to the holding removal declaration button BT31 corresponding to the unspecified product being operated in this manner, a state confirmation screen is displayed on the customer-side display 405.

Figure 29:
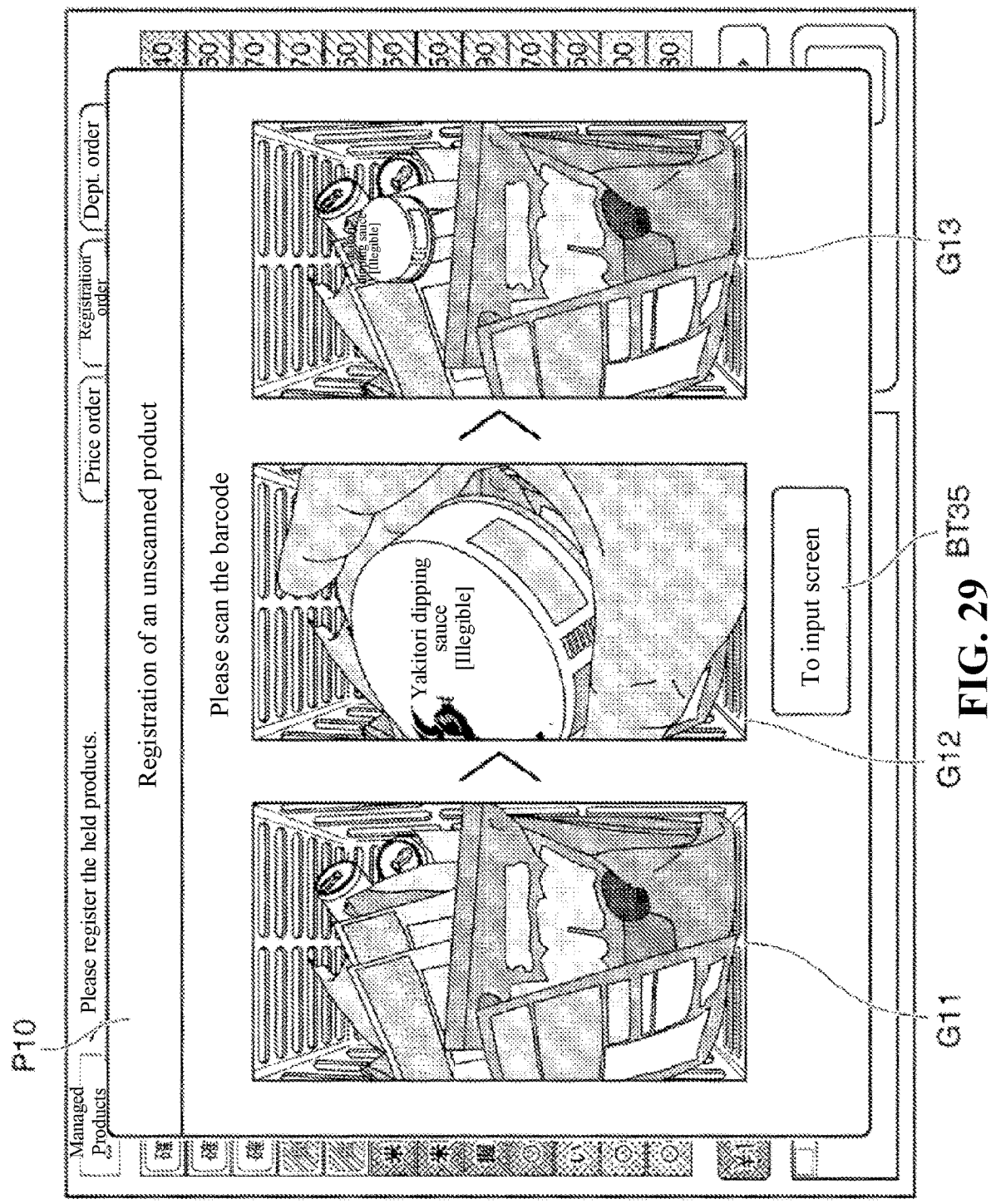
FIG. 29 is a diagram illustrating one example of a state confirmation screen according to one or more embodiments.

FIG. 29 illustrates one example of a state confirmation screen P10. The state confirmation screen P10 is a screen indicating the state of when an operation of the portable terminal 60 by the customer registers an unspecified product corresponding to the operated holding removal declaration button BT31. The state confirmation screen P10 may be displayed so as to overlap, for example, on the held product processing screen of FIG. 28.

The same drawing gives an example of the state confirmation screen P10, when an unspecified product to undergo processing for holding removal is classified as pseudo-scan input (classification number 3).

Furthermore, the portable terminal 60 is held by a holder part provided in the cart, and the state confirmation screen P10 of the same drawing responds when the portable terminal 60 is enabled to capture an image of the inside of the shopping basket in a state of being held by the holder part. The customer causes the portable terminal 60 held by the holder part to scan the product code.

Captured images G11, G12, and G13 are disposed in order from left to right on the state confirmation screen P10 in the same drawing. The captured images G11, G12, and G13 are captured images obtained when the portable terminal 60 has captured an image as an attempt to scan the product code of the corresponding unspecified product.

The disposition order of the captured images G11, G12, and G13 from left to right corresponds to the passage of time as the images were captured.

First, the second (center) captured image G12 is a captured image captured when a product to undergo processing falls within the image capture range of the portable terminal 60 during a product registration operation.

The first captured image G11 is a captured image captured in the past before the second captured image G12, and is captured at a timing before the product to undergo processing falls within the image capture range.

The third captured image G13 is a captured image captured after the second captured image G12, and is captured at a timing when the product to undergo processing was removed from the image capture range.

In this case, the employee is able to ascertain the state at the time of the product registration operation where an unspecified result occurs by viewing the captured images G11, G12, and G13.

For example, the employee is first able to ascertain that the product to undergo processing was not put inside the shopping basket at the stage before the product registration operation was performed according to the transition of the captured image G11 to the captured image G12.

The employee is able to ascertain, according to the captured image G12, that an unspecified result as a pseudo-scan input (classification number 3) has occurred because a portion of the product code of the product is hidden by a hand.

The employee is able to ascertain what the product to undergo processing is according to the captured image G12. Specifically, in the example in the same drawing, the employee ascertains that the product to undergo processing is "Canned yakitori".

Furthermore, the employee is able to ascertain that the product to undergo processing was put inside the shopping basket after the product registration operation was performed according to the transition of the captured image G12 to the captured image G13.

When grasping the state at the time of product registration operation as described above, the employee operates a screen transition button BT35 to display a product information input screen. In response to the screen transition button BT35 being operated, the product information input screen is displayed instead of the state confirmation screen P10.

Furthermore, the employee may perform an operation that causes the scanner (customer-side scanner 406, employee-side scanner 419) of the self-checkout machine 40 to read the product code of the product to undergo processing that is put in the shopping basket while the state confirmation screen P10 is displayed. The product information input screen is displayed in response to the self-checkout machine 40 successfully reading the product code.

Figure 30:
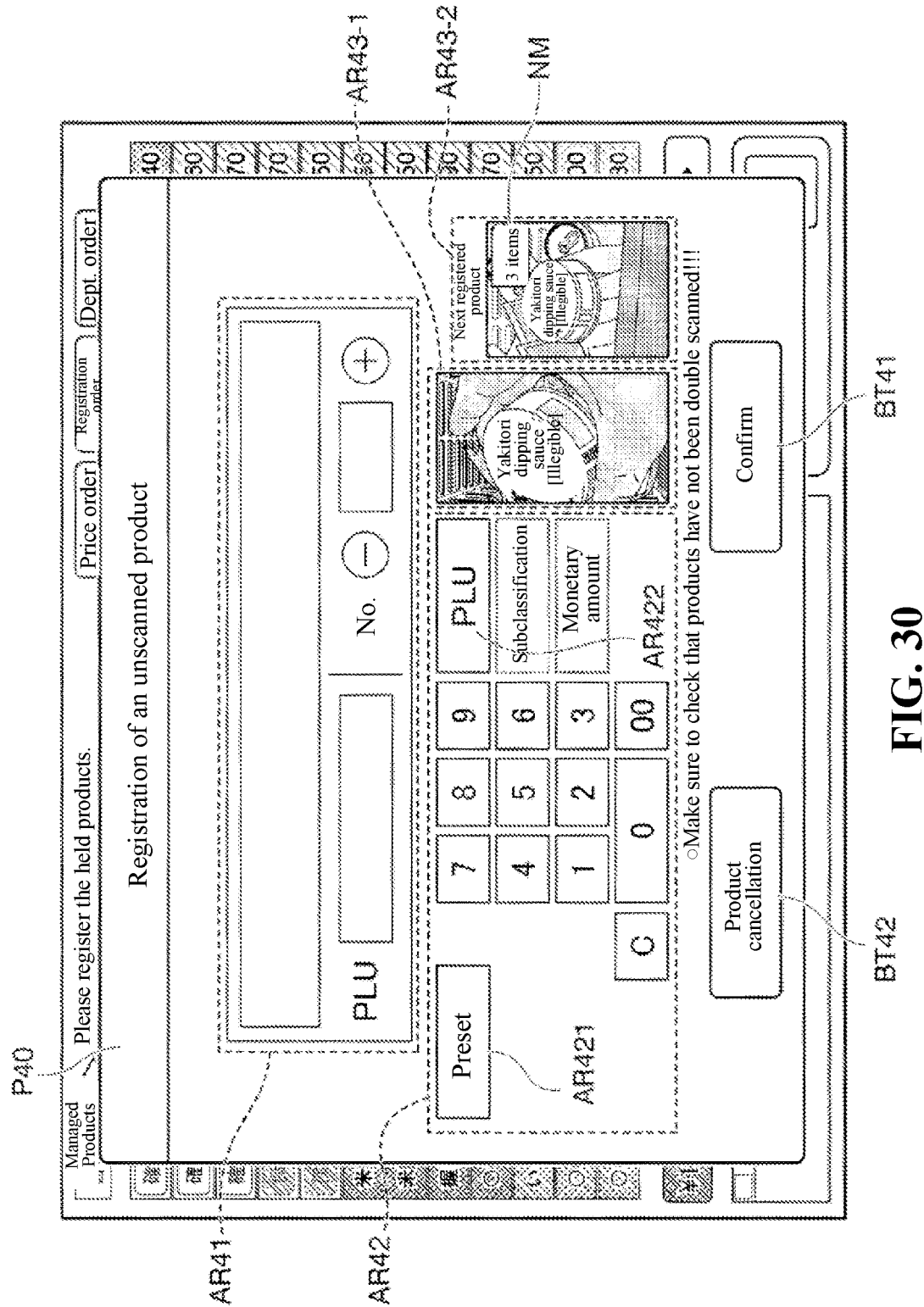
FIG. 30 is a diagram illustrating one example of a product information input screen according to one or more embodiments.

FIG. 30 illustrates one example of a product information input screen P40. The product information input screen P40 is a screen on which the employee performs an operation to input product information of a product to undergo processing as an unspecified product. The product information input screen P40 may be displayed so as to overlap, for example, on the held product processing screen in the same manner as the state confirmation screen P10.

On the product information input screen P40, a product information area AR41, an input operation area AR42, a registration button BT41, a cancellation button BT42, and a captured image area AR43 (target captured image area AR43-1, next captured image area AR43-2) are disposed.

The product information area AR41 is an area wherein product information relating to the corresponding unspecified product is shown. The product information area AR41 in the same drawing shows the product name, product code, price, registered quantity, and the like. It is possible to input (register) the registered quantity by operating a plus button and a minus button disposed in the product information area AR41.

The input operation area AR42 is an area wherein a software keyboard and buttons for inputting product information in the product information area AR41 are disposed.

In the input operation area AR42, it is possible to switch between a keyboard having a key layout corresponding to numerical input and a keyboard having a key layout corresponding to character input in response to an operation.

A preset call button BT421 is disposed in the input operation area AR42. Operating the preset call button BT421 causes a preset key screen to be displayed, wherein a preset key corresponding to each product is disposed.

For example, when an unspecified product to undergo processing is either a reading failure (classification number 2), pseudo-scan input (classification number 3), or non-scan input (classification number 4), a preset key screen may be displayed when the employee ascertains the product name of the product to undergo processing. The employee is able to input product information of a product to undergo processing in the product information area AR41 by operating the preset key of the corresponding product from among the preset keys disposed on the displayed preset key screen.

A product code input declaration button BT422 is disposed in the input operation area AR42. The product code input declaration button BT422 is a button operated when declaring that an input operation of the product code will be performed.

After operating the product code input declaration button BT422, the employee performs an operation for, for example, inputting the numerical value of the product code indicated by printing or the like on a product to undergo processing to a keyboard disposed in the input operation area AR42. The product code is thereby input into the product information area AR41.

When the product information input screen P40 is displayed in response to the employee causing the self-checkout machine 40 to read the product code, the read product code is in a state of having been input in the product information area AR41, and when it is an unspecified product other than NO-FILE (classification number 1), because the self-checkout machine 40 specifies a product from a product master on the basis of the product code, for example, the product name, price, and the like are also in a state of being input.

Furthermore, when the product to undergo processing is classified as NO-FILE (classification number 1), at a stage when the product information input screen P40 is displayed, the product code is in a state of being input in the product information area AR41. In this case, the employee inputs the product name, price, or the like into the product information area AR41 by operating the keyboard disposed in the input operation area AR42.

The registration button BT41 is a button that is operated to establish the information input to the product information area AR41 as described above, cancel the hold on the corresponding unspecified product, and make the product a normally registered product.

The cancellation button BT42 is a button by which an operation is performed to instruct cancellation of registration for the corresponding unspecified product.

The employee confirms the contents input to the product information area AR41 and then performs an operation on the registration button BT41. Thus, the self-checkout machine 40 cancels the held state thus far of the unspecified product, and performs processing so as to include it in the registered products.

After the registration button BT41 is operated, the product information input screen P40 is erased and returns to the held product processing screen (FIG. 28). At the stage of returning to the held product processing screen, the holding removal declaration button BT31 of the list item of the product to undergo processing in the held product list area AR31 indicates that the held state has been cancelled by displaying, for example, "Confirmed".

Alternatively, when it is judged that the product to undergo processing should not be registered, the employee performs an operation on the cancellation button BT42 to cancel the registration, and retrieves the applicable product from the shopping basket.

After the cancellation button BT42 is operated, the product information input screen P40 is erased and returns to the held product processing screen (FIG. 28). In the stage of returning to the held product processing screen, the list item of the product to undergo processing in the held product list area AR31 changes to a predetermined appearance indicating that registration was cancelled.

The classification number, classification name, or the like of the corresponding unspecified product may be displayed on the state confirmation screen P10 or the product information input screen P40.

In the captured image area AR43, the target captured image area AR43-1 is an area wherein a target captured image is displayed. The target captured image is a captured image obtained by capturing an image when the current unspecified product to undergo processing falls within the image capture range during a product registration operation when the unspecified product is a code-unacquired product. The captured image displayed in the target captured image area AR43-1 may be, for example, the same as the captured image G12 displayed in the state confirmation screen P10.

In the captured image area AR43, the next captured image area AR43-2 is an area wherein the next captured image is displayed. The next captured image is a captured image obtained by capturing an image during a product registration operation performed following the product registration operation corresponding to the current code-unacquired product to undergo processing. That is, the next captured image is a captured image corresponding to a product registration operation wherein reading of the product code first was successful after a product registration operation corresponding to the current code-unacquired product to undergo processing and where the product could be specified.

When the next captured image is a captured image wherein an article as a product is detected among the captured images obtained corresponding to the next product registration operation, the captured image including the detected product is selected.

When the portable terminal 60 is unable to read the product code normally and a certain product is registered as a code-unacquired product as a result of the customer performing a product registration operation targeting the product, the customer will often try the product registration operation again for the same product. In this kind of case, the customer performs the product registration operation for the same product twice in a row. In this kind of case, when the product code is read normally by the second product registration operation, duplicate registration is performed, wherein the same product is registered as a held product, which is a code-unacquired product, and normally registered where it is specified on the basis of the read product code.

When duplicate registration is performed in this manner, processing should be performed so that the registration of the held product as a code-unacquired product is deleted and normal registration for the same product is left as the procedure for holding removal by the employee. To smoothly perform this kind of processing, it is required that the employee be able to easily ascertain whether the code-unacquired product subject to holding removal has undergone duplicate registration.

The captured image area AR43 (target captured image area AR43-1 and next captured image area AR43-2) is disposed on the product information input screen P40, and the target captured image and the next captured image are displayed.

When a state is shown wherein an image of the same product is captured in the target captured image and the next captured image, the employee is able to confirm that duplicate registration was performed. Therefore, the employee in this case, for example, performs an operation on the cancellation button BT42 disposed on the product information input screen P40. The code-unacquired product to undergo processing is thereby deleted from the list of registered products.

A quantity display portion NM is disposed in the next captured image area AR43-2. The quantity display portion NM is an image portion that indicates, for example, the quantity (registered quantity) registered by an operation of the customer regarding a product normally registered by the product registration operation when an image of the next captured image is captured.

By disposing the quantity display unit NM, the employee is able to ascertain the registered quantity of the product normally registered in duplicate with the unspecified product subject to holding removal at the stage of performing the operation of the holding removal, and is able to accurately perform the work or operation related to the holding removal.

When the product to undergo processing is an unspecified product as NO-FILE (classification number 1), the portable terminal 60 notifies that reading of the product code was successful but specification of the product was not performed. In this case, since the customer is able to ascertain that reading of the product code was successful, it is unlikely that a duplicate registration will occur by again performing the product registration operation for the same product. Therefore, when the registration result of the product to undergo processing falls under NO-FILE, the captured image area AR43 (image to be processed, next captured image) may not be displayed.

However, there is a possibility that the product registration operation will be performed again by the customer mistakenly believing that reading of the product code failed even if a notification corresponding to an unregistered result as, for example, NO-FILE is performed. Thus, even when the registration result of the product to undergo processing falls under NO-FILE, the captured image area AR43 (image to be processed, next captured image) may be displayed. Provided that the captured image area AR43 is displayed, it is easy for the employee to ascertain that the unregistered result of NO-FILE for the same product underwent duplicate registration.

Figure 31:
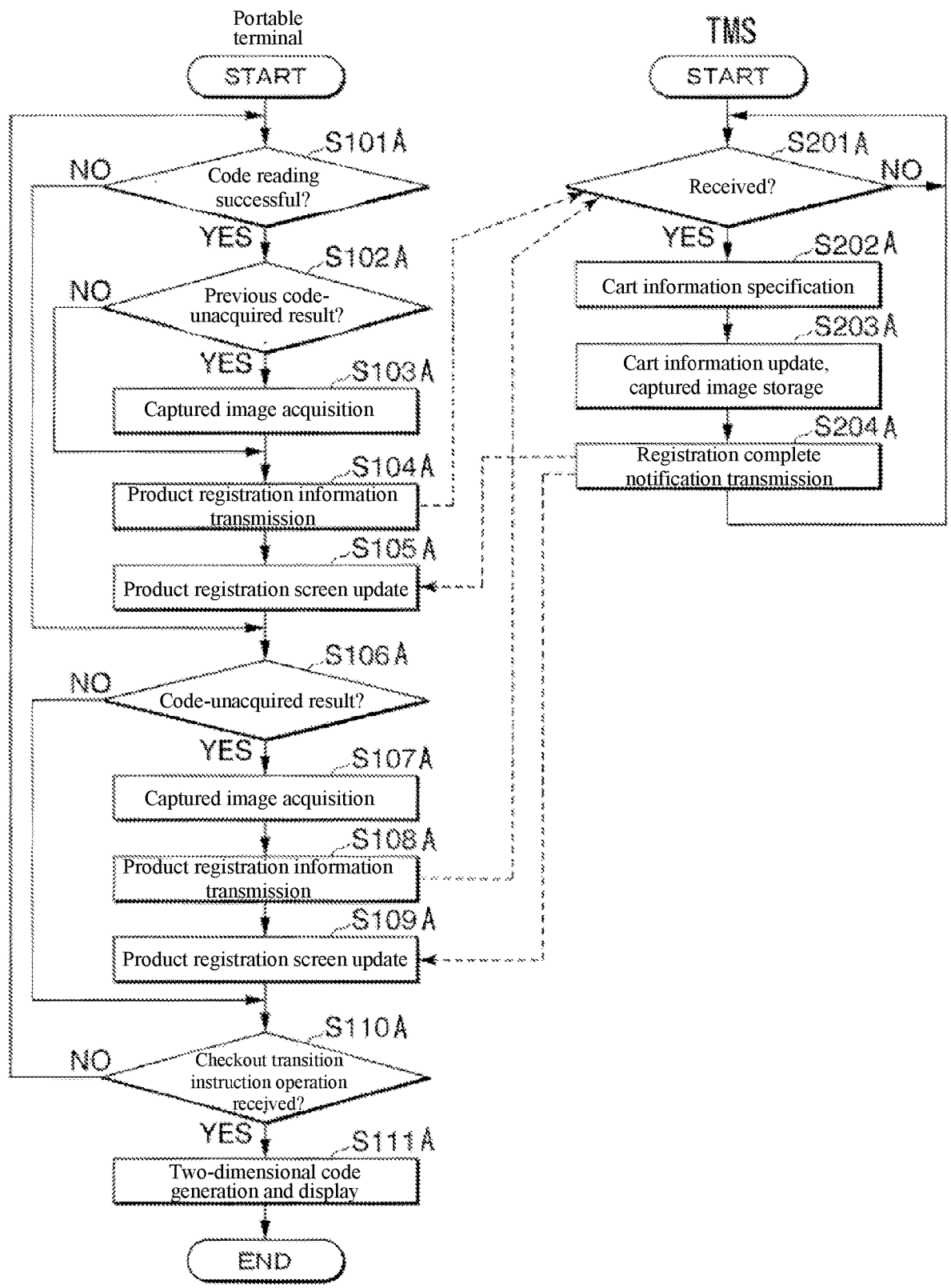
FIG. 31 is a flowchart illustrating one example of a processing procedure for product registration executed by a portable terminal and TMS according to one or more embodiments.

Referencing the flowchart in FIG. 31, a processing procedure example executed by the portable terminal 60 and the TMS 20 of one or more embodiments in relation to product registration is described. The processing in the same drawing corresponds to FIG. 9, and more specifically illustrates the processing process in steps S5 to S11 as including the processing corresponding to the registration result of the unspecified product.

First, a processing procedure example executed by the portable terminal 60 will be described.

Step S101A: The portable terminal 60 determines whether reading of the product code was successful based on a state where the product registration screen is displayed.

Step S102A: When the reading of the product code is successful, the portable terminal 60 further determines whether the product registration result corresponding to the previous product registration operation is a code-unacquired result (any of a reading failure (classification number 2), a pseudo-scan input (classification number 3), or a non-scan input (classification number 4)).

The code-unacquired result corresponds to when registration of a held product as a code-unacquired product is performed as a product registration result.

Step S103A: When it is determined in step S102A that the product registration result corresponding to the previous product registration operation is a code-unacquired result, the portable terminal 60 acquires (extracts) from the captured images captured by a camera 506 a captured image wherein the product is contained during a period corresponding to the current product registration operation. The captured image acquired by the portable terminal 60 in step S103A is used as the next captured image in the next captured image area AR43-2 of the product information input screen P40 wherein the code-unacquired product registered by the previous product registration operation is to undergo processing for holding removal.

Note that the form of the captured image (moving image, static image) acquired by the portable terminal 60 in step S103A, the number of captured images, the time, period, and the like of the captured image to be acquired may differ in response to the classification of the detected code-unacquired product.

Step S104A: When it is determined that there is no code-unacquired result in step S102A, or after processing in step S103A, the portable terminal 60 transmits the product registration information.

The product registration information includes the product code read in correspondence with step S101A and the cart ID. In addition, when reaching step S104A via step S103A, the portable terminal 60 transmits product registration information further including the captured image acquired in step S103A. Furthermore, in the case where it is determined that there was no code-unacquired result in step S102A, when the product registration result corresponds to an unspecified product of NO-FILE (classification number 1), the portable terminal 60 transmits product registration information indicating that the product registration result is NO-FILE (classification number 1).

Step S105A: The portable terminal 60 updates the product registration screen in response to the reception of a registration complete notification transmitted from the TMS 20 in response to the transmission of the product registration information in step S102A, as illustrated in FIG. 11C, for example.

Step S106A: When it is determined that the code has not been read normally in step S101A, or after the processing in step S105A, the portable terminal 60 determines whether the product registration result according to the current product registration operation is a code-unacquired result. The code-unacquired result is a product registration result that is determined to be applicable to a held product of any of a reading failure (classification number 2), a pseudo-scan input (classification number 3), and a non-scan input (classification number 4).

First, the portable terminal 60 determines that a code-unacquired result as a reading failure (classification number 2) has occurred when a certain time has passed without normally completing (successfully) reading the barcode while in a state where it is recognized that the entire barcode of the product has been captured in the captured image.

The portable terminal 60 determines that a code-unacquired result as a pseudo-scan (classification number 3) has occurred when the product is recognized in the captured image, but reading of the barcode is not completed normally because the barcode is not able to be recognized at all.

Alternatively, the portable terminal 60 determines that a code-unacquired result as a pseudo-scan has occurred even when reading of the barcode is not completed normally because only a portion of the barcode of the product is able to be recognized in the captured image.

Alternatively, the portable terminal 60 determines that a code-unacquired result as a pseudo-scan has occurred even when reading of the barcode is not completed normally because the product was moved too quickly, although the barcode of the product is able to be recognized in the captured image.

For this kind of code-unacquired result classified as a pseudo-scan, there is a possibility that fraudulence has been carried out, such as where the customer merely pretends to perform an operation to cause reading of the barcode of the product and puts the product in the shopping basket.

The portable terminal 60 placed in the shopping cart is capable of capturing an image of the contents of the shopping basket placed in the shopping cart. The portable terminal 60 determines that a code-unacquired result as a non-scan input (classification number 4) has occurred when a state is detected wherein a new product is additionally input into the shopping basket, regardless of recognizing a situation where an attempt to read the barcode of the product in the captured image is made.

Note that, for example, the customer may move a product already registered within the shopping basket to organize the contents of the shopping basket. The portable terminal 60 may be made so as to be capable of respectively identifying this kind of product movement and the additional input of a new product corresponding to the code-unacquired result as a non-scan input on the basis of the captured image.

For the occurrence of this kind of code-unacquired result classified as a non-scan input, there is a possibility that fraudulence may have been carried out, such as where the customer does not cause the portable terminal 60 to read the barcode of the product and puts the product in the shopping basket as is.

Furthermore, this is applicable to when the product registration result is determined not to be a code-unacquired result in step S106A, and when the portable terminal 60, as a result of analyzing the captured image obtained by capturing an image by the camera 506, determines that the product registration operation was not performed.

Step S107A: When it is determined in step S106A that there was a code-unacquired result, the portable terminal 60 acquires (extracts) from the captured images captured by the camera 506 a captured image in a period corresponding to the current product registration operation.

The captured images acquired by the portable terminal 60 in step S107A are used as captured images G11, G12, and G13 displayed in the state confirmation screen P10 when the code-unacquired product registered by the current product registration operation is to undergo processing for holding removal. Furthermore, the captured image acquired by the portable terminal 60 in step S107A is used as the target captured image of the target captured image area AR43-1 in the product information input screen P40 when the code-unacquired product registered by the current product registration operation is to undergo processing for holding removal.

Step S108A: The portable terminal 60 transmits the product registration information indicating the product registration result as the current code-unacquired result to the TMS 20. The captured image acquired in step S107A is included in the product registration information transmitted in step S108A.

Step S109A: The portable terminal 60 updates the product registration screen in response to the reception of a registration complete notification transmitted from the TMS 20 according to the transmission of the product registration information in step S108A.

Step S110A: When it is determined that there is no code-unacquired result in step S106A, or after the processing in step S109A, the portable terminal 60 determines whether the checkout transition instruction operation is accepted.

When the checkout transition instruction operation is not accepted, processing is returned to step S101A.

Step S111A: When accepting the checkout transition instruction operation, the portable terminal 60, for example, creates a two-dimensional code of the cart ID and displays the generated two-dimensional code on a display unit 504 by, for example, the code display screen illustrated in FIG. 11D.

Next, a processing procedure example executed by the TMS 20 will be described.

Step S201A: The TMS 20 determines whether the product registration information transmitted from the portable terminal 60 is received in step S104A or step S108A.

Step S202A: When the product registration information is received, the TMS 20 specifies cart information indicated by the cart ID included in the received product registration information.

Step S203A: The TMS 20 updates the cart information specified in step S202A. That is, the TMS 20 generates registered product information or held product information on the basis of the product code included in the product registration information received in correspondence with step S201A. The TMS 20 adds the generated registered product information or the held product information to the cart information specified in step S202A. Thus, one product is registered in the cart information.

When the captured image is included in the product registration information received in step S201A, the TMS 20 stores the captured image in association with the registered product information or held product information added to the cart information.

Step S204: The TMS 20 transmits a registration complete notification to the portable terminal 60 after the processing in S203A.

The portable terminal 60 may delete, at a predetermined timing, captured images not transmitted to the TMS 20 (that is, captured images not used as the target captured image and next captured image) from among the captured images obtained by steady imaging. For example, when a product is specified and registered twice in succession, it is established that the captured image corresponding to the first registration is not utilized as the next captured image. Thus, the portable terminal 60 may delete the captured image corresponding to the first registration at a timing at which the product is specified and registered twice in succession. Alternatively, the portable terminal 60 may, for example, erase captured images that were not transmitted to the TMS 20 at a timing at which the checkout transition instruction operation is performed and product registration for all products is considered to be complete.

In the SCS, the portable terminal 60 does not transmit the product registration information every time a product is registered, for example, but may collectively transmit the product registration information for all registered products in response to product registration being completed for all products. At this time, the portable terminal 60 transmits the product registration information including captured images used as the target captured image and the next captured image.

When collective transmission of the product registration information is performed in this manner, the portable terminal 60 may, for example, erase the captured images (captured images not used as the target captured image and next captured image) that are not transmitted to the TMS 20 at a timing at which product registration for all the products is considered to be complete.

Figure 32:
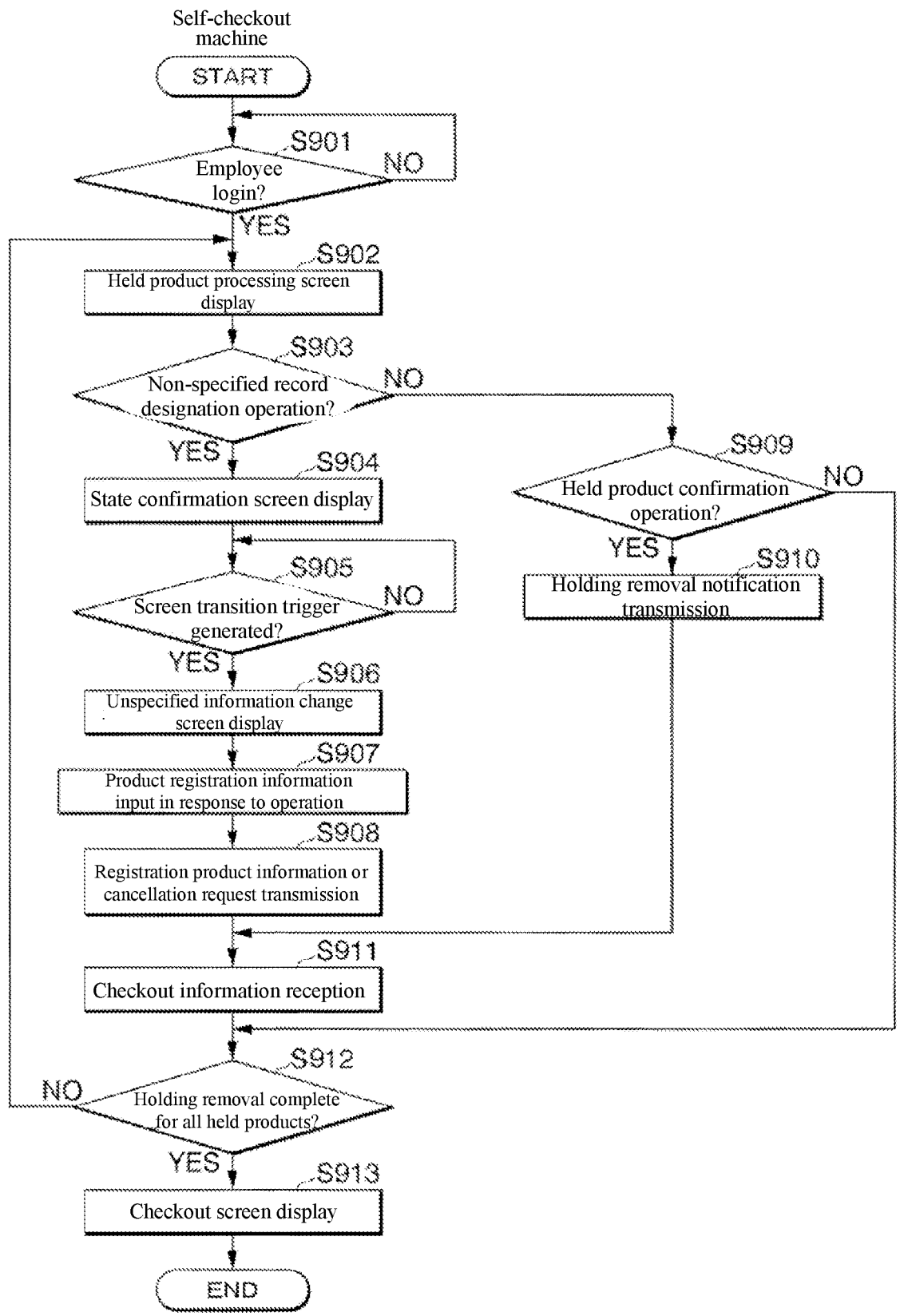
FIG. 32 is a flowchart illustrating a processing procedure example executed by the self-checkout machine in relation to holding removal of a held product according to one or more embodiments.

A processing procedure example executed by the self-checkout machine 40 in relation to holding removal of a held product will be described with reference to the flowchart in FIG. 32.

Step S901: The self-checkout machine 40 waits for login to be performed by the employee performing the holding removal in a state wherein the checkout screen including list items of held products is displayed on the customer-side display 405 as illustrated in FIGS. 23A and 23B.

Step S902: In response to the employee logging in, the self-checkout machine 40 causes the display on the customer-side display 405 to change from the checkout screen to the held product processing screen (FIG. 28).

Step S903: In the state wherein the held product processing screen is displayed, the self-checkout machine 40 determines whether an unspecified record designation operation has been performed. The unspecified record designation operation is an operation on the holding removal declaration button BT31 disposed on a list item corresponding to an unspecified product among the list items of the held products (unspecified records) in the held product list area AR31.

Step S904: When the unspecified record designation operation is performed, the self-checkout machine 40 causes the customer-side display 405 to display the state confirmation screen P10, whereon an unspecified product corresponding to a list item designated by the unspecified record designation operation is to undergo processing for holding removal.

Step S905: In the state wherein the state confirmation screen P10 is displayed, the self-checkout machine 40 waits for a screen transition trigger to occur on the product information input screen P40. The screen transition trigger is the acceptance of an operation on the screen transition button BT35 on the state confirmation screen P10, or the completion (success) of the self-checkout machine 40 reading the product code.

Step S906: When the screen transition trigger occurs, the self-checkout machine 40 displays the product information input screen P40 for the unspecified product to undergo processing.

Step S907: When the product information input screen P40 is displayed, the self-checkout machine 40 inputs the product registration information in response to a product registration information (product code, product name, price, quantity, and the like) input operation being performed by the employee.

Step S908: The self-checkout machine 40 transmits the registered product information or a cancellation request to the TMS 20 in response to the registration button BT41 or the cancellation button BT42 being operated. The registered product information, having content wherein the information input to the product information area AR41 is reflected, is transmitted in response to the operation of the registration button BT41. The cancellation request is a command that is transmitted in response to the cancellation button BT42 being operated and requests that the held product information to undergo processing that is saved in the cart information be placed in a canceled state.

Step S909: When it is determined that the unspecified record designation operation is not performed in step S903, the self-checkout machine 40 determines whether a held product confirmation operation was performed. The held product confirmation operation is an operation on the holding removal declaration button BT31 in a list item corresponding to a held product that is not an unspecified product. In other words, held products that are not unspecified products are products that may be specified as age confirmation products (classification number 5), pharmaceutical products (classification number 6), or security tag products (classification number 7). For these held products that are not unspecified products, the employee performs a predetermined handling task, and then holding removal is performed by operating the holding removal declaration button BT31 of the corresponding list items.

Step S910: When the held product confirmation operation is performed, the self-checkout machine 40 transmits a holding removal request corresponding to the held product for which the current held product confirmation operation was performed to the TMS 20.

Step S911: The TMS 20 updates the applicable cart information in response to receipt of the registered product information or cancellation request transmitted from the self-checkout machine 40 in step S908. That is, when registered product information is received, the TMS 20 changes the held product information of the target product to product registration information according to the received registered product information. At this time, the TMS 20 may change, for example, a holding removal flag included in the product information so as to indicate that holding removal was carried out.

When a cancellation request is received, the TMS 20 changes the held product information of the target product so as to indicate that cancellation was carried out. The TMS 20, in response to the receipt of a holding removal notification transmitted from the self-checkout machine 40 in step S910, changes the product information type so that the held product information of the target product in the cart information is managed as registered product information. In this case, the TMS 20 may change, for example, the holding removal flag included in the product information so as to indicate that holding removal was carried out.

When the cart information is updated as described above, the TMS 20 transmits checkout information corresponding to the updated cart information to the self-checkout machine 40. The self-checkout machine 40 receives the transmitted checkout information.

Step S912: The self-checkout machine 40 determines whether holding removal for all the held products has been performed. When held products that have yet to undergo holding removal remain, the processing is returned to step S902.

When the processing is returned from step S912 to step S902, the self-checkout machine 40 displays the held product processing screen updated according to the content of the checkout information received in step S911.

Step S913: When it is determined in step S912 that holding removal for all the held products has been performed, the self-checkout machine 40 displays the checkout screen whereon the content of the checkout information received in step S911 is reflected. Because the list items of held products are not displayed in the registered product list area AR3 of the checkout screen displayed in step S912, the self-checkout machine 40 is in a state wherein checkout processing may be executed according to the operation of the customer thereafter.

<Variations>

Variations of the second example will be described below. The variations described below may be combined with the second example and other variations as appropriate.

[First Variation of Second Example]

In the foregoing embodiments, the TMS 20 performs specification of the product based on the product code read by the portable terminal 60. Specification of the product is not limited to this kind of processing. For example, the product may be specified by the portable terminal 60 transmitting a captured image of the product to the TMS 20 and then comparing the captured image received by the TMS 20 to a database of product images.

[Second Variation of Second Example]

Figure 33:
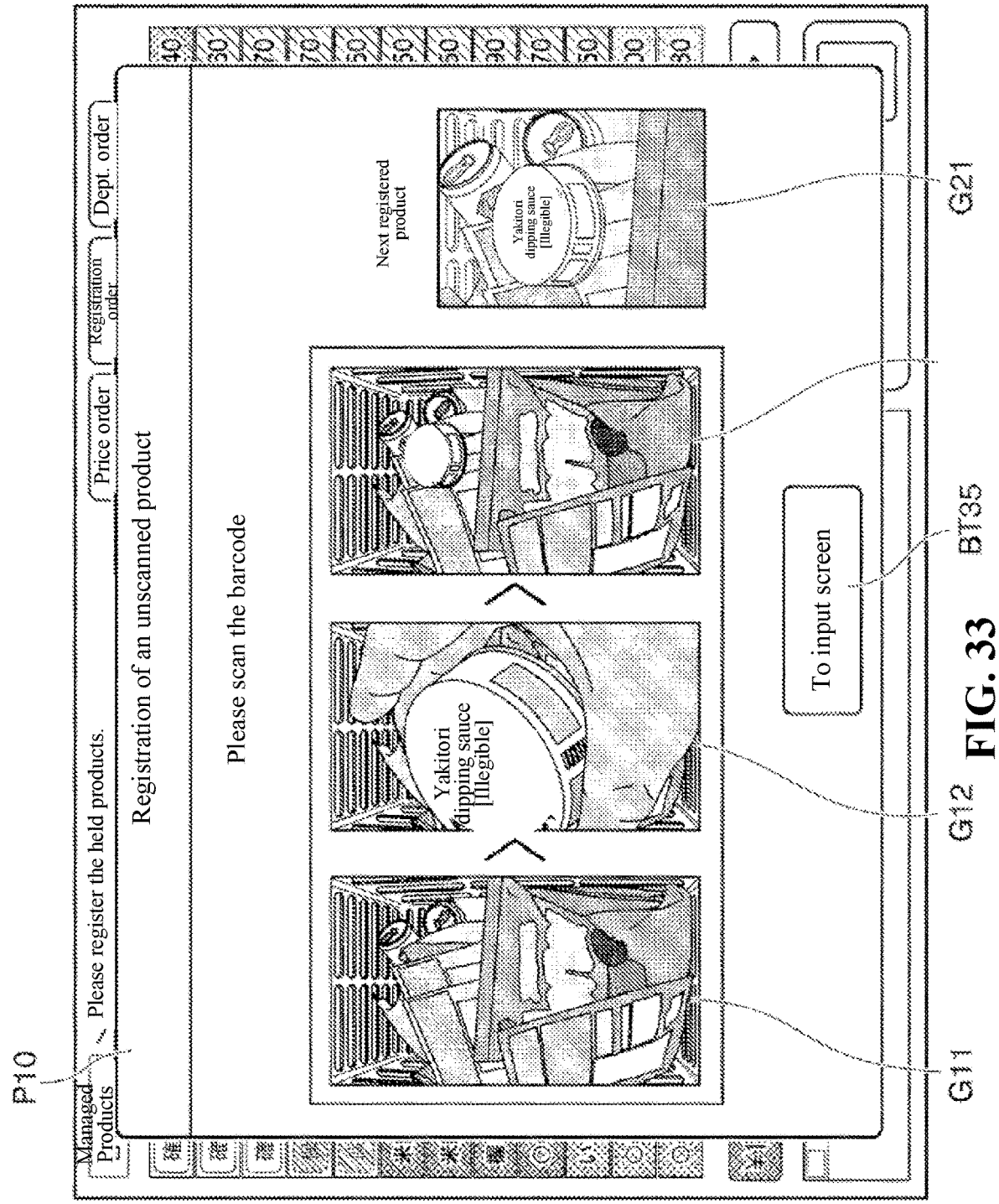
FIG. 33 is a diagram illustrating one example of the state confirmation screen according to one or more embodiments.

The next captured image may also be displayed, for example, on the state confirmation screen P10. FIG. 33 illustrates one example of the state confirmation screen P10 corresponding to the present variation. On the state confirmation screen P10 in the same drawing, the next captured image G21 is disposed in addition to captured images G11, G12, and G13 of when the product registration operation is performed for an unspecified product.

In this case, the employee is able to judge whether duplicate registration has arisen at a stage where the state confirmation screen P10 is displayed before the product information input screen P40 is displayed.

The disposition appearance of the captured images G11, G12, and G13 on the state confirmation screen P10 and the next captured image G21 are not limited to the example in the same drawing. For example, the next captured image G21 may be disposed above an area or below an area wherein the captured images G11, G12, and G13 are disposed. Alternatively, it may be disposed so as to fall within a range of any of the captured images G11, G12, or G13. Alternatively, although the captured images G11, G12, and G13 are displayed, for example, the next captured image may be displayed in response to, for example, an operation or the like on a button for displaying the next captured image on the state confirmation screen P10 in a state wherein the next captured image G21 is not displayed.

The quantity display portion NM that is the same as that illustrated in FIG. 30 may be disposed in correspondence with the next captured image G21 illustrated in FIG. 33.

[Third Variation of Second Example]

On the checkout screen (FIG. 27) or the held product processing screen (FIG. 28), for example, list item of a held product as an unspecified products (unspecified record) may be disposed with the list item of a product that was normally registered first by a subsequent product registration operation (normal registration record), having a relationship where the disposition order is before and after, regardless of the sort order.

Figure 34:
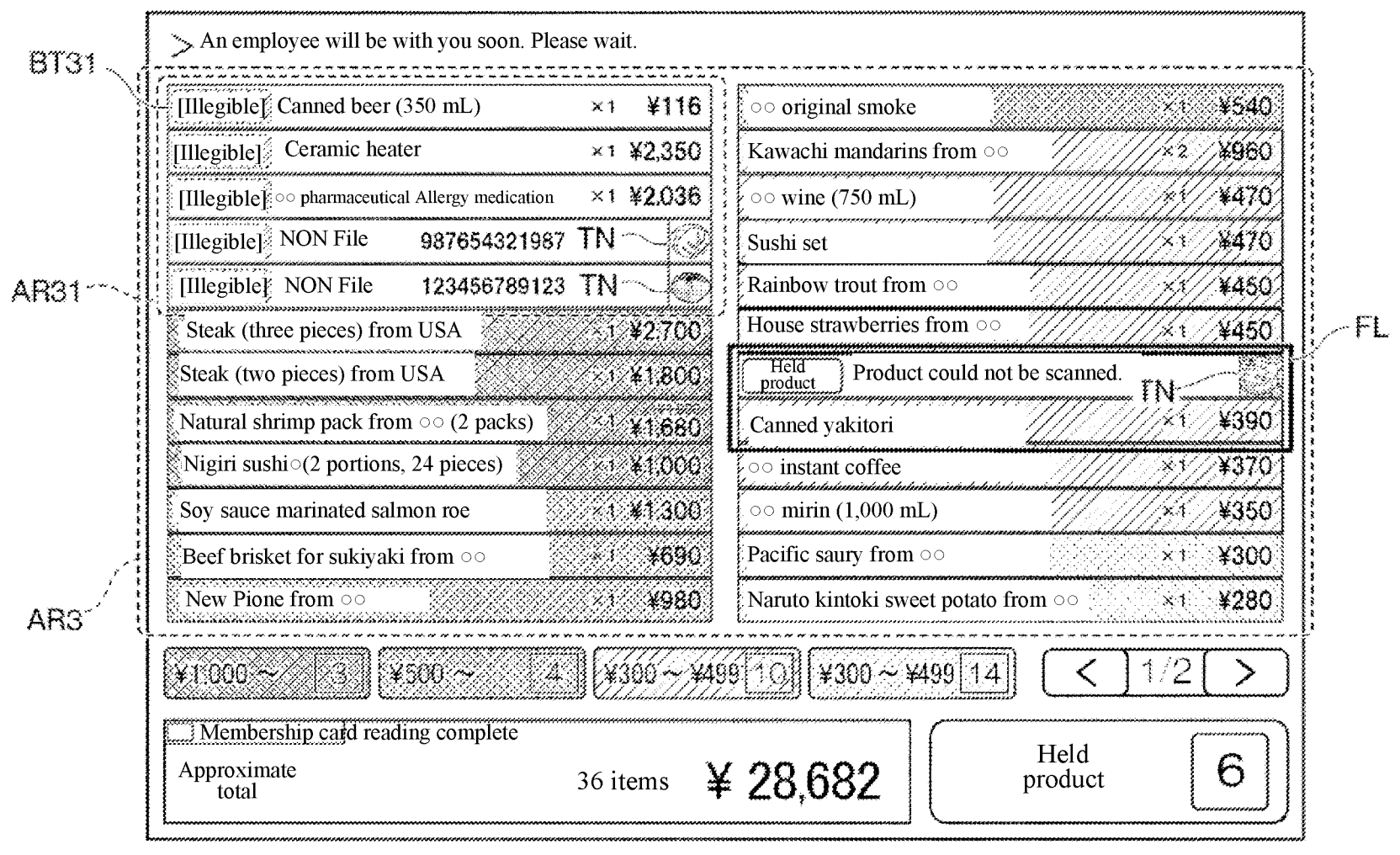

FIG. 34 illustrates one example of the checkout screen corresponding to the present variation. In the same drawing, the list item of a code-unacquired product (held product applicable to any of reading failure (classification number 2), pseudo-scan input (classification number 3), and non-scan input (classification number 4)) among the unspecified products is disposed with the list item of a product that was normally registered first after registration of the code-unacquired product, having a relationship where the disposition order is before and after.

In the same drawing, an example is illustrated of the disposition order, wherein the list item of a code-unacquired product is placed before, and the list item of a product that was normally registered first after the registration of the code-unacquired product is placed after. The list item of the code-unacquired product and the list item of the product that was normally registered are surrounded by one frame FL. It is thereby possible to easily visually ascertain a set of list items of code-unacquired products having a possibility of duplicate registration and list items of products that are normally registered.

[Fourth Variation of Second Example]

In the foregoing embodiments, in response to holding removal of a held product being performed, the corresponding list item displayed in the held product list area AR31 of the held product processing screen indicates that holding removal was carried out by, for example, changing the display on the holding removal declaration button BT31. In this case, the list item of the held product subject to holding removal is disposed at the same position in the held product list area AR31 even after holding removal is carried out.

However, the list item of the held product may move to the registered product list area AR3 outside the held product list area AR31 in response to holding removal being carried out, and may be disposed according to the disposition order (sort order) set at present as a normal registration record.

[Fifth Variation of Second Example]

In the foregoing embodiments, a corresponding captured image at the time of the product registration operation wherein the product was first able to be specified after the unspecified product was registered is displayed as the next captured image.

In contrast thereto, in the present variation, even when, for example, a registration result that there is an unspecified product is obtained by the next product registration operation after the unspecified product was registered, the corresponding captured image at the time of the next product registration operation may be displayed as the next captured image. Alternatively, even when, for example, a registration result that there is an unspecified product is obtained by the next product registration operation performed within a fixed time frame after the unspecified product was registered, the corresponding captured image at the time of the next product registration operation may be displayed as the next captured image.

For example, when registered as an unspecified product by the customer as a result of performing the product registration operation for a certain product, there are cases where the customer again performs the product registration operation, upon which the same product is registered in the same manner as an unspecified product. In other words, when registering a product, there are also cases where duplicate registration is carried out such that the registration results for the same product as an unspecified product are redundant. With the configuration of the present variation, it becomes easier for the employee to ascertain this kind of duplicate registration and to take response measures quickly.

As described above, when a registration result that there is an unspecified product is obtained by the next product registration operation performed after the unspecified product was registered, or alternatively, when a registration result that there is an unspecified product is obtained by the next product registration operation performed within a fixed time frame after the unspecified product was registered, processing may be performed so that the same product is registered as an unspecified product, and, for example, the TMS 20 treats this as one unspecified record.

[Sixth Variation of Second Example]

Once the portable terminal 60 transmits captured images obtained by the camera 506 regularly to the TMS 20, the TMS 20 side may acquire the captured images corresponding to the code-unacquired result in response to the time when the code-unacquired result occurred, the classification result, the image analysis result, and the like.

[Seventh Variation of Second Example]

Once the TMS 20 stores the captured images regularly transmitted by the portable terminal 60, in response to the portable terminal 60 or the TMS 20 determining that a code-unacquired result occurred based on a captured image, the applicable captured image may be managed as corresponding to the code-unacquired result by granting, for example, a flag or identification information.

[Eighth Variation of Second Example]

The next captured image displayed by the self-checkout machine 40 may be displayed by a search by the employee. For example, when one unspecified product is subject to holding removal, the employee performs an operation for instructing the self-checkout machine 40 to search for a captured image corresponding to a product that was normally registered first after the unspecified product was registered. The self-checkout machine 40 requests the TMS 20 to search for the instructed captured image. The TMS 20 executes the search in response to the request, and transmits the searched captured image to the self-checkout machine 40. The self-checkout machine 40 displays the received captured image as the next captured image.

[Ninth Variation of Second Example]

The portable terminal 60, the TMS 20, or the like may be configured to catch the occurrence of a state wherein a registered product is not input into the shopping basket, a state wherein a product is input into the shopping basket without an accompanying person or the like of the customer registering the product, or the like based on a result of analyzing a change in a captured image obtained by the portable terminal 60 capturing an image of the inside of the shopping basket.

When the occurrence of a state such as that described above is caught, the portable terminal 60 may perform guidance for the customer by, for example, a display to make sure that the registered product is placed into the shopping basket or that product registration of the product placed in the shopping basket without being registered is performed.

[Tenth Variation of Second Example]

A search for a product registered in a corresponding transaction may be carried out on the product information input screen P40 in FIG. 30. The search possible in the present variation may be a vague search that searches for products "including" an input keyword.

For example, a button instructing a vague search is disposed on the product information input screen P40 of the present variation. When the button is operated, a keyboard for character input where, for example, the fifty Japanese gojuon85 (or the alphabet) is disposed is displayed in the input operation area AR42. The employee performs an operation for inputting a keyword on the keyboard for character input because the keyword may be a part of the name of the product searched for. At this time, it is possible to convert Japanese hiragana characters input as a keyword into a word. Thereafter, the employee operates a search execution button disposed on the product information input screen P40.

In response to the search execution button being operated, the transaction state management device 280 executes a vague search and displays the search result. The search result may be displayed as a pop-up screen, for example. The product name, price, number registered, and the like for each searched product may be displayed in the search result.

The employee specifies the current unspecified product to undergo processing from among the products presented as the search result, and performs an operation to select the specified product. The display of the product information input screen P40 may be returned to, for example, in response to this operation. The product name, price, registered number, product code, and the like, of the selected product are input in the displayed input operation area AR42. The employee confirms the content displayed in the input operation area AR42 and then operates the registration button BT41. The employee is thereby able to efficiently perform holding removal of the unspecified product without inputting, for example, a number having several digits as the product code or narrowing down by the product classification.

[Eleventh Variation of Second Example]

For example, a moving image (or a time lapse image) of a captured image may be displayed, corresponding to the product registration operation when the target unspecified product is registered by an operation on a screen such as the state confirmation screen P10 in FIG. 29 and FIG. 33, the product information input screen P40 in FIG. 30, or the like. The operation for displaying the moving image may be, for example, an operation on a moving image display button disposed on the state confirmation screen P10, product information input screen P40, or the like, or may be, for example, an operation on the captured image G12 on the state confirmation screen P10, or the target captured image area AR43-1 or next captured image area AR43-2 on the product information input screen P40.

For example, when the next captured image is displayed, a moving image may be displayed from starting the product registration operation when the target unspecified product is registered to until an image of the product corresponding to the next captured image is captured. The moving image may be deleted, for example, in response to checkout completion. However, when a transaction has ended without checkout being completed for some reason, the moving image may be kept without being deleted for a fixed period of time after the transaction is completed so that the employee is able to confirm even after the transaction is completed. The moving image may be kept by the TMS 20 or the transaction state management device 280 in association with the date, member identification information, and the like. The moving image that is kept may be reproduced by a terminal such as the transaction state management device 280.

[Twelfth Variation of Second Example]

In the foregoing embodiments, variations, or the like, a portion of the processing executed by the portable terminal 60, transaction state management device 280, or the like may be executed by a higher level device, such as the TMS 20, connected via communication to the portable terminal 60. In the foregoing embodiments, variations, or the like, a portion of the processing executed by the self-checkout machine 40 may be executed by a higher level device, such as the TMS 20, connected via communication to the self-checkout machine 40.

For example, a configuration of a thin-client system may be provided to the SCS of one or more embodiments. The TMS 20 may be configured as a server (for example, a cloud server) that supports a thin-client, and the portable terminal 60, transaction state management device 280, or the like may function as a thin-client. In this case, a thin-client terminal such as the portable terminal 60, transaction state management device 280, or the like transmits information, such as a captured image or a command corresponding to an operation performed on itself, to the transaction state management device 280. The transaction state management device 280 may execute processing in response to information received from the thin-client terminal and transmit image data or web page data as a screen or the like whereon the processing result is reflected to the thin-client terminal. The portable terminal 60, transaction state management device 280, or the like as the thin-client terminal displays the transmitted image data or web page data using an image viewer or a web browser.

As described above, in the SCS according to one or more embodiments, a terminal device (for example, the portable terminal 60) performs registration of the product according to an operation of the customer. The SCS is provided with image capture means (for example, the camera 506) for capturing an image of the product to be registered; product specification means (TMS 20) for specifying the product to be registered on the basis of a captured image obtained by the imaging means; and storage means for, when an unspecified result is generated wherein the product is unable to be specified by the product specification means, storing, as a supplementary image corresponding to the unspecified result (for example, the next captured image), a captured image corresponding to the product first specified by the product specification means after a timing at which the unspecified result is generated (step S203).

According to the foregoing configuration, in response to the held product being registered as an unspecified product, an image corresponding to the registration result wherein the product was first specified after the unspecified product was registered may be acquired as the next captured image. By displaying the next captured image at a predetermined opportunity, it is possible to effectively resolve the unspecified state of the product (for example, holding removal of the held product in an unspecified state).

The SCS according to one or more embodiments is further provided with display control means for displaying specified registration information (for example product specification records) regarding a product specified by the product specification means as registration result information indicating a result obtained by the customer performing registration of the product using the terminal device, and a registration result information list (for example, the registered product list area AR3 on the held product processing screen) in which unspecified information indicating the unspecified result (for example, unspecified records) is indicated; and displaying, in response to unspecified information having been designated from among registration result information indicated in the registration result information list being designated, a captured image (for example, a target captured image in the target captured image area AR43-1) when an unspecified result corresponding to the designated unspecified information is generated, and a supplementary image (for example, the next captured image in the next captured image area AR43-2) corresponding to the unspecified result in which the designated unspecified information is indicated.

According to the foregoing configuration, it is possible to display the target captured image obtained by capturing an image of the state of the product registration operation corresponding to the unspecified product subject to holding removal, and the next captured image corresponding to the unspecified product. By viewing the target captured image and the next captured image, for example, it becomes easier for the employee to judge whether duplicate registration of the same product has been performed by the customer.

The display control means that the SCS according to one or more embodiments is provided with displays the disposition order of the unspecified information in the registration result information list in succession.

According to the foregoing configuration, in the registered product list area AR3 of the held product processing screen, it is possible to form the held product list area AR31 wherein the list items of unspecified products are disposed, for example, in order from the top. It thereby becomes easier for the employee to perform the work of holding removal of the unspecified product.

According to one or more embodiments, displayed in the registration result information list is the unspecified information and the specified registration information regarding the product first specified by the product specification means after a timing at which the unspecified result corresponding to the unspecified information was generated so that the disposition order is before and after.

According to the foregoing configuration, the list item of an unspecified product may be disposed in the registered product list area AR3 of the held product processing screen with the list item for a product specified first after product registration corresponding to the unspecified product such that the disposition order is continuous. Thus, in the registered product list area AR3, for example, the list items of unspecified products and the list items of products that may have undergone duplicate registration corresponding to the unspecified products are disposed side by side, and it is therefore possible to improve the efficiency of the work of holding removal of unspecified products by the employee.

The display control means that the SCS according to one or more embodiments is provided with displays, together with the supplementary image, the quantity registered for the product corresponding to the supplementary image (for example, displays the quantity display portion NM).

According to the foregoing configuration, the quantity display portion NM may be displayed in correspondence with the next captured image. The employee is thereby able to ascertain the quantity of unspecified products subject to holding removal and products normally registered in duplicate at the stage of performing the operation of the holding removal, and is able to accurately perform the work or operation related to the holding removal.

The SCS according to one or more embodiments is provided with editing means (an editor, for example, the product information input screen P40) for editing the unspecified information. The display control means disposes, in response to the editing means carrying out editing so that the unspecified information is changed to specified registration information, the specified registration information that was changed from the unspecified information in the registration result information list in a disposition order according to predetermined placement rules regarding the registration result information.

According to the foregoing configuration, in the registered product list area AR3 wherein the list items of held products are disposed in a unified order, the list items corresponding to products that underwent holding removal may be redisposed as list items of normally registered products according to a prescribed disposition order.

The self-checkout machine (40) that the SCS according to one or more embodiments is provided with includes information acquisition means for acquiring registration result information relating to a registration result performed for a product using the portable terminal; and display control means for displaying, on the basis of registration result information acquired by the information acquisition means, and in registration performed by the customer for the product using the terminal device, specified registration information regarding the specified product, and a registration result information list (for example, the registered product list area AR3 on the held product processing screen) in which unspecified information indicating an unspecified result wherein the product is not specified is indicated; and displaying, in response to the unspecified information from among registration result information indicated in the registration result information list being designated, the designated unspecified information (for example, a target captured image in the target captured image area AR43-1), and information relating to a product that was first specified after the unspecified result corresponding to the designated unspecified result was generated (for example, the next captured image in the next captured image area AR43-2).

A method executed by the checkout device that the SCS according to one or more embodiments is provided with acquires registration result information relating to a registration result performed for a product using the portable terminal; displays, on the basis of the acquired registration result information, and in registration performed by the customer for the product using the terminal device, a registered result information list wherein specified registration information regarding the specified product, and unspecified information indicating an unspecified result wherein the product is not specified are indicated; and displays, in response to the unspecified information from among registration result information indicated in the registration result information list being designated, the designated unspecified information, and information relating to a product that was first specified after the unspecified result corresponding to the designated unspecified result was generated.

Third Example

In a self-checkout system, a code of a product (for example, a barcode) is read so that a customer performs product registration. According to the SCS in one or more embodiments, an error that may occur when reading the code may be efficiently resolved, and user convenience may be improved.

The SCS 1 according to one or more embodiments is the same as the system configuration of the SCS illustrated in FIG. 1. A TMS 20, a registration and checkout device 30, a self-checkout machine 40, a monitoring device 50, and a portable terminal 60 according to the third example may have the same configuration as the same devices according to the first example described above.

Customer information, store information, and cart information stored in the TMS 20 according to one or more embodiments includes, for example, the information elements illustrated in FIGS. 7A, 7B, and 7C, respectively.

In one or more embodiments, the classification of the held product illustrated in FIG. 8 may be further subdivided and defined as illustrated in FIG. 35. The registration and checkout device 30 and the self-checkout machine 40 included in SCS 1 may acquire information such as that illustrated in FIG. 35 (a file illustrating a relationship between a classification number and a holding sub-classification number).

A held product classified as classification number "1" is a NO-FILE held product. As described above, a NO-FILE held product is a held product where scanning of the product code was successful but there is no product code stored in a product file. In other words, when there is a held product due to scanning of the product code being successful but there being no product code stored in the product file, the held product is classified as classification number "1". A held product classified as classification number "1" needs to be confirmed or the like by an employee during checkout since the price is unknown.

In FIG. 35, "NO-FILE" of "1 (NO-FILE)" is a classification name (held product classification) of a held product. The same is true for "reading failure" of "2 (reading failure)", "specified product" of "3 (specified product)", and "canceled product" of "4 (canceled product)", which will be described later.

A holding sub-classification number "11" exists as a sub-classification under (subordinate to) the broad classification of classification number "1". Because there is only one holding sub-classification under the broad classification of classification number "1", which is holding sub-classification number "11", all held products classified as classification number "1" are also classified as holding sub-classification number "11".

In FIG. 35, "NO-FILE" of "11 (NO-FILE)" is a classification name (holding sub-classification name) of a held product. The same is true for "pseudo scan (covered or the like)" of "21 (pseudo scan (covered or the like))" and "pseudo scan (short time)" of "22 (pseudo scan (short time))", which will be described later.

In FIG. 35, reading operation "Yes" indicates that a reading operation has been performed, and reading operation "No" indicates that the reading operation has not been performed. Reading outcome "Success" indicates that reading by the reading operation was successful. Reading outcome "Failure" indicates that reading by the reading operation failed. Reading outcome "-" is set when the reading operation was not performed.

A held product classified as classification number "2" is a reading failure held product. A reading failure held product is a held product for which reading of the product code was not successful, as described above. In other words, when there is a held product due to reading of the product code being unsuccessful, the held product is classified as classification number "2". A held product classified as classification number "2" may require confirmation by the employee during checkout since the price is unknown, and furthermore, there is also concern regarding a fraudulent operation.

Holding sub-classification numbers "21", "22", "23", and "24" exist as sub-classifications under the broad classification of classification number "2". Holding sub-classification number "21" is a "pseudo scan (covered or the like)" held product. Holding sub-classification number "22" is a "pseudo scan (short time)" held product. Holding sub-classification number "23" is a "barcode defect" held product. Holding sub-classification number "24" is a "non-scan input" held product.

A held product of the holding sub-classification number "21" (pseudo scan (covered or the like)) is, for example, a held product constituting reading failure since an image of the barcode of the product is not captured (captured within the readable range) (since an image is captured only of a portion other than the barcode of the product within the readable range), despite reading operation of the product being performed (despite the product being held over)—that is, despite the product being placed in the image capture range of a camera 606 (more specifically, range within which a barcode can be read); or a held product constituting reading failure since one portion of the barcode is covered by, for example, a finger or the like despite an image of the barcode of the product being captured; or a held product constituting reading failure since an image capture angle of the barcode is improper despite an image of the barcode of the product being captured.

A held product (pseudo scan (short time)) of the holding sub-classification number "22" is, for example, a held product constituting a reading failure since the barcode is moved (including passed through) at a speed at which reading is not possible despite an image of the barcode of the product being captured.

A held product of the classification number "23" (barcode defect) is, for example, a held product constituting a reading failure due to wrinkling, a scratch, stain, reflection, or the like of a printed portion of the barcode despite an image of the barcode of the product being captured.

A held product of the classification number "24" (non-scan input) is, for example, a held product constituting a reading failure due to being placed in a shopping basket 80 without the reading operation of the product being performed (without holding the product over).

There are cases where held products of the holding sub-classification numbers "21" to "24" (that is, a held product of the classification number "2") are referred to as reading failure products. There are also cases where a state resulting in a held product of the holding sub-classification numbers "21" to "24" is referred to as a reading failure state (or simply "reading failure").

A held product of the holding sub-classification number "21" (pseudo scan (covered or the like)), a held product of the holding sub-classification number "22" (pseudo scan (short time)), and a held product of the holding sub-classification number "23" (barcode defect) are all common in that they are held products for which the reading operation is performed and reading is not successful. However, it is conceivable that an intention to cause reading to be successful for a held product of the holding sub-classification number "21" (pseudo scan (covered or the like)) and a held product of the holding sub-classification number "22" (pseudo scan (short time)) is rare in comparison to a held product of the classification number "23" (barcode defect). That is, since it may be said that this is a pseudo reading operation (false reading operation), a held product of the holding sub-classification number "21" (pseudo scan (covered or the like)) and a held product of the holding sub-classification number "22" (pseudo scan (short time)) are referred to as a pseudo scan (false scan) held product.

A held product classified as classification number "3" is a specified product (described later) held product. A held product of a specified product is a held product for which registration of the product is successful but handling by an employee is requested during checkout due to being a specified product. In other words, when there is a held product due to there being a specified product, the held product is classified as classification number "3". A held product classified as classification number "3" needs to be confirmed or the like by an employee during checkout due to being a specified product.

Holding sub-classification numbers "31, "32", and "33" exist as sub-classifications under the broad classification of classification number "3". Holding sub-classification number "31" is an "age confirmation product" held product. Holding sub-classification number "32" is a "pharmaceutical product" held product. Holding sub-classification number "33" is a "security tag" held product.

A held product of the holding sub-classification number "31" (age confirmation product) is, for example, a held product requiring an employee to confirm the age of the customer at the point of sale, which includes alcohol, tobacco, or the like.

A held product of the holding sub-classification number "32" (pharmaceutical product) is, for example, a held product requiring a qualified pharmacist or the like to provide an explanation or the like to the customer.

A held product of the holding sub-classification number "33" (security tag product) is, for example, a held product requiring an employee to remove a security tag from the product at the time of sale since the security tag is attached.

A held product classified as classification number "4" is a canceled product held product. The held product of the canceled product is a held product for which registration of the product is successful but the registration is canceled after the registration. In other words, when there is a held product due to registration being cancelled after registration of the product, the held product is classified as classification number "4". A held product classified as classification number "4" is a canceled product (that is, a product that will not be purchased), and needs to be confirmed or the like by an employee during checkout since the product will not be taken out of the shop.

Holding sub-classification number "41" exists as a sub-classification under classification number "4".

When the reading operation is not performed with respect to a held product of the holding sub-classification number "31" (age confirmation product), the product is classified as a held product of the holding sub-classification number "24" (non-scan input). The same is true for a held product of the holding sub-classification number "32" (pharmaceutical product), a held product of the holding sub-classification number "33" (security tag product), and a held product of the holding sub-classification number "41" (canceled product).

The foregoing description is made on the assumption that the reading operation is performed on a held product of the holding sub-classification number "31" (age confirmation product) and reading is successful; however, when the reading operation is performed and reading fails, the product is classified as any of a held product of the holding sub-classification number "21" (pseudo scan (covered or the like)), a held product of the holding sub-classification number "22" (pseudo scan (short time)), or a held product of the holding sub-classification number "23" (barcode defect). The same is true for a held product of the holding sub-classification number "32" (pharmaceutical product), a held product of the holding sub-classification number "33" (security tag product), and a held product of the holding sub-classification number "41" (canceled product).

As illustrated in FIG. 35, the classification number and the holding sub-classification number have a high order and low order relationship; however, one or both are used according to the state. For example, an example is described regarding the cart information wherein a classification number is stored in the held product information; however, a holding sub-classification number may be stored instead of or in addition to the classification number.

The SCS 1 according to one or more embodiments performs as a system corresponding to self-checkout according to, for example, the procedure illustrated in FIG. 9.

As a result of product registration processing according to one or more embodiments, a state (reading failure state) applicable to reading failure of any of the holding sub-classification numbers "21" to "24" in FIG. 35 may occur. In this case, the screen in FIG. 11A to 11C described above is displayed on a touch panel 604 of the portable terminal 60.

Figure 36:
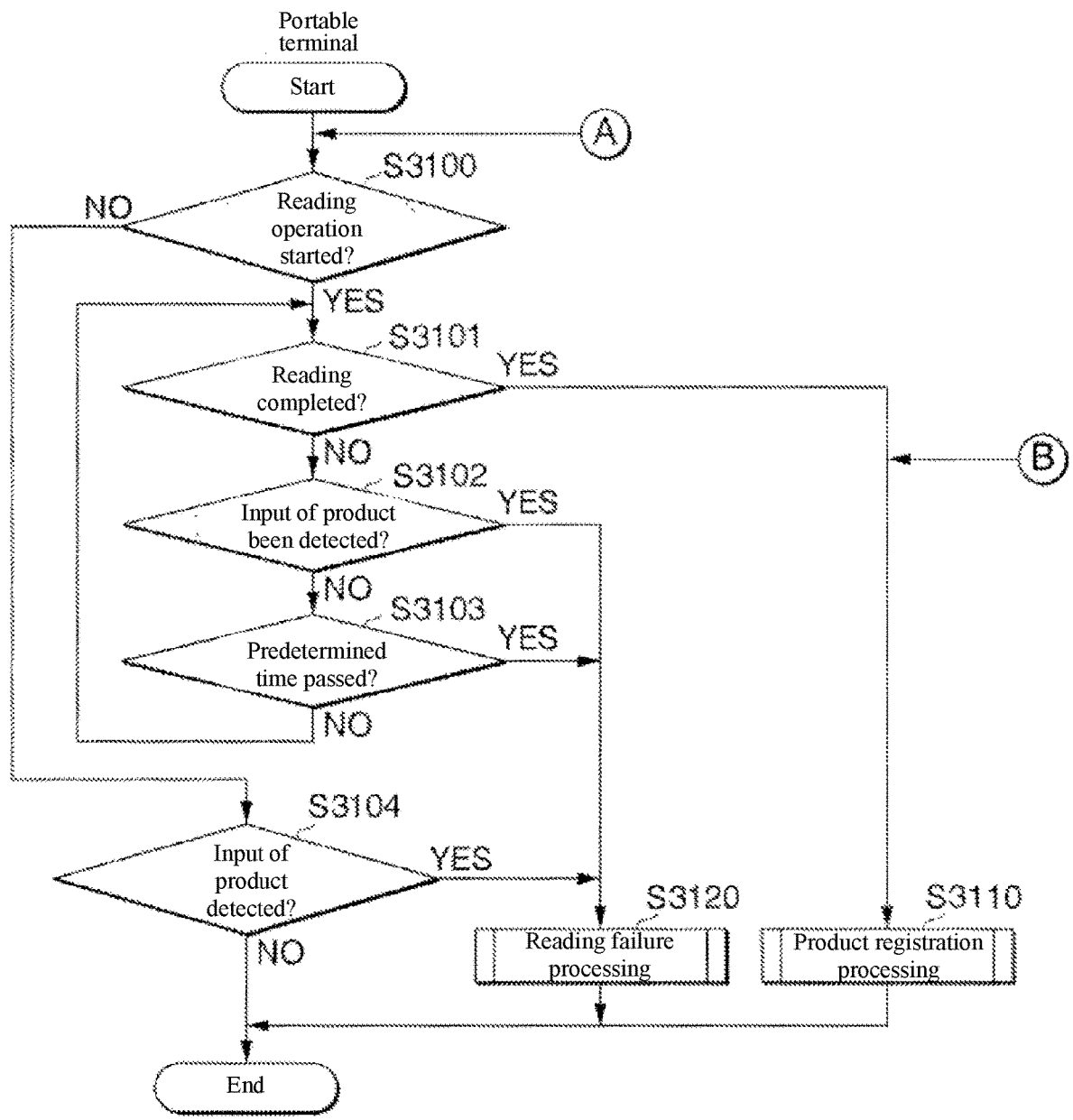
FIG. 36 is a flowchart illustrating one example of the operation of a portable terminal according to one or more embodiments.
Figure 37:
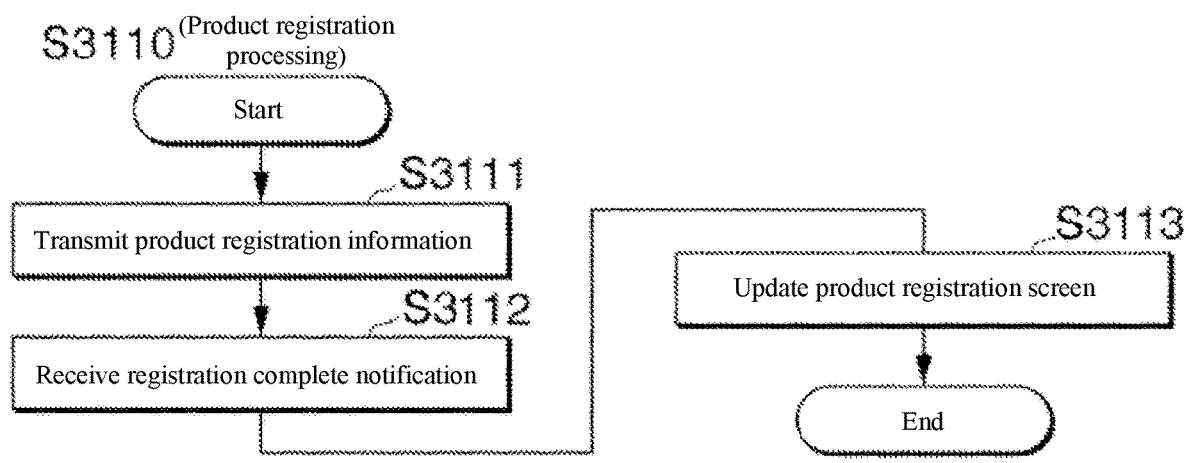
FIG. 37 is a flowchart illustrating one example of the operation of the portable terminal according to one or more embodiments.
Figure 38:
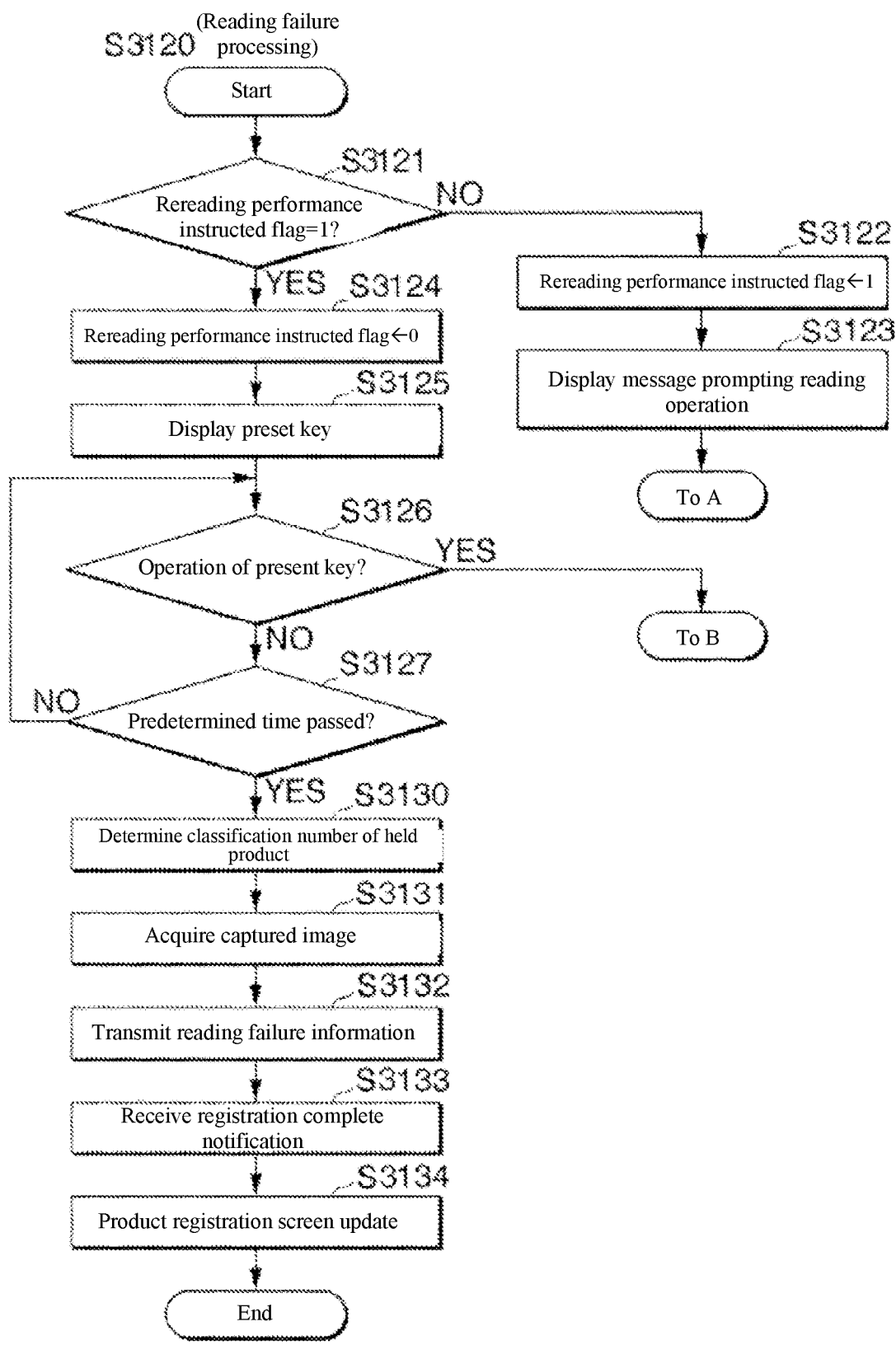
FIG. 38 is a flowchart illustrating one example of the operation of the portable terminal according to one or more embodiments.
Figure 39:
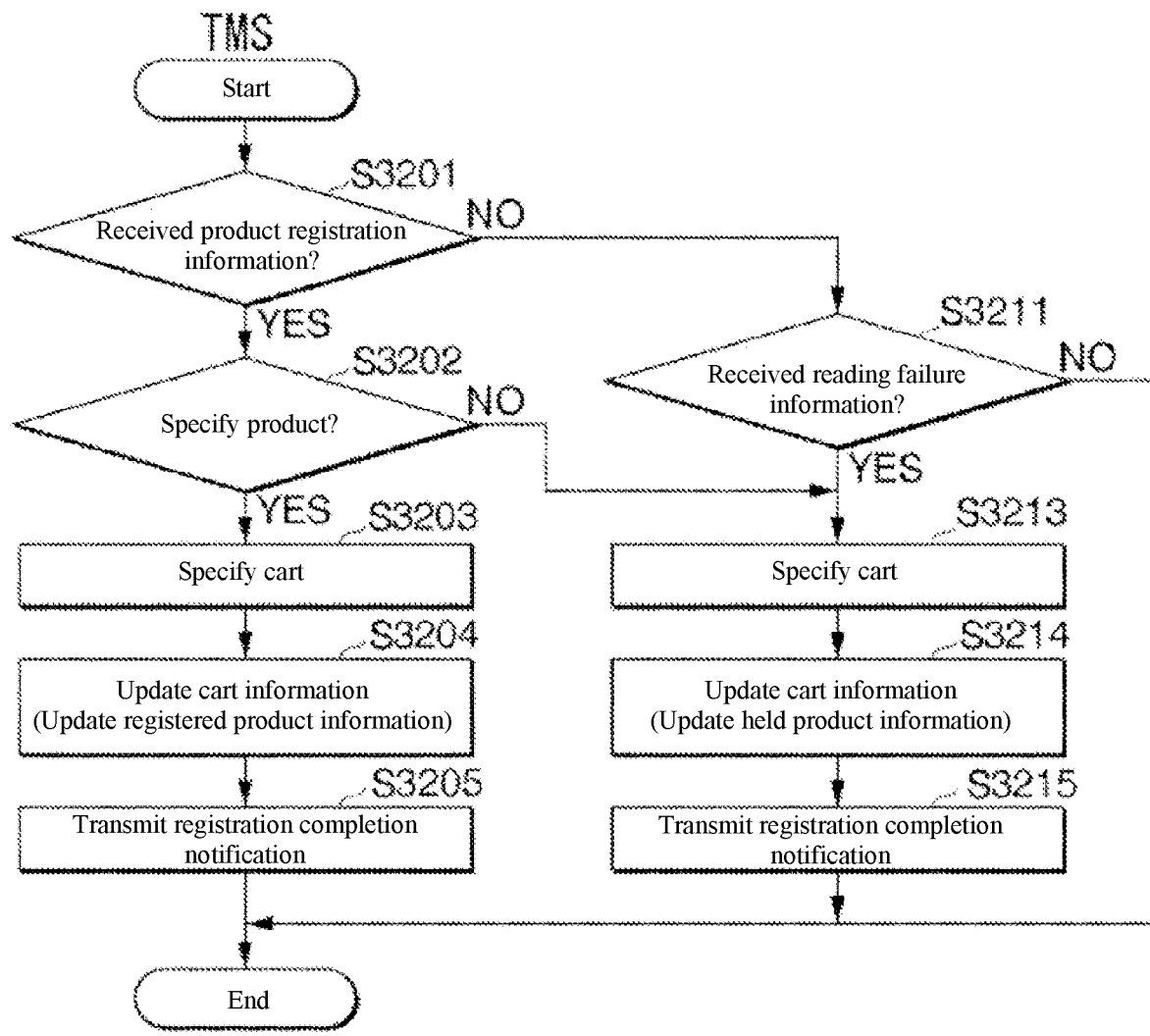
FIG. 39 is a flowchart illustrating one example of the operation of a TMS according to one or more embodiments.

FIG. 36 to FIG. 38 are flowcharts illustrating one example of the operation of the portable terminal 60 according to one or more embodiments. FIG. 39 is a flowchart illustrating one example of the operation of the TMS 20 according to one or more embodiments. The flowcharts in FIG. 36 to FIG. 39 correspond to the processing in steps S5 to S9 in FIG. 9. In the flowcharts in FIG. 36 to FIG. 39, the processing concerning a held product classified as classification number "3" (specified product) and a held product classified as classification number "4" (canceled product) is omitted.

Although omitted from the flowcharts in FIG. 36 to FIG. 38, the portable terminal 60 always performs image capture using a camera 606 to recognize the reading operation of a barcode and input of the product into the shopping basket 80.

[Description of Flowchart in FIG. 36]

Step S3100: The portable terminal 60 judges whether the reading operation of a barcode by the customer has started. For example, when a barcode-like object is recognized in a captured image (through-the-lens image), the portable terminal 60 judges that the reading operation of the barcode by the customer has started. A storage unit 602 of the portable terminal 60 (or within another device that may be referenced by the portable terminal 60. For example, a storage 202 of the TMS 20) stores in advance several types of images of barcode-like objects as images for comparison, and when an image resembling any image for comparison is recognized within the captured image, the portable terminal 60 may judge that a barcode-like object was recognized (that is, judges that the reading operation of the barcode by the customer has started). When the reading operation has started (step S3100: YES), the process proceeds to step S3101. When the reading operation has not started (step S3100: NO), the process proceeds to step S3104.

Step S3101: The portable terminal 60 judges whether the reading of a barcode has completed (succeeded). That is, the portable terminal 60 judges whether a product code was acquired from the barcode. When reading has completed (step S3101: YES), the process proceeds to step S3110. When reading has not completed (step S3101: NO), the process proceeds to step S3102.

Step S3102: The portable terminal 60 judges whether input of the product into the shopping basket 80 has been detected. That is, the portable terminal 60 set as illustrated in FIGS. 3A and 3B captures an image of the contents of the shopping basket 80 placed in the shopping cart 70; however, input of the product into the shopping basket 80 may be detected by a change in a captured image. When input of the product has been detected (step S3102: YES), the process proceeds to step S3120. When input of the product has not been detected (step S3102: NO), the process proceeds to step S3103.

Step S3103: The portable terminal 60 judges whether a predetermined time has passed since the start of the reading operation. When the predetermined time has passed (step S3103: YES), the process proceeds to step S3120. When the predetermined time has not passed (step S3103: NO), the process returns to step S3101.

Step S3104: The portable terminal 60 judges whether input of the product into the shopping basket 80 has been detected, the same as in step S3102. When input of the product has been detected (step S3104: YES), the process proceeds to step S3120. When input of the product has not been detected (step S3104: NO), the present flowchart ends.

Step S3110: Following step S3101 (YES), the portable terminal 60 executes product registration processing (described later). The present flowchart then ends.

Step S3120: Following step S3102 (YES), step S3103 (YES), and step S3104 (YES), the portable terminal 60 executes reading failure processing (described later). The present flowchart then ends.

[Description of Flowchart in FIG. 37]

The flowchart in FIG. 37 is one example of the product registration processing (S3110) in FIG. 36.

Step S3111: The portable terminal 60 transmits product registration information to the TMS 20. The product registration information includes the product code acquired from the barcode read in step S3101, and a cart ID. The process then proceeds to step S3112.

Step S3112: The portable terminal 60 receives a registration complete notification transmitted from the TMS 20 in response to the transmission of the product registration information in step S3111. The process then proceeds to step S3113.

Step S3113: The portable terminal 60 updates the product registration screen as illustrated in, for example, FIG. 10C.

[Description of Flowchart in FIG. 38]

The flowchart in FIG. 38 is one example of the reading failure processing (S3120) in FIG. 36.

Step S3121: The portable terminal 60 judges whether a value of a rereading operation instructed flag is "1". The rereading operation instructed flag is information indicating whether the rereading operation (another reading operation) has been instructed. A value "0" of the rereading operation instructed flag indicates that an instruction for the rereading operation has yet to be carried out in the transaction, and the value "1" of the rereading operation instructed flag indicates that an instruction for the rereading operation has already been carried out in the transaction. When the value of the rereading operation instructed flag is "1", that is, when an instruction for the rereading operation has already been carried out in the transaction (step S3121 (YES)), the process proceeds to step S3124. When the value of the rereading operation instructed flag is "0", that is, when an instruction for the rereading operation has yet to be carried out in the transaction (step S3121 (NO)), the process proceeds to step S3122. The rereading operation instructed flag may be stored in the storage unit 602 of the portable terminal 60 (or within another device that may be referenced by the portable terminal 60. For example, the storage 202 of the TMS 20). When storing the rereading operation instructed flag within another device, the rereading operation instructed flag in each portable terminal 60 (or customer) may be stored within the other device so that each may be identified.

Step S3122: The portable terminal 60 sets the value of the rereading operation instructed flag to "1". The process then proceeds to step S3123.

Step S3123: The portable terminal 60 displays a message prompting the reading operation. The process then returns to step S3100 in FIG. 36.

Step S3124: The portable terminal 60 sets the value of the rereading operation instructed flag to "0". The process then proceeds to step S3125.

Step S3125: The portable terminal 60 displays a preset key on the touch panel 604. The customer is able to operate the preset key to register a product. Details of the preset key will be described below. The process then proceeds to step S3126.

Step S3126: The portable terminal 60 judges whether the preset key has been operated. In other words, the portable terminal 60 judges whether there was an operation for registering the product by the preset key. When the preset key is operated (step S3126: YES), the process returns to step S3110 (product registration processing) in FIG. 36 and FIG. 37. When the preset key has not been operated (step S3126: NO), the process proceeds to step S3127.

Step S3127: The portable terminal 60 judges whether a predetermined time has passed from the display (display start) of the preset key in step S3125. When the predetermined time has passed (step S3127: YES), the process proceeds to step S3130. When the predetermined time has not passed (step S3127: NO), the process returns to step S3126.

Step S3130: The portable terminal 60 determines the classification number of a held product (for example, a holding sub-classification number). For example, the portable terminal 60 may determine the holding sub-classification number as follows.

[Determination of Classification Numbers of Held Products (Holding Sub-Classification Number)]

(1) When the process transitions from step S3102 (YES) in FIG. 36 to the reading failure processing (step S3120), the holding sub-classification number is determined to be "22". That is, since input of the product is detected before the predetermined time has passed, the held product is judged to be a held product of the holding sub-classification number "22" (pseudo scan (short time)).

(2) When the process transitions from step S3103 (YES) in FIG. 36 to the reading failure processing (step S3120) and it is determined that there is a pseudo scan, the holding sub-classification number is determined to be "21". That is, when the reading operation is permitted until the predetermined time has passed and the performance is determined to be a pseudo scan, the held product is judged to be a held product of the holding sub-classification number "21" (pseudo scan (covered or the like)).

(3) When the process transitions from step S3103 (YES) in FIG. 36 to the reading failure processing (step S3120) and it is not determined that there is a pseudo scan, the holding sub-classification number is determined to be "23". That is, when the reading operation is permitted until the predetermined time has passed and the performance is determined to not be a pseudo scan, the held product is judged to be a held product of the holding sub-classification number "23" (barcode defect).

(4) When the process transitions from step S3104 (YES) in FIG. 36 to the reading failure processing (step S3120), the holding sub-classification number is determined to be "24". That is, since input of the product is detected without the start of the reading operation being recognized, the held product is judged to be a held product of the holding sub-classification number "24" (non-scan input).

A held product of the holding sub-classification number "21" (pseudo scan (covered or the like)) and a held product of the holding sub-classification number "23" (barcode defect) will be described further. Although either a held product of the holding sub-classification number "21" (pseudo scan (covered or the like) or a held product of the holding sub-classification number "23" (barcode defect) is determined according to whether there is a determination result regarding whether the reading operation of the customer until the predetermined time passes is a pseudo scan (specifically, pseudo scan such as covering), the portable terminal 60 may determine whether there is a pseudo scan as follows, for example.

The portable terminal 60 may determine whether there is a pseudo scan on the basis of a plurality of captured images during a period until a predetermined time passes (period until step S3103 (YES)).

(Determination Method 1)

When an image of at least one portion of the barcode is not captured (for example, when one portion is covered by a finger or the like) in a plurality of captured images during a period until a predetermined time has passed, or when the angle of the barcode is improper despite the barcode being placed in the image capture range of the camera 606, the portable terminal 60 determines that there is a pseudo scan, and when an image of the entire barcode is captured and the angle of the barcode is appropriate, the portable terminal 60 determines that there is no pseudo scan.

(Determination Method 2)

Instead of the determination method 1, even when an image of the entire barcode is captured and the angle of the barcode is appropriate in a plurality of captured images during a period until a predetermined time has passed, and the object in the plurality of captured images has not changed (for example, the object has not changed its angle or position by a predetermined amount or more) (that is, when there is no evidence of any reading attempt), the portable terminal 60 may determine that there is a pseudo scan. That is, when an image of the entire barcode is captured and the angle of the barcode is appropriate in a plurality of captured images during a period until a predetermined time has passed, and the object in the plurality of images has changed (that is, when there is evidence of any reading attempt), the portable terminal 60 may determine that there is no pseudo scan, and when this is not the case, the portable terminal 60 may determine that there is a pseudo scan.

As follows, the portable terminal 60 may judge (differentiate), in the processing in S3130, how the process transitioned to the reading failure processing (namely, whether the process transitioned to the reading failure processing from step S3102 (YES) in FIG. 36, transitioned to the reading failure processing from step S3103 (YES) in FIG. 36, or transitioned to the reading failure processing from step S3104 (YES) in FIG. 36). As one example, a different flag (value is set to 1) is set in the case of step S3102 (YES) in FIG. 36, the case of step S3103 (YES) in FIG. 36, and the case of step S3104 (YES) in FIG. 36, and in the processing in S3130, the portable terminal 60 may judge how the process transitioned to the reading failure processing on the basis of which flag is set.

Simply, different processing is carried out for each of determination processing of the holding sub-classification number when the process transitions from step S3102 (YES) in FIG. 36 to the reading failure processing, determination processing of the holding sub-classification number when the process transitions from step S3103 (YES) in FIG. 36 to the reading failure processing, and determination processing of the holding sub-classification number when the process transitions from step S3104 (YES) in FIG. 36 to the reading failure processing (that is, by branching the processing flow), the holding sub-classification number corresponding to each may be determined (granted) in each processing. That is, the holding sub-classification number may be determined to be "22" in the determination processing of the holding sub-classification number when the process transitions from step S3102 (YES) in FIG. 36 to the reading failure processing (referred to as classification number determination processing A), the holding sub-classification number may be determined to be "23" or "21" in the determination processing of the holding sub-classification number when the process transitions from step S3103 (YES) in FIG. 36 to the reading failure processing (referred to as classification number determination processing B), and the holding sub-classification number may be determined to be "24" in the determination processing of the holding sub-classification number when the process transitions from step S3104 (YES) in FIG. 36 to the reading failure processing (referred to as classification number determination processing C)

It is conceivable that the transition to the (first) reading failure processing before going through step S3123 in FIG. 38 and the transition to the (second) reading failure processing after going through step S3123 in FIG. 38 may be different. When the transition to the first reading failure processing and the transition to the second reading failure processing are different, the second transition (that is, the newer one) may be adopted and the holding sub-classification number may be determined. As one example, when the first transitions from step S3104 (YES) in FIG. 36 to the reading failure processing, and the second transitions from step S3102 (YES) in FIG. 36 to the reading failure processing (when the first is a non-scan and the second is short time), the transition of the second transition (transition from step S3102 (YES) in FIG. 36 to the reading failure processing) may be adopted and the holding sub-classification number may be determined to be "22".

Step S3131: Following step S3130, the portable terminal 60 acquires (extracts) a captured image corresponding to the reading failure state currently occurring from among the captured images captured by the camera 606. The process then proceeds to step S3132.

The captured image acquired by the portable terminal 60 in step S3131 will be described. The captured image acquired by the portable terminal 60 is to have the employee visually recognize the reading failure state that occurred. Therefore, the format of the captured image (moving image, static image) acquired by the portable terminal 60, the number of captured images, the time, period, and the like of the captured image to be acquired may differ depending on the reading failure state.

[Captured Image Acquired in Case of Held Product of Holding Sub-Classification Numbers "21" to "23"]

In the case of a held product of the holding sub-classification numbers "21" to "23" (that is, when reading operation of a barcode is performed), the portable terminal 60 acquires a captured image wherein the state of reading of the barcode may be recognized. That is, as described above, the camera 606 always performs image capture to recognize the reading operation of the barcode and input of the product into the shopping basket 80; however, these are temporarily stored while the portable terminal 60 extracts the captured image wherein the state of reading of the barcode may be recognized in step S3131. In the case of a held product of the holding sub-classification numbers "21" to "23" (that is, when the reading operation of a barcode is performed), the portable terminal 60 acquires (extracts) a captured image wherein input of the product into the shopping basket 80 may be recognized (image before and after input, or the like) in addition to a captured image wherein the state of reading of the barcode may be recognized.

[Captured Image Acquired in Case of Held Product of Holding Sub-Classification Number "24"]

In the case of a held product of the holding sub-classification number "24" (that is, when reading operation of a barcode is not performed), the portable terminal 60 acquires a captured image wherein input of the product into shopping basket 80 may be recognized (image before and after input, or the like). That is, as described above, the camera 606 always performs image capture to recognize the reading operation of the barcode and input of the product into the shopping basket 80; however, these are temporarily stored while the portable terminal 60 extracts the captured image wherein input of the product into the shopping basket 80 (image before and after input, or the like) may be recognized in step S3131.

Step S3132: The portable terminal 60 transmits reading failure information to the TMS 20. The reading failure information includes the captured image acquired in step S3131, the holding sub-classification number determined in step S3130, and the cart ID. The process then proceeds to step S3133.

Step S3133: The portable terminal 60 receives a registration complete notification transmitted from the TMS 20 in response to the transmission of the reading failure information in step S3132. The process then proceeds to step S3134.

Step S3134: The portable terminal 60 may, for example, update the product registration screen and display a guidance image WD2 superimposed thereon, as illustrated in FIG. 11C. The present flowchart then ends.

As illustrated in FIG. 36 to FIG. 38, after displaying a message prompting another reading operation, when reading of the barcode is not completed normally (not successful) (step S3102 (YES), step S3103 (YES)) despite recognizing the reading operation of the barcode, the portable terminal 60 displays the preset key (step S3125) in the reading failure processing (step S3120), and when registration of the product using the preset key is not carried out within a predetermined time (step S3127 (YES)), the product undergoes processing as a held product of the holding sub-classification numbers "21" to "23".

As illustrated in FIG. 36 to FIG. 38, after displaying a message prompting another reading operation, when input of the product is detected without recognizing the reading operation of the barcode (step S3104 (YES)), the portable terminal 60 displays the preset key (step S3125) in the reading failure processing (step S3120), and when registration of the product using the preset key is not carried out within a predetermined time (step S3127 (YES)), the product undergoes processing as a held product of the holding sub-classification number "24".

In the flowchart illustrated in FIG. 38, when the first reading is not successful, the second (another) reading is performed, and when the second reading is also not successful, the preset key is displayed; however, when the first reading is not successful, the preset key may be displayed without causing the second reading to be performed. For example, whether to cause the second reading to be performed may be changed according to the holding sub-classification number. As one example, in the case of non-scan input where the holding sub-classification number is "24", the preset key may be immediately displayed based on the operation or without the operation, without causing the second (another) reading to be performed.

[Description of Flowchart in FIG. 39]

Step S3201: The TMS 20 judges whether the product registration information transmitted by the portable terminal 60 is received in step S3111 in FIG. 37. When the product registration information is received (step S3201: YES), the process proceeds to step S3202. When the product registration information is not received (step S3201: NO), the process proceeds to step S3211.

Step S3202: TMS 20 judges whether the product was able to be specified. That is, the TMS 20 judges whether the product code included in the product registration information is stored in the product file (product master). When the product is able to be specified (step S3202: YES), the process proceeds to step S3203. When the product is not able to be specified (step S3202: NO), the process proceeds to step S3213.

Step S3203: TMS 20 specifies the cart information. That is, the TMS 20 specifies the cart information corresponding to the cart ID included in the product registration information. Then the process proceeds to step S3204.

Step S3204: The TMS 20 updates the cart information specified in step S3203. That is, the TMS 20 updates the registered product information (total, registered product N) in the cart information. Thus, one product is registered in the cart information. Then the process proceeds to step S3205.

Step S205: A TMS 20 transmits a registration complete notification to the portable terminal 60. The portable terminal 60 receives the registration complete notification in step S3112 of FIG. 37. The present flowchart then ends.

Step S3211: The TMS 20 judges whether the reading failure information transmitted from the portable terminal 60 is received in step S3132 in FIG. 38. When the reading failure information is received (step S3211: YES), the process proceeds to step S3213. When the reading failure information is not received (step S3211: NO), the present flowchart ends.

Step S3213: TMS 20 specifies the cart information. That is, the TMS 20 specifies the cart information corresponding to the cart ID included in the reading failure information. Then the process proceeds to step S3214.

Step S3214: The TMS 20 updates the cart information specified in step S3213. That is, the TMS 20 updates the held product information (total, held product N) in the cart information. One product (held product) is thereby registered in the cart information. Then the process proceeds to step S3215. The TMS 20 is able to reference information illustrating a relationship between a classification number and a holding sub-classification number (for example, information such as that illustrated in FIG. 35), and recognizes a classification number that is superior to the holding sub-classification number included in the reading failure information.

Step S3215: The TMS 20 transmits a registration complete notification to the portable terminal 60. The portable terminal 60 receives the registration complete notification in step S3133 in FIG. 38. The present flowchart then ends.

When it is not possible to specify the product (step S3202: NO), the TMS 320 registers a held product (NO-FILE) of classification number "1" when updating the cart information (step S3214).

When updating the cart information, the TMS 20 also registers a held product classified as the category number "3" (specified products); namely, a held product of the holding sub-classification number "31" (age confirmation product), a held product of the holding sub-classification number "32" (pharmaceutical product), and a held product of the holding sub-classification number "33" (security tag product). For example, the portable terminal 60, in the same manner as other products that are not applicable to a specified product, transmits product registration information for an age confirmation product (the same applies to pharmaceutical products and security tag products) (step S3111 of FIG. 37), and the TMS 20 may register the held product (specified product) in the processing in S3204 (or in the processing in S3214).

When updating the cart information, the TMS 20 similarly registers a held product classified as the classification number "4" (canceled product). For example, in cancellation processing (cancel processing. Not illustrated), the portable terminal 60 transmits the product registration information (product registration information including information to the effect that there is a cancellation. Also referred to as registration cancellation information), and the TMS 20 may register the held product (canceled product) in the processing in S3204 (or in the processing in S3214).

FIGS. 40A to 40D and FIGS. 41A to 41D are diagrams illustrating one example of the rereading instruction screen and the preset key screen (preset key sub-screen) according to one or more embodiments. The display and the like of the preset key will be described using FIG. 40A-40D and FIGS. 41A-41D.

FIGS. 40A to 40D illustrate a scenario where a certain customer K purchases one more bar of "○○ chocolate" from a state wherein one bag of "○○ crisps" and two bottles of "○○ tea" are secured.

FIG. 40A illustrates a scenario where one bag of "○○ crisps" and two bottles of "○○ tea" are registered (all readings are successful). In FIG. 40A, the portable terminal 60 captures an image of the inside of the shopping basket 80. An object of the "○○ crisps (reference numeral a) and an object of the "○○ tea" (reference numeral b) exist in the captured image in FIG. 40A. From the scenario in FIG. 40A, when the customer K performs the reading operation of the barcode of the "○○ chocolate" and inputs the "○○ chocolate" into the shopping basket 80 while in a state where reading is not successful (in the case of step S3102 (YES) or in the case of step S3103 (YES) in FIG. 36), the captured image immediately after input becomes as shown in FIG. 40B. The object of the "○○ crisps" (reference numeral a), the object of the "○○ tea" (reference numeral b), and an object of the "○○ chocolate" (reference numeral c) exist in the captured image in FIG. 40B.

Next, the portable terminal 60 displays a rereading instruction screen WD31 as illustrated in FIG. 40C (step S3123 in FIG. 38). A message to the effect that registration has failed (reference numeral d) and prompting reading operation (reference numeral e) is displayed on the rereading instruction screen WD31 in FIG. 40C. An OK button BT51 that is operated when performing another reading operation according to the foregoing message and a do not purchase button BT53 that is operated when stopping a purchase of the product (∘∘ chocolate) are disposed on the rereading instruction screen WD31 in FIG. 40C.

When the OK button BT51 is operated on the rereading instruction screen WD31, the rereading instruction screen WD31 is erased and, as in the flowchart illustrated in FIG. 38, the process returns to step S3100 in FIG. 36.

When the do not purchase button BT53 is operated on the rereading instruction screen WD31, the rereading instruction screen WD31 is erased, and although omitted from the flowchart illustrated in FIG. 38, cancellation processing (cancel processing. Not illustrated) is executed on the product and the processing is ended.

When reading is not successful in another reading operation in the same manner as the first, the portable terminal 60 displays the preset key screen WD41 as illustrated in FIG. 40D (step S3125 in FIG. 38).

A message to the effect that registration (reading) has failed (reference numeral d) and prompting selection of a product using a button (preset key) (reference numeral f) is displayed on the preset key screen WD41 in FIG. 40D. A plurality of preset keys BT60 and display switching buttons BT61 for the preset keys (a button for displaying the next plurality of preset keys BT60 and a button for displaying the previous plurality of preset keys BT60. Either one in the case of the first or last) are disposed on the preset key screen WD41 in FIG. 40D. A cannot select button BT62 that is operated when selection of the product (∘∘ chocolate) using the preset key is not possible because the preset key corresponding to the product (∘∘ chocolate) is not found, or the like, although there is an intention to purchase the product (∘∘ chocolate), and a do not purchase button BT63 that is operated when stopping a purchase of the product (∘∘ chocolate) are disposed on the preset key screen WD41 in FIG. 40D.

When any preset key BT60 is operated on the preset key screen WD41, the preset key screen WD41 is erased and, as in the flowchart illustrated in FIG. 38, the process returns to step S3110 (product registration processing) in FIG. 36 and FIG. 37. The product corresponding to the operated preset key BT60 is thereby registered. Specifically, in the present example, the preset key BT60 corresponding to the ∘∘ chocolate is operated on the preset key screen WD41. The portable terminal 60 acquires the product code of the ∘∘ chocolate on the basis of the operation of the preset key BT60 corresponding to the ∘∘ chocolate. When the product code of the chocolate ∘∘ is acquired on the basis of the operation of the preset key BT60 corresponding to the ∘∘ chocolate, the portable terminal 60 executes product registration processing (step S3110) and registers the ∘∘ chocolate, the same as when reading of the barcode attached to the ∘∘ chocolate is successful (that is, when the product code of the ∘∘ chocolate is acquired by reading of the barcode).

When the display switching button BT61 is operated on the preset key screen WD41, the preset key BT60 displayed on the preset key screen WD41 is switched. That is, the portable terminal 60 switches the preset key BT60 displayed on the preset key screen WD41 on the basis of the operation of the display switching button BT61.

When the cannot select button BT62 is operated on the preset key screen WD41, the preset key screen WD41 is erased, and although omitted from the flowchart illustrated in FIG. 38, the process proceeds to step S3130. That is, the product (∘∘ chocolate) undergoes processing as a held product in the same manner as when the predetermined time has passed (step S3127 (YES)).

When the do not purchase button BT63 is operated on the preset key screen WD41, the preset key screen WD41 is erased, and although omitted from the flowchart illustrated in FIG. 38, cancellation processing (cancel processing. Not illustrated) is executed on the product and the processing is ended.

FIGS. 41A-41D illustrate a scenario where the certain customer K purchases one more "apple" from a state wherein one bag of "∘∘ crisps" and two bottles of "∘∘ tea" are secured. A barcode is not attached to the "apple".

Figure 41A:
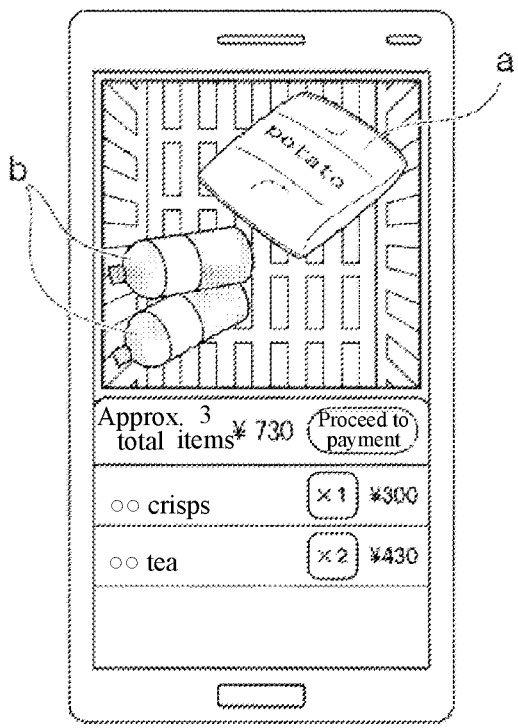
FIGS. 41A to 41D are diagrams illustrating one example of the rereading instruction screen and the preset key screen according to one or more embodiments.
Figure 41B:
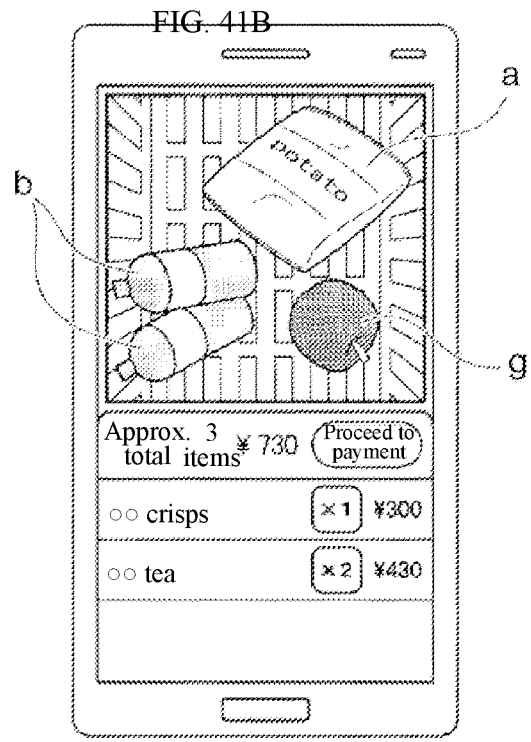

FIG. 41A illustrates a scenario where one bag of "∘∘ crisps" and two bottles of "∘∘ tea" are registered (all readings are successful), the same as in FIG. 40A. From the scenario of FIG. 41A, when the customer K inputs the "apple" in the shopping basket 80 (in the case of step S3104 (YES) in FIG. 36), the captured image immediately after input becomes as illustrated in FIG. 41B. The object of the "∘∘ crisps" (reference numeral a), the object of the "∘∘ tea" (reference numeral b), and an object of the "apple" (reference numeral g) exist in the captured image in FIG. 41B.

Figure 41C:
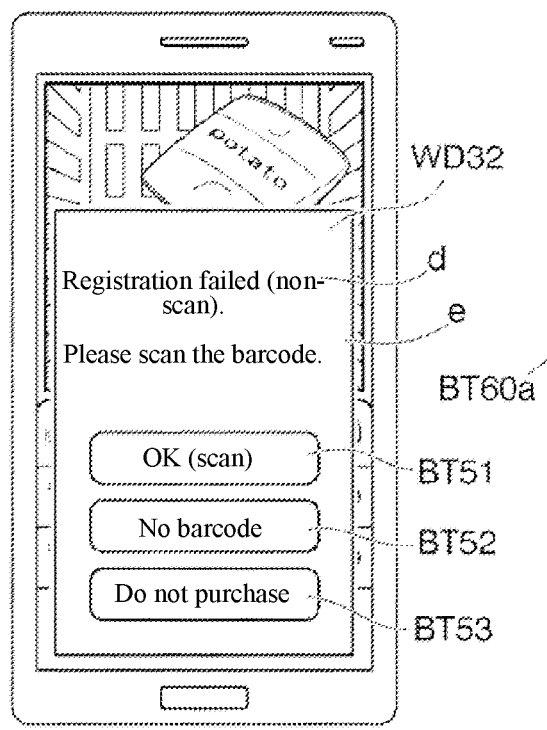

Next, the portable terminal 60 displays a rereading instruction screen WD32 as illustrated in FIG. 41C (step S3123 in FIG. 38). A message to the effect that registration has failed (reference numeral d) and prompting the reading operation (reference numeral e) is displayed on the rereading instruction screen WD32 in FIG. 41C. In the case of a product sold separately, such as a fruit or vegetable, a label having a barcode attached is put on a display stand and this may be scanned and the number thereof input via the app. When the foregoing label is installed, a message prompting the reading operation of the barcode of the label may be displayed. The OK button BT51 that is operated when performing the reading operation according to the foregoing message, a no barcode button BT52 that is operated when a barcode is not attached to the product (apple), and the do not purchase button BT53 that is operated when stopping a purchase of the product (apple) are disposed on the rereading instruction screen WD32 in FIG. 41C.

When the rereading instruction screen WD31 in FIG. 40C and the rereading instruction screen WD32 in FIG. 41C are compared, because FIGS. 40A-40D are a scenario where reading of the barcode failed (a scenario where the existence of the barcode was able to be confirmed), the no barcode button BT52 existing on the rereading instruction screen WD32 in FIG. 41C is not disposed on the rereading instruction screen WD31 in FIG. 40C.

When the OK button BT51 is operated on the rereading instruction screen WD32, the rereading instruction screen WD32 is erased and, as in the flowchart illustrated in FIG. 38, the process returns to step S3100 in FIG. 36. In the example in FIGS. 41A-41D, because a barcode is not attached to the apple, the customer K does not operate the OK button BT51. Supposing that a barcode is attached to the apple, the customer K may operate the OK button BT51.

When the no barcode button BT52 is operated on the rereading instruction screen WD32, the rereading instruction screen WD32 is erased, and although omitted from the flowchart illustrated in FIG. 38, the process proceeds to step S3124 in FIG. 38. That is, when a barcode is not attached to the product, even if the process returns to step S3100 in FIG. 36, reading does not succeed even if the reading operation is performed; therefore, the process simply proceeds to step S3124 in FIG. 38.

When the do not purchase button BT53 is operated on the rereading instruction screen WD32, the rereading instruction screen WD32 is erased, and although omitted from the flowchart illustrated in FIG. 38, cancellation processing (cancel processing. Not illustrated) is executed on the product and the processing is ended.

Figure 41D:
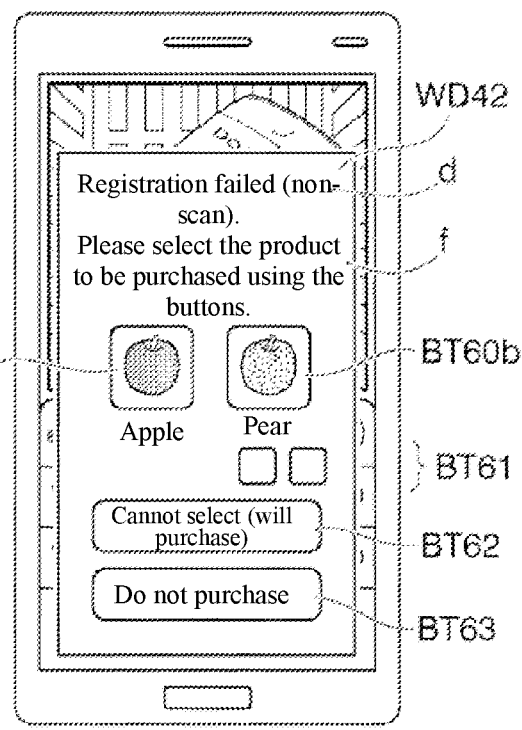

On the basis of the operation of the no barcode button BT52, the portable terminal 60 displays the preset key screen WD42 as illustrated in FIG. 41D (step S3125 in FIG. 38). Supposing that the OK button BT51 is operated when a barcode is attached to the apple, even when the same result as the first reading occurs in another reading operation, the portable terminal 60 displays the preset key screen WD42 as illustrated in FIG. 41D (step S3125 in FIG. 38).

A message to the effect that registration (reading) has failed (reference numeral d) and prompting selection of a product using a button (preset key) (reference numeral f) is displayed on the preset key screen WD42 in FIG. 41D. A plurality of preset keys BT60 (a preset key BT60a corresponding to an apple and a preset key BT60b corresponding to a pear) and display switching buttons BT61 for the preset keys are disposed on the preset key screen WD42 in FIG. 41D. The cannot select button BT62 that is operated when selection of the product (apple) using the preset key is not possible because the preset key corresponding to the product (apple) is not found or the like although there is an intention to purchase the product (apple), and a do not purchase button BT63 that is operated when stopping a purchase of the product (apple) are disposed on the preset key screen WD42 in FIG. 41D.

When the preset key BT60a corresponding to the apple, for example, is operated on the preset key screen WD42, the preset key screen WD42 is erased and, as in the flowchart illustrated in FIG. 38, the process returns to step S3110 (product registration processing) in FIG. 36 and FIG. 37. The apple corresponding to the operated preset key BT60a is thereby registered.

When the display switching button BT61 is operated on the preset key screen WD42, the preset key BT60 displayed on the preset key screen WD42 is switched. That is, the portable terminal 60 switches the preset key BT60 displayed on the preset key screen WD42 on the basis of the operation of the display switching button BT61.

When the cannot select button BT62 is operated on the preset key screen WD42, the preset key screen WD42 is erased, and although omitted from the flowchart illustrated in FIG. 38, the process proceeds to step S3130. That is, the product (apple) undergoes processing as a held product in the same manner as when the predetermined time has passed (step S3127 (YES)).

When the do not purchase button BT63 is operated on the preset key screen WD42, the preset key screen WD42 is erased, and although omitted from the flowchart illustrated in FIG. 38, cancellation processing (cancel processing. Not illustrated) is executed on the product and the processing is ended.

[Preset Keys Displayed]

The preset keys displayed on a preset key screen WD41 (WD42) will be described. The portable terminal 60 may display a preset key according to, for example, one of the following display modes 1 to 4.

(Display Mode 1)

The portable terminal 60 displays preset keys for all products, for example. Specifically, as illustrated on the preset key screen WD41 in FIG. 40D, the portable terminal 60 displays preset keys for part of a plurality of products among all products and displays part of the plurality of preset keys of the others according to the operation of the display switching button BT61.

In the display mode 1, the number of preset keys to be displayed increases greatly. Accordingly, there is a possibility that the customer is unable to select a preset corresponding to the product to be purchased. In such a case, the customer may operate, for example, the cannot select button BT62 to allow processing to progress.

(Display Mode 2)

The portable terminal 60 displays a preset key for a specific product. Specifically, as illustrated on the preset key screen WD42 in FIG. 41D, the portable terminal 60 displays a preset key for a specific product and does not display a preset key for another product. The specific product may be a product sold separately, such as a fruit or vegetable (regardless of whether a barcode is attached). In other words, the specific product may be a product having a predetermined sales method (for example, sold separately). The specific product may be a product without a barcode attached (regardless of whether it is a product sold separately).

In the display mode 2, the displayed preset key is a preset corresponding to the specific product both when registering the specific product and when registering a product other than the specific product. That is, the preset key corresponding to the product to be purchased is displayed when registering the specific product (specific product); however, the preset key corresponding to the product to be purchased when registering a product other than the specific product (product other than the specific product) is not displayed. Accordingly, in the latter case, the customer operates, for example, the cannot select button BT62. A button for displaying the preset key of a product other than the specific product is disposed, and in the case of the latter, the button for displaying the preset key of a product other than the specific product may be operated to display the preset key of a product other than the specific product.

(Display Mode 3)

The portable terminal 60 displays a preset key according to a position in the store (the position of the portable terminal 60 or the position of the customer using the portable terminal 60). Specifically, the portable terminal 60 captures (specifies and estimates) the position of each customer (portable terminal 60) in the store by GPS, wireless LAN, wireless tag, beacon, or the like, and displays a preset key according to the captured position. For example, when the captured position is a section for alcoholic beverages, a preset key relating to alcoholic beverages may be displayed, and when the captured position is a section for daily necessities, a preset key relating to daily necessities may be displayed. The preset key corresponding to the captured position may be preferentially displayed (the preset key corresponding to the captured position may be displayed on a first page, and other preset keys may be displayed according to the operation).

(Display Mode 4)

The portable terminal 60 may determine the preset key to be displayed on the basis of image recognition. That is, a preset key narrowed down from among many preset keys may be displayed on the basis of image recognition. For example, when there is a round, red product, an apple or the like may be displayed as illustrated on the preset key screen WD42 in FIG. 41D.

Display modes 1 to 4 may be combined as appropriate. Which of the display modes 1 to 3 is adopted may be varied according to the customer.

[After Checkout Transition Instruction]

The customer, when completing registration of all the products to be purchased, performs a checkout transition instruction operation, causing the self-checkout machine 40 to read the two-dimensional code displayed on the portable terminal 60. The self-checkout machine 40 that read the two-dimensional code requests the TMS 20 to calculate the subtotal amount as illustrated in FIG. 9 as step S313. Here, when requesting calculation of the subtotal amount, the self-checkout machine 40 of one or more embodiments requests checkout information used for checkout processing using the checkout screen.

The TMS 20 specifies the applicable cart information in response to the request for the checkout information and generates the checkout information on the basis of the specified cart information. The checkout information includes various information in the cart information (for example, a portion or all of the registered product information, held product information, cancellation information, and the like). For example, the checkout information includes image data (captured images) as information relating to the held product information. The TMS 20 transmits the generated checkout information to the self-checkout machine 40. When the checkout information is received, the self-checkout machine 40 causes the display 405 to display the checkout screen whereon the content of the received checkout information is reflected.

The display 405 of the self-checkout machine 40 according to one or more embodiments, for example, displays the checkout screen illustrated in FIG. 13.

A held product processing screen AR4 for canned beer, which is an age confirmation product, according to one or more embodiments is the screen illustrated in FIG. 38.

The held product processing screen AR4 that is displayed in response to operating the call button BT31 displayed as "Unscanned" and is for processing the registration failure product according to one or more embodiments is the screen displayed in FIG. 39, for example.

In response to the captured image magnification operation having been performed according to one or more embodiments, as illustrated in FIGS. 40A-40D, the self-checkout machine 40 disposes a magnified captured image area AR431 on the held product processing screen AR4.

Furthermore, the held product processing screen AR4 is the screen in FIGS. 41A-41D, for example, when a reading failure product is classified as a "pseudo scan" according to one or more embodiments.

Figure 19:
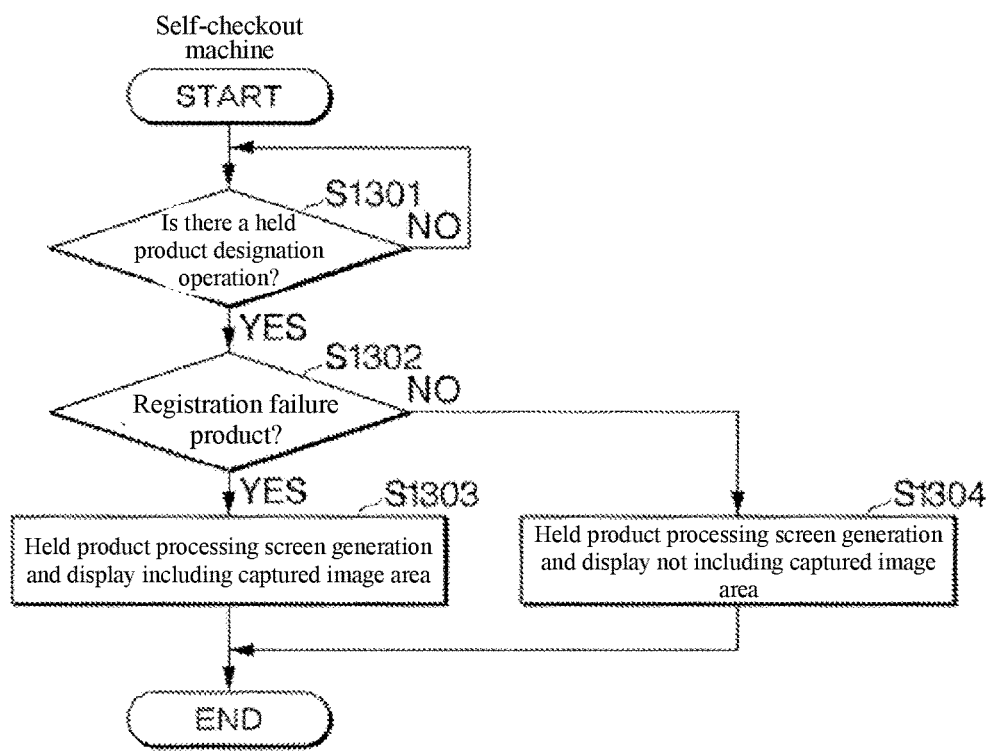
FIG. 19 is a flowchart illustrating a processing procedure example executed by the self-checkout machine in relation to a display of the held product processing screen according to one or more embodiments.

A processing procedure executed by the self-checkout machine 40 in relation to the display of the held product processing screen according to one or more embodiments is the same as the procedure illustrated in FIG. 19, for example.

<Variation>

A variation of the third example will be described below.

The portable terminal 60 may be held by the customer without being placed in the shopping cart 70 to perform product registration. In this case, input of the product into the shopping cart 70 may be detected. For example, a device (terminal) provided with image capture means capable of detecting the input of the product into the shopping basket 80 (shopping bag 90) may be installed, and a device provided with weighing means capable of detecting the input of the product into the shopping basket 80 (shopping bag 90) may be installed. Even in a mode where the input of the product into the shopping cart 70 is not detected (a mode where a device other than the portable terminal 60 is not used), the portable terminal 60 is not able to execute the transition to the reading failure processing from step S3102 (YES) in FIG. 36, which is related to product input, but is able to execute the transition to the reading failure processing from step S3103 (YES) in FIG. 36, which is unrelated to product input. That is, a held product of the holding sub-classification number "21" (pseudo scan (covered or the like)) or a held product of the holding sub-classification number "23" (barcode defect) may be recognized.

In the foregoing embodiments, an example is described wherein the preset key is displayed in the second reading failure state without displaying the preset key in the first reading failure state (FIG. 38); however, the preset key may be displayed in the first reading failure state. For example, in FIG. 38, there is no need for the processing ins S3121 to S3124. Alternatively, without displaying the preset key in the reading failure state up to Nth (N is an integer of 2 or more), the preset key may be displayed in the (N+1)th reading failure state. In this case, a counter for counting the number of times of reading after the reading failure state may be used instead of a flag indicating the presence or absence of reading after the reading failure state (rereading operation instructed flag). The number of times (0 times or more) until the preset key is displayed may be varied according to the customer. For example, past purchase results, the number of occurrences of the reading failure state, or the like are stored for each customer, and the number of times (0 times or more) until the preset key is displayed may be varied according to the past purchase results, the number of occurrences of the reading failure state, or the like. The number of times (0 times or more) until the preset key is displayed may be varied according to the type of product instead of or in addition to the customer.

In the foregoing embodiments, no particular distinction is made between a product registered by reading of the barcode and a product registered using the preset key; however, a product registered by reading of the barcode and a product registered using the preset key may be stored and output (displayed or the like) to allow distinction. For example, a product registered by the reading of the barcode and a product registered using the preset key may be stored for each product in the cart information (registered product N) to allow distinction. For example, information to the effect that there is a product registered using the preset key regarding the product registered using the preset key may be stored. A product registered by reading of the barcode and a product registered using the preset key may be stored in the cart information (registered product information (total)) to allow distinction. For example, a breakdown (number of items, approximate subtotal amount, or the like) of the product registered using the preset key may be stored. The portable terminal 60 may display a product registered by reading of the barcode and a product registered using the preset key to allow distinction in a registered product list such as that illustrated in FIG. 10C, for example. For example, the portable terminal 60 may display in the registered product list information to the effect that there is a product registered using the preset key regarding the product registered using the preset key. The self-checkout machine 40 may display a product registered by reading of the barcode and a product registered using the preset key to allow distinction on the checkout screen such as that illustrated in FIG. 18, for example. For example, the self-checkout machine 40 may display on the checkout screen information to the effect that there is a product registered using the preset key regarding a product registered using the preset key.

In the foregoing embodiments, the portable terminal 60 detects the reading failure state indicating that a product for which the product code has not been read has been secured (input into the shopping basket 80 (shopping bag 90)) by a customer. However, another device (for example, a transaction state management device 50, a store controller 100, the TMS 20, or the like) may detect the reading failure state instead of the portable terminal 60. A mode where the transaction state management device 50 (the same as the case of the store controller 100 and the TMS 20) detects the reading failure state may be realized as follows, for example. The portable terminal 60 notifies the transaction state management device 50 to the effect that the product code is read and to the effect that the product is input into the shopping basket 80 at respective timings. The transaction state management device 50 judges that the reading failure state has occurred (that is, detects the reading failure state) when there is a notification to the effect that the product has been input into the shopping basket 80 regardless of there being no notification to the effect that the product code has been read from the portable terminal 60. When the reading failure state is detected, the transaction state management device 50 (the same as the case of the store controller 100 and the TMS 20) notifies the portable terminal 60 to the effect that the reading failure state has occurred. The portable terminal 60 executes the reading failure processing (FIG. 38) when the transaction state management device 50 (the same as the case of the store controller 100 and the TMS 20) notifies to the effect that the reading failure state has occurred.

In the foregoing embodiments, the camera 606 of the portable terminal 60 is used for both reading of the product code and judging of the input of the product; however, the camera 606 does not necessarily need to be used for both. For example, a device provided with image capture means capable of detecting the input of a product into the shopping basket 80 (shopping bag 90) may be installed (for example, installed in an individual shopping cart 70, installed on the ceiling or the like of the store, or the like). That is, the product code may be read using the camera 606 of the portable terminal 60, and the input of the product may be detected using a device installed in the shopping cart 70, or the ceiling or the like of the store.

In the foregoing embodiments, input of the product is judged by the camera 606 (captured image); however, there is no need to judge by a captured image. For example, a weighing device capable of detecting the input of the product into the shopping basket 80 (shopping bag 90) (for example, installed in an individual shopping cart 70, or the like) may be used instead of or in addition to the image capture means.

In the foregoing embodiments, in the case of reading failure, the message prompting reading is displayed for any classification of the holding sub-classification numbers "21" to "24", and the preset key is displayed during another reading failure; however, control may be varied according to the classification. For example, in the case of a certain holding sub-classification number (for example, the holding sub-classification number "24"), the preset key may be displayed without displaying the message prompting reading, and in the case of the other holding sub-classification numbers (for example, the holding sub-classification numbers "21" to "23"), the preset key may be displayed after displaying the message prompting reading. Furthermore, for example, in the case of a certain holding sub-classification number (for example, the holding sub-classification number "24"), the preset key may be displayed (the message prompting reading may be displayed, or the message prompting reading need not be displayed), and in the case of the other holding sub-classification numbers (for example, the holding sub-classification numbers "21" to "23"), a held product may be set without displaying the preset key (the message prompting reading may be displayed, or the message prompting reading need not be displayed). Processing corresponding to the state (reading failure state) may thereby be executed. In the case of the foregoing mode (when the processing is varied for each classification of held products), the processing for determining the holding sub-classification number of a held product (step S3130 of FIG. 38) may be executed closer to the beginning (for example, the first part of the reading failure processing (S3120)). "A certain holding sub-classification number" is set as holding sub-classification number "24", and "the other holding sub-classification numbers" are set as holding sub-classification numbers "21" to "23"; however, the combination of "a certain holding sub-classification number" and "the other holding sub-classification numbers" is not limited to this. There may be a set of 3 to 5 rather than a set of 2 such as "a certain holding sub-classification number" and "the other holding sub-classification numbers".

In the foregoing embodiments, the portable terminal 60 displays the preset key (candidate product); however, another device (for example, the self-checkout machine 40, the registration and checkout device 30, or the like) may display the preset key (candidate product) instead of or in addition to the portable terminal 60. For example, the preset key (candidate product) may be displayed for each of the held products (held products of the holding sub-classification numbers "21" to "24") on the self-checkout machine 40 without displaying the preset key on the portable terminal 60. Furthermore, for example, when the preset key (candidate product) is displayed on the portable terminal 60 and registration using the preset key is not carried out (that is, when there is a held product), the preset key (candidate product) may be displayed for each of the held products (held products of the holding sub-classification numbers "21" to "24") on the self-checkout machine 40.

All or part of each function (input and output, storage, processing (including judging)) in each of the devices described in the foregoing (store controller 100, TMS 20, registration checkout measures 30, self-checkout machine 40, transaction state management device 50, portable terminal 60, or the like) may be realized in another device different from the devices described as the execution subject of the function. For example, the TMS 20, the store controller 100, or the self-checkout machine 40 may execute at least part of the processing described using the left column of the sequence diagram in FIG. 9 or at least part of the processing described using the flowcharts in FIG. 36 to FIG. 39 as the processing of the portable terminal 60 instead of the portable terminal 60. The TMS 20, the store controller 100, or the portable terminal 60 may execute at least part of the processing described using the middle column of the sequence diagram in FIG. 9 instead of the self-checkout machine 40 as the processing of the self-checkout machine 40.

In relation to the foregoing, the portable terminal 60 may function as a so-called thin-client specialized for an interface for input and output with regard to the present shopping service (registration of the product described in the sequence diagram in FIG. 9 or the flowcharts in FIG. 36 to FIG. 39, or the like). For example, the portable terminal 60 does not execute a shopping application (installation to the portable terminal 60 is also unnecessary), and an external device (may be the TMS 20 or another cloud server) may execute the shopping application. That is, the portable terminal 60 may accept various inputs (operation of the customer, detection by a device such as a camera), transmit input information (operation information, image information, or the like) to an external device, receive a processing result (update screen information, control information of a device, or the like) of the external device based on the input information, and perform various outputs (display on a display unit, control of a device). Another device (the self-checkout machine 40 or the like) may also function as the thin-client instead of or in addition to the portable terminal 60.

In the SCS 1 according to one or more embodiments, the portable terminal 60 is used for product registration according to an operation of the customer in the store. The SCS 1 is provided with reading means (a reader) for reading a product code; acquisition means (a receiver) for acquiring (receiving) product information corresponding to a product code read by the reading means; detection means (an additional detector) for detecting the reading failure state indicating that the customer has secured a product for which a product code has not been read by the reading means (for example, the product for which the product code has not been read is input in the shopping basket 80 (shopping bag 90)) (for example, the processing in S3102 in FIG. 36); and display means (an additional display) for displaying the candidate product in a selectable manner when the reading failure state is detected by the detection means (for example, the display in FIG. 40D and FIG. 41D), wherein the acquisition means acquires product information of the candidate product selected by a selection operation of the customer.

According to the foregoing configuration, it is possible to appropriately deal with a problem arising when a customer registers a product themselves. For example, it is possible to appropriately deal with a problem relating to the state of a barcode, also including the presence or absence of a barcode, or various problems such as misreading of a barcode by a customer, fraudulence, or the like. Misreading of a barcode by a customer or fraudulence is where, for example, the barcode of the product is not able to actually be read even if intending to do so, or that the product is intentionally input into the shopping basket without causing the barcode to be read due to malicious intent.

For example, in a system wherein the customer registers a product themselves, it is preferable to affix a barcode on a product sold separately, such as a fruit or vegetable, in the same manner as with other products. This is because the customer is able to register the product by reading the barcode attached to the product as with other products, even for a product sold separately or the like. However, there is a possibility that reading becomes difficult as a result of wrinkling of the affixed barcode arising due to the shape or the like of the product. In the first place, the work of affixing a barcode to a product sold separately or the like is in itself a burden on the store side.

According to the foregoing configuration, the candidate product is displayed when reading of the barcode reading fails due to, for example, wrinkling or the like. According to the foregoing configuration, for example, the candidate product is displayed even when reading of the barcode is not carried out because the barcode is not attached. Accordingly, there is no problem even if the barcode affixed to a product sold separately or the like has wrinkling, and furthermore, the work of affixing the barcode to the product sold separately or the like in itself may be omitted, and the burden thereof may be eliminated.

When the customer is unfamiliar with the reading of a barcode, or the reading operation of the customer is inappropriate, reading will fail, and it is possible that an unread product will be placed in the basket. There is also the possibility that reading of the barcode is inadvertently forgotten, and the unread product is placed in the basket. Moreover, there may be customers who will intentionally cause reading of the barcode to fail or who will put the product into the basket without performing reading.

According to the foregoing configuration, when reading of a barcode fails or when a product is input into the basket without performing reading of the barcode, the candidate product is displayed, no matter the state. Accordingly, taking out an unregistered product (so-called basket removal) may be prevented or suppressed regardless of good intention or bad intention.

A product that is not registered at the registration stage of the product in the shop undergoes processing at the checkout stage as a so-called held product; however, when the number of held products increases, the number of operations for held products at the checkout stage increases and becomes a burden.

According to the foregoing configuration, when reading of a barcode fails or when a product is input into the basket without performing reading of the barcode, the candidate product is displayed and one selected held product is registered. Accordingly, the number of products that become held products at the registration stage decreases, the number of operations at the checkout stage decreases, and the burden decreases.

The display means that the SCS according to one or more embodiments is provided with displays information prompting the product code to be reread before displaying the candidate product when the reading failure state is detected by the detection means (for example, the display in FIG. 40C and FIG. 41C or the like), does not display the candidate product when the reading means is successful in rereading the product code, and displays the candidate product when the reading means fails to reread the product code.

According to the foregoing configuration, a suitable candidate product may be displayed to the customer. That is, according to the foregoing configuration, because a candidate product is displayed at the time of detection of another reading failure state without displaying the candidate product at the time of detection of the first reading failure state—for example, when there is an unexpected reading failure state—the customer is prompted for another reading, registration is performed by the original (normal) registration method wherever practicable (also means that the customer is informed), and registration from the candidate product may be performed as needed, such as when performing registration again and it does not work, or the like.

The SCS according to one or more embodiments is provided with held product determination means (a controller) for determining, when there is no selection operation for a candidate product after detection of the reading failure state, that the product that caused the reading failure state to occur (for example, a reading failure product) is a held product for which checkout is put on hold at the time of checkout (processing is briefly held for confirmation or the like by the employee during checkout), wherein the held product determination means determines, when there is a selection operation for a candidate product after detection of the reading failure state, that the product that caused the reading failure state to occur is not the held product.

According to the foregoing configuration, it is possible to appropriately determine whether the reading failure product is a held product according to the presence or absence of a selection operation for a candidate product.

The acquisition means that the SCS according to one or more embodiments is provided with acquires, when there is a selection operation for a candidate product after detection of the reading failure state, product information of the candidate product selected by the selection operation is acquired as product information of the product that caused the reading failure state to occur; and acquires, when there is no selection operation for a candidate product after detection of the reading failure state, information used for detection of the reading failure state as information relating to the held product (for example, a captured image).

According to the foregoing configuration, it is possible to acquire information according to the presence or absence of a selection operation according to the presence or absence of a selection operation for a candidate product. That is, when there is a selection operation for a candidate product, the product information of the candidate product may be acquired assuming that the selection operation is correct, and when there is no selection operation for the candidate product, a captured image or the like may be acquired as information relating to a held product.

When there is no selection operation for a candidate product after the detection of the reading failure state, information relating to the reading failure state (for example, the holding sub-classification number or the like) may be acquired instead of or in addition to the information used for the detection of the reading failure state.

When the detection means that the SCS according to one or more embodiments is provided with detects the reading failure state, a product of a predetermined sales method (for example, sold separately) is displayed in a selectable manner as a candidate product.

According to the foregoing configuration, a suitable candidate product may be displayed. For example, according to the foregoing configuration, when the reading failure state is likely to arise for a product of a predetermined sales method, a suitable product (product where a reading failure state is likely to arise) may be displayed as a candidate product.

When the detection means that the SCS according to one or more embodiments is provided with detects the reading failure state, a product according to the position of the customer in the store is displayed in a selectable manner as a candidate product.

According to the foregoing configuration, a suitable candidate product may be displayed. For example, according to the foregoing configuration, when the reading failure state is detected near a certain display shelf, a suitable product (product put on display on the display shelf) may be displayed as a candidate product.

The SCS according to one or more embodiments is provided with image capture means for capturing an image of a secured product secured by the customer, wherein the image capture means is capable of capturing an image of the reading operation whereby the customer reads the product code in addition to the secured product, the reading means reads the product code from the captured image of the reading operation, and the detection means detects the reading failure state on the basis of a change in the captured image of the secured product.

According to the foregoing configuration, realization is easily possible using the image capture means.

The portable terminal that the SCS according to one or more embodiments is provided with includes reading means for reading a product code; acquisition means for acquiring product information corresponding to the product code read by the reading means; detection means for detecting the reading failure state indicating that the customer has secured a product for which a product code has not been read by the reading means; and display means for displaying a candidate product in a selectable manner when the reading failure state is detected by the detection means; wherein the acquisition means acquires product information of the candidate product selected by a selection operation of the customer.

A method executed by the portable terminal that the SCS according to one or more embodiments is provided with reads the product code, acquires product information corresponding to the read product code, detects the reading failure state indicating that the customer has secured a product for which a product code has not been read by the reading means, and displays a candidate product in a selectable manner when the reading failure state is detected. The method acquires product information of a candidate product selected by a selection operation of the customer.

The SCS 1 according to one or more embodiments is provided with the portable terminal 60 for performing product registration, and the self-checkout machine 40 for checkout processing corresponding to a product registered by the portable terminal. The SCS is provided with image capture means (for example, the camera 606) provided to enable image capture of a state relating to registration of a product by the customer, detection means for detecting a predetermined reading failure state where registration (reading) of the product is considered to have failed during a period in which registration of the product in response to a single transaction is performed, and display control means for displaying a captured image (for example, the captured image in the captured image area AR43) corresponding to the reading failure state detected by the detection means on the basis of the captured image obtained by the image capture means when the checkout device performs checkout of the product registered in response to the single transaction.

According to the foregoing configuration, when the reading failure state occurs while the customer is registering a product using the portable terminal 60, an image of the reading failure state may be displayed. This allows, for example, the prevention of the reading failure state (for example, prevention of fraudulent acts in product registration) or the accurate handling of a product corresponding to the reading failure state when the customer registers the product themselves.

The display control means that the SCS of one or more embodiments is provided with displays a plurality of captured images corresponding to a predetermined period before and after the product is input into a product input unit (for example, the shopping basket 80) when the product is input into the product input unit without the information of the product being read as classification of the reading failure state (in the case of non-scan input).

According to the foregoing configuration, when the classification of the reading failure state is non-scan input (in the case of a held product of holding sub-classification number "24"), a captured image may be displayed of the contents of the shopping basket 80 during a period from before the target product is input until it is input. A state transition of the contents of the shopping basket 80 when there is a non-scan input may thereby be accurately ascertained.

The SCS according to one or more embodiments carries out display so as to show a portion that differs from other captured images in a predetermined captured image from among the plurality of captured images.

According to the foregoing configuration, the frame FL showing a portion of a product additionally input may be disposed in a captured image wherein an image of the additionally input product is captured from among the plurality of captured images displayed when the classification of the reading failure state is non-scan input. The additionally input product may thereby be immediately ascertained.

The display control means that the SCS according to one or more embodiments is provided with displays captured images having different imaging targets according to the classification of the reading failure state (holding sub-classification numbers "21" to "24") detected by the detection means.

According to the foregoing configuration, displaying a captured image wherein an image of the imaging target corresponding to the classification of the reading failure state is captured makes it possible to display an accurate captured image as evidence in response to the reading failure state.

The display control means that the SCS according to one or more embodiments is provided with displays a captured image of when an operation for causing reading of the information of a product is performed when in the reading failure state due to a classification that reading of the information of the product was not successful (in the case of a held product of holding sub-classification numbers "21" to "24").

According to the foregoing configuration, in the case where, for example, there is a pseudo scan, barcode defect, or the like, when determined as the reading failure state, it is possible to display a captured image obtained by capturing an image of the product falling within the image capture range of the camera 606. In the case of a pseudo scan, barcode defect, or the like, it is thereby possible to specify a product where reading of the barcode should have been performed.

The display control means that the SCS according to one or more embodiments is provided with displays a screen on which the checkout device carries out processing of a held product as a reading failure product (for example, the held product processing screen AR4) together with a captured image captured corresponding to the reading failure product.

According to the foregoing configuration, when the held product is a reading failure product, it is possible to display the captured image area AR43 together with the held product processing screen AR4 that is displayed for an operation where the employee processes the held product. The employee is thereby capable of appropriately processing the held product as a reading failure product.

The portable terminal 60 that the SCS according to one or more embodiments is provided with includes image capture means provided to enable image capture of a state relating to registration of a product by the customer, detection means for detecting a predetermined reading failure state where registration (reading) of the product is considered to have failed during a period in which registration of the product in response to a single transaction is performed, and display control means for displaying product information of the registered product and a captured image (for example, the product registration screen) obtained by image capture via the image capture means, and performing display relating to the detected reading failure state (for example, the guidance image WD2) in response to the reading failure state having been detected by the detection means.

According to the foregoing configuration, in response to the occurrence of the reading failure state, the portable terminal 60 performs display related to the reading failure state. The customer is thereby able to ascertain that there is a reading failure state. Moreover, a suppressing effect is obtained with respect to customers intending to commit a fraudulent act.

Fourth Example

In a system wherein a customer registers a product themselves using a portable terminal, a fraudulent act by the customer may be determined during registration of the product. However, depending on the state of the product registration, there are cases where a fraudulent act is determined regardless of whether the customer is performing work related to registration according to the proper procedure. An SCS according to one or more embodiments enables suitable determination of a fraudulent act according to the state of the customer in product registration.

Figure 42:
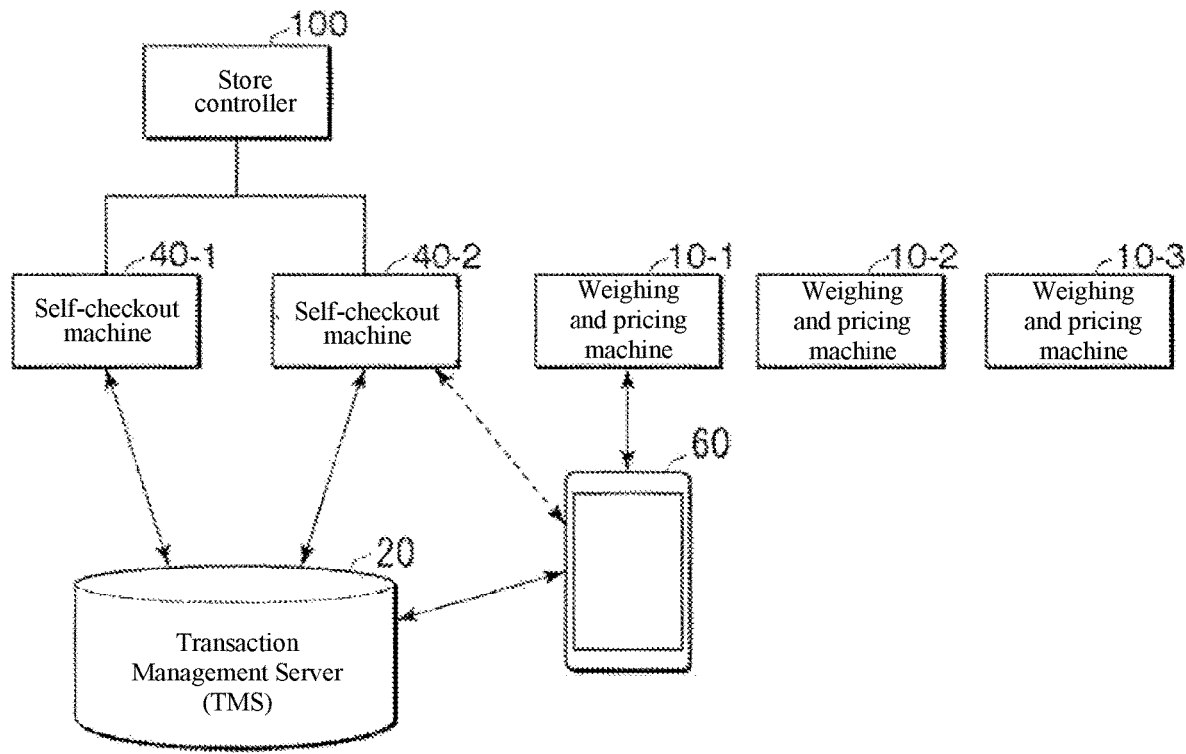
FIG. 42 is a diagram illustrating a configuration example of an SCS according to one or more embodiments.

The SCS of one or more embodiments operates as a self-checkout system. FIG. 42 illustrates one example of a configuration of the SCS according to one or more embodiments. The SCS is provided with a weighing and pricing machine 10 (10-1, 10-2, 10-3), a self-checkout machine 40 (40-1, 40-2), a store controller 100, the portable terminal 60, and a TMS 20. The self-checkout machine 40, the store controller 100, the portable terminal 60, and the TMS 20 of the fourth example are provided with the same configuration as, for example, the self-checkout machine 40, the store controller 100, the portable terminal 60, and the TMS 20 of the first example described above. In one or more embodiments, the portable terminal 60 is mounted to the shopping cart 70 as illustrated in FIG. 3A and FIG. 3B.

The weighing and pricing machine 10 measures a product placed on a weighing scale, calculates the monetary amount of the product by the weight and the unit price per weight of the product measured, and generates product pricing information of the product including the calculated monetary amount. The weighing and pricing machine 10 transmits the product pricing information to the portable terminal 60.

The store controller 100 may communicate with the weighing and pricing machine 10. For example, the store controller 100 may store information of a product master. The weighing and pricing machine 10 may execute processing for registration of the product by utilizing the product master stored by the store controller 100.

Figure 43:
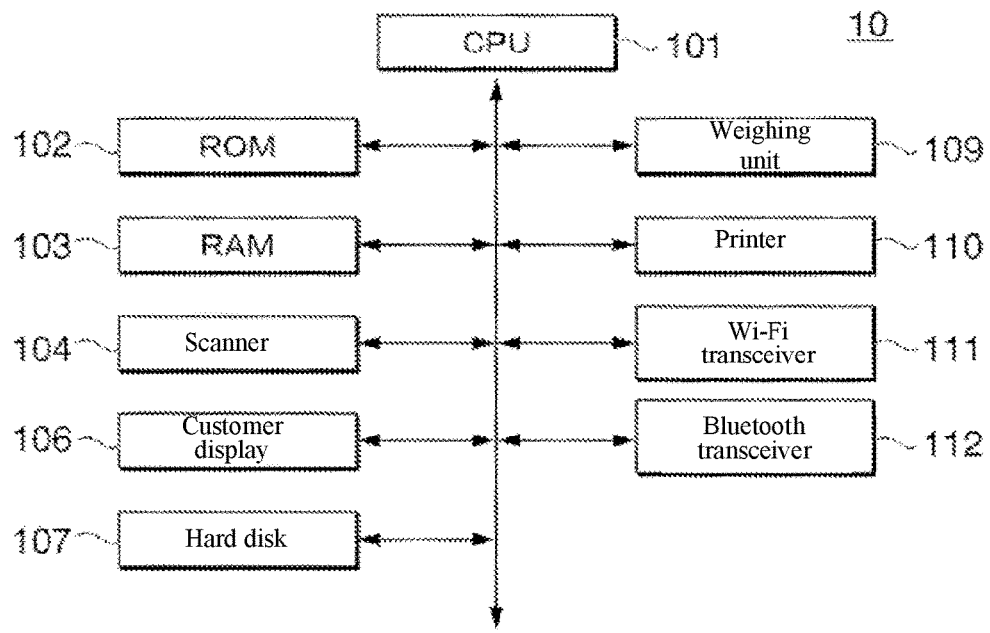
FIG. 43 is a diagram illustrating a configuration example of a weighing and pricing machine according to one or more embodiments.
Figure 44:
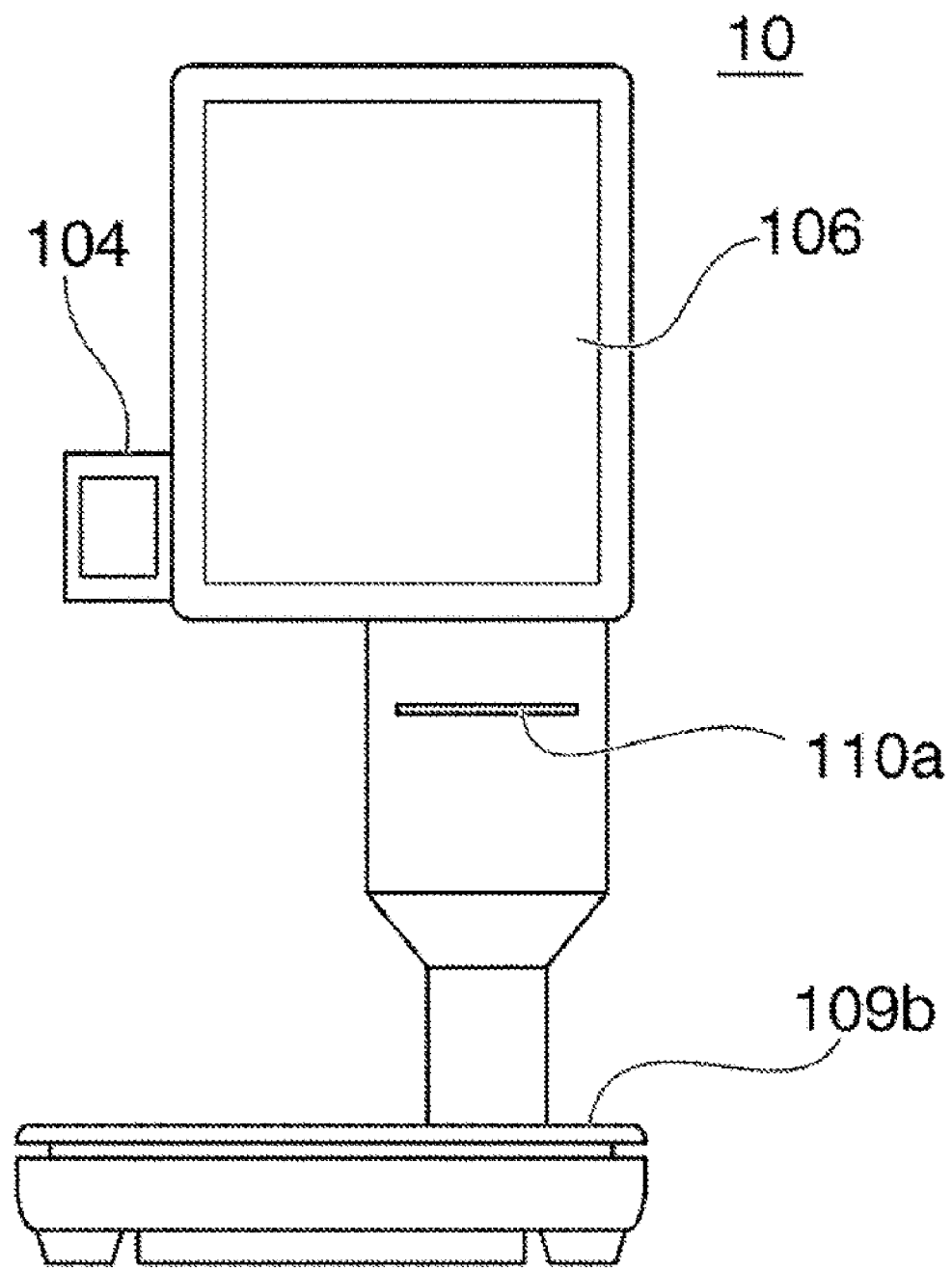
FIG. 44 is a perspective view illustrating an external appearance example of the weighing and pricing machine according to one or more embodiments.

FIG. 43 illustrates one example of a hardware configuration of the weighing and pricing machine 10. FIG. 44 illustrates one example of an external appearance of the weighing and pricing machine 10 when viewed from a front direction.

As illustrated in FIG. 43, the weighing and pricing machine 10 is provided with a CPU 101, a ROM 102, a RAM 103, a scanner 104, a customer display 106, a hard disk 107, a weighing unit 109, a printer 110, a Wi-Fi transceiver 111, and a Bluetooth transceiver 112. These are mutually connected via a bus 119. As illustrated in FIG. 44, the weighing and pricing machine 10 is further provided with a label ejection slot 110a and a weighing scale 109b.

The CPU 101 executes various processing for realizing the functions of the weighing and pricing machine 10 by executing a program.

The ROM 102 stores various information. For example, it stores the program executed by the CPU 101. The ROM 102 stores information relating to the customer display 106 or relating to a display by the customer display 106 (screen information, message information, or the like). The ROM 102 stores a device number (device identifier) for identifying its own device. The ROM 102 may store information relating to printing by the printer 110 (printed content, printing format information, or the like).

The RAM 103 is utilized as a work area when the CPU 101 executes processing and calculation.

The scanner 104 optically reads encoded information.

As illustrated in FIG. 44, the customer display 106 is disposed facing the customer side on the front side and performs display oriented towards the customer. The customer display 106 may be a touch panel for accepting an operation by the customer.

The hard disk 107 stores various data as an auxiliary storage device of the CPU 101. The hard disk 107 may store, for example, a product file. The hard disk 107 may store a program for causing the CPU 101 to execute registration processing or the like. The hard disk 107 may store various information generated by executing the program. The hard disk 107 may store information relating to display by the customer display 106 and information relating to printing by the printer 110.

Another storage device such as an SSD may be provided instead of the hard disk 107.

The weighing unit 109 measures a weight of a product or the like (product and packing containing the product) placed on the weighing scale 109*b* and outputs data indicating a weight value to the CPU 101. The CPU 101 that acquires the weight value from the weighing unit 109 subtracts a predetermined weight (weight of the packing) from the weight value to calculate the product placed on the weighing scale 109*b*. The CPU 101 temporarily stores the weight of the product calculated as described above in the RAM 103 and displays it on the customer display 106.

The printer 110 prints on a paper medium and issues the paper medium printed from the label ejection slot 110*a*. The paper medium is a label affixed to a product.

The Wi-Fi transceiver 111 performs wireless LAN communication on the basis of the Wi-Fi standard and communicates with another weighing and pricing machine 10. The Wi-Fi transceiver 111 may communicate with the store controller 100. The weighing and pricing machine 10 is provided with an RF transceiver and may communicate via a mobile communication network based on LTE or 5G standards.

The Bluetooth transceiver 112 communicates with the portable terminal 60 by a short-range wireless communication method based on the Bluetooth standard. Bluetooth is one example of short-range wireless communication according to one or more embodiments. Short-range communication may be, for example, infrared communication. The Wi-Fi transceiver 111 may communicate with the portable terminal 60.

The self-checkout machine 40 according to one or more embodiments is provided with the configuration illustrated in FIG. 4B.

The portable terminal 60 of one or more embodiments is provided with the configuration illustrated in FIG. 5. In one or more embodiments, a Bluetooth transceiver 609 of the portable terminal 60 communicates with the Bluetooth transceiver 112 of the weighing and pricing machine 10. The Wi-Fi transceiver 608 of the portable terminal 60 may communicate with the Wi-Fi transceiver 111 of the weighing and pricing machine 10.

The TMS 20 according to one or more embodiments is provided with the configuration illustrated in FIG. 6. The customer information, store information, and cart information stored in the TMS 20 includes, for example, the information elements illustrated in FIGS. 7A, 7B, and 7C, respectively. The held product corresponding to the cart information according to one or more embodiments is defined in the same manner as in the example illustrated in FIG. 8.

Figure 45:
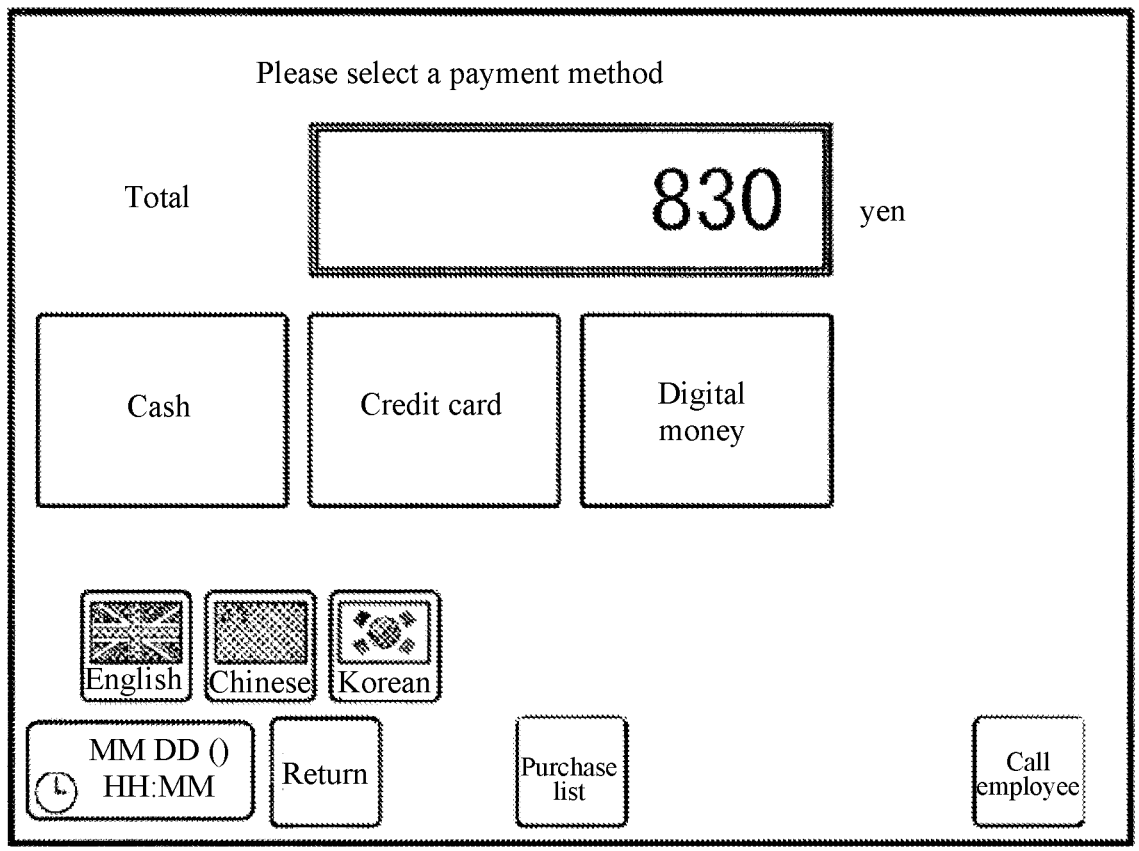
FIG. 45 is diagram illustrating one example of a registered product presentation screen and a screen displayed by a self-checkout machine according to one or more embodiments.

The SCS according to one or more embodiments operates as a self-checkout system according to, for example, the procedure illustrated in FIG. 9. In step S17 of FIG. 9, the self-checkout machine 40 that receives cart identification information and subtotal information from the transaction management server 50 may display a subtotal amount such as that illustrated in, for example, FIG. 45 on a customer display unit 206.

In one or more embodiments, when product registration is not able to be performed normally, for example, a shopping application displays the screen in FIGS. 10A to 10D described above, and the SCS operates according to the procedure illustrated in FIG. 12.

[Product Registration in Selling Area Corresponding to Selling by Weight]

In a store of one or more embodiments, there is a selling area corresponding to selling by weight according to a self-pricing method wherein the customer uses the weighing and pricing machine 10 to perform pricing of a product sold by weight and registers the product. The operation of the SCS and the weighing and pricing machine 10 corresponding to the self-pricing method are described below.

A procedure example relating to product registration by a customer in a selling area where the weighing and pricing machine 10 is used will be described.

When a product sold by weight is to be purchased, the customer first performs input of an item of the product to be purchased as follows by using their own portable terminal 60.

Figure 46:
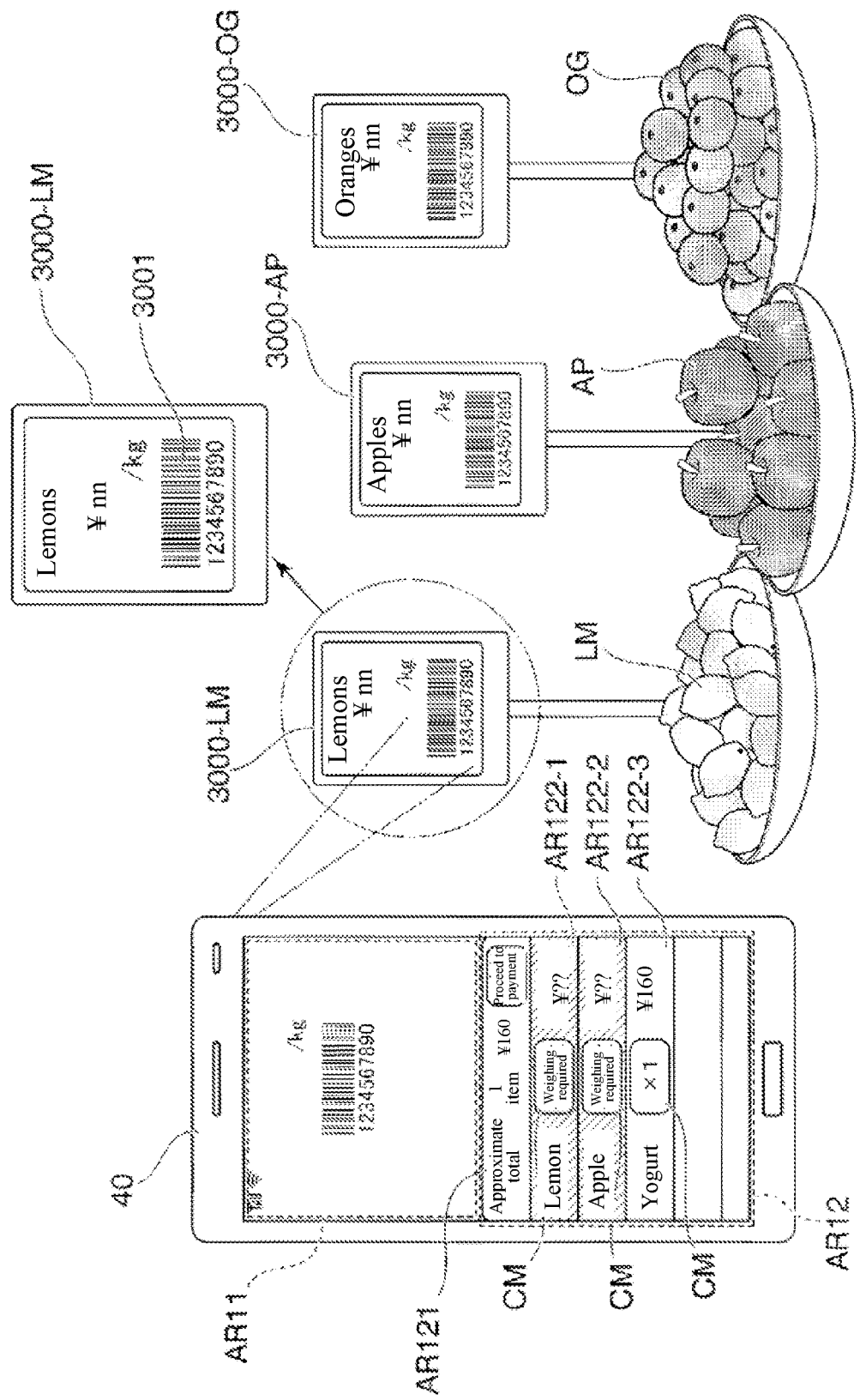
FIG. 46 is a diagram illustrating one example of a situation wherein a product sold by weight is put on display in a store according to one or more embodiments.

FIG. 46 illustrates one example of a situation wherein a product sold by weight is put on display in the store. In the example in FIG. 46, lemons LM, apples AP, and oranges OG are put on display as products sold by weight. Product information panels 3000-LM, 3000-AP, and 3000-OG are installed corresponding to the lemons LM, apples AP, and oranges OG put on display. When no particular distinction is made between the product information panels 3000-LM, 3000-AP, and 3000-OG, they are described as a product information panel 3000.

The product information panel 3000 presents information of a corresponding product. In the example in FIG. 46, the product information panel 3000-LM is illustrated magnified. The item of the product being a lemon, unit price per unit weight, and a product information code 3001 are presented in this manner on the product information panel 3000-LM as information of the product. The product information code 3001 is, for example, a barcode (one-dimensional code). The product information code 3001 may be a two-dimensional code. The product information code 3001 includes a product code of an item of a product as a lemon.

An item of a product, unit price per unit weight, and product information code are presented in the same manner on another product information panel 3000 as information of a product.

The product information panel 3000 may present information of a product by a display device performing display. Alternatively, the product information panel 3000 may present information of a product by affixing printed matter such as a poster or the like.

The display device presents information of a product, which enables a display reflecting a discount during a limited-time sale or the like to be performed at a proper timing. Changing the barcode according to a passage of time and displaying the same causes the portable terminal 60 to read the barcode or the like captured by the camera in advance, which makes it possible to prevent fraudulence, such as registration of a product sold by weight at a different unit price.

When inputting an item of a product to be purchased, the customer displays the product registration screen on their own portable terminal 60 and causes the portable terminal 60 to read the product information code presented by the product information panel 3000 of the product to be purchased. In the same drawing, a situation is illustrated wherein the customer causes the product information code 3001 corresponding to the lemons LM to be read. A situation is illustrated wherein an image of the product information code 3001 is shown in the scanned image area AR11 on the product registration screen of the portable terminal 60.

When a code scan of the product information code 3001 corresponding to the lemons LM is performed in this manner, the portable terminal 60 acquires the product information of the lemons LM from the read product information code 3001. The portable terminal 60 designates the lemons LM as an item of a product sold by weight by utilizing the acquired product information.

The portable terminal 60 displays the product registration screen illustrated in FIG. 46. A product registration state area AR12 is disposed on the product registration screen. The registration state of a product to be purchased at the present point in time is illustrated in the product registration state area AR12. A total area AR121 and registration list item AR122 (AR122-1, AR122-2, AR122-3) are disposed in the product registration state area AR12. The registration list item AR122 is a list item individually indicating a registered product or a product in a temporary registration state wherein input of the item has been performed.

Registration list items AR122-1, AR122-2, and AR122-3 corresponding to yogurt, apples AP, and lemons LM are disposed as the registration list item AR122.

In this case, the yogurt is not a product sold by weight. For this reason, in the registration list item AR122-1 for the yogurt, "×1" is displayed in a comment display CM, indicating that one item has been registered, and it is illustrated that the price is 160 yen.

In contrast to this, for each product sold by weight of the apples AP and lemons LM, there is a state of "temporary registration" (temporary registration state) for the product to be purchased. A product in the temporary registration state is a product for which input of an item has been performed but pricing has yet to be completed (or in a state of waiting for weighing).

Therefore, in the registration list items of the apples AP and the lemons LM, the comment display CM of "Weighing required", for example, indicates that pricing by weighing has yet to be performed. Along with this, in the registration list items of the apples AP and the lemons LM, the display of "?? yen" indicates that the price is undetermined. In the registration list items AR122-1 and AR122-2, a predetermined background color indicating the temporary registration state is set.

In the example in FIG. 46, the lemons LM and apples AP are temporarily registered by the customer as products sold by weight. In this case, there are two types of products sold by weight designated as to be purchased by the customer: the lemons LM and apples AP. The customer in this case weighs the lemons LM and apples AP, respectively. Thus, the customer takes out a quantity (number) of the displayed lemons LM and apples AP, respectively, that they want to buy. The customer weighs the lemons LM and apples AP taken out by using the weighing and pricing machine 10.

Figure 47:
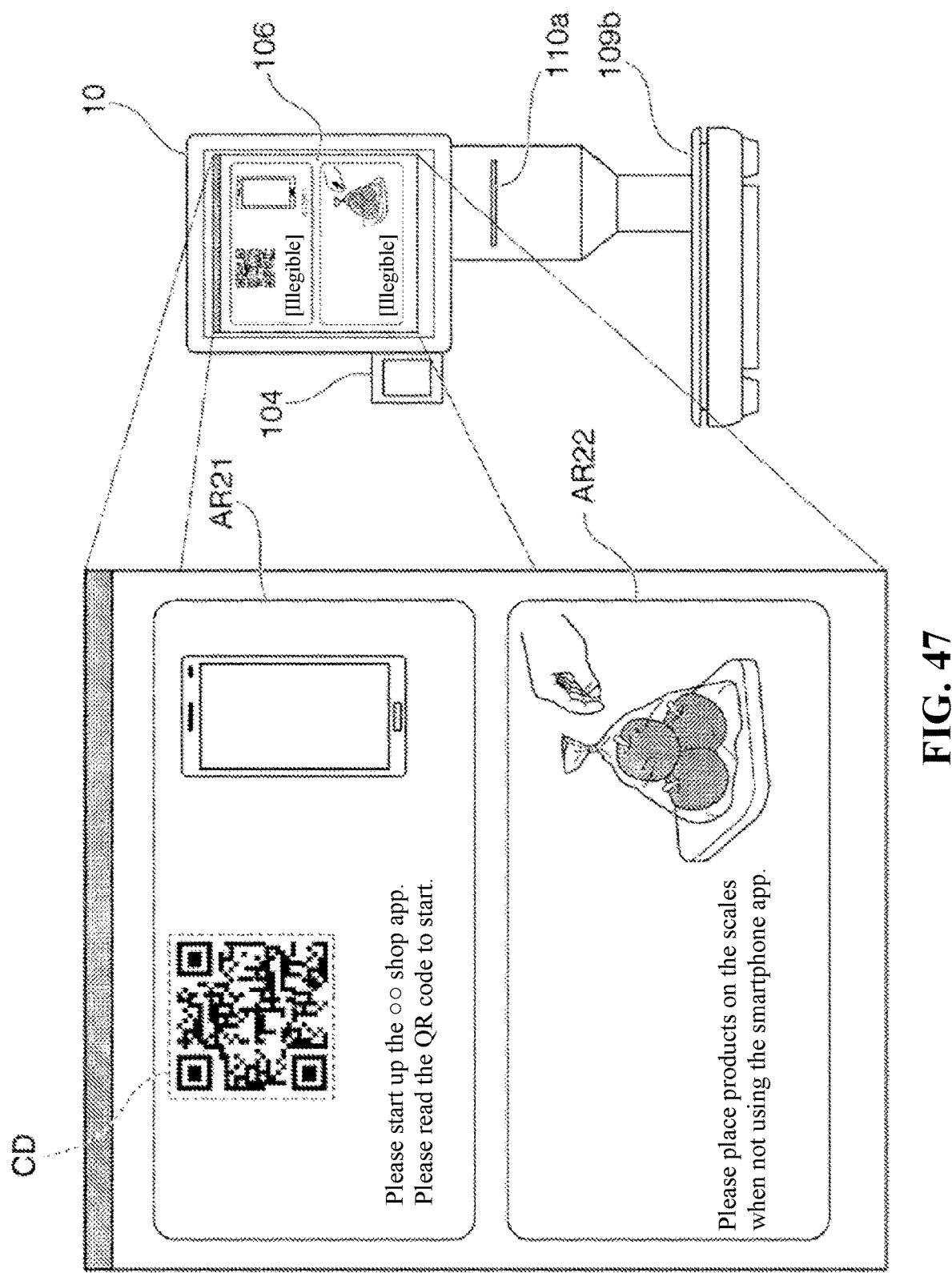
FIG. 47 is a diagram illustrating an external appearance example of the weighing and pricing machine when viewed from a front direction according to one or more embodiments.
Figure 49A:
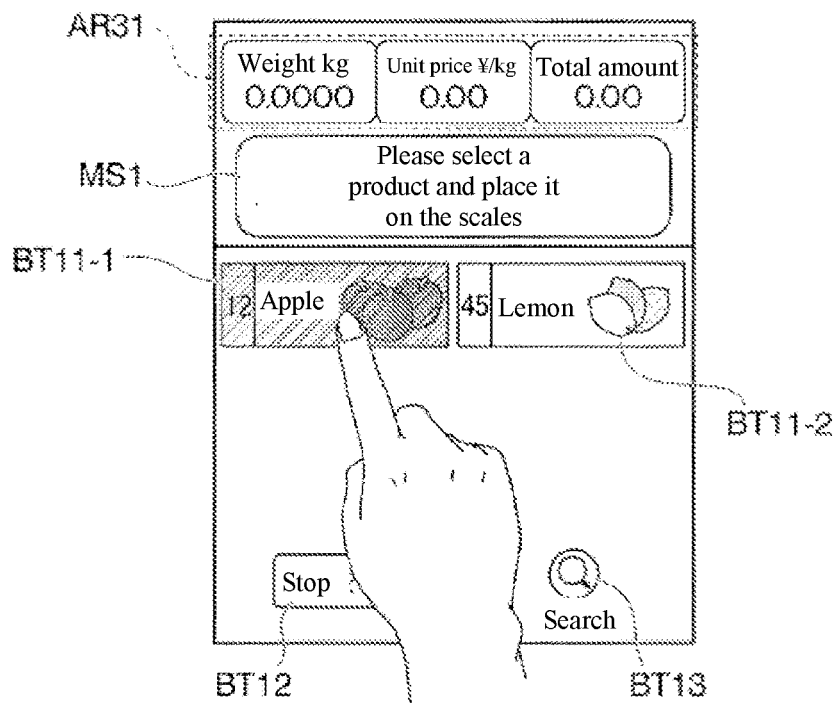
FIGS. 49A and 49B are diagrams describing a procedure example performed by a customer in response to the pricing of one product according to one or more embodiments.
Figure 49B:
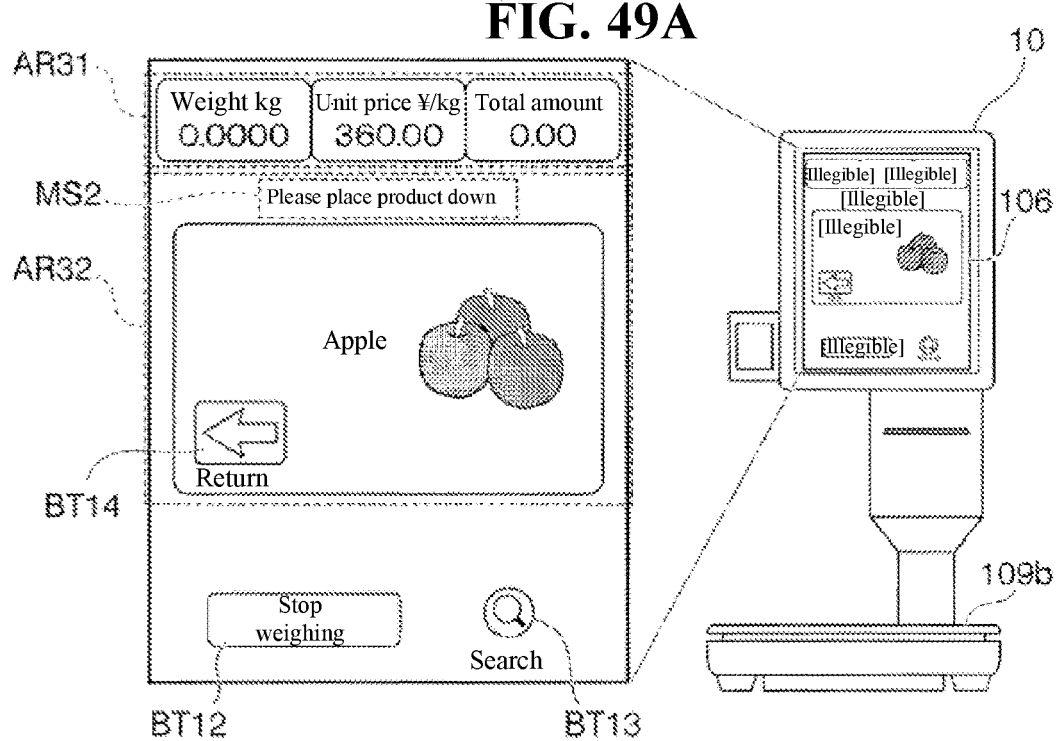

As illustrated in FIG. 47, the weighing and pricing machine 10 displays a standby screen on the customer display 106. A code reading guide area AR21 and a weighing guide area AR22 are disposed on the standby screen.

In the code reading guide area AR21, display is performed according to a guide oriented towards a customer who performs product registration by utilizing the portable terminal 60. For example, after a connection information code CD is displayed by a two-dimensional code and when starting registration of a product to be purchased (including weighing and pricing based on the weighing result), a display is performed in the code reading guide area AR21 that guides the customer to cause the portable terminal 60 to read the connection information code CD.

The connection information code CD is control information for connecting via Bluetooth, for example, the portable terminal 60, whereby the shopping application is operated, to the weighing and pricing machine 10.

In the weighing guide area AR22, display is performed according to a guide oriented towards a customer who does not utilize the portable terminal 60 for shopping. When starting registration of a product to be purchased, a display is performed in the weighing guide area AR22 that guides the customer to place a product corresponding to a first item of the product to be purchased on the weighing scale 109b of the weighing unit 109.

The customer in this case performs product registration by utilizing the portable terminal 60. Therefore, when starting the registration of a product sold by weight to be purchased, the customer performs an operation causing the portable terminal 60 to read the connection information code CD displayed in the code reading guide area AR21. FIG. 48A illustrates one example of a mode of the product registration screen in a touch-panel display unit 406 when the portable terminal 60 is reading the connection information code CD.

The portable terminal 60 establishes communication with the weighing and pricing machine 10 in response to reading the connection information code CD as described above. In this manner, the weighing and pricing machine 10 is placed in a state of exclusive communication by the portable terminal 60 of the connection destination by communicably connecting the weighing and pricing machine 10 and the portable terminal 60. The portable terminal 60 does not perform a connection with another portable terminal 60 when in the state of exclusive communication.

When a customer who does not utilize the portable terminal 60 for shopping places a product on the weighing scale 109b to start weighing, for example, the weighing and pricing machine 10 may prohibit the establishment of mutual communication with the portable terminal 60 thereafter. In a case where the establishment of mutual communication is not prohibited, for example, an attempt to establish mutual communication would result in failure; however, because the time until timeout occurs is spent, it takes time from the detection of the foregoing declaration until weighing actually becomes possible. In contrast thereto, when the establishment of mutual communication is prohibited, essentially, unnecessary time (time until timeout occurs) is saved and weighing is immediately performed. For example, the operation may be such that the foregoing prohibition is removed after printing of the label is completed.

The portable terminal 60 transmits the information of a product sold by weight in a temporary registration state to the weighing and pricing machine 10 in response to communication with the weighing and pricing machine 10 being established. Specifically, the portable terminal 60 in this case transmits information of the lemons LM and apples AP as the information of the products sold by weight in the temporary registration state.

The portable terminal 60 causes the touch-panel display unit 406 to display the pricing operation screen in response to communication with the weighing and pricing machine 10 being established. FIG. 48B illustrates one example of the pricing operation screen displayed on the touch-panel display unit 406 of the portable terminal 60.

The weighing and pricing machine 10 displays the pricing operation screen on the customer display 106 in response to communication with the portable terminal 60 being established.

FIG. 48C illustrates one example of the pricing operation screen displayed on the customer display 106 of the weighing and pricing machine 10.

Product selection buttons BT11 (BT11-1, BT11-2) are disposed on the pricing operation screen. The product selection button BT11 is a button corresponding to each product in the temporary registration state, whereby an operation is performed to select a product to undergo registration (weighing, pricing). In the same drawing, an example is illustrated wherein among the product selection buttons BT11, the product selection button BT11-1 corresponds to the apples AP and the product selection button BT11-2 corresponds to the lemons LM.

A registration result area AR31 is disposed on the pricing operation screen. The unit price per weight and measured weight of a product sold by weight set to be registered and the total monetary amount of the products sold by weight for which registration has been completed thus far are shown in the registration result area AR31.

A stop button BT12 and a search button BT13 are disposed on the pricing operation screen. The stop button BT12 is a button whereby an operation is performed for instructing the stoppage of registration by weighing and pricing a product sold by weight in the temporary registration state. The search button BT13 is a button that is operated when instructing a search for another product when desiring to further register another product not indicated by the product selection button BT11 since, for example, temporary registration is not performed.

A message MS1 such as "Select a product and place the product on the scales" is displayed on the pricing operation screen to guide the customer to place the product to be registered on the weighing scale 109*b* after operating the product selection button BT11 corresponding to the product to be registered.

The pricing operation screen that is the same as that displayed on the weighing and pricing machine 10 is displayed on the portable terminal 60. The customer is thereby able to perform the operation of weighing, pricing, and registering a product in the temporary registration state on both the portable terminal 60 and the weighing and pricing machine 10.

The product registration screen or the like may be displayed on the portable terminal 60 without displaying the pricing operation screen.

In the following description, an example is given wherein the customer performs registration by operating the pricing operation screen displayed on the weighing and pricing machine 10.

Here, the customer first registers the apples AP from among the apples AP and the lemons LM in the temporary registration state. In this case, the customer operates the product selection button BT11-1 corresponding to the apples AP on the pricing operation screen. FIG. 17 illustrates a state wherein the customer operates the product selection button BT11-1 corresponding to the apples AP. The product selection button BT11-1 is highlighted in response to being touched by an operation. The apples AP are designated to undergo registration by this kind of operation on the product selection button BT11-1.

The display of the customer display 106 on the weighing and pricing machine 10 transitions from the pricing operation screen to a weighing and guidance screen in response to the apples AP being designated to undergo registration. FIG. 17 illustrates one example of the weighing and guidance screen. A weighing and guidance area AR32 is disposed on the weighing and guidance screen. The registration result area AR31, the stop button BT12, and the search button BT13 are disposed on the weighing and guidance screen continuously from the pricing operation screen.

Content oriented towards the customer to guide them to place the apples AP on the weighing scale 109*b* is displayed on the weighing and guidance area AR32. Specifically, a message MS2 stating, "Please place the product down", text stating "Apples", and an apple design are displayed in the weighing and guidance area AR32 in the same drawing. A return button BT14 is disposed in the weighing and guidance area AR32. The return button BT14 is a button whereby an operation for returning to the previous screen is performed.

The customer in this case, as illustrated in the same FIG. 17, places the apples AP to be registered on the weighing scale 109*b*.

The display of the customer display 106 of the weighing and pricing machine 10 transitions from the weighing and guidance screen to a weighing result screen in response to the apples AP to be registered being placed on the weighing scale 109*b* and the weighing unit 109 having performed the measurement.

Figure 50A:
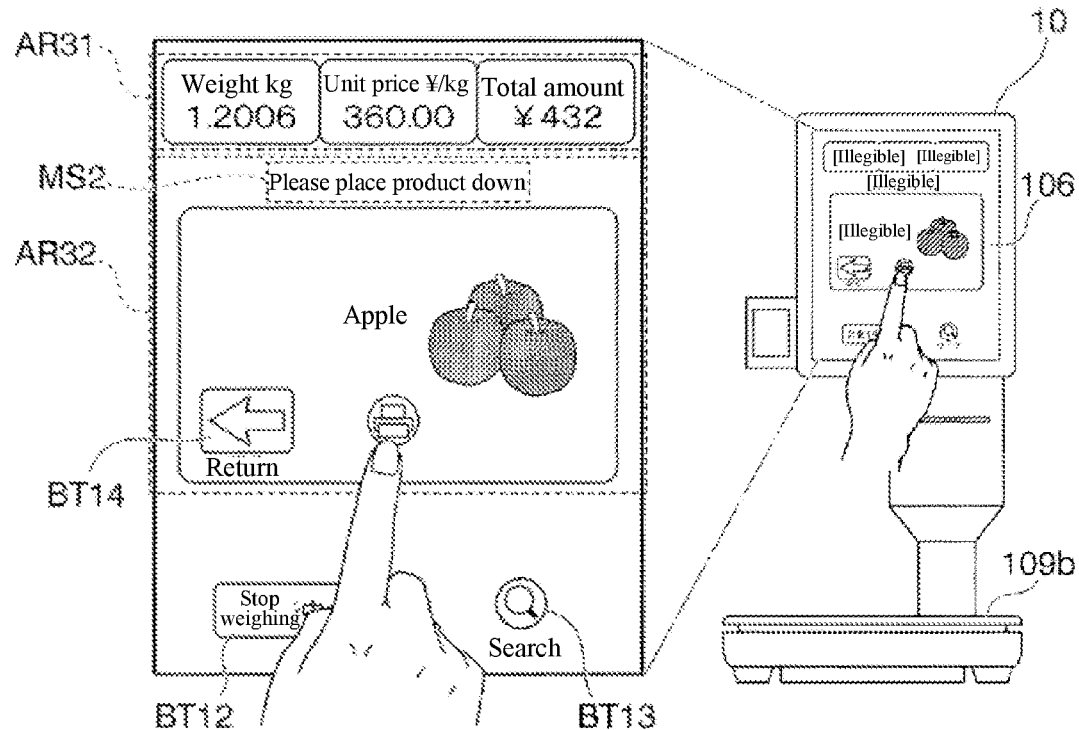
FIGS. 50A and 50B are diagrams describing the procedure example performed by a customer in response to the pricing of one product according to one or more embodiments.

FIG. 50A illustrates one example of the weighing result screen. A label issuance and guidance area AR33 is disposed on the weighing result screen. The registration result area AR31, the stop button BT12, and the search button BT13 are disposed on the weighing result screen continuously from the weighing and guidance screen.

The weight measured for the apples AP, the unit price per weight of the apples AP, and the price of the apples AP calculated according to the measured weight are shown in the registration result area AR31 of the weighing result screen.

A message MS3 such as, for example, "Please press the print button" is displayed in the label issuance and guidance area AR33 to prompt the customer to operate a label issuance button BT15 for issuance of a label (single-article label) whereon the pricing result of the apples AP is reflected. Text stating "Apples" or an apple design indicating that the current product to be issued a label is the apple AP is displayed in the label issuance and guidance area AR33. The label issuance button BT15 is disposed in the label issuance and guidance area AR33. The return button BT14 whereby an operation for returning to the previous screen is performed is disposed in the label issuance and guidance area AR33.

In this case, the customer operates the label issuance button BT15 as illustrated in the same FIG. 50A. The weighing and pricing machine 10 issues a label (single-article label) whereon content reflecting the pricing result for the apples AP is printed in response to the label issuance button BT15 being operated.

The display of the customer display 106 of the weighing and pricing machine 10 transitions from the weighing result screen to a label affixing and guidance screen in response to the label issuance button BT15 being operated.

Figure 50B:
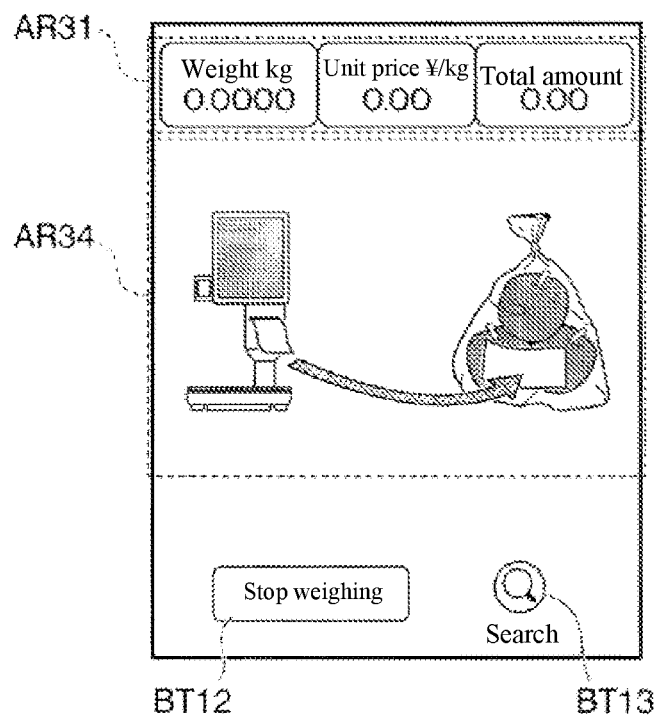

FIG. 50B illustrates one example of the label affixing and guidance screen. A label affixing and guidance area AR34 is disposed on the label affixing and guidance screen. The registration result area AR31, the stop button BT12, and the search button BT13 are disposed on the label affixing and guidance screen continuously from the weighing and guidance screen.

A design of content for guiding the label issued from the weighing and pricing machine 10 so as to be affixed to a bag containing the apples AP for which pricing is currently performed is displayed in the label affixing and guidance area AR34. A message such as, for example, "Please affix the label to the bag of the product" for guiding the affixing of the label may be displayed in the label affixing and guidance area AR34.

The weighing and pricing machine 10 transmits the product pricing information of the apples AP wherein the pricing result is reflected to the portable terminal 60 at a timing at which the pricing result is obtained for the product sold by weight in the temporary registration state and the label is issued, as described above.

The weighing and pricing machine 10 may transmit product registration information based on the product pricing information to the TMS 20 via a communication line.

The display on the customer display 106 of the weighing and pricing machine 10 transitions from the label affixing and guidance screen to the pricing operation screen in response to the issuance of the label for the apples AP being performed as described above.

Figure 51A:
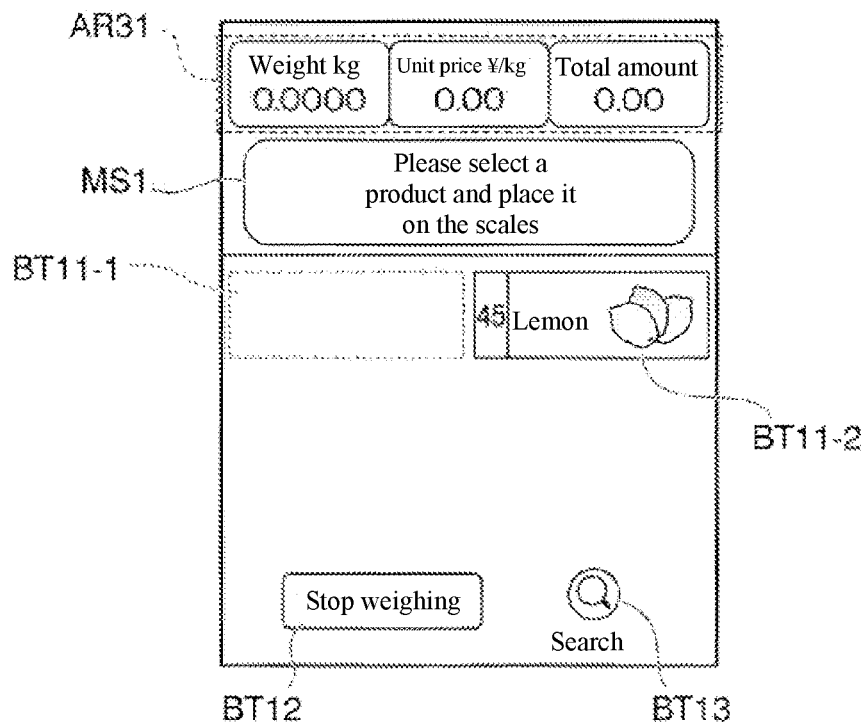
FIGS. 51A and 51B are diagrams illustrating an aspect example of a pricing operation screen and a product registration screen according to one or more embodiments.

FIG. 51A illustrates an aspect example of the pricing operation screen displayed in response to issuance of the label for the apples AP. The product selection button BT11-1 of the apples AP displayed on the pricing operation screen in FIG. 48C is erased from the pricing operation screen in FIG. 51A.

The product selection button BT11-1 of the apples AP may be displayed grayed out, for example, instead of erased so as to indicate that the operation is impossible. That is, the pricing operation screen may only be operated for a product sold by weight in the temporary registration state.

When the pricing operation screen is displayed, the pricing operation screen that may be operated in the same manner as the same drawing may also be displayed on the portable terminal 60.

When the pricing operation screen is displayed, the customer operates the product selection button BT11-2 to set the lemons LM that are still in the temporary registration state as a registration target (weight and price).

Provided that the customer operates the stop button BT12 at this time, the temporary registration state of the lemons LM is removed, and only the apples AP are registered as a product sold by weight. In this case, the customer may return the lemons LM taken from the display location to the display location or leave them as a held product and hand them to the employee at the time of checkout.

The customer, after operating the product selection button BT11-2 corresponding to the lemons LM, causes the weighing and pricing machine 10 to perform weighing and pricing of the lemons LM and issuance of a label by the same procedure as that of the apples AP described above. Weighing and pricing (registration) for all the products sold by weight in the temporary registration state are completed in response to issuance of the label for the lemons LM being performed.

The display of the customer display 106 of the weighing and pricing machine 10 returns to the standby screen (FIG. 47) in response to registration being completed for all the products sold by weight in the temporary registration state being completed.

Figure 51B:
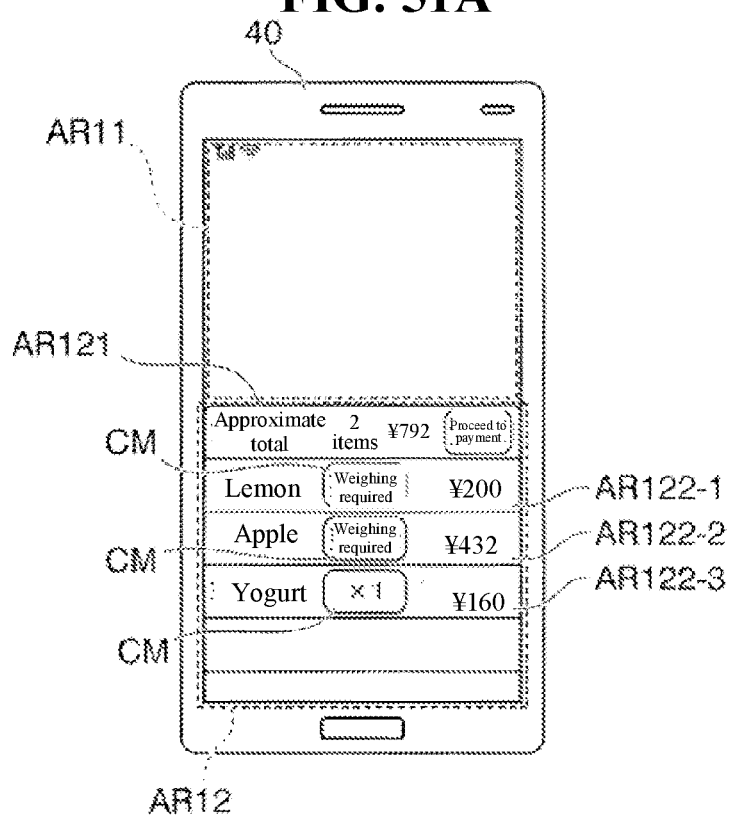

The product registration screen displayed on the touch-panel display unit 406 of the portable terminal 60 enters a state illustrated in FIG. 51B, for example, in response to registration being completed for all the products sold by weight in the temporary registration state.

The product registration state area AR12 of the product registration screen in FIG. 51B changes as shown below in comparison to FIG. 46. That is, the registration list items AR122-1 and AR122-2 corresponding to the lemons LM and the apples AP change from a state of indicating that they are temporarily registered to a state indicating that they are registered. Specifically, the background color in each of the registration list items AR122-1 and AR122-2 changes from a color indicating the temporary registration state to a color indicating that registration is complete. The price established by the pricing processing is indicated in each of the registration list items AR122-1 and AR122-2. The comment display CM in each of the registration list items AR122-1 and AR122-2 changes from "Weighing required" to "Weighed". The comment display CM stating "Weighed" indicates that the corresponding product is a product sold by weight and has been registered by weighing and pricing processing. Because of this, the comment display CM may be a display such as, for example, "Already weighed" or "Already registered" instead of the display stating "Weighed".

Information or the like relating to the result of pricing processing of the measured weight, price, unit price, or the like may be displayed for the weighed product sold by weight in the product registration state area AR12.

Alternatively, the comment display CM itself may be erased in response to the corresponding product being registered. Even in this kind of case, it is preferable to change the appearance, such as the background color, of the registration list item AR122 so that a product sold by weight and a product not sold by weight may be visually differentiated in the product registration state area AR12.

The product registration screen displayed on the portable terminal 60 may change to a state indicating that the registration list item AR122 of the product sold by weight for which registration is completed is registered (weighed) each time registration (weighing) of a plurality of products sold by weight in the temporary registration state is completed one by one.

Figure 52:
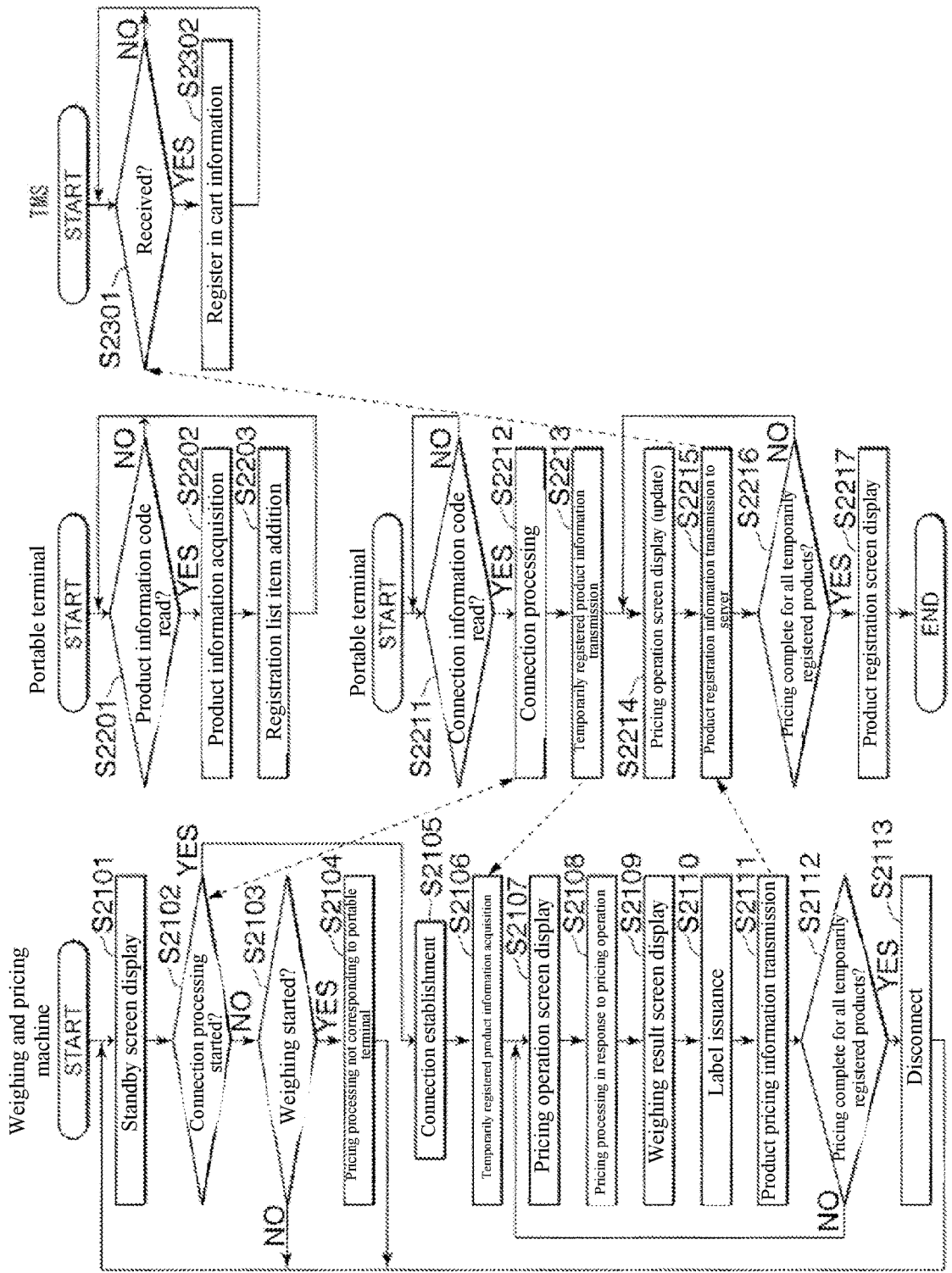
FIG. 52 is a flowchart illustrating a processing procedure example executed by the weighing and pricing machine, a portable terminal, and a transaction management server in relation to the registration of a product sold by weight in a single transaction according to one or more embodiments.

A processing procedure example executed by the weighing and pricing machine 10, the portable terminal 60, and the TMS 20 of one or more embodiments in relation to the registration of a product sold by weight in a single transaction will be described with reference to the flowchart in FIG. 52.

First, a processing procedure example of the portable terminal 60 will be described that corresponds to when the customer performs input of an item of a product sold by weight to be purchased using the portable terminal 60.

Step S2201: The portable terminal 60 waits for reading of the product information code 3001 (FIG. 46) to be performed when the product registration screen is displayed on the touch-panel display unit 406.

Step S2202: The portable terminal 60 acquires product information from the read product information code in response to reading of the product information code 3001 being performed. The portable terminal 60 acquires the product information, thereby inputting the item of the product to be purchased by the customer.

Step S2203: The portable terminal 60 adds the registration list item AR122 indicating the product of the product information acquired in step S2202 to the product registration state area AR12 of the product registration screen. The product of the product information acquired in response to reading of the product information code 3001 in this manner is treated as a temporarily registered product. The registration list item AR122 of the temporarily registered product is set having a background color that indicates temporary registration, as in the registration list items AR122-2 and AR122-3 in FIG. 46, and the display stating "Weighing required" in the comment display CM indicates that pricing has yet to be performed.

After the processing in step S2203, processing is returned to step S2201.

Next, a processing procedure example executed by the weighing and pricing machine 10 in response to pricing of the temporarily registered product will be described.

Step S2101: The weighing and pricing machine 10 sets a standby mode in a state where the operation of weighing and pricing by the customer is not performed. In the standby mode, the weighing and pricing machine 10 displays the standby screen on the customer display 106. As illustrated in FIG. 47, the connection information code CD is displayed on the standby screen.

Step S2102: Under the standby state, the weighing and pricing machine 10 determines whether connection processing is started with the portable terminal 60 that has read the connection information code CD.

Step S2103: In the case where it is determined that connection processing has not started in step S2102, the weighing and pricing machine 10 determines whether the customer has placed the product on the weighing scale 109b and the weighing unit 109 has thereby started weighing.

Step S2104: When it is determined that the weighing unit 109 has started weighing in step S2103, the weighing and pricing machine 10 executes pricing processing corresponding to a transaction that does not utilize the portable terminal 60 for a weighed product. After the processing in step S2104, processing is returned to step S2101. By processing being returned to step S2101, the weighing and pricing machine 10 sets the standby mode and displays the standby screen including the connection information code CD.

The weighing and pricing machine 10 displays a product selection screen for performing an operation for designating (selecting) a product to be priced as the pricing processing in S2104 corresponding to a transaction not utilizing the portable terminal 60. The connection information code CD may be erased in response to the product selection screen being displayed. That is, the connection information code CD may be erased in response to the weighing unit 109 having performed weighing.

The product selection screen is a screen whereon, for example, a preset key for each product classified as a product sold by weight is disposed, thereby making it possible to select a product sold by weight. The products sold by weight may also include products for which the number is calculated according to the measured weight and the price is calculated according to the calculated number and unit price.

The customer finds the preset key corresponding to the product placed on the weighing scale 109b from the product selection screen and operates the found preset key. The weighing and pricing machine 10 sets the product having the corresponding operated preset key as a pricing target.

When the product having the corresponding operated preset key is set as the pricing target, the weighing and pricing machine 10 calculates the price of the product to be priced on the basis of the weighing result of the weighing unit 109.

When the price is calculated, the weighing and pricing machine 10 displays the weighing result screen whereon the label issuance button BT15 is disposed, having content for guiding the customer to an operation for issuance of a label in a mode according to FIG. 50A.

The weighing and pricing machine 10 issues a label (single-article label) whereon a pricing processing result of the current product to be priced is reflected in response to the label issuance button BT15 being operated. Thereafter, the weighing and pricing machine 10 returns processing to step S2101 to enter standby mode and displays the standby screen.

Alternatively, the weighing and pricing machine 10 may display the product selection screen whereon the preset key for the product sold by weight is disposed on the standby screen together with the connection information code CD. The customer who does not utilize the portable terminal 60 may also operate the preset key on the product selection screen displayed on the standby screen before placing the product to be priced on the weighing scales 109b to cause pricing to start. When the preset key on the product selection screen displayed on the standby screen is operated in this manner, the weighing and pricing machine 10 sets the product having the corresponding operated preset key as the pricing target. In addition, the weighing and pricing machine 10 displays the weighing and guidance screen of the mode according to, for example, FIG. 17, and guides the customer to place the product set as the pricing target on the weighing scales 109b. The connection information code CD may be erased in response to the weighing and guidance screen being displayed.

The weighing and pricing machine 10 displaying the foregoing weighing and guidance screen calculates the price of the product to be priced on the basis of the weighing result of the weighing unit 109 in response to the customer placing the product to be priced on the weighing scales 109b.

When the price is calculated, the weighing and pricing machine 10 displays the weighing result screen in a mode according to FIG. 50A. The weighing and pricing machine 10 issues a label (single-article label) when the label issuance button BT15 disposed on the weighing result screen is operated and returns processing to step S2101 to enter standby mode and displays the standby screen.

In this manner, the customer who does not utilize the portable terminal 60 may cause pricing to start by placing the product to be priced on the weighing scales 109b or performing an operation to select the product to be priced by an operation on the product selection screen displayed on the standby screen.

Step S2105: When it is determined in step S2102 that connection processing has started, the weighing and pricing machine 10 executes the started connection processing and establishes a connection with the portable terminal 60.

Step S2106: When the connection is established, the portable terminal 60 transmits temporarily registered product information. The weighing and pricing machine 10 acquires the transmitted temporarily registered product information. The temporarily registered product information is a product sold by weight, such as the apples AP, lemons LM, or the like for which an item is input in response to the portable terminal 60 reading the product information code 3001.

Step S2107: The weighing and pricing machine 10 that acquired the temporarily registered product information displays the pricing operation screen (FIG. 48C) on the customer display 106. The pricing operation screen is a screen whereon the product selection button BT11 corresponding to each temporarily registered product indicated by the acquired temporarily registered product information is disposed, and whereby an operation for selecting one temporarily registered product to undergo pricing processing from among the temporarily registered products is performed as the pricing operation.

Here, the weighing and pricing machine 10 erases the standby screen displayed until the connection processing is started according to the display of the pricing operation screen in the first step S2107 corresponding to the connection processing being started in step S2102. Erasure of the standby screen causes the connection information code CD to also be erased. That is, the processing in S2107 is processing to erase the connection information code CD in response to the weighing and pricing machine 10 establishing a connection with the portable terminal 60.

Step S2108: After displaying the pricing operation screen, the weighing and pricing machine 10 executes pricing processing in response to the pricing operation of the customer. That is, the customer, as described in FIG. 17, operates the product selection button BT11 on the pricing operation screen to designate a temporarily registered product to undergo pricing processing. The customer places the temporarily registered product designated to undergo pricing processing on the weighing scales 109*b* and causes the weighing unit 109 to execute weighing. The weighing and pricing machine 10 calculates the price by utilizing the weight measured by the weighing unit 109 and the unit price per weight shown in the temporarily registered product information acquired in step S2106.

Step S2109: The weighing and pricing machine 10 displays the weighing result screen (FIG. 50A) on the customer display 106 in response to the price being established by the pricing processing in step S2108. The weighing and pricing machine 10 performs a display so that the measured weight, unit price per weight, and calculated price are reflected in the registration result area AR31 of the weighing result screen.

Step S2110: The label issuance button BT15 is disposed on the weighing result screen. The customer operates the label issuance button BT15. The weighing and pricing machine 10 issues a label corresponding to the current product priced by the pricing processing in step S2018 in response to the label issuance button BT15 being operated.

The weighing and pricing machine 10 may issue a label in response to, for example, the pricing processing in step S2108 being completed and the price being established as processing in step S2110. In this case, the display of the label issuance button BT15 on the weighing result screen may be omitted.

Step S2111: The weighing and pricing machine 10 transmits product pricing information to the portable terminal 60 in response to the pricing processing in step S2108 being completed and the price being established. The product pricing information reflects the result of the pricing processing for the current product set to undergo pricing processing in step S2108.

Step S2112: After the transmission of the product pricing information in step S2111, the weighing and pricing machine 10 determines whether the pricing processing is completed for all the temporarily registered products.

When a product for which pricing processing has yet to be completed remains, the processing is returned to step S2107. In this case, the weighing and pricing machine 10 displays in step S2107 the pricing operation screen whereon the product selection button BT11 of a temporarily registered product for which the pricing processing is completed is set to a non-operable state as illustrated in FIG. 51A.

Step S2113: When it is determined that the pricing processing of all the temporarily registered products is complete in step S2112, the weighing and pricing machine 10 disconnects from the portable terminal 60 established in step S2105.

After disconnecting from the portable terminal 60, the processing is returned to step S2101. That is, the standby screen is displayed. The standby screen is displayed, and the connection information code CD is thereby displayed. That is, the weighing and pricing machine 10 displays the connection information code CD for connection to the next portable terminal 60 in response to disconnection from the portable terminal 60.

Next, a processing procedure example executed by the portable terminal 60 in relation to pricing of the temporarily registered product will be described.

Step S2211: The portable terminal 60 waits for the connection information code CD to be read under a state where the product registration screen is displayed.

Step S2212: The customer performs an operation to cause the portable terminal 60 to read the connection information code CD so that the portable terminal 60 performs reading of the connection information code CD. In response to reading of the connection information code CD being performed, the portable terminal 60 executes between the weighing and pricing machine 10 processing for communicably connecting to the weighing and pricing machine 10 according to a connection procedure indicated by the read connection information code CD.

Step S2213: When the connection to the weighing and pricing machine 10 is established by the connection processing in step S2212, the portable terminal 60 transmits the temporarily registered product information to the weighing and pricing machine 10. The temporarily registered product information is information on a product sold by weight for which input of an item has been performed by the processing in steps S2201 to S2203.

Step S2214: After the processing in step S2213, the portable terminal 60 displays the pricing operation screen (FIG. 48B) on the touch-panel display unit 406 instead of the product registration screen used up to that point.

Step S2215: The portable terminal 60 waits for the product pricing information transmitted from the weighing and pricing machine 10 in step S2211 to be received after displaying the pricing operation screen in step S2214. When the product pricing information is received, the portable terminal 60 transmits the product registration information wherein the pricing processing result indicated by the received product pricing information is reflected to the TMS 20. In response to the product pricing information being received, the portable terminal 60 determines that the pricing of the temporarily registered product indicated by the product pricing information is completed.

Step S2216: After the processing in S2215, the portable terminal 60 determines whether the pricing processing is completed for all the temporarily registered products.

When a product for which pricing processing has yet to be completed remains, the processing is returned to step S2214. In this case, the portable terminal 60 updates the pricing operation screen displayed up to that point in step S2214 so that the product selection button of a temporarily registered product for which the pricing processing is completed is in a non-operable state.

Step S2217: When it is determined in step S2216 that the pricing processing for all the temporarily registered products has been completed, the portable terminal 60 displays the product registration screen on the touch-panel display unit 406.

Next, a processing procedure example executed by the TMS 20 will be described.

Step S2301: The TMS 20 waits for the product registration information transmitted from the portable terminal 60 to be received in step S2215.

Step S2302: When the product registration information is received, the TMS 20 registers (adds) the received product registration information to the cart information corresponding to the current transaction. At this time, the TMS 20 searches the cart information associated with the same cart ID as that included in the received product registration information, and registers the product registration information in the searched cart information. The processing in S2302 being performed resolves the temporary registration state for one product and registration is thereby completed. After the processing in S2302, processing is returned to step S2301.

[Occurrence of Reading Failure State in Selling Area Corresponding to Selling by Weight]

When the customer is registering a product in a selling area corresponding to selling by weight as described above, the portable terminal 60 is in a state of executing processing related to the product registration illustrated in FIG. 13 in response to being in a state of registering a product.

Therefore, when the customer is performing product registration in the manner described above in the selling area corresponding to selling by weight, a case may occur wherein it is determined by the portable terminal 60 that the reading failure state has occurred. This point will be described with reference to FIG. 53A.

In FIG. 53A, at a timing at which a predetermined event occurs according to a procedure of when the customer registers a product at a selling area corresponding to selling by weight is illustrated according to passage of time.

The customer goes to a location where products sold by weight are put on display in the selling area corresponding to selling by weight, and causes the portable terminal 60 to read the product information code 3001 corresponding to an item of a product to be purchased by the customer at a time t1.

When the customer causes the portable terminal 60 to read the product information code 3001, the customer takes out the product sold by weight of the quantity to be purchased by the customer from the displayed products sold by weight, and moves to the weighing and pricing machine 10. Here, the customer may move the product sold by weight taken by hand to the weighing and pricing machine 10, but may also place (house) it in the shopping basket 80 placed on the shopping cart. The same drawing illustrates that the product sold by weight taken by the customer is housed in the shopping basket 80 at a time t2 when a certain time has passed from the time t1.

Depending on the customer, the product sold by weight to be purchased by the customer before causing the portable terminal 60 to read the product information code 3001 may be taken out and housed in the shopping basket 80 at the timing indicated as a time t2p. In this manner, there is a possibility that the customer will house the product in the shopping basket 80 at a timing before and after the timing of causing the portable terminal 60 to read the product information code 3001.

The portable terminal 60 determines an event wherein the product sold by weight is housed in the shopping basket 80 as described above as the reading failure state. That is, when the product sold by weight is housed in the shopping basket 80, the portable terminal 60 is in a state placed on a holder 71 mounted to the shopping cart and executes processing related to the product registration illustrated in FIG. 13 while capturing an image of the inside of the shopping basket 80.

The customer in this case inputs the product sold by weight into the shopping basket 80 without performing a particular operation for causing the portable terminal 60 to read the product code. A product code is not affixed to a product sold by weight. Therefore, the portable terminal 60 capturing an image of the state wherein the product sold by weight is housed in the shopping basket 80 detects a state wherein a new product is additionally input into the shopping basket 80, regardless of whether a situation exists where an attempt to read the barcode of the product is not recognized. That is, the portable terminal 60 in this case determines that the reading failure state classified as non-scan input has occurred. Depending on the state when the customer houses the product sold by weight in the shopping basket 80, the portable terminal 60 may determine a pseudo-scan instead of a non-scan input, but in any case, the determination result is that the reading failure state has occurred.

The customer causes the portable terminal 60 to read the product information code as described above, brings out the product sold by weight to be purchased, and then moves to the weighing and pricing machine 10. The customer causes the portable terminal 60 to read the connection information code CD displayed by the weighing and pricing machine 10 of the movement destination as illustrated by a time t3 in the same drawing, thereby connecting the portable terminal 60 and the weighing and pricing machine 10.

The portable terminal 60 and the weighing and pricing machine 10 being connected causes the pricing operation screen to be displayed on the customer display 106 of the weighing and pricing machine 10. The customer, by operating the pricing operation screen as in FIG. 48C and FIG. 17, designates a product sold by weight to undergo pricing (to be registered), and the product sold by weight to be registered is placed on the weighing scales 109b of the weighing and pricing machine 10 as in FIG. 17. In response to the product sold by weight being placed thereon, the weighing and pricing machine 10 executes weighing and pricing processing according to weighing and the measured weight of the product sold by weight at a time t4 in the same drawing.

When the pricing processing is completed, the weighing and pricing machine 10 displays the weighing result screen as in FIG. 50A. At a time t5 in the same drawing, the weighing and pricing machine 10 issues a label (single-article label) for the product sold by weight whereon the current pricing result is reflected in response to the label issuance button BT15 on the displayed weighing result screen being operated. At this time, the weighing and pricing machine 10 causes the product registration to complete by transmitting the product pricing information to the portable terminal 60 in response to the operation of the label issuance button BT15.

The customer lifts the product sold by weight from the weighing scale 109b, and affixes the issued label on a bag containing the product sold by weight. Provided that there is one product sold by weight, the customer may affix a label to the product sold by weight itself. Then, the customer houses the product sold by weight in the shopping basket 80 at a time t6 in the same drawing.

Here, the portable terminal 60 executes the processing in FIG. 13 even when the product sold by weight for which the pricing processing is performed and registration is completed as described above is housed in the shopping basket 80. Although the label is affixed to the product sold by weight housed in the shopping basket 80, the product code is not printed because the label in this case proves that the corresponding product sold by weight has been registered.

Therefore, even when the product sold by weight is housed in the shopping basket 80 at a timing of the time t6 after registration completion of the product sold by weight, the portable terminal 60 determines that the reading failure state classified as non-scan input has occurred.

When the customer is accustomed to handling the weighing and pricing machine 10, there is a possibility that the product sold by weight is housed in the shopping basket 80 at a timing indicated as a time t6p in the same drawing. That is, when weighing and pricing processing is completed at the time t4 and the weighing result screen is displayed, the customer in this case first lifts the product sold by weight from the weighing scale 109b at the timing indicated as the time t6p and houses it in the shopping basket 80. Following this, the customer operates the label issuance button BT15 to issue a label having the product pricing information issued (time t5), and affixes the issued label to the product sold by weight already housed in the shopping basket 80.

In this case as well, the portable terminal 60 determines that the reading failure state classified as non-scan input has occurred at a timing of the time t6p before the time t5 of issuing the label.

In this manner, when the customer self-registers a product sold by weight in a product sold by weight selling area, there is a possibility of determining (detecting) that the reading failure state due to non-scan input has occurred for each of two opportunities (time t2 (or time t2p)) and time t6 (or time t6p)) where the customer houses the product sold by weight in the shopping basket 80.

When the occurrence of this kind of reading failure state is detected, product registration information normally registered for the same product sold by weight and held product information corresponding to non-scan input are registered in duplicate as a product registration result in the cart information. When the occurrence of the reading failure state is detected, the portable terminal 60 is able to perform display for notifying the customer that the product corresponding to the reading failure state is to be handled as a held product.

In this case, for example, the employee performs the operation of holding removal corresponding to the non-scan input on the self-checkout machine 40 to enable the registration of the held product information to be erased. However, on the other hand, because the same targeted product sold by weight is registered normally, it is not preferable for the display of a notification corresponding to, for example, the reading failure state to be performed by the portable terminal 60 by the customer housing the product in the shopping basket 80.

For example, the reading failure state such as non-scan input and pseudo-scan may be handled as a fraudulent act. Therefore, in a situation where the occurrence of the reading failure state due to non-scan input or pseudo-scan is detected, it is also possible for a monitoring device (not illustrated in the drawing) provided in the store, for example, to perform notification by a display or the like of the occurrence of a fraudulent act on the basis of information transmitted from the TMS 20. However, it is not appropriate to notify the reading failure state detected when self-registering this kind of product sold by weight as a fraudulent act.

Therefore, in one or more embodiments, when self-registering a product sold by weight, even if an event arises wherein the product sold by weight is housed in the shopping basket 80, a result is generated wherein the detection of the occurrence of the reading failure state corresponding to the event becomes invalid. Invalidation of the detection of the occurrence of this type of reading failure state is also described below as reading failure invalidation.

[Reading Failure Invalidation]

A setting example of an invalidation period in reading failure invalidation by the SCS of one or more embodiments will be described with reference to FIG. 53B. In the same drawing, the timing of time t1 to time t6 (t6p) the same as in FIG. 53A is illustrated.

The portable terminal 60 first sets a period (t10 to t11) according to a period from the time t1 to the time t11 at which a time T2 has passed, and a period from the time t1 to a time t10 retroactive to a time T1 as a first invalidation period TM1, using the time t1 at which reading of the product information code is executed as a reference. The lengths of the time T1 and time T2 may be the same or different.

In the first invalidation period TM1, the detection of the occurrence of the reading failure state in response to housing of the product sold by weight performed in the shopping basket 80 by the customer is invalidated.

As a mode of reading failure invalidation corresponding to the first invalidation period TM1, when housing of the product sold by weight is performed in the shopping basket 80 by the customer at the time t2 after the time t1, the portable terminal 60 does not detect the occurrence of the reading failure state even if the captured image at that time has content to be detected (determined) as the occurrence of the reading failure state. Thus, even if the customer houses a product sold by weight in the shopping basket 80, the portable terminal 60 is able to prevent the display of a notification or the like related to the occurrence of the reading failure state. In this case, because the portable terminal 60 does not transmit the reading failure information to the TMS 20, it is possible to prevent a display or the like for notifying the occurrence of the reading failure state (fraudulent act) from being performed on the monitoring device or the like of the store.

Alternatively, the portable terminal 60 detects (determines) that the reading failure state has occurred on the basis of the captured image at that time, but may not perform display of a notification or the like related to the occurrence of the reading failure state or transmission of the reading failure information to the TMS 20. At this time, history information regarding the reading failure state detected by the portable terminal 60 is stored by the portable terminal 60, TMS 20, or the like.

As a mode of reading failure invalidation corresponding to the first invalidation period TM1, when housing of the product sold by weight is performed in the shopping basket 80 by the customer at the time t2 before the time t1, the following applies.

In this case, when housing of the product sold by weight is performed in the shopping basket 80 at the time t2p, reading of the product information code of the time t1, serving as a trigger for setting the first invalidation period TM1, is not yet executed. Therefore, the portable terminal 60 detects the occurrence of the reading failure state in response to brief housing of the product sold by weight in the shopping basket 80 at the time t2p, and performs display related to the occurrence of the reading failure state or transmission of reading failure information to the TMS 20.

Thereafter, when the product information code is read at the time t1, the portable terminal 60 at that point in time invalidates the detection of the occurrence of the reading failure state corresponding to the time t2p. Specifically, when the display of a notification or the like according to the detection of the occurrence of the reading failure state corresponding to the time t2p is being performed, for example, the portable terminal 60 suspends the display. The portable terminal 60 transmits a notification that the detection of the occurrence of the reading failure state corresponding to the time t2p is invalidated (invalidation notification) to the TMS 20.

The TMS 20 deletes the held product information corresponding to the received invalidation notification from the cart information. The TMS 20 may further transfer the received invalidation notification to the monitoring device. The TMS 20 that received the invalidation notification suspends the notification of the corresponding reading failure state.

In this case, the history of the occurrence of the reading failure state being detected in correspondence with the time t2p may be stored by the portable terminal 60 or the TMS 20.

In this manner, when housing of the product sold by weight is performed in the shopping basket 80 by the customer at the time t2p before the time t1, the detection of the occurrence of the reading failure state, briefly handled as valid, is treated as being invalid at the timing when the time t1 is reached.

Using the time t3 at which reading of the connection information code CD is executed as a reference, the portable terminal 60 sets a period from the time t3 to a time t12 at which a time T3 has passed as a second invalidation period TM2. The time T3 may be established on the basis of a time when it is anticipated that an operation wherein the customer causes the portable terminal 60 to read the connection information code CD and then issue a label and an act for causing the shopping basket 80 to house the product sold by weight for which pricing has been completed are completed.

In the second invalidation period TM2, the detection of the occurrence of the reading failure state in response to housing of the product sold by weight performed in the shopping basket 80 by the customer is invalidated, in the same manner as the first invalidation period TM1.

A processing procedure example executed by the portable terminal 60 relating to reading failure invalidation will be described with reference to the flowcharts in FIG. 54 to FIG. 56.

Figure 54:
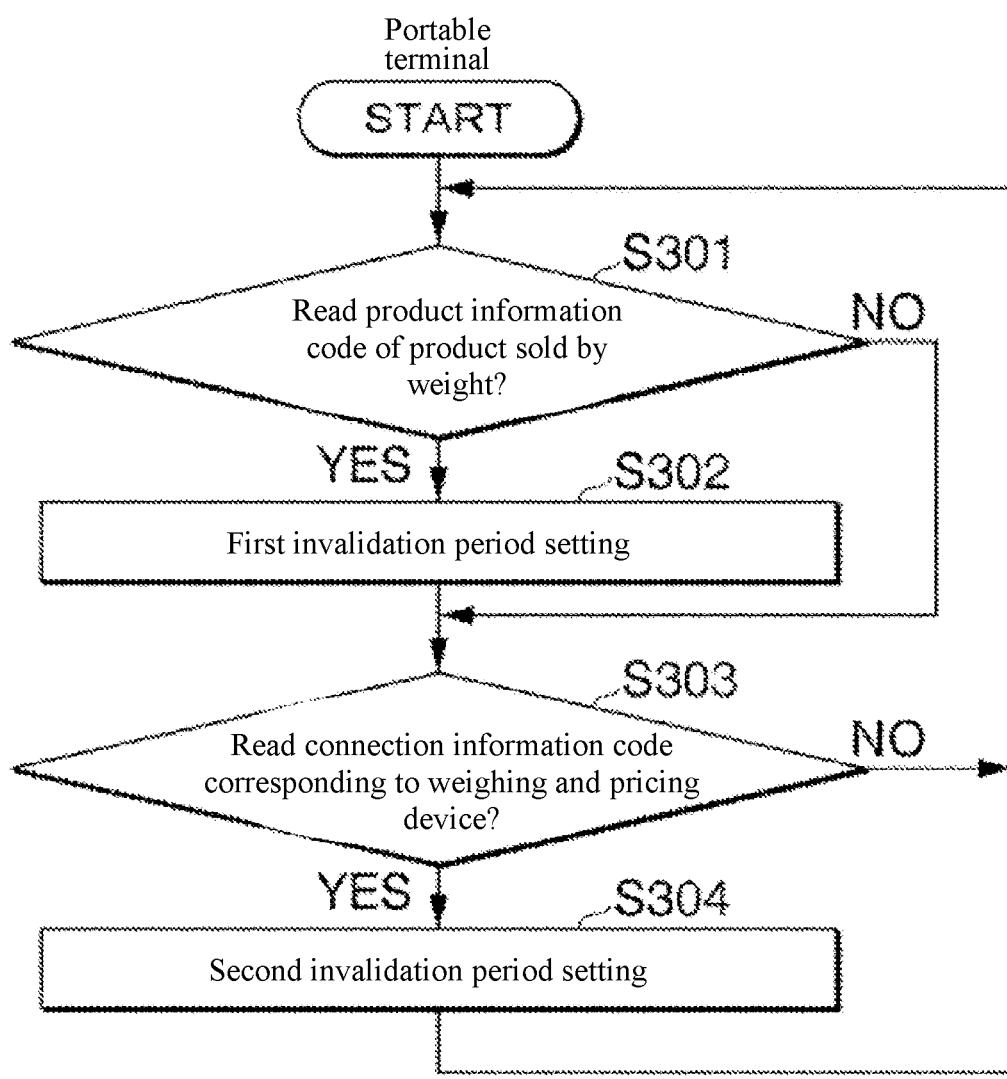
FIG. 54 is a flowchart illustrating a processing procedure example executed by the portable terminal in relation to the setting of the invalidation period according to one or more embodiments.

First, the flowchart in FIG. 54 illustrates a processing procedure example that the portable terminal 60 executes in relation to setting of an invalidation period (first invalidation period TM1, second invalidation period TM2).

Step S301: The portable terminal 60 determines whether reading of the product information code of the product sold by weight is executed during execution of the product registration processing.

Step S302: When reading of the product information code of the product sold by weight is executed, the portable terminal 60 sets the first invalidation period TM1 using a point in time at which reading of the current product information code is executed as a reference.

Step S303: After the processing in S302 or when it is determined that the reading of the product information code is not executed in step S301, the portable terminal 60 determines whether the reading of the connection information code CD for connecting to the weighing and pricing machine 10 displayed by the weighing and pricing machine 10 is executed.

When reading of the connection information code CD for connecting to the weighing and pricing machine 10 is not executed, the processing is returned to step S301.

Step S304: When reading of the connection information code CD for connecting to the weighing and pricing machine 10 is executed, the portable terminal 60 sets the second invalidation period TM2 using a point in time at which reading of the current connection information code CD as a reference was executed. After the processing in S304, processing is returned to step S301.

Figure 55:
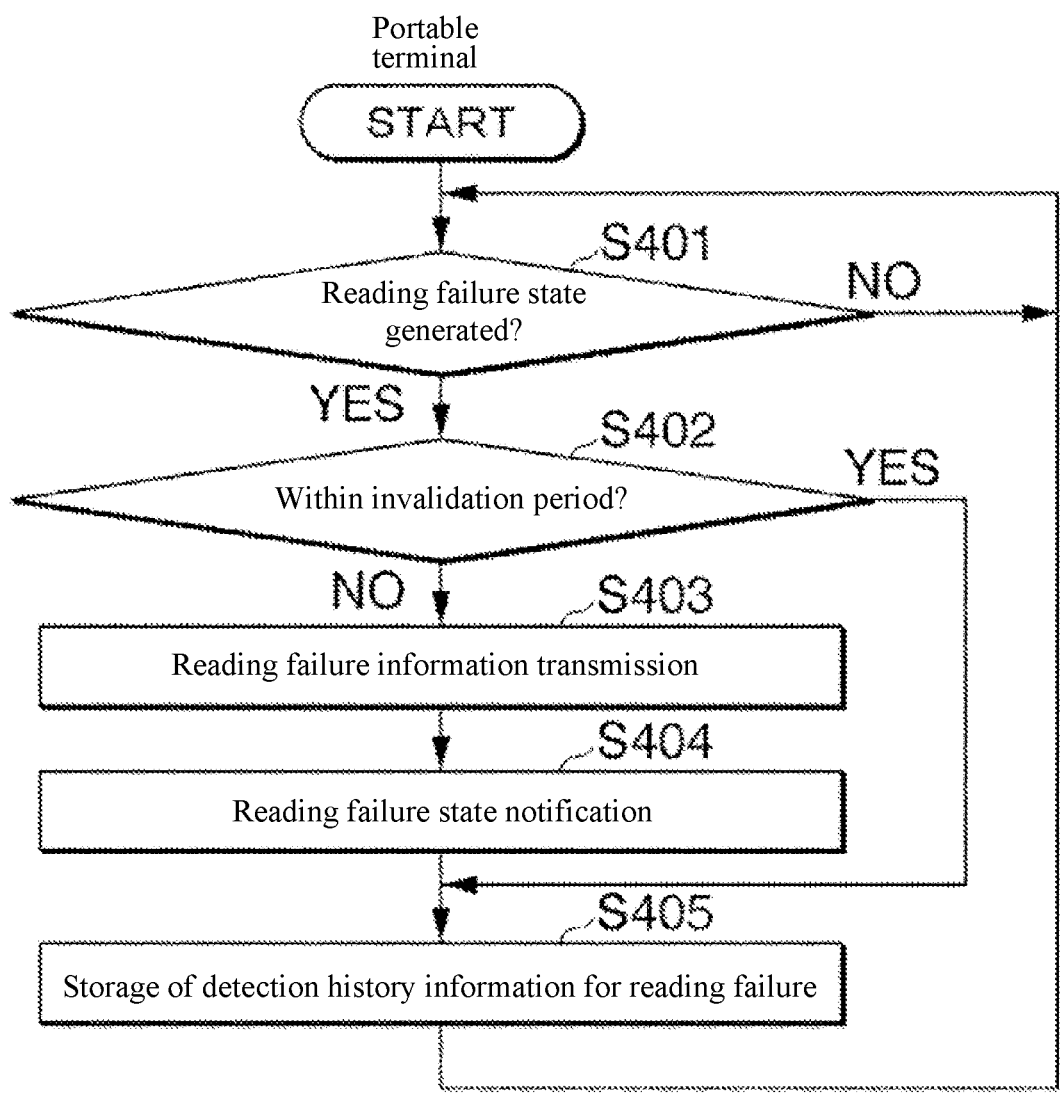
FIG. 55 is a flowchart illustrating a processing procedure example executed by the portable terminal in response to a detection of an occurrence of a reading failure state according to one or more embodiments.

The flowchart in FIG. 55 illustrates a processing procedure example executed by the portable terminal 60 in response to the detection of the occurrence of the reading failure state. FIG. 55 illustrates a procedure when the occurrence of the reading failure state is detected regardless of the invalidation period, and display of a notification relating to the occurrence of the reading failure state by the portable terminal 60 and transmission of the reading failure information from the portable terminal 60 is not performed during the invalidation period.

Step S401: The portable terminal 60 judges whether the occurrence of the reading failure state is detected.

Step S402: When the occurrence of the reading failure state is detected, the portable terminal 60 determines whether the point in time at which the occurrence of the reading failure state is detected is included in the invalidation period (first invalidation period or second invalidation period TM2).

Step S403: When the detection of the reading failure state is not included in the invalidation period, the portable terminal 60 transmits reading failure information corresponding to the detection of the occurrence of the current reading failure state to the TMS 20.

Step S404: The portable terminal 60 causes the touch-panel display unit 406 to perform a display notifying the occurrence of the reading failure state.

Step S405: After the processing in step S404 or when it is determined that the reading failure state is included in the invalidation period in step S402, the portable terminal 60 stores detection history information indicating a history of the detection of the occurrence of the current reading failure state. The portable terminal 60 may transmit the detection history information to the TMS 20 to store the detection history information in the TMS 20.

After the processing in S405, processing is returned to step S401.

Figure 56:
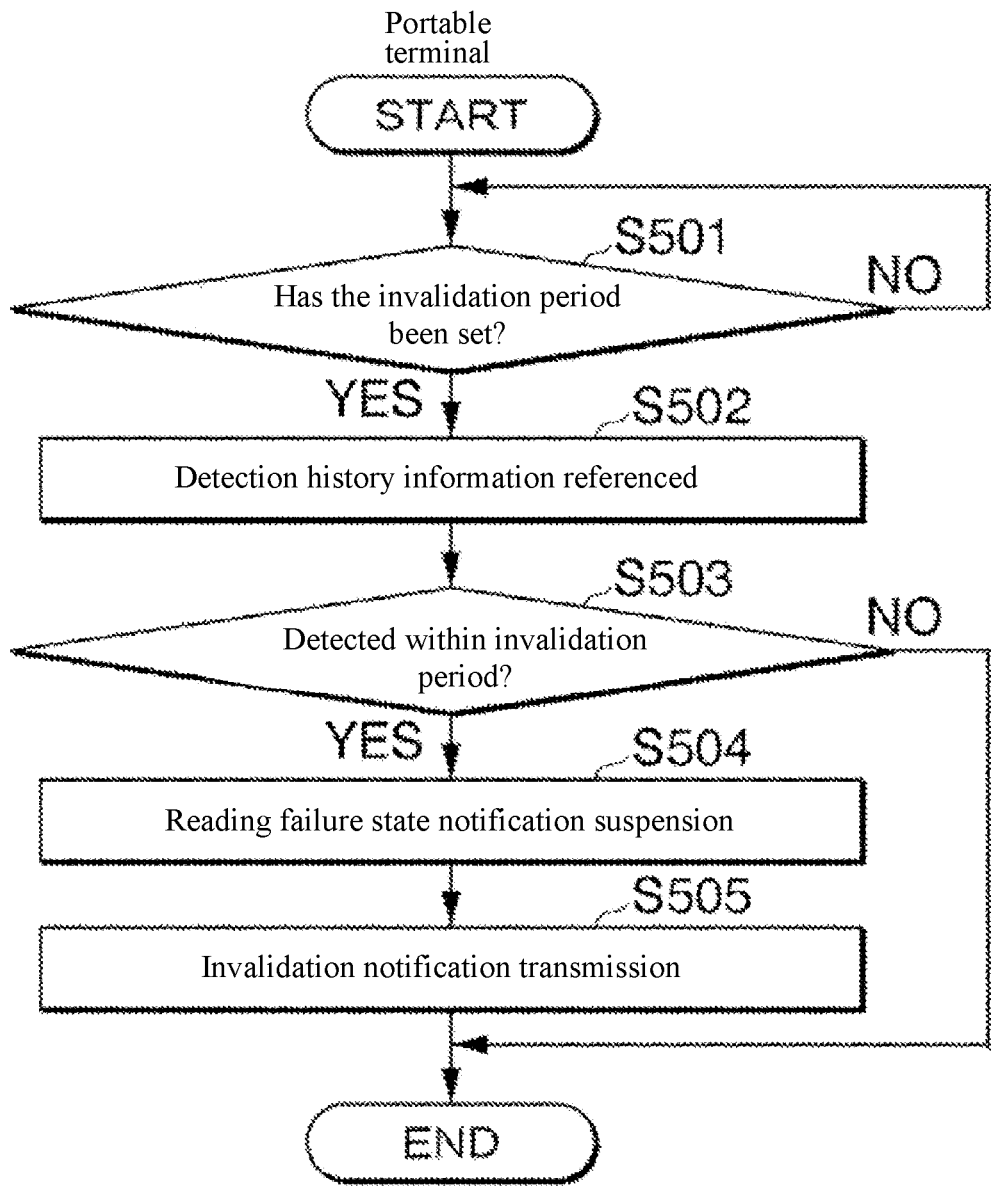
FIG. 56 is a flowchart illustrating a processing procedure example wherein the portable terminal invalidates the detection of the occurrence of the reading failure state before a time serving as a reference of the invalidation period according to one or more embodiments.

The flowchart in FIG. 56 illustrates a processing procedure example wherein the portable terminal 60 invalidates the detection of the occurrence of the reading failure state before a time serving as a reference of the invalidation period.

Step S501: The portable terminal 60 waits for the invalidation period to be set in step S302 or step S304 in FIG. 54.

Step S502: When the invalidation period is set, the portable terminal 60 references the detection history information stored by the portable terminal itself or the TMS 20.

Step S503: As a result of referencing the detection history information in step S502, the portable terminal 60 determines whether the occurrence of the reading failure state is detected during the invalidation period currently set.

Step S504: When it is determined that the occurrence of the reading failure state has been detected, and when, at the present time, a notification relating to the occurrence of the applicable reading failure state is caused by the touch-panel display unit 406, the portable terminal 60 suspends the notification.

Step S505: When the occurrence of the reading failure state has been detected, the portable terminal 60 transmits the invalidation notification regarding the detection of the occurrence of the applicable reading failure state to the TMS

20. The TMS 20 deletes the applicable held product information from the cart information in response to the receipt of the invalidation notification. In response to the receipt of the invalidation notification, the TMS 20 is able to suspend the notification regarding the occurrence of the applicable reading failure state being executed by the monitoring device.

Variation of Fourth Example

A variation of the fourth example will be described below. In the variation, the procedure for when the customer registers a product sold by weight differs from the fourth example as follows.

In the variation, the product information panel 3000 is not provided in a location where a product sold by weight is put on display. That is, the product information code 3001 is not presented in a location where the product sold by weight is put on display. The customer takes out the product sold by weight of a quantity to be purchased by the customer from the displayed products sold by weight; however, at this time, the customer does not perform the operation for causing the portable terminal 60 to read the product information code 3001.

The customer holds the product sold by weight to be purchased and weighs it using the weighing and pricing machine 10. When the customer moves from the location where the product sold by weight is put on display to the weighing and pricing machine 10, there is a possibility that customer will house the product sold by weight to be purchased in the shopping basket 80 placed in the shopping cart.

Figure 57:
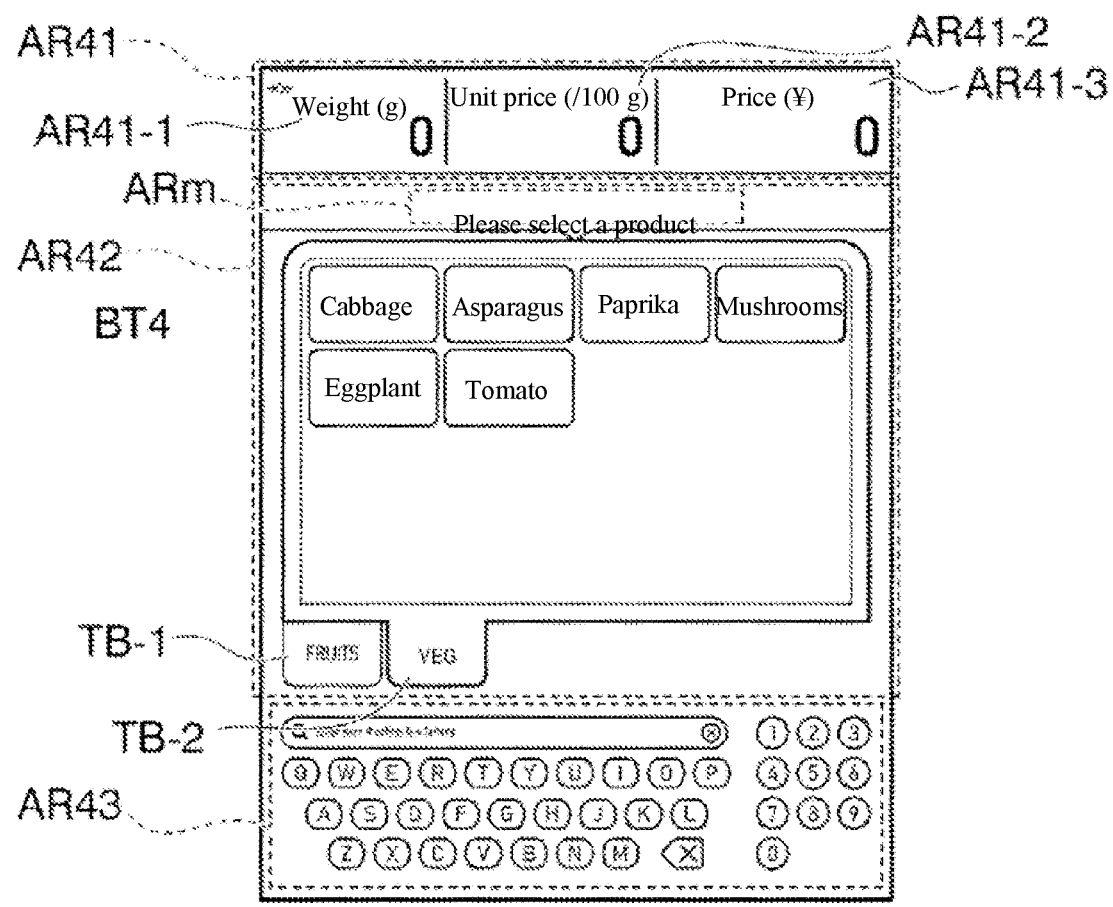
FIG. 57 is a diagram illustrating one example of a pricing operation screen according to one or more embodiments.

In the standby mode, the weighing and pricing machine 10 displays the pricing operation screen as the standby screen displayed on the customer display 106. FIG. 57 illustrates one example of the pricing operation screen according to the variation of the fourth example.

A weighing result area AR41 is disposed on the pricing operation screen. The weighing result area AR41 is an area (column) displaying the result of weighing the product sold by weight to be priced. The weighing result area AR41 includes a weighing area AR41-1, a unit price per weight area AR41-2, and a total monetary amount area AR41-3.

The weighing area AR41-1 is an area indicating the measured weight of the product sold by weight to be priced.

The unit price per weight area AR41-2 is an area indicating the unit price per weight of the product sold by weight to be priced.

Among the products sold by weight, the number is calculated on the basis of the measured weight and unit weight, and there are products that correspond to a number wherein the price is calculated on the basis of the calculated number and unit price per article. In the case of this kind of product sold by weight corresponding to the number, the number calculated on the basis of the measured weight and unit weight may be displayed in the weighing area AR41-1, and the unit price per article may be indicated in the unit price per weight area AR41-2.

The total monetary amount area AR41-3 is an area indicating the total monetary amount of the sum of all prices of products sold by weight for which pricing has been completed to that point under the same single transaction.

A product selection area AR42 is an area where a product to be priced may be selected. In the product selection area AR42 in the same drawing, two tabs TB (TB-1, TB-2) are disposed in the product selection area AR42. A sheet whereon a respective product button is disposed is associated with each tab TB in the product selection area AR42. The tab TB may be selected by an operation of the customer. The selected tab TB is highlighted with respect to the other tab TB, and a product button BT4 (preset key) disposed on the sheet of the selected tab TB is displayed in the product selection area AR42.

A tab TB-1 displays "FRUITS". The product button BT4 for each product sold by weight classified into fruits is disposed on the sheet corresponding to the tab TB-1.

A tab TB-2 displays "VEG". The product button BT4 (preset key) for each product sold by weight classified into vegetables is disposed in a predetermined order on the sheet corresponding to the tab TB-2.

The structure of this kind of sheet on the pricing operation screen corresponds to when products of fruits and vegetables are sold as products sold by weight.

The disposition order of the product button BT4 on the sheet may be determined on the basis of, for example, product code order, product name order, or the like, and also past purchases or preset priority. When the number of products of a classification corresponding to one tab TB exceeds the number of product buttons BT4 falling within one sheet, switching of a plurality of sheets is made possible by an operation such as skipping, scrolling, or the like of sheets.

A message area ARm is disposed on an upper side of the product selection area AR42. The message area ARm is an area wherein a message having predetermined content according to the content of the current screen is displayed. "Please select a product" is displayed in the message area ARm in the same drawing. That is, a message is displayed in the message area ARm in this case to guide the customer to perform an operation of the product button BT4 for performing item designation of the product to be priced.

A search area AR43 capable of searching for a product sold by weight according to a character input operation is disposed on the pricing operation screen. Operating a software keyboard disposed in a search area AR43 and inputting a product name or the like makes it possible for the customer to search for a product sold by weight.

The search area AR43 need not be disposed on the pricing operation screen. In addition, the search area AR43 may be displayed in response to, for example, a predetermined operation being performed on the pricing operation screen.

Either of the tabs TB-1 and TB-2 is selected on a pricing operation screen in an initial state.

The customer at the weighing and pricing machine 10 performs pricing (product registration) for each item of the product sold by weight to be purchased. Therefore, the customer first selects one item to be priced from among the items of the products sold by weight to be purchased. At this time, when in a state where the tab TB corresponding to the classification of the item of the product sold by weight selected to be priced is not selected, the customer performs an operation for selecting the tab TB corresponding to the classification of the product sold by weight set to be priced.

For example, in response to selecting "cabbage" to be priced from among the products sold by weight to be purchased, a state is indicated wherein the customer selects the tab TB-2 corresponding to a vegetable of a classification to which the cabbage corresponds.

In response to the tab TB-2 being selected, the product button BT4 for each product sold by weight classified as a vegetable is disposed on the sheet. Only the product name is displayed on the product button BT4; however, an image or the like representing the product may also be displayed in addition to the product name, for example.

The customer in this case operates the product button BT4 whereon the product name of "cabbage" is displayed among the buttons disposed on the sheet since the cabbage is set to be priced. That is, the customer performs an operation to designate that the item of the product sold by weight to be priced is "cabbage".

In response to the product button BT4 being operated, the customer display 106 displays a guidance screen for guiding the customer to place and weigh the cabbage designated as the product to be priced on the weighing scale 109b. The customer places the cabbage that is the product sold by weight to be priced on the weighing scale 109b.

The weighing and pricing machine 10 executes weighing and pricing processing according to the weighing result in response to the cabbage being placed on the weighing scale 109b. That is, the weighing and pricing machine 10 in this case calculates the price of cabbage according to the weight of the weighed cabbage and the unit price per weight of the cabbage.

The weighing and pricing machine 10 displays the weighing result screen on the customer display 106 in response to the completion of pricing processing.

Figure 58:
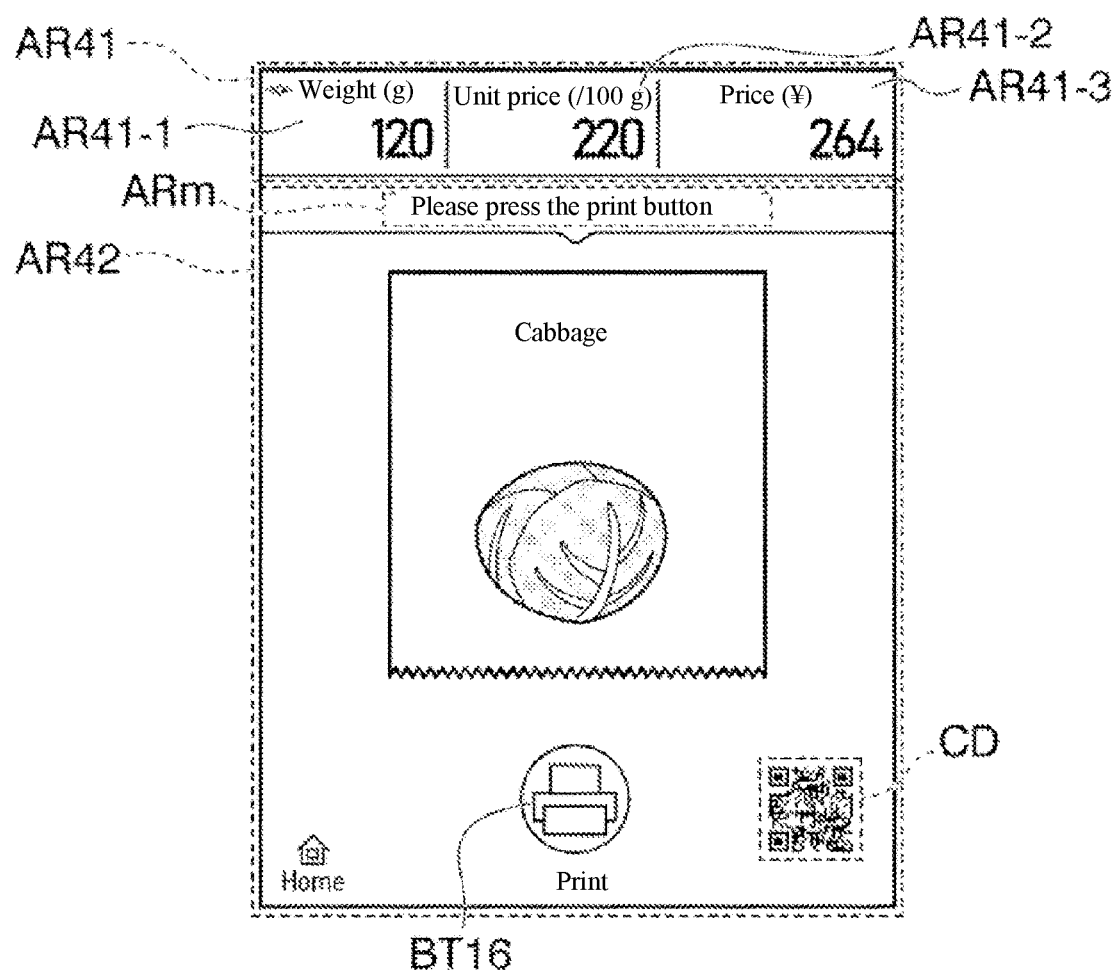
FIG. 58 is a diagram illustrating one example of a weighing result screen according to one or more embodiments.

FIG. 58 illustrates one example of the weighing result screen. In the same drawing, portions that are the same as those in FIG. 57 are given the same reference numerals, and descriptions are omitted as appropriate.

On the weighing result screen in the same drawing, the weight of the cabbage weighed in the weighing area AR41-1 is indicated in the weighing result area AR41, and the unit price per weight of the cabbage is indicated in the unit price per weight area AR41-2; there is a change to the state wherein the total monetary amount according to the calculated price of the cabbage is indicated in the total monetary amount area AR41-3.

A label issuance button BT16 is disposed on the weighing result screen. In addition, a message such as "Please press the print button" is displayed in the message area ARm to prompt the customer to operate a label issuance button BT16 for issuance of a label (single-article label) whereon the pricing processing result of the cabbage is reflected.

As described above, the procedure until the product button BT4 corresponding to the product sold by weight to be priced is operated, the product sold by weight to be priced is placed on the weighing scale 109b, and the weighing and pricing machine 10 is caused to execute pricing processing is the same as where the customer utilizes the portable terminal 60 to perform product registration, and where the customer does not utilize the portable terminal 60.

In addition, the customer who does not perform product registration by utilizing the portable terminal 60 operates the label issuance button BT16. The weighing and pricing machine 10 establishes the current pricing using pricing processing, and issues a label (single-article label) whereon content reflecting the pricing result established for the cabbage is printed in response to the label issuance button BT16 being operated. In this case, a code (a barcode or a two-dimensional code) is printed on the label issued. The code printed on the label includes information required for checkout at a POS terminal operated by the employee, such as the product code and price.

The connection information code CD is displayed on the weighing result screen. The customer who utilizes the portable terminal 60 to perform product registration of the product sold by weight performs an operation for causing the portable terminal 60 to read the connection information code instead of an operation on the label issuance button BT16.

The portable terminal 60 establishes a connection via communication with the weighing and pricing machine 10 by reading the connection information code CD. The weighing and pricing machine 10 establishes the current pricing using pricing processing in response to the establishment of the connection to the portable terminal 60, and transmits product pricing information regarding the cabbage to the portable terminal 60. The weighing and pricing machine 10 issues a label (single-article label) whereon content reflecting the pricing result established for the cabbage is printed. In this manner, a code need not be printed on the label issued according to the connection of communication with the portable terminal 60.

The weighing and pricing machine 10 may transmit product registration information based on the product pricing information transmitted to the portable terminal 60 to the TMS 20 via a communication line.

After the label is issued, the process may transition from the weighing result screen to the display of the label affixing and guidance screen. A display of a message, design, or the like is performed on the label affixing and guidance screen to guide the customer to affix the label issued from the weighing and pricing machine 10 to a bag containing the cabbage for which pricing was currently performed.

When the label is issued, the customer removes the cabbage from the weighing scale 109b, and affixes the label taken from the label ejection slot 110a to the bag containing the cabbage. At this time, there is a possibility that the customer will house the bag of cabbage having the label affixed in the shopping basket 80 placed on the shopping cart.

The label affixing and guidance screen may be erased, for example, in response to a sensor provided in the label ejection slot 110a detecting that the label has been taken. In response to the label affixing and guidance screen being erased, the customer display 106 may transition to the display of the pricing operation screen for designating an item of the next product sold by weight to be priced.

Even during self-registration of a product sold by weight, when the customer performs a procedure for registering the product sold by weight to be purchased, there is a possibility of determining (detecting) that the reading failure state due to non-scan input has occurred in response to each of two opportunities where the customer houses the product sold by weight in the shopping basket 80 in correspondence with one product sold by weight. This point will be described with reference to FIG. 59A.

Figure 59A:
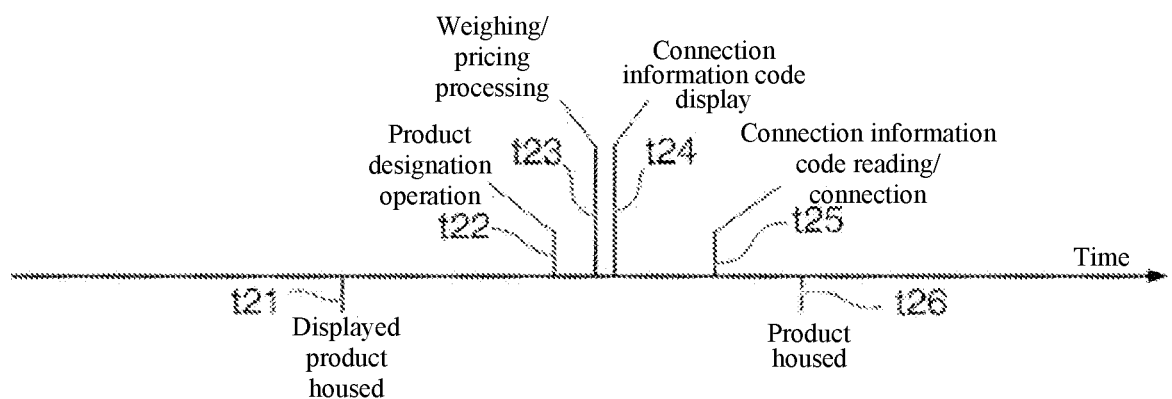
FIGS. 59A and 59B are diagrams illustrating a setting example of the invalidation period according to one or more embodiments.

In FIG. 59A, a timing at which a predetermined event occurs according to a procedure for when the customer registers a product at a selling area corresponding to selling by weight is illustrated according to a passage of time.

When the customer goes to a location where the product sold by weight in the selling area corresponding to selling by weight is put on display, the customer first takes out the product to be purchased from the displayed products at a time t21 and houses the product taken in the shopping basket 80 placed in the shopping cart. At this time, the portable terminal 60 placed in the holder 71 of the shopping cart detects the occurrence of the reading failure state.

Thereafter, the customer goes to the weighing and pricing machine 10 and operates the product button BT4 at a time t22 to designate the product to be priced. Thereafter, the customer places the product to be priced on the weighing scale 109b. Thereby, the weighing and pricing machine 10 executes weighing and pricing processing at a time t23, and the weighing result screen including the connection information code CD is displayed at a time t24.

The customer performs an operation to cause the portable terminal 60 to read the connection information code CD displayed by the weighing result screen at a time t25, thereby establishing a connection between the portable terminal 60 and the weighing and pricing machine 10. The weighing and pricing machine 10 thereby establishes a pricing processing result, and performs transmission of the product pricing information to the portable terminal 60 and issuance of the label. Thereafter, the customer affixes the issued label to a bag containing the product to be priced and houses it in the shopping basket 80 at a time t26. At this time, the portable terminal 60 placed in the holder 71 of the shopping cart detects the occurrence of the reading failure state.

In this manner, even under the registration procedure of the product sold by weight, the occurrence of the reading failure state is detected at the timing of the time t21 at which the product sold by weight put on display is housed in the shopping basket 80, and the timing of the time t26 at which the product sold by weight for which pricing has completed is housed in the shopping basket 80. The occurrence of this type of reading failure state may also be invalidated.

Figure 59B:
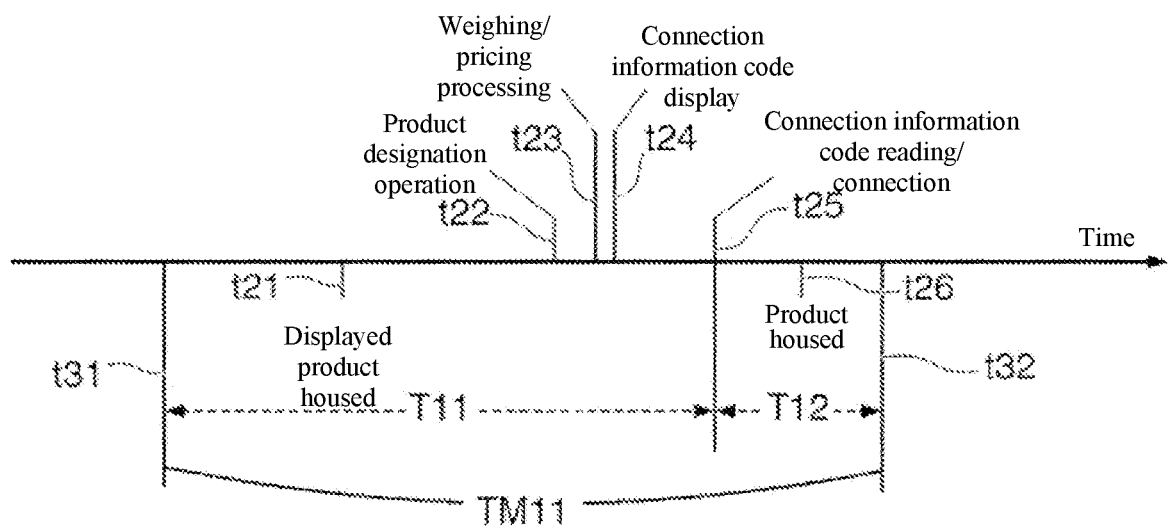

Therefore, by setting an invalidation period TM11 as illustrated in FIG. 59B, detection of the occurrence of the reading failure state at the timing of the time t21 and time t26 is invalidated.

For example, the portable terminal 60 sets the invalidation period TM11 using the time t25 as a reference in response to the connection information code CD being read at the time t25. That is, the portable terminal 60 sets a period (t31 to t32) according to a period from the time t25 to a time t31 retroactive to a time T11, and a period from the time t25 to a time t32 at which a time T12 has passed as the invalidation period TM11.

The time T11 may be set on the basis of a time that is expected to be required from when the customer takes the product sold by weight to be purchased from among the products sold by weight put on display and houses it in the shopping basket 80 to when the portable terminal 60 is made to read the connection information code CD. The time T12 may be established on the basis of a time when it is expected that the product sold by weight for which pricing has been established is housed in the shopping basket 80 after an operation for causing the portable terminal 60 to read the connection information code CD is performed.

In addition, the portable terminal 60 may execute the same processing as FIG. 55 and FIG. 56. As a result, an event wherein a product sold by weight for which pricing has been established at a timing corresponding to the time t26 is housed in the shopping basket 80 is not treated as a reading failure state, and, for example, notification relating to the occurrence of the reading failure state is not executed. An event wherein a product sold by weight is housed in the shopping basket 80 at a timing corresponding to the time t21 is briefly handled as a reading failure state, but this is invalidated by setting the invalidation period TM11 at the time t25 so as not to be handled as an occurrence of a reading failure state.

For example, when the customer intends to purchase a plurality of items of a product sold by weight, there is a possibility that the customer will perform an act of housing the products sold by weight in the shopping basket 80 multiple times at the location where the product sold by weight is put on display. In this case, the portable terminal 60 detects the occurrence of the reading failure state each time a product sold by weight is housed in the shopping basket 80.

Thereafter, when the invalidation period TM11 is set by the customer first causing the portable terminal 60 to read the connection information code in correspondence with the product sold by weight to be priced, all past reading failure states that are included in the set invalidation period TM11 are invalidated.

Focus control applicable to the camera 606 of the portable terminal 60 when code scanning is performed under a state where the shopping application of one or more embodiments is operating will be described using the following three examples.

Focus Control: First Example

In the first example of focus control, the shopping application applies auto-focus control possessed by the camera (camera 606) of the portable terminal 60 as, for example, a smartphone or the like to a code scan function.

When the customer causes the portable terminal 60 to read the code (product code, connection information code, or the like), it is preferable that the customer avoid adjusting the distance or angle between the portable terminal 60 and the code as much as possible.

When the auto-focus control of a smartphone camera is applied to reading a code, the camera performs control so as to focus on the code; therefore, the code is easily focused on without adjusting as described above. However, in this case, there is a possibility that an already registered product is registered in duplicate because, for example, the barcode of the product housed in the shopping basket 80 is automatically focused on in a state where the portable terminal 60 is mounted to the shopping cart so as to capture an image of the inside of the shopping basket 80.

Focus Control: Second Example

In the second example of focus control, the shopping application controls a focus mechanism of the camera (camera 606) so as to focus on the code by repeatedly changing the perspective of a focal length.

When the customer causes the portable terminal 60 that causes the shopping application to operate to read the code (product code, connection information code, or the like), it is preferable that the customer avoid adjusting the distance between the portable terminal 60 and the code as much as possible.

With the focus control of the present example, because the perspective of the focal length is changed, after the customer makes the code enter the image capture range, it is possible to reliably focus on the code, provided that a certain fixed distance is maintained between the portable terminal 60 and the code. That is, the customer in this case need not make adjustments such as moving the code closer to or farther away from the portable terminal 60 when causing the code to be read. However, with the focus control of the present example, because the perspective of the focal length is changed over a comparatively large width, a large change is repeated for the entire captured image. Therefore, the determination of non-scan input based on the change of the state inside the shopping basket 80 is a disadvantage. There is a possibility that recognition accuracy is reduced regarding processing, such as image recognition, for applications other than code scanning.

Focus Control: Third Example

In the third example of focus control, the shopping application controls the focus mechanism regarding the camera (camera 606) so as to fix the focal length by a predetermined value.

In this kind of focus control, it is difficult to focus on the code in the captured image, and the image portion of the code is easily blurred. However, depending on the code recognition capability of the shopping application, the code may be normally read even in a state of being blurred to a certain extent, and no hindrance may be caused to product registration or the like.

For example, in the case of auto-focus control, there is a possibility of a malfunction arising wherein the code of a product in the shopping basket 80 is automatically focused on and product registration is performed. This kind of malfunction may be prevented with the focus control of the present example.

In the present example, how the fixed focal length is set may be set on the basis of characteristics of the device as a camera corresponding to the camera 606, the distance between the code and the portable terminal 60 that is expected when the customer causes the code to be read, or the like. The portable terminal 60 may be provided with a function for setting a suitable focal length value according to the model of the portable terminal 60 as the smartphone or automatically setting the focal length according to the reading state of the code.

Switching may be made possible by two or more focus controls from among the first to third examples described above. For switching of the focus control, for example, the customer (user) may perform manual switching, or the portable terminal 60 may judge whether any focus control is suitable on the basis of a state or the like of the captured image by the camera 606 when a code scan is performed by the customer and then perform switching. For example, in the case of a state wherein a fixed amount of time or more is required before it is possible to focus on and read the code, the portable terminal 60 may be configured to switch to another focus control. Alternatively, the portable terminal 60 may switch the focus control on the basis of, for example, the age of the customer or the degree of familiarity with the operation of the code scan. The degree of familiarity with the operation may be determined by the portable terminal 60, for example, on the basis of an elapsed time after installing the shopping application, the number of times the shopping application is started up, an operation accumulation time, and the like.

<Supplement Regarding Captured Images in Product Registration>

As illustrated in FIG. 11C, FIG. 51B, and the like, the scan image area AR11 is disposed on the product registration screen displayed by the portable terminal 60. A captured image obtained by the camera 606 capturing an image is displayed in the scan image area AR11. However, a predetermined partial area is displayed in the scan image area AR11 instead of displaying the entire area of the captured image. The captured image displayed in the scan image area AR11 may be, for example, an area occupying about ⅓ to ½ of the upper side with respect to the entire area. In this case, the portable terminal 60 may define the area displayed in the scan image area AR11 among the entire area of the captured image as an area used for code detection, and may exclude the other areas so as not to be utilized for code detection.

When the customer causes the portable terminal 60 to read the product code, the code (product code or connection information code) is adjusted so as to fall within the scan image area AR11. At this time, the captured image displayed in the scan image area AR11 as described above is limited to a portion of the entire area, and therefore, it becomes easier for the customer to scan the code. Another area such as the product registration state area AR12 may also be displayed on the product registration screen, and the product registration screen that is easy for the customer to use may also be provided.

On the other hand, the entire area of the captured image may be utilized for the detection of a non-scan input or the like, for example. That is, the portable terminal 60 performs detection of non-scan input or the like for not only an area displayed on the product registration screen in the captured image but also an area not displayed on the product registration screen. Thus, the product registration screen that is easy to use as described above, for example, is provided, and the whole inside of the shopping basket 80 may be targeted by utilizing the entire area of the captured image in relation to detection of non-scan input or the like.

Another example of the fourth example will be described below.

[First Variation]

A product sold separately may be sold in the selling area corresponding to selling by weight described above. A product sold separately, for example, a fresh food such as a vegetable, a fruit, a fish, or the like, is a product for which the unit price per unit number is determined, yet a product code is not able to be attached in advance.

As one example, when the store sells apples as a product sold separately, the customer may perform product registration of an apple as follows.

In this case, the customer causes the portable terminal 60 read the product information code 3001 of the apple. The apple as a product sold separately is thereby set as an item to be registered. Accordingly, the registration operation screen is displayed on the portable terminal 60 to indicate that, for example, the apple as a product sold separately is set to be registered, and the registered number is input thereon. The customer performs an operation on a registration operation screen to input the number (quantity) of apples that the customer is going to purchase as the registered quantity. In response to the registered quantity being input, the portable terminal 60 calculates the price according to the input registered quantity and, for example, the unit price per article (may be unit price per weight depending on the item).

In the case of a product sold separately, the information of the unit price may be included in the product information code. The portable terminal 60 is thereby able to acquire unit price information by reading the product information code. Alternatively, the portable terminal 60 may acquire the unit price associated with the item read from the product information code from the TMS 20. Calculation of the price may be performed by the TMS 20 on the basis of information on the item and purchase quantity transmitted from the portable terminal 60 and, for example, information on the unit price stored by the TMS 20.

The information on the item, purchase quantity, and the price is acquired in this manner to complete the registration of the apple as a product sold separately. In this manner, in the case of a product sold separately, it is not necessary for the weighing and pricing machine 10 to weigh the product.

In this manner, even when the product sold separately is self-registered, when the product sold separately that is put on display is housed in the shopping basket 80 by the customer in the same manner as a product sold by weight, an event applicable to a reading failure state occurs. That is, when the product sold separately is self-registered as described above, an event applicable to a reading failure state occurs at the timing when the product sold separately is housed in the shopping basket 80 according to the time t2 or the time t2*p* in FIG. 53B.

Even for this kind of self-registration of a product sold separately, the detection of the occurrence of the reading failure state when the product sold separately is housed in the shopping basket 80 by the customer may be invalidated by executing control of reading failure invalidation. However, in the case of self-registration of the product sold separately, in the flowchart in FIG. 54, the processing corresponding to setting the first invalidation period in steps S301 and S302 may be executed, and steps S303 and S304 may be omitted.

The self-registration of the product sold separately may be operated by using the weighing and pricing machine 10 according to the product registration procedure. In this case, the customer causes the portable terminal 60 to read the product information code 3001 of the apple that is the product sold separately, houses the apple in the shopping basket 80, and goes to the weighing and pricing machine 10.

The customer causes the portable terminal 60 to read the connection information code CD displayed on the standby screen of the weighing and pricing machine 10 at the destination, thereby connecting the portable terminal 60 to the weighing and pricing machine 10. The customer performs an operation for designating the apple by an operation on the pricing operation screen, and then performs an operation for designating the purchase number. In the case of a product sold separately, it is not necessary to place and weigh it on the weighing scale 109b.

In response to this kind of operation, the weighing and pricing machine 10 calculates the price on the basis of the designated purchase number and the unit price (unit price per number) per unit number set for the apple and displays the weighing result screen. The customer performs an operation on the weighing result screen for instructing label issuance (an operation on the label issuance button BT15) to establish the pricing processing result and to issue the label. The customer affixes the issued label to a bag containing the apple.

The self-registration of the product sold separately may be operated by using the weighing and pricing machine 10 according to the product registration procedure.

In this case, the customer takes out the apple that is the product sold separately to be purchased from the display location, houses it in the shopping basket 80, and goes to the weighing and pricing machine 10. The customer performs an operation on the weighing and pricing machine 10 for designating the apple as the product to be priced, and then performs an operation for designating the purchase number. In this case also, it is not necessary to place and weigh the apple that is the product sold separately on the weighing scale 109b.

The weighing and pricing machine 10 calculates the price according to the unit price per number price of the apple and the designated purchase number and displays the weighing result screen including the connection information code CD. The customer causes the portable terminal 60 to read the connection information code CD to connect the portable terminal 60 to the weighing and pricing machine 10. The weighing and pricing machine 10 establishes the current pricing processing result in response to communication with the portable terminal 60 being established, and transmits product pricing information to the portable terminal 60 and issues a label. The customer affixes the issued label to a bag containing the apple.

Even when the product sold separately is self-registered using the weighing and pricing machine 10 in accordance with the product registration procedure as described above, when the product sold separately that was put on display is housed in the shopping basket 80 by the customer in the same manner as a product sold by weight, an event applicable to a reading failure state occurs. For example, when the customer takes out the bag containing the product sold separately housed in the shopping basket 80, affixes the label, and again houses the bag containing the product sold separately in the shopping basket 80, an event applicable to a reading failure state occurs.

In this case, the detection of the occurrence of the reading failure state when the product sold separately is housed in the shopping basket 80 by the customer may be invalidated by executing control of reading failure invalidation.

In each of the foregoing embodiments, the setting of the invalidation period may be changed as appropriate.

For example, in the first example, as a procedure for self-registration, the product information code 3001 is read by the portable terminal 60 and then the product at the display location is taken out. In this kind of case, the invalidation period TM1 may be set only to the period from the time t1 to the time t11 at which the time T2 has passed, excluding the period from the time t1 to the time t10 retroactive to the time T1.

Conversely, when, as a procedure for self-registration, the product at the display location is taken out before the portable terminal 60 reads the product information code 3001, the invalidation period TM1 may be set only to the period from the time t1 to the time t10 retroactive to the time T1, and the period from the time t1 to the time t11 at which the time T2 has passed may be excluded.

For example, provided that the product is not housed in the shopping basket 80 when the product is taken out from the display location by the procedure of self-registration, the invalidation period TM1 according to the first example need not be set. In the case of the second example, the invalidation period TM11 according to the period corresponding to the time T12 may be set excluding the period corresponding to the time T11.

Conversely, provided that the product is not housed in the shopping basket 80 after the pricing processing result is established by the procedure of self-registration, the invalidation period TM2 according to the first example need not be set. In the case of the second example, the invalidation period TM11 according to the period corresponding to the time T11 may be set excluding the period corresponding to the time T12.

An example of the procedure of self-registration is given where there is a possibility that the product taken out from the display location after the product information code 3001 is read at the time t1 in FIG. 53A is housed in the shopping basket 80; however, the product is not housed in the shopping basket 80 before the point in time t1.

In this kind of case, the first invalidation period TM1 may be set with a timing for housing the product in the shopping basket 80 as a period from the time t1 at which the product information code 3001 is read to the time t3 at which the connection information code CD is read. Provided that the first invalidation period TM1 is set in this manner, under the procedure of the self-registration of the present variation, the detection of the occurrence of a reading failure state may be reliably invalidated according to the product taken out of the display location by the customer and being housed the shopping basket 80.

The second invalidation period TM2 may be set in the same manner as in FIG. 53B.

In the fourth example described above, the invalidation period TM1 is set using the portable terminal 60 having read the product information code 3001 as a trigger, and the invalidation period TM2 is set using the connection information code CD having been read thereafter as a trigger.

When the portable terminal 60 is made to read the product information code 3001 and the connection information code CD, the customer holds the portable terminal 60 placed in the holder 71 in their hand, and a state is created where it is possible to capture an image of the product information code 3001 and connection information code CD. That is, when the portable terminal 60 reads the product information code 3001 and the connection information code CD, it moves when taken out of the holder 71.

Therefore, the portable terminal 60 may use its own movement being detected according to when it is taken out of the holder 71 as a trigger instead of using the product information code 3001 and connection information code CD being read as the trigger for setting the invalidation periods TM1 and TM2.

In this case, the portable terminal 60 may be provided with a motion sensor using a gyro sensor, an angular velocity sensor, or the like. In addition, the portable terminal 60 may set the invalidation period TM1 in response to the motion sensor detecting a first motion, and may set the invalidation period TM2 in response to a second motion being detected within a fixed time following the point in time at which the first motion was detected.

In the second example, the portable terminal 60 may set the invalidation period TM11 in response to the motion sensor detecting motion.

In each of the foregoing embodiments, the invalidation period is set without any particular limitation in response to the portable terminal 60 having performed reading of the product code of a product sold by weight or reading of the connection information code corresponding to the weighing and pricing machine.

In contrast thereto, in the present variation, there may be a case where the invalidation period is not set, even if the portable terminal 60 performs reading of the product information code of the product sold by weight or reading of the connection information code corresponding to the weighing and pricing machine. For this purpose, for example, the portable terminal 60 may determine whether to set the invalidation period under a fixed probability by, for example, the generation of a random number or the like when reading of the product information code of the product sold by weight or reading of the connection information code corresponding to the weighing and pricing machine has been performed.

When the invalidation period is not set, a reading failure state as a non-scan input occurs in response to the customer placing the product sold by weight in the shopping basket 80, and the product is registered as a held product; therefore, the employee performs the operation of holding removal in response. Therefore, provided that the invalidation period is not set at a fixed probability as in the present variation, it may be possible to deter a fraudulent act such as where, for example, a malicious customer simply pretends to register a product sold by weight and places it in the shopping basket 80 and does not purchase it.

In the foregoing embodiment, the invalidation period is set in correspondence with registration of a product sold by weight (and a product sold separately). The setting of the invalidation period may be set when registering a product (hereinafter also referred to as a normal product) other than a product sold by weight to which a product code is normally affixed.

In the case of a normal product, the flow is such that a typical act of the customer according to registration is to take a normal product from a product shelf, and when the portable terminal 60 is made to read the product code of the product taken, the normal product is housed in the shopping basket 80. However, in reality, the pattern of acts according to the registration of this kind of product is diverse and difficult to predict. Therefore, there is a possibility of it being accidentally determined that the act related to the registration performed by the customer at that time is a non-scan input, regardless of the customer having no intention of performing a fraudulent act.

As a specific example, when a certain degree of time is left after the customer has caused the product code to be read until the product is housed in the shopping basket 80 for some reason, a non-scan input may be determined when the product is housed in the shopping basket 80. When a product is moved for organization in the shopping basket 80 after being housed, a non-scan input may be determined according to a change in the captured image while being organized, despite the product having been housed in the shopping basket 80 within a standard time after the product code was read.

Therefore, the invalidation period is set during registration corresponding to the normal product. As one specific example, the invalidation period may be set until a fixed time passes from a timing at which the portable terminal 60 reads the product code of the normal product. Erroneous determination of a non-scan input as described above may thereby be avoided.

The length of the invalidation period may be changed according to the product, customer, or the like. For example, it takes more time to house large or heavy products in the shopping basket 80 than other products. Therefore, for example, an invalidation period longer than the standard may be set for large or heavy products on the basis of the setting in the product information. For example, when the customer is of a certain age or greater on the basis of member information or the like, an invalidation period longer than the standard may be set.

In the foregoing embodiments and variations, a portion of the processing executed by the portable terminal 60, the weighing and pricing machine 10, and the self-checkout machine 40 may be executed by a higher level device, such as the TMS 20.

A configuration of a thin-client system may be provided to the SCS of the fourth example as one of the modes described above.

As one example, the TMS 20 or another server may be configured as a server that supports a thin-client (for example, a cloud server), and the portable terminal 60, weighing and pricing machine 10, self-checkout machine 40, or the like may function as a thin-client. In this case, the thin-client terminal such as the portable terminal 60, weighing and pricing machine 10, self-checkout machine 40, or the like transmits information, such as a captured image or a command corresponding to an operation performed on itself, to the cloud server. The cloud server may execute processing in response to information received from the thin-client terminal and transmit image data or web page data as a screen or the like whereon the processing result is reflected to the thin-client terminal. The portable terminal 60, weighing and pricing machine 10, self-checkout machine 40, or the like as the thin-client terminal displays the transmitted image data or web page data using an image viewer or a web browser.

Under the foregoing embodiment, for example, the portable terminal 60, which is the thin-client terminal, transmits a captured image to the cloud server, and on the basis of the captured image received by the cloud server, the product registration processing, detection of the occurrence of the reading failure state, control of reading failure invalidation, or the like may be executed.

Each of the foregoing embodiments and each variation may be combined as appropriate.

The SCS according the fourth example as described above is an SCS (SCS) whereby the portable terminal (for example, the portable terminal 60) operated by the customer in the store registers a product, wherein the SCS is further provided with reading means (a reader) for reading a code; detection means (an additional detector) for detecting the occurrence of a reading failure state in which the customer secures a product for which the reading means has not performed reading of a product code from among the codes; display means (a display) for performing display of information relating to the reading failure state detected by the detection means; and invalidation means (an invalidation controller) for performing invalidation control to cause a result to arise where detection of the reading failure state according to the occurrence of the reading failure state becomes invalid on the basis of a timing at which the reading means reads a predetermined code (product information code 3001, connection information code CD) (steps S301 to S304, S401 to S405, S501 to S505).

According to the foregoing configuration, when the product information code 3001 or the connection information code CD is read, for example, at the selling area of a product sold by weight (or product sold separately), detection regarding the occurrence of the reading failure state may cause an invalid result to arise. Here, causing a result to arise where detection regarding the occurrence of the reading failure state becomes invalid includes briefly invalidating the occurrence of the detected reading failure state.

It is thereby possible to perform a suitable determination of a fraudulent act according to the state of the customer during product registration.

In the SCS of the fourth example, the predetermined code is a product information code for specifying a product sold by weight or a product sold separately, and the invalidation means applies the invalidation control to at least one of the occurrence of the reading failure state up until before a predetermined time, and the occurrence of the reading failure state up until after a predetermined time, wherein a point in time where the reading means reads the product information code is taken as a reference (steps S301, S302, S401 to S405, S501 to S505).

According to the foregoing configuration, in response to the portable terminal 60 reading the product information code 3001 provided at the display location of products, it is possible not to treat this as a reading failure state, even if the customer housed the product taken out from the display location in the shopping basket 80.

In the SCS of the fourth example, the predetermined code is a device code (connection information code CD) for specifying a device that performs pricing processing of a product sold by weight or a product sold separately, and the invalidation means applies the invalidation control to at least one of the occurrence of the reading failure state up until before a predetermined time, and the occurrence of the reading failure state up until after a predetermined time, wherein a point in time where the reading means reads the device code is taken as a reference (steps S303, S304, S401 to S405, S501 to S505).

Since the weighing and pricing machine 10 connected to the portable terminal 60 is uniquely specified by the connection information code CD, it has a function as a device code for specifying a device.

According to the foregoing configuration, in response to the portable terminal 60 reading the connection information code CD for connecting to the weighing and pricing machine 10, it is possible not to treat this as a reading failure state, even if, for example, pricing is finished and the customer housed the product to which a label is affixed in the shopping basket 80.

In the SCS of the fourth example, the predetermined code includes a product code for specifying a product sold by weight or a product sold separately, and a device code for specifying a device for performing pricing processing of the product sold by weight or the product sold separately, and the invalidation means applies invalidation processing to the occurrence of the reading failure state from the point in time at which the product code is read to the point in time at which the device code is read by the reading means.

According to the foregoing configuration, it is reliably possible not to treat an event wherein the customer housed the product taken out from the display location in the shopping basket 80 after the product information code 3001 as a reading failure state.

The reading means that the SCS of the fourth example is provided with reads a code from a captured image, captured by the image capture means (camera 606), of a reading operation wherein the customer has caused the portable terminal to read the code, and the detection means detects the occurrence of the reading failure state on the basis of a change in the captured image obtained by the image capture means provided to capture an image of the product secured by the customer.

In the foregoing configuration, the reading means reads a code from the captured image obtained by the image capture means, and wherein the captured image is of a reading operation wherein the customer has caused the portable terminal to read the code. The detection means detects the occurrence of the reading failure state on the basis of a change in the captured image obtained by image capture by the image capture means provided so as to capture an image of the product secured by the customer.

This kind of configuration makes it possible to perform reading of the code and detect the occurrence of the reading failure state on the basis of the captured image obtained by the camera 606 that the portable terminal 60 is provided with.

The processing of each device described above may be performed by recording a program for realizing a function of a device included in the SCS described above on a computer-readable recording medium, and causing a computer system to read and execute the program recorded on the recording medium. Here, "causing a computer system to read and execute the program recorded on the recording medium" includes installing the program in the computer system. "Computer system" as used herein includes hardware such as an OS, a peripheral device, or the like. The "computer system" may include a plurality of computer devices connected via a network including a communication line such as the internet, a WAN, a LAN, a dedicated line, or the like. "Computer-readable recording medium" refers to a storage device such as a flexible disk, a magneto-optical disk, a portable medium such as ROM or CD-ROM, a hard disk-equipped computer system, or the like. In this manner, the recording medium wherein the program is stored may be a non-transient recording medium such as CD-ROM or the like. The recording medium also includes an internally or externally-provided recording medium accessible from a distribution server for distributing the program. The code of the program stored in the recording medium of the distribution server may be different from the code of the program of a format executable by the terminal device. Namely, provided that installation is possible in a format executable by the terminal device after being downloaded from the distribution server, any format stored by the distribution server is acceptable. The configuration wherein the program is divided into a plurality and combined by the terminal device after being downloaded at different timings and the distribution server for distributing each of the divided programs may be different. Moreover, the "computer-readable recording medium" includes those that hold a program for a fixed period of time, such as a volatile memory (RAM) inside the computer system serving as a server or a client when the program is transmitted via a network. The foregoing program may be for realizing a portion of the functions described above. Moreover, it may be a so-called difference file (difference program) that is capable of realizing the functions described above in combination with a program already recorded in the computer system.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A self-checkout system comprising:
a camera that captures images of a scene where a customer attempts to register products using a portable terminal;
a checkout device that checks out one or more of the products that have been successfully registered by the portable terminal;
a detector that detects a registration failure state where at least one of the products was unsuccessfully registered by the portable terminal; and
a display that displays, during a period in which the checkout device is checking out the one or more successfully registered products, the detected registration failure state, wherein
the display displays a registration result information list including specified registration information and unspecified information,
the specified registration information is information regarding the one or more successfully registered products,
the unspecified information is information regarding the at least one unsuccessfully registered product, and
in the registration result information list, a disposition of the unspecified information is continuous with a disposition of the specified registration information.

2. The self-checkout system according to claim 1, wherein
the detector detects the registration failure state as a result of the portable terminal failing to read an identification code of the at least one unsuccessfully registered product, and
when the detector detects the registration failure and the at least one unsuccessfully registered product is input into a product input unit, the display displays some of the captured images corresponding to a predetermined period before and after the at least one unsuccessfully registered product is input into the product input unit.

3. The self-checkout system according to claim 1, wherein the display displays:
a screen on which the checkout device carries out processing of the at least one unsuccessfully registered product, and
one of the captured images corresponding to the at least one unsuccessfully registered product.

4. A self-checkout method executed by a self-checkout system comprising a portable terminal by which a customer attempts to register products and a checkout device that checks out one or more of the products that have been successfully registered by the portable terminal, the self-checkout method comprising:
capturing images of a scene where the customer attempts to register the products using the portable terminal;
attempting to read identification codes of the products using the portable terminal;
detecting a registration failure state as a result of the portable terminal failing to read an identification code of at least one of the products that was unsuccessfully registered by the portable terminal;
during checkout by the checkout device for the one or more successfully registered products, when the registration failure state is detected and the at least one unsuccessfully registered product is input into a product input unit, displaying some of the captured images corresponding to a predetermined period before and after the at least one unsuccessfully registered product is input into the product input unit; and
displaying a registration result information list including specified registration information and unspecified information, wherein
the specified registration information is information regarding the one or more successfully registered products,
the unspecified information is information regarding the at least one unsuccessfully registered product, and
in the registration result information list, a disposition of the unspecified information is continuous with a disposition of the specified registration information.

5. A self-checkout system comprising:
a camera that captures images of a scene where a customer attempts to register products using a portable terminal;
a checkout device that checks out one or more of the products that have been successfully registered by the portable terminal;
a detector that detects a registration failure state where at least one of the products was unsuccessfully registered by the portable terminal;
a display that displays, during a period in which the checkout device is checking out the one or more successfully registered products, the detected registration failure state;
a reader that reads a product code;
a receiver that receives product information corresponding to the read product code;
an additional detector that detects a reading failure state indicating that the customer has secured a product for which the reader has not read the product code; and
an additional display that displays a candidate product of a predetermined sales method in a selectable manner when the additional detector detects the reading failure state.

6. A self-checkout system comprising:
a camera that captures images of a scene where a customer attempts to register products using a portable terminal;
a checkout device that checks out one or more of the products that have been successfully registered by the portable terminal;
a detector that detects a registration failure state where at least one of the products was unsuccessfully registered by the portable terminal;
a display that displays, during a period in which the checkout device is checking out the one or more successfully registered products, the detected registration failure state;
a reader that reads codes;
an additional detector that detects an occurrence of a reading failure state in which the customer secures a product for which the reader has not read a product code among the codes; and
an invalidation controller, wherein
the display displays information relating to the reading failure state detected by the additional detector, and
the invalidation controller performs invalidation control based on a timing at which the reader reads a code which is a product information code to specify a product sold by weight or a product sold separately, such that detection of the reading failure state according to the occurrence of the reading failure state becomes invalid.

* * * * *